United States Patent [19]

Kim et al.

[11] Patent Number: 4,625,308

[45] Date of Patent: Nov. 25, 1986

[54] ALL DIGITAL TDMA DYNAMIC CHANNEL ALLOCATED SATELLITE COMMUNICATIONS SYSTEM AND METHOD

[75] Inventors: Kap S. Kim, Gaithersburg; William R. H. Tisdale, Baltimore; Bruce S. Andrews; T. Randolph Nash, both of Rockville; Kathleen J. Kolodgie; Steven S. Eiserike, both of Rockville, all of Md.

[73] Assignee: American Satellite Company, Rockville, Md.

[21] Appl. No.: 445,501

[22] Filed: Nov. 30, 1982

[51] Int. Cl.⁴ .............................................. H04J 3/06
[52] U.S. Cl. .................................................. 370/104
[58] Field of Search ...................... 370/104, 95, 91, 85

[56] References Cited

U.S. PATENT DOCUMENTS

| | | | |
|---|---|---|---|
| 3,634,628 | 1/1972 | Sekimoto et al. | 370/80 |
| 4,054,753 | 10/1977 | Kaul et al. | 370/104 |
| 4,262,356 | 4/1981 | Lautier et al. | 370/104 |
| 4,287,588 | 9/1981 | Segner | 370/29 |
| 4,295,217 | 10/1981 | Fennel, Jr. et al. | 370/81 |
| 4,312,063 | 11/1982 | Warner | 370/68 |
| 4,322,845 | 3/1982 | Fennel, Jr. et al. | 370/104 |
| 4,346,470 | 8/1982 | Alvarez, III et al. | 370/104 |

OTHER PUBLICATIONS

Habib, E. J. and Mittal, S., "A New Integrated Service for American Satellite Network," Publication No. AIAA-82-0617-CP, *AIAA* 9th Communications Satellite Systems Conference, Mar. 7-11, 1982.

*Primary Examiner*—Douglas W. Olms
*Assistant Examiner*—Frank M. Scutch, III
*Attorney, Agent, or Firm*—Saidman, Sterne, Kessler & Goldstein

[57] ABSTRACT

An all digital TDMA dynamic channel allocated satellite communications system and method provides a satellite communications network between geographically separated nodes. The topology of the network is controlled by an on-line master node in accordance with user demands and operator commands received from the nodes in the network. A frame communication format is employed where each node in the system is allocated a burst within each frame. The length of the bursts is controlled by the on-line master node to provide the communications channels in the network. Control information to and from the on-line master node is conveyed in the network via the satellite link in selected frame bursts. In this way, the on-line master node dynamically controls the topology of the satellite communications network.

66 Claims, 59 Drawing Figures

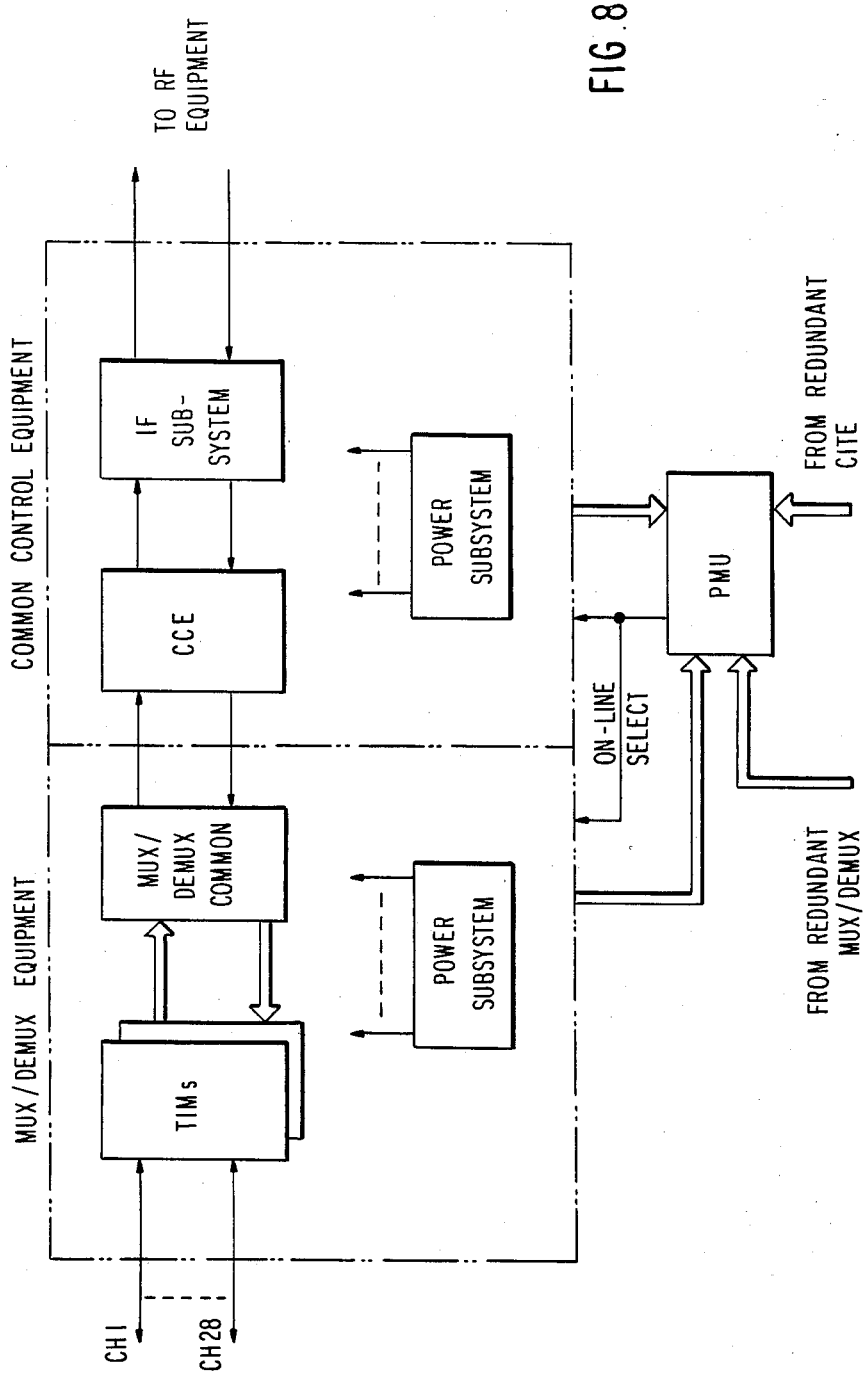

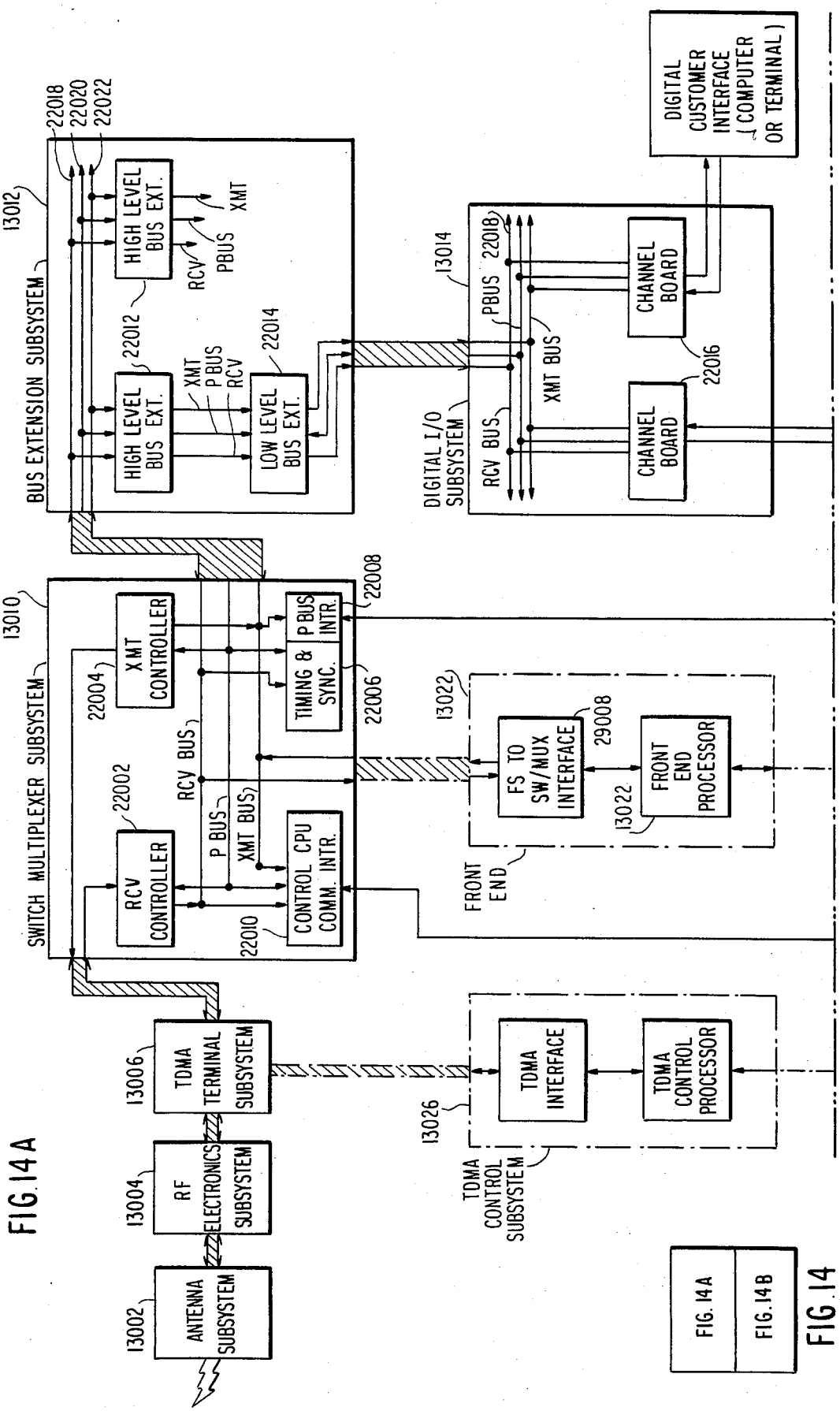

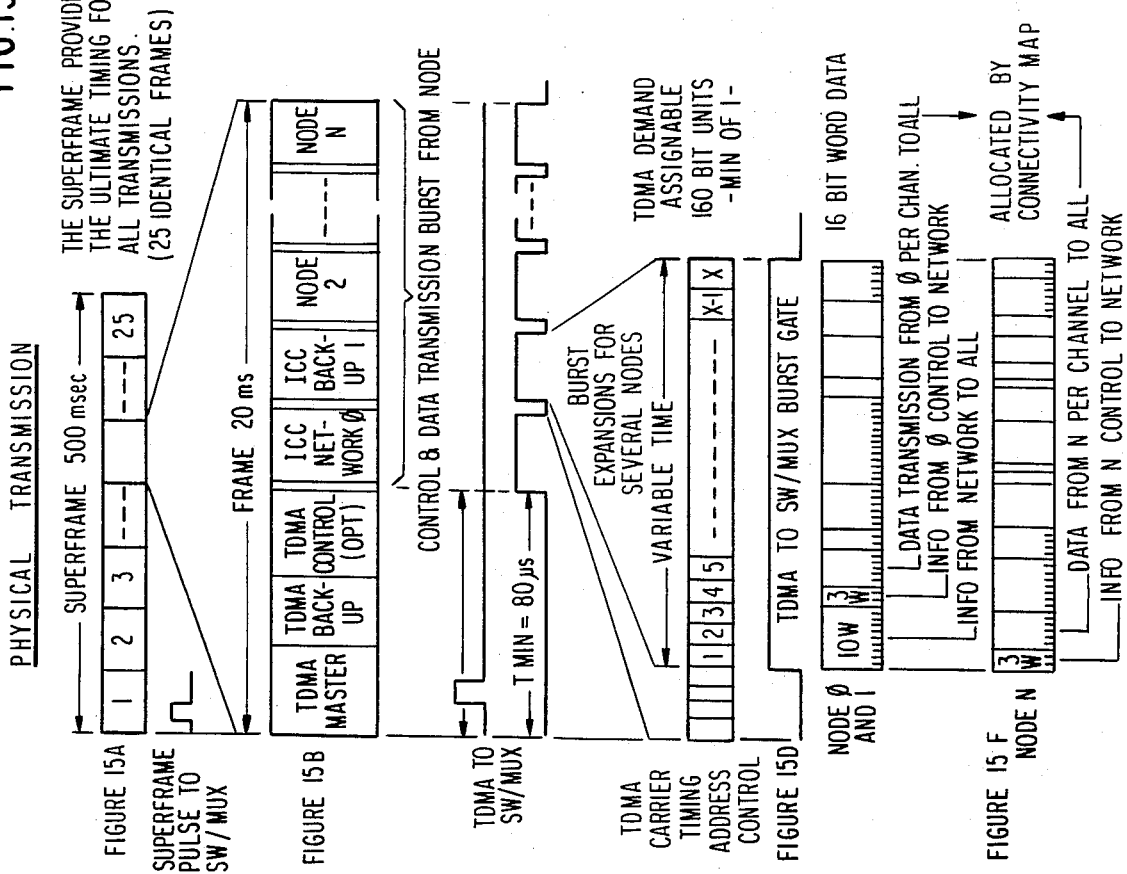

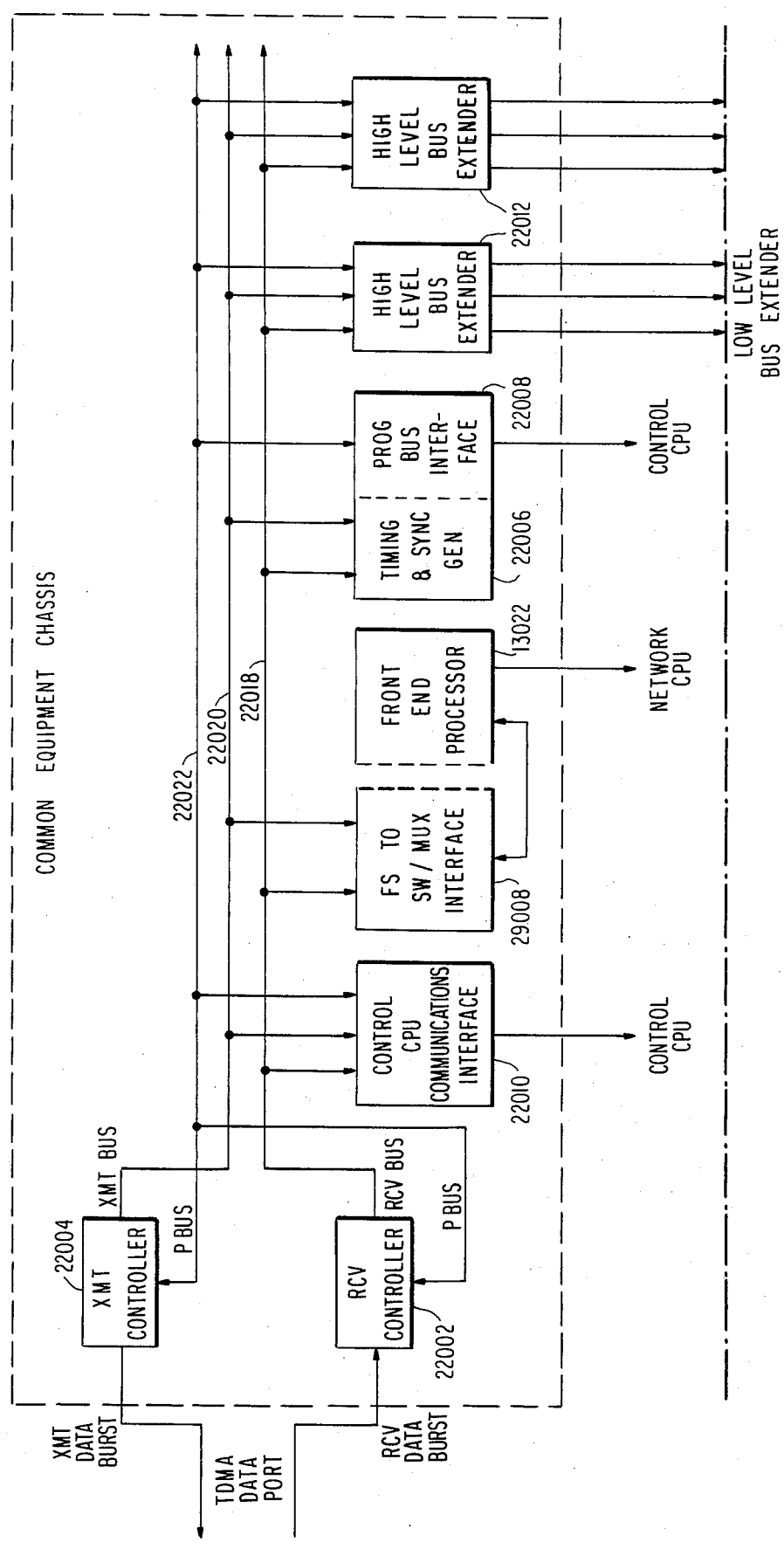

FIG. 23A

CONNECTIVITY MAPS

| | | |
|---|---|---|
| XMT | NODE 1 | CH 8 |
| RCV | NODE 4 | CH 3 |
| | # BLOCKS 3 | |

| | | |
|---|---|---|
| XMT | NODE 1 | CH 49 |
| RCV | NODE 4 | CH 7 |
| | # BLOCKS 12 | |

9600 B/S

| | | |
|---|---|---|
| XMT | NODE 1 | CH 41 |
| RCV | NODE 2 | CH 32 |
| | # BLOCKS 20 | |

16 KB/S

| | | |
|---|---|---|
| XMT | NODE 1 | CH 53 |
| RCV | NODE 2 | CH 17 |
| | # BLOCKS 3 | |

2400 B/S

| | | |
|---|---|---|
| XMT | NODE 1 | CH 14 |
| RCV | NODE 3 | CH 9 |
| | # BLOCKS 3 | |

| | | |
|---|---|---|
| XMT | NODE 2 | CH 32 |
| RCV | NODE 1 | CH 41 |
| | # BLOCKS 20 | |

16 KB/S

| | | |
|---|---|---|
| XMT | NODE 2 | CH 189 |
| RCV | NODE 3 | CH 207 |
| | # BLOCKS 80 | |

| | | |
|---|---|---|
| XMT | NODE 2 | CH 28 |
| RCV | NODE 4 | CH 152 |
| | # BLOCKS 30 | |

| | | |
|---|---|---|
| XMT | NODE 2 | CH 17 |
| RCV | NODE 1 | CH 53 |
| | # BLOCKS 3 | |

| | | |
|---|---|---|
| XMT | NODE 3 | CH 207 |
| RCV | NODE 2 | CH 189 |
| | # BLOCKS 8 | |

| | | |
|---|---|---|
| XMT | NODE 4 | CH 3 |
| RCV | NODE 1 | CH 8 |
| | # BLOCKS 3 | |

| | | |
|---|---|---|
| XMT | NODE 4 | CH 152 |
| RCV | NODE 2 | CH 28 |
| | # BLOCKS 30 | |

24 KB/S

| | | |
|---|---|---|
| XMT | NODE 4 | CH 7 |
| RCV | NODE 1 | CH 49 |
| | # BLOCKS 12 | |

BIT MAPS

NODE 2 XMT BIT MAP

| EVENT # 19 | CH 32 |
|---|---|
| EVENT # 99 | CH 189 |
| EVENT # 129 | CH 28 |
| EVENT # 132 | CH 17 |
| EVENT # 16384 | CH 1023 |

EVENT #19
WORDS + 1 =
20 WORDS
EVENT # 99
99−19 = 80 BITS

NODE 2 RCV BIT MAP

| EVENT # 16384 | CH 1023 |
|---|---|
| EVENT # 14 | CH 1023 |
| EVENT # 34 | CH 32 |
| EVENT # 37 | CH 17 |
| EVENT # 16384 | CH 1023 |
| EVENT # 16384 | CH 1023 |
| EVENT # | CH |
| EVENT # 16384 | CH |
| EVENT # | CH |
| EVENT # | CH |
| EVENT # 16384 | CH 1023 |

24016

NODE 3 XMT BIT MAP

| EVENT # 2 | CH 207 |
|---|---|
| EVENT # 16384 | CH 1023 |

23002

NODE 3 RCV BIT MAP

| EVENT # 16384 | CH 1023 |
|---|---|
| EVENT # | CH |
| EVENT # | CH |
| EVENT # 16384 | CH 1023 |
| EVENT # 19 | CH 1023 |
| EVENT # | CH |
| EVENT # 16384 | CH 1023 |
| EVENT # 16384 | CH 1023 |
| EVENT # | CH |

FIG. 23

| FIG. 23A |
|---|
| FIG. 23B |

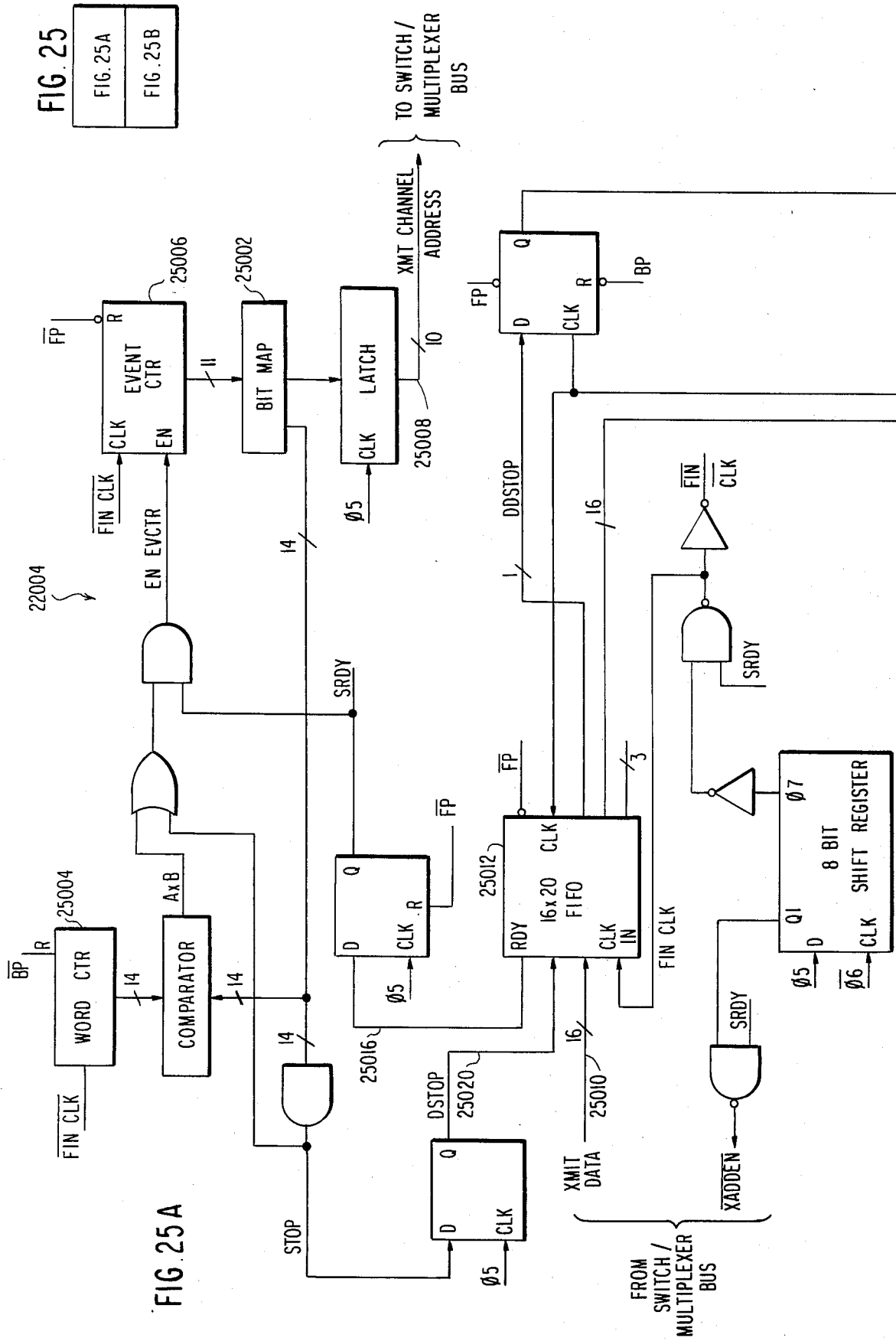

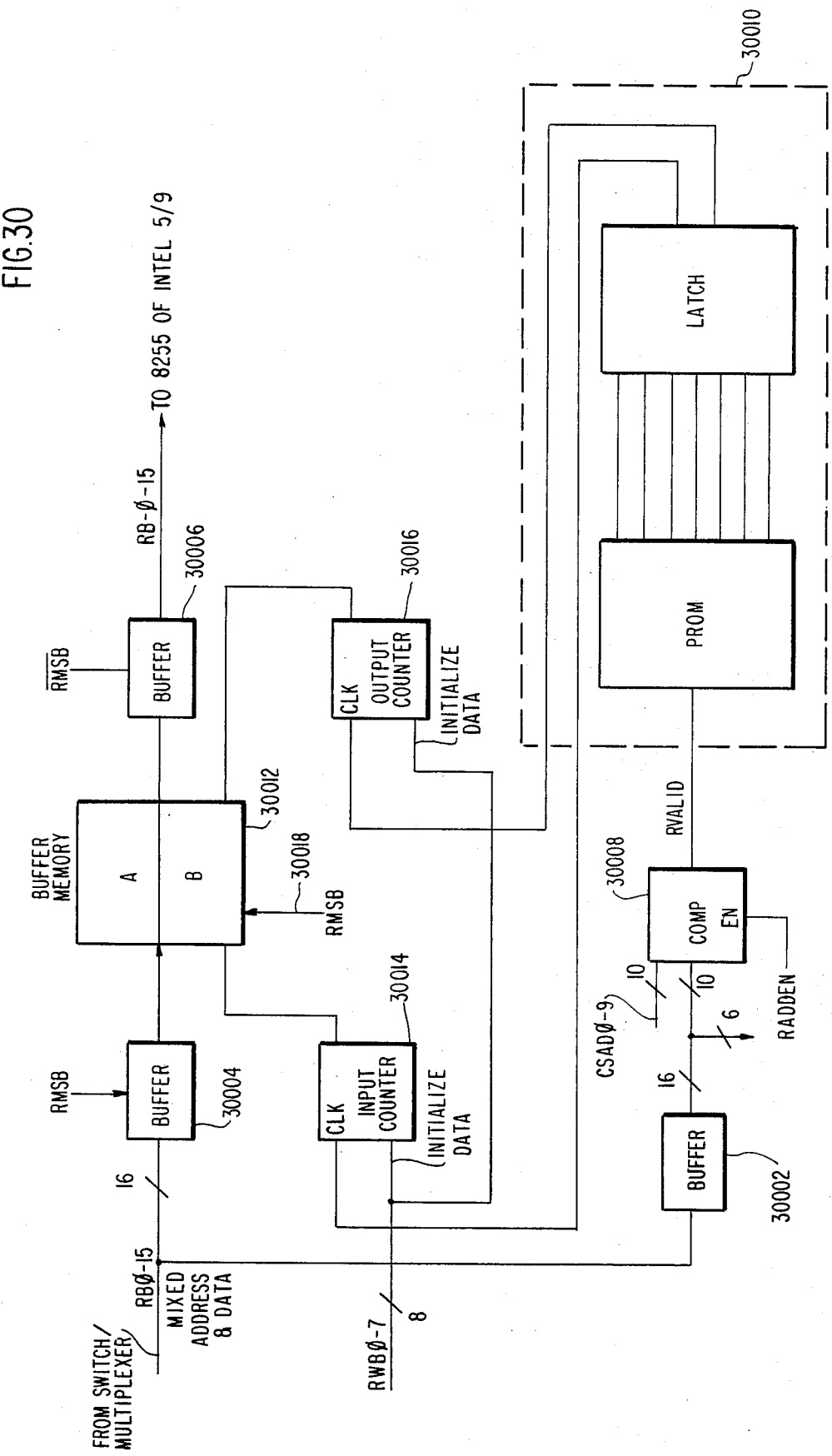

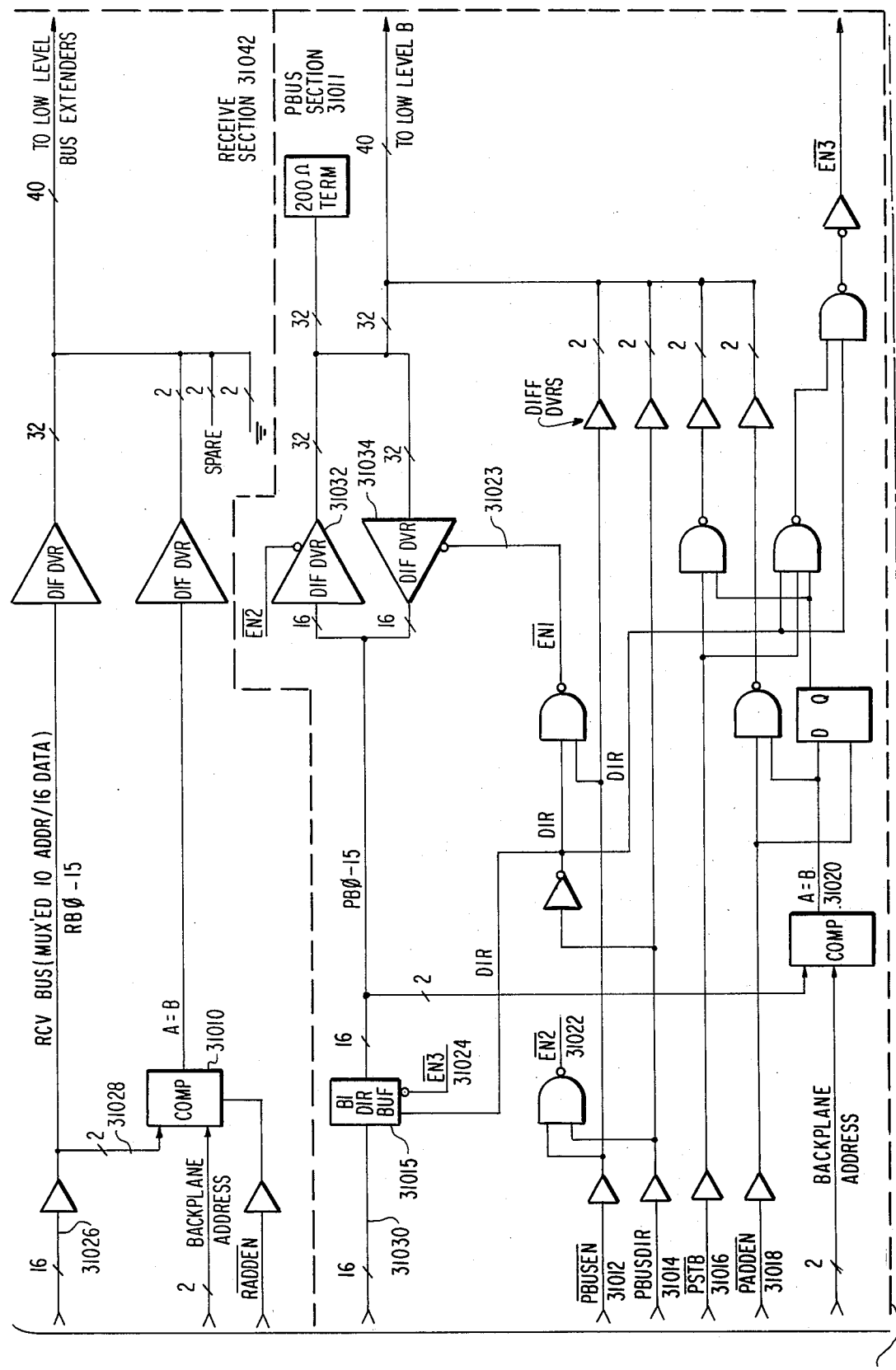

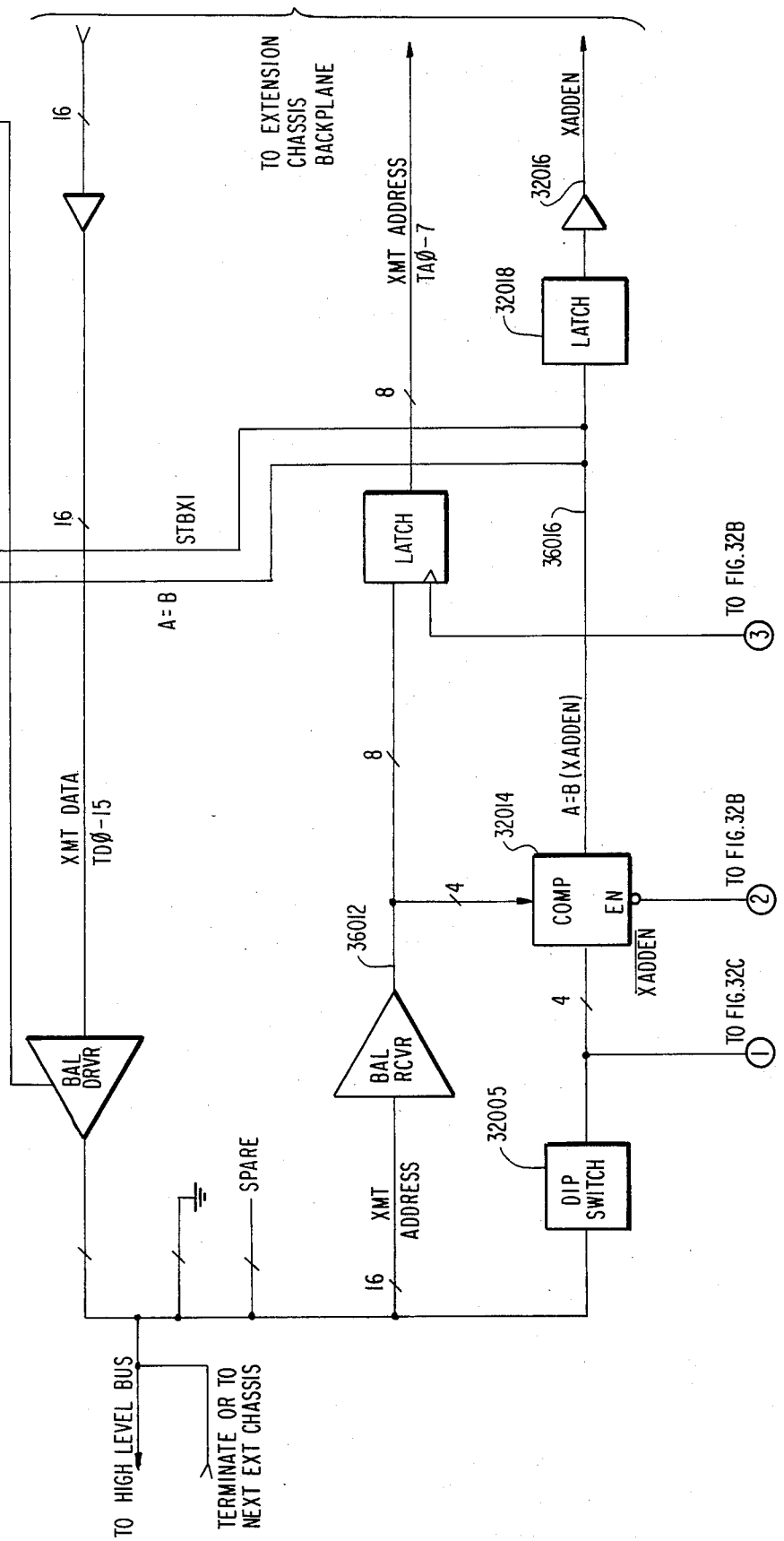

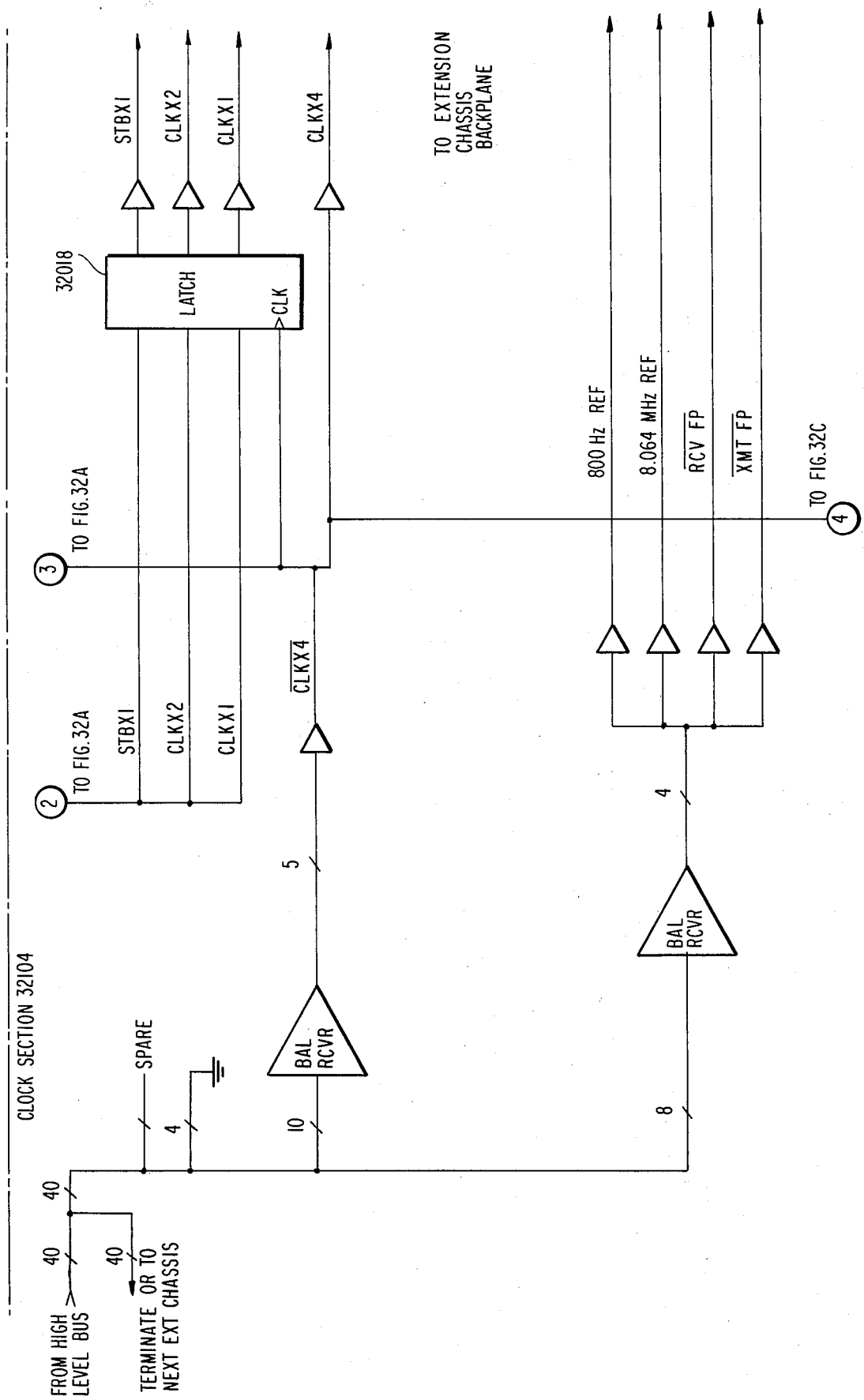

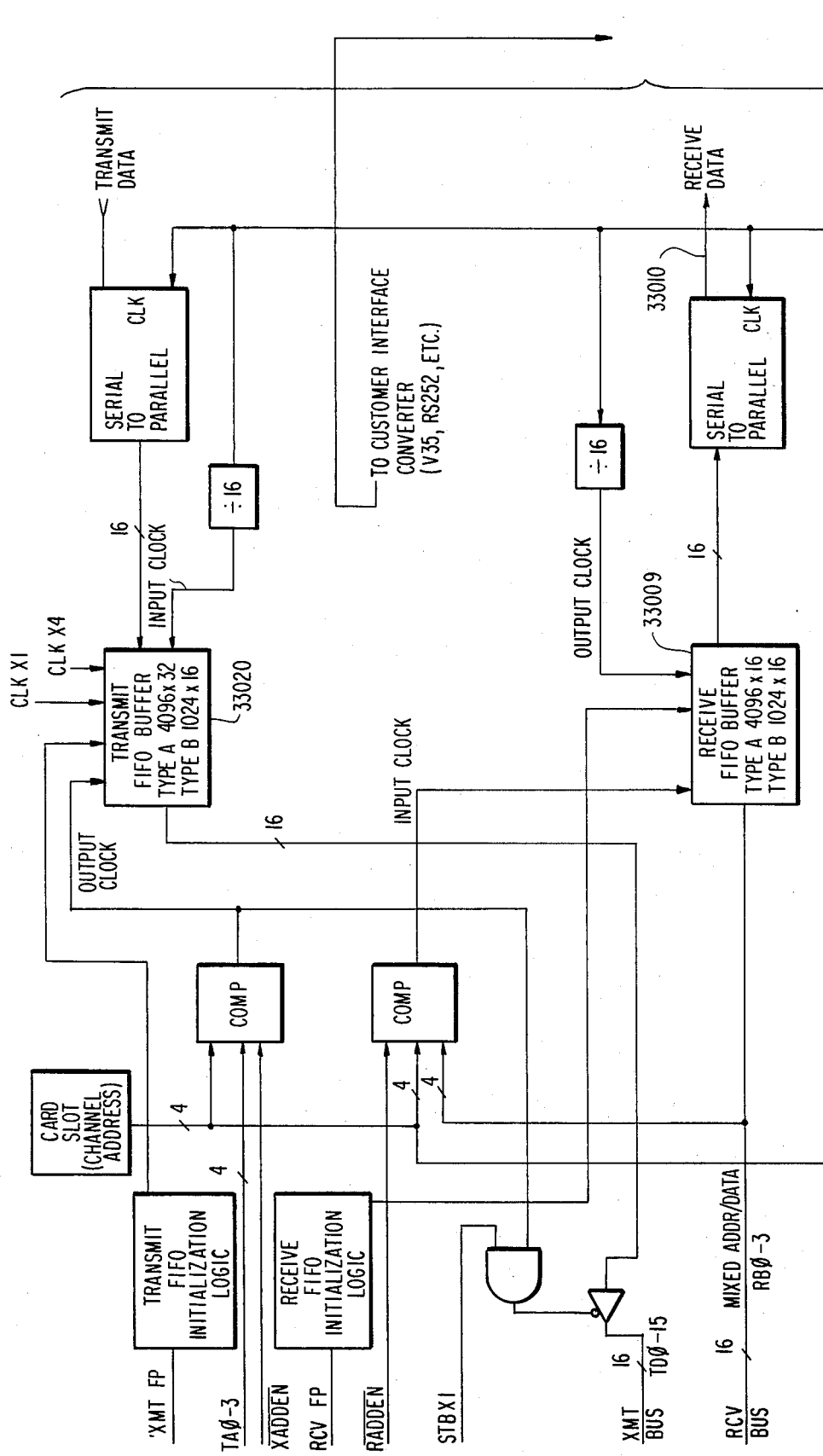

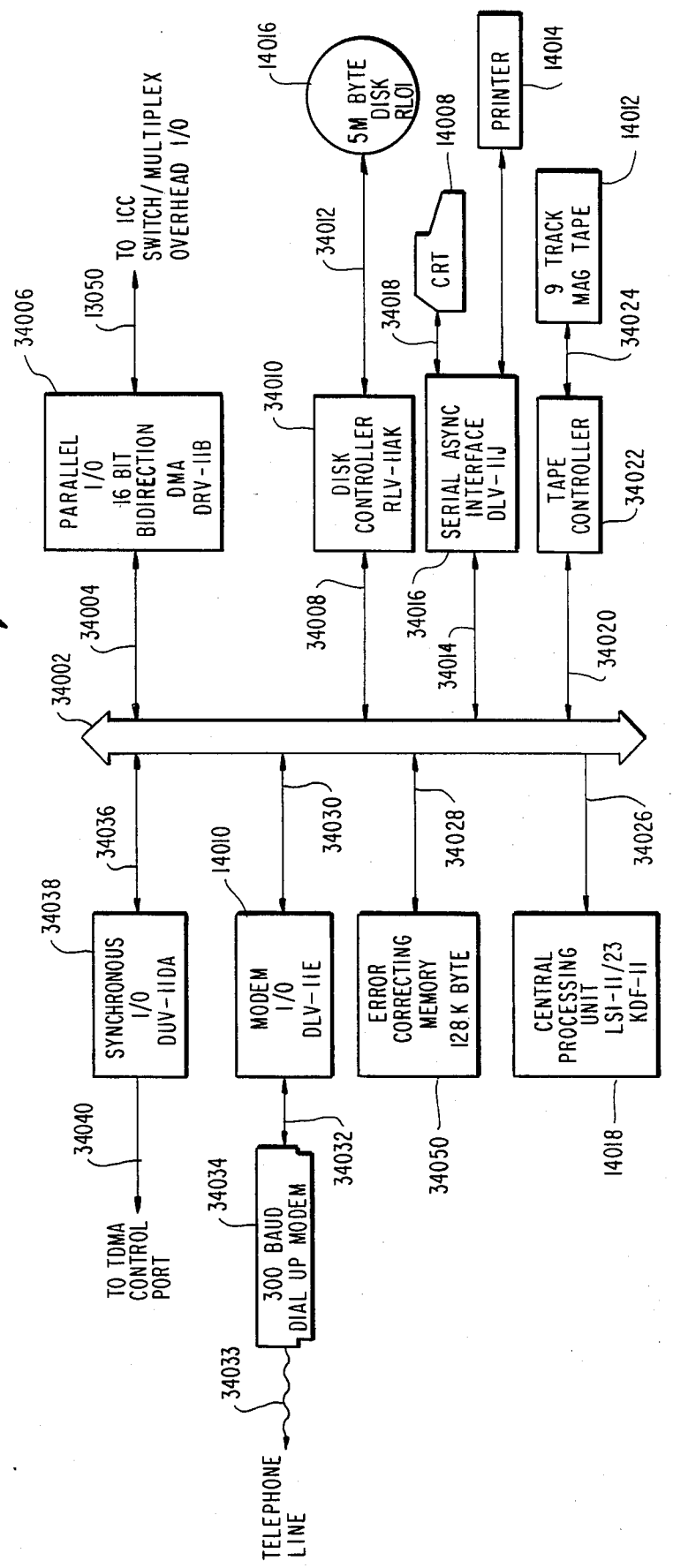

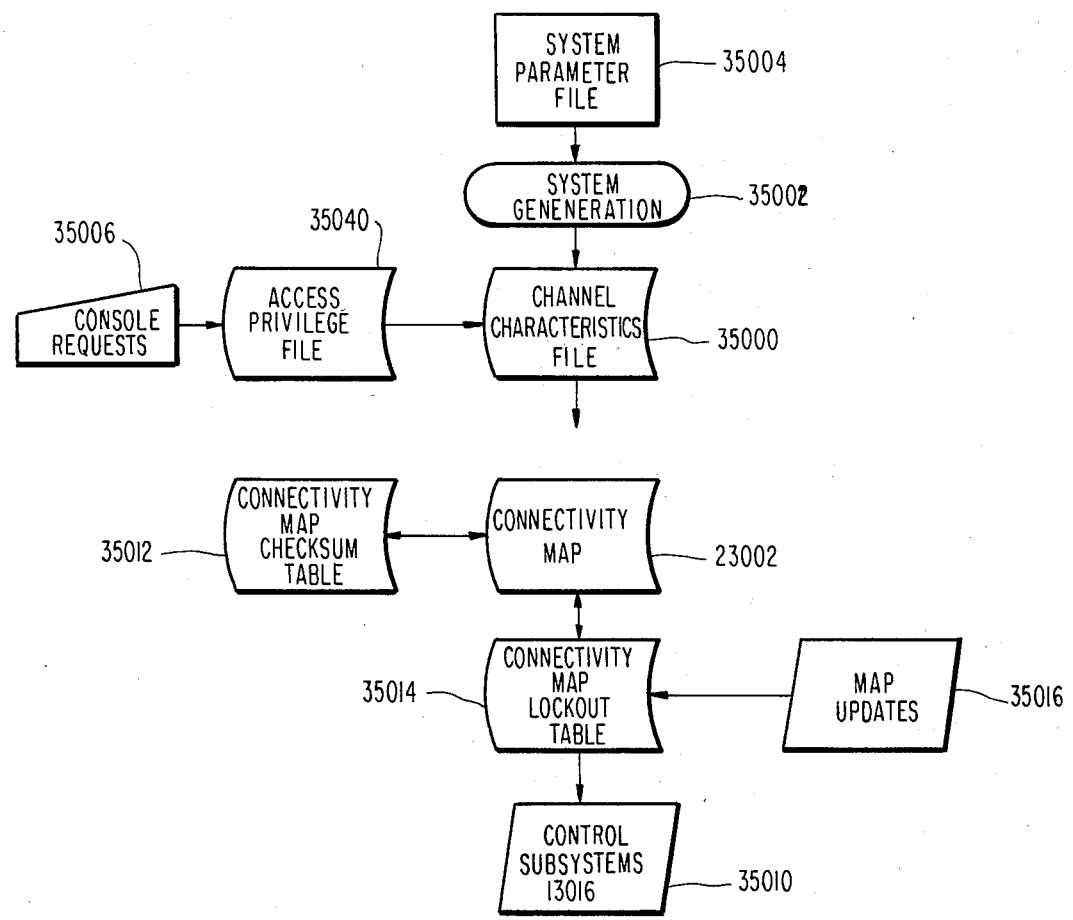
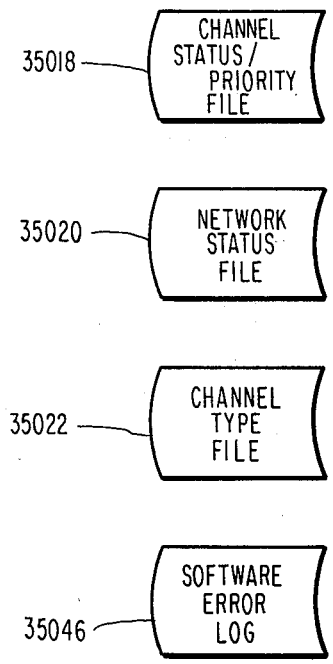
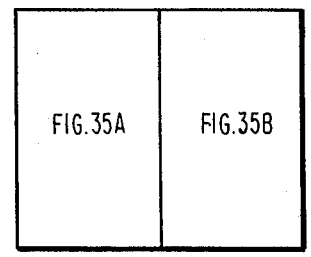
FIG.35A
FIG.35

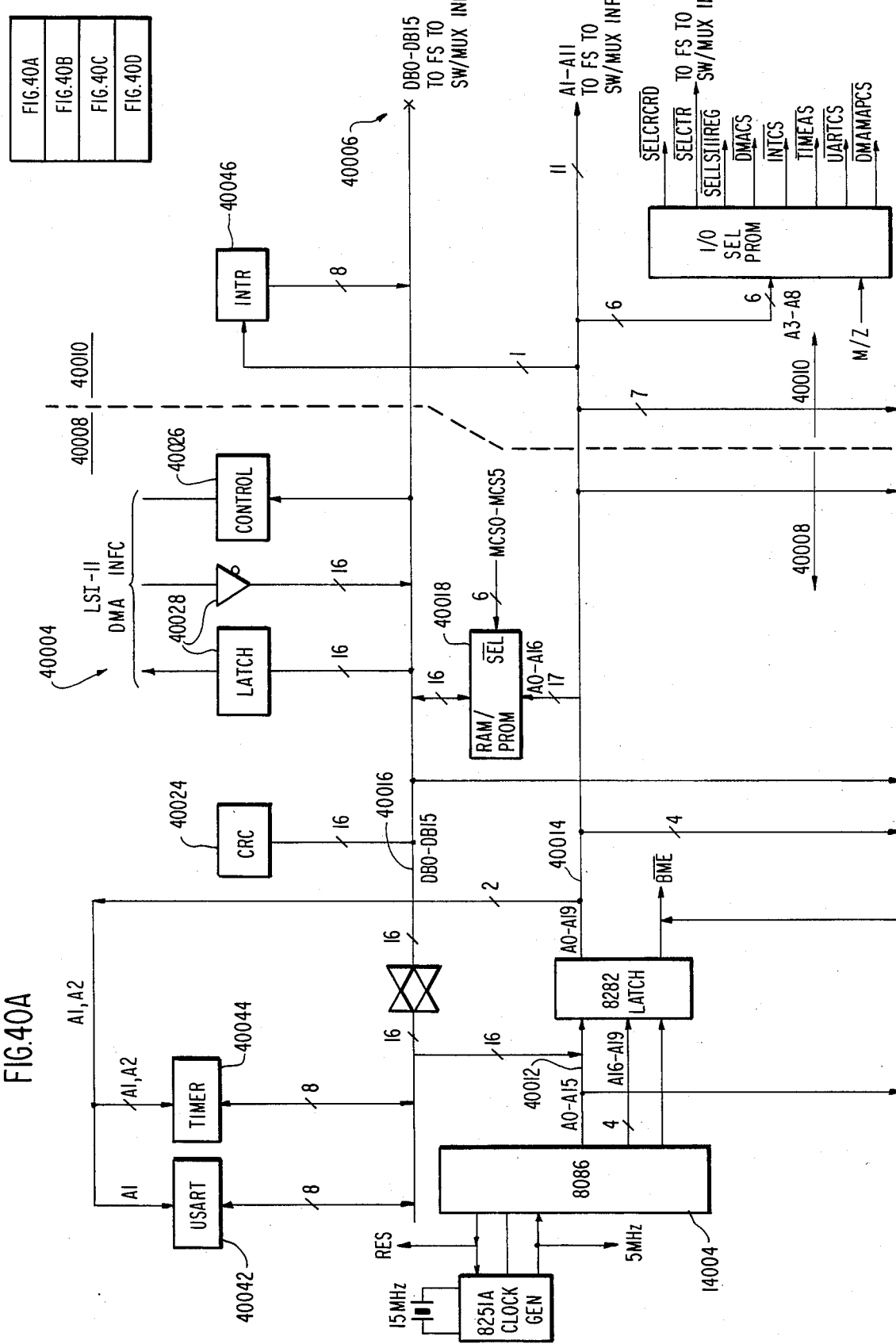

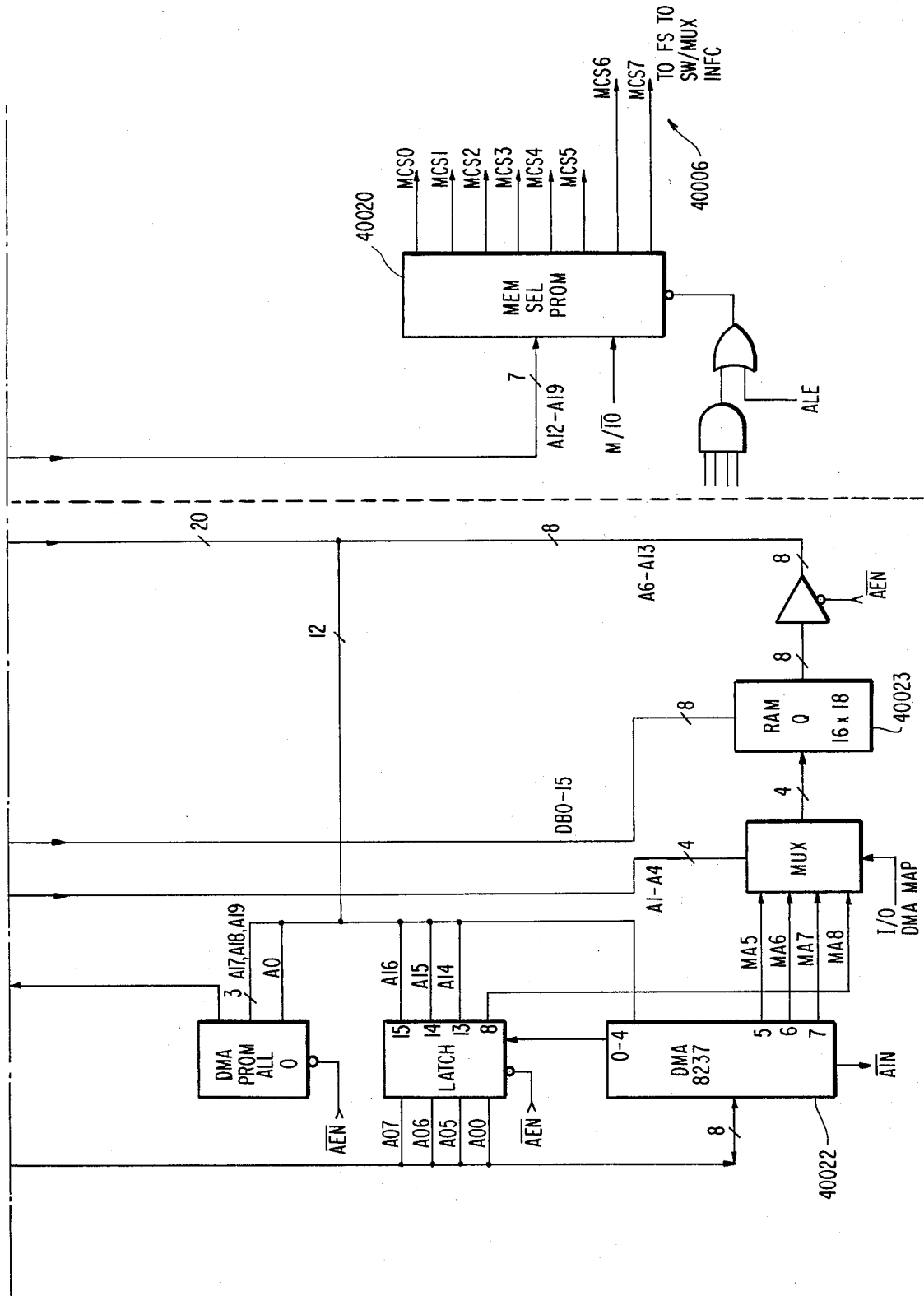

ALL DIGITAL TDMA DYNAMIC CHANNEL ALLOCATED SATELLITE COMMUNICATIONS SYSTEM AND METHOD

BACKGROUND OF THE INVENTION

1. Field of the Invention

The present invention relates to time division multiple access (TDMA) satellite communication systems and methods, and more particularly, to all digital TDMA satellite communication systems and methods having dynamic channel allocation.

2. Description of the Related Art

A generalized satellite service was initiated by the assignee to its customers in 1974. The general service was a basic voice-oriented satellite communication network, serving private business exchanges (PBXs) and dedicated trunk linkes. As shown in FIG. 1, it was comprised of customer equipment, local loops, central offices, microwave interconnect, a satellite, and associated earth stations.

Soon after the introduction of the generalized service, a number of specialized networks were also introduced by the assignee. These satellite networks were dedicated and tailored to individual customer needs. Two examples are shown in FIGS. 2 and 3. These dedicated networks include earth stations located on customer premises and baseband multiplex equipment located adjacent to the customer equipment.

As a result of this experience, the assignee realized the need and turned its attention to the development of a special class of dedicated satellite communications service called SDX (SDX is a registered trademark of American Satellite Company for customer premised service). This innovation was characterized by a 5-meter earth station providing a 56-kilobit per second (Kbps) point-to-point duplex service, as shown in FIG. 4.

The SDX satellite communication service was followed by a frequency division multiplex/frequency division multiple access (FDM/FDMA) satellite communications system. The FDM/FDMA system is shown in FIGS. 5 and 6. It consists of analog multiplex equipment performing several stage multiplexing. The composite baseband is sent to earth station via an analog microwave link, where it is frequency modulated (FM) for satellite transmission. Various earth stations in this network share the satellite in a FDMA mode. FIG. 6 shows how this service is integrated into the associated earth station.

A time division multiplex/time division multiple access (TDM/TDMA) communications system shown in FIG. 7 is arranged quite differently. Such a TDM/TDMA system has been found to exhibit greater versatility as compared to the FMD/FDMA communications system discussed above. In the TDM/TDMA communication system, voice circuits are digitized by using unique channel bank equipment into a standard T1 stream. The T1 strems are multiplexed and transported to the earth station via the digital microwave link, where they are converted back to the original T1 lines. The TDMA equipment provides 4 phase modulation (for T1 streams) and network timing such that each terminal can access the full transponder (satellite) at a periodic rate and without interference to other terminals.

A block diagram of a conventional TDMA satellite communications system is shown in FIG. 8. The TDMA equipment operates at a bit rate of 64 Mbps with a frame period of 750 microseconds. The frame format is shown in FIG. 9. At this bit rate, each 36 megahertz (MHz) satellite transponder supports up to 39 T1 data streams. Higher network throughput (up to 250 Mbps) is obtained by utilizing a multiple transponder hopping (receive and/or transmit) feature. Rate 7/8 forward error correcting code (FEC) is applied selectively on a per T1 channel basis to achieve a BER (bit error rate) improvement of better than 3 orders of magnitude. The system utilizes two reference sync bursts to obtain greater system reliability. A 5.33 Kbps alarm channel is also included for centralizing at the operational control center all alarms from the central offices, microwave repeaters, and earth stations. In this regard, reference is made to the article by E. J. Habib and S. Mittal entitled "A New Integrated Service For American Satellite Network," Publication No. AIAA-81-0617-CP, *AIAA 9th Communications Satellite Systems Conference*, Mar. 7–11, 1982.

The TDM/TDMA system described above, however, does not meet needs of certain users for whom a specialized service is more applicable. Such specialized satellite communications networks can have one of several forms, as shown in FIG. 10: simplex (one way) transmission; point-to-point duplex; broadcast; and, multiway. The fundamental characteristic of these specialized networks is that they are dedicated to the user with on-premise earth stations and utilize fixed single-channel, per-carrier type of transmission. Such specialized systems, however, do not meet the current requirements of the marketplace because requirements have grown to the point where a dynamic reassignment of channel resources per network is complicated and has become a large economic factor.

SUMMARY OF THE INVENTION

The present invention is an all digital time division multiple access (TDMA) dynamic channel allocated satellite communications system and method. There are at least two nodes in the satellite network of the present invention. The nodes are separated geographically and service user devices in their respective geographical areas. Normally, any user device can communicate with any other user device in the network because the communications channels in the network are dynamically allocated in accordance with user requests and operator demands. The dynamic channel allocation capability allows the network of the present invention to service the user devices without requiring reconfiguration necessary in conventional specialized communications systems.

One of the nodes in the network of the present invention is designated as the on-line master node. Another of the nodes is designated as the stand-by master node. All other nodes are designated as slave nodes. The on-line master node controls the network topology in accordance with user requests and operator demands.

All nodes in the network typically include the following: an antenna subsystem; a radio frequency (RF) electronics subsystem; a TDMA terminal subsystem; an integrated communications controller (ICC) subsystem; a voice digitizing equipment subsystem; and a user interactive interface module (UIIM) subsystem. The ICC subsystem typically comprises, at all nodes: a switch/multiplexer subsystem; a bus extension subsystem; a digital input/output (I/O) equipment subsystem; a control subsystem; and a serial subsystem. The on-line master node typically also has the following: an on-line network subsystem; an on-line TDMA control subsystem; and a front end subsystem. The stand-by master node typically also includes the following: a stand-by network subsystem; a stand-by TDMA control subsystem; and a front end subsystem.

The network employs the following TDMA communication format. A frame is the basic building block. A frame includes a plurality of contiguous bursts. Some of the bursts are allocated for control information. In addition, each node in the system is allocated one burst per frame. The length of these bursts is set by the on-line network subsystem in accordance with user demands and operator commands. In this way, a node can receive additional communication capability in a dynamic fashion. A selected number of frames define a superframe. The topology of the network is changed by the on-line network subsystem at superframe boundaries.

In the operation of the network, a user device at any node requests a desired communications channel between it and another user device. A serial subsystem at that node detects the user request (either directly or via an associated UIIM subsystem), and provides the request to its control subsystem. The control subsystem provides the requests to its switch/multiplexer. The switch/multiplexer provides the request to its TDMA terminal, which provides the request as control information in the burst allocated for such information. The control information is received by the TDMA terminal at the on-line master node via the satellite link. The control information is then provided to the on-line network subsystem via its switch/multiplexer and associated front end subsystem.

The on-line network subsystem then determines whether the requested communications channel can be provided. Specifically, it must determine, among other things, whether network bandwidth is available, and whether the destination user device is available to receive communication. This determination is made by successive communications by the on-line network subsystem with the subsystems at the destination user device node and the requesting user device node. If the on-line network subsystem determines that it can provide the requested communication channel, it causes the network to be reconfigured to provide the requested communication channel. The reconfiguration takes place on a superframe boundary. Typically, channels can be provided within a very short period of time (five seconds or less, depending on whether bandwidth is immediately available).

Note that the on-line network subsystem controls the topology of the network. The control subsystem at each node (including the on-line and stand-by master nodes) controls the configuration and operation of its node in accordance with control information provided to it by the on-line master node via the satellite link. Also note that the user devices at each node are controlled by the control subsystem and the associated serial subsystems at the node. The control subsystems, in turn, provide control information via the satellite link to the on-line network subsystem so that the on-line network subsystem can effectively manage the network topology. The on-line network subsystem can change the length of a burst for a given node to accommodate changes in communication channel requirements.

The stand-by master node continuously monitors the operation of the network. When a failure in network operation is detected, the stand-by master node may take control of the system from the prior on-line master node. It will continue to run the network until the prior on-line master node indicates that it can again assume control of the network. Thus, the stand-by master node acts to prevent a network-wide failure due to a failure in the on-line master node.

Additional redundancy can be provided by stand-by subsystems at each of the nodes of the network. This additional redundancy reduces further the likelihood of a failure at a node from impacting on the operation of the network.

The system and method of the present invention can accommodate all types of user devices, both analog and digital, as well as intelligent and standard user devices. By providing dynamic channel allocation capability, the present invention can continually reconfigure the network to accommodate user demands and operator commands.

BRIEF DESCRIPTION OF THE DRAWINGS

Various objects, features, and attendant advantages of the present invention are more fully appreciated as the same becomes better understood with reference to the following detailed description of the present invention when considered in connection with the accompanying drawings, in which:

FIG. 8 is a block diagram of a prior art TDMA terminal of a satellite communications system;

FIG. 14, comprising FIGS. 14A and 14B, is a more detailed block diagram of the subsystems which are present at a node.

FIG. 15 illustrates the frame format used in the present invention.

FIGS. 22A and 22B, is a block diagram of the switch/multiplexer of the present invention.

FIGS. 23A and 23B, is a representation of a typical connectivity map and bit map.

FIG. 25, comprising FIGS. 25A and 25B, is a block diagram of the transmit controller in the switch/multiplexer.

FIG. 30 is a block diagram of the receive section in the control CPU communications channel interface.

FIG. 31, comprising FIGS. 31A and 31B, is a block diagram of a high level bus extender in the bus extension subsystem.

FIG. 32, comprising FIGS. 32A, 32B, 32C, and 32D, is a block diagram of a low level bus extender in the bus extension subsystem.

FIG. 33, comprising FIGS. 33A and 33B, is a block diagram of the digital I/O interface.

FIG. 34 a hardware block diagram of the network subsystem.

FIG. 35, comprising FIGS. 35A and 35B, is a block diagram of the processor employed in the network subsystem.

FIG. 40, comprising FIGS. 40A, 40B, 40C, and 40D, is a block diagram of the front end subsystem.

DETAILED DESCRIPTION OF THE INVENTION

TABLE OF CONTENTS

| | |
|---|---|
| 1.0 The System and Method of the Present Invention-General Overview | 14 |
| 2.0 Antenna Subsystem | 27 |
| 3.0 Radio Frequency (RF) Electronics Subsystem | 28 |

TABLE OF CONTENTS-continued

| | |
|---|---|
| 4.0 Time Division Multiple Access (TDMA) Subsystem | 29 |
| 5.0 Integrated Communications Controller (ICC) Subsystem | 42 |
| 5.1 Switch/Multiplexer Subsystem | 55 |
| 5.2 Bus Extension Subsystem | 73 |
| 5.3 Digital Input/Output (I/O) Equipment Subsystem | 80 |
| 5.4 Network Subsystem | 82 |
| 5.5 Front-End Subsystem | 132 |
| 5.6 Control Subsystem | 155 |
| 5.7 Serial Subsystem | 168 |
| 6.0 Voice Digitizer Equipment Subsystem | 194 |
| 7.0 User Interactive Interface Module (UIIM) Subsystem | 202 |

1.0 The All System and Method of the Present Invention—General Overview

The present invention is an all digital, time division multiple access (TDMA) satellite communications system and method. The present invention employs a complex, multinode network, in which each node is capable of servicing a wide variety of voice and data terminal types. Interconnectivity between terminal devices (called channels) is completely variable, and occurs in response to equipment demand or operator command. Reconfiguration of the network takes place in real-time, without interruption of on-line channels.

Figure 11:
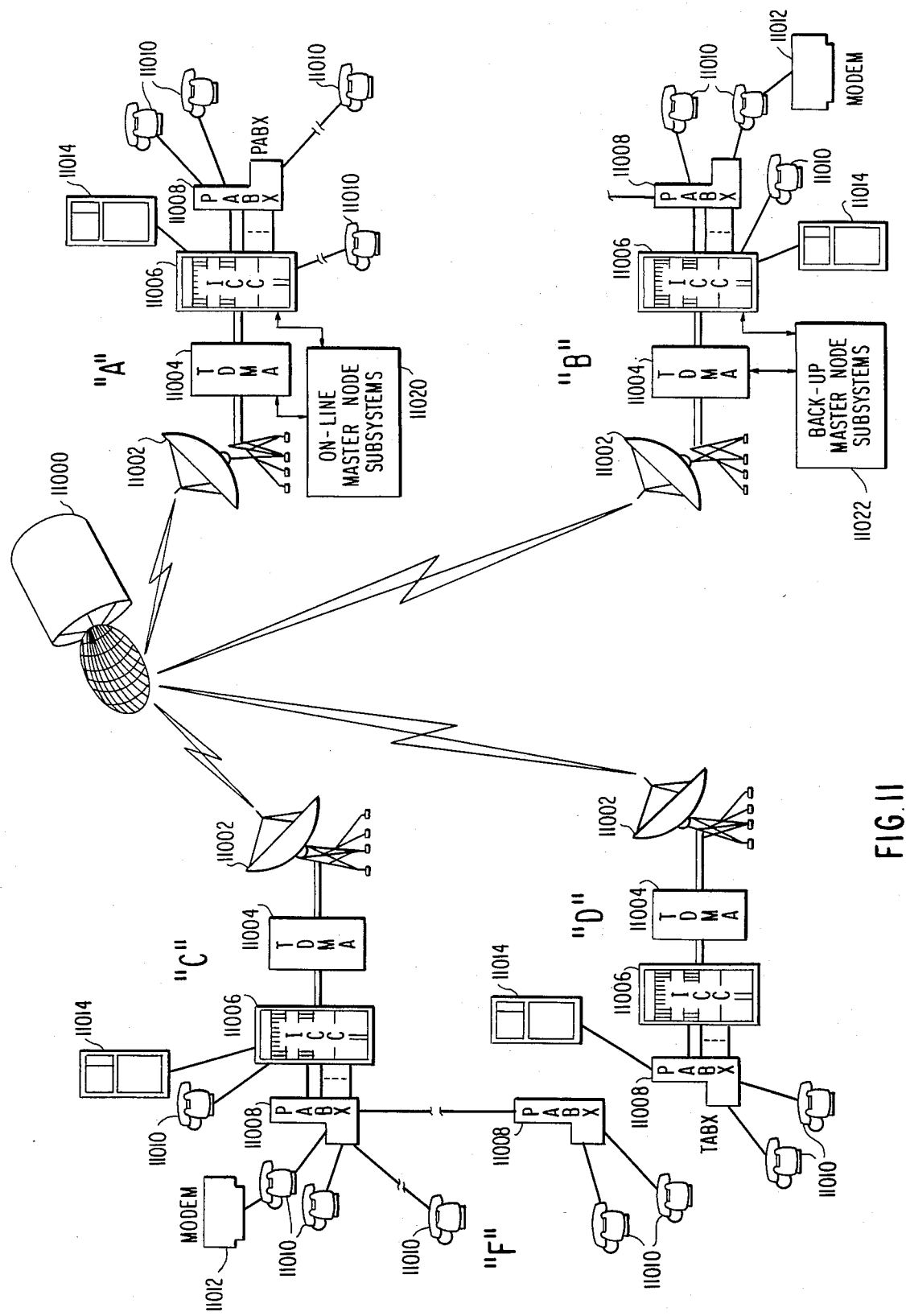
FIG. 11 is a simplified block diagram of the present invention.

Referring now to FIG. 11, which is a very general subsystem diagram of a representative example of the present invention, nodes (or sites) A, B, C, and D are geographically separated from each other. Nodes A, B, C, and D communicate with each other in burst fashion via satellite 11000. In very broad terms, each node includes an antenna, radio frequency (RF) electronics subsystem 11002, a TDMA terminal subsystem 11004, an integrated communications controller 11006, and user devices such as a private automatic business exchange (PABX) 11008, voice terminal devices 11010, and computer devices 11012.

Nodes B, C and D are referred to as slave nodes because they operate via satellite 11000 under control of the on-line master node A. Node B is called the back-up master node, and it normally operates as a slave node unless a failure occurs which results in it becoming the on-line master node. When node B become the on-line master node it assumes control of the system, and node A becomes the back-up master node, as discussed in greater detail below.

Figure 1:
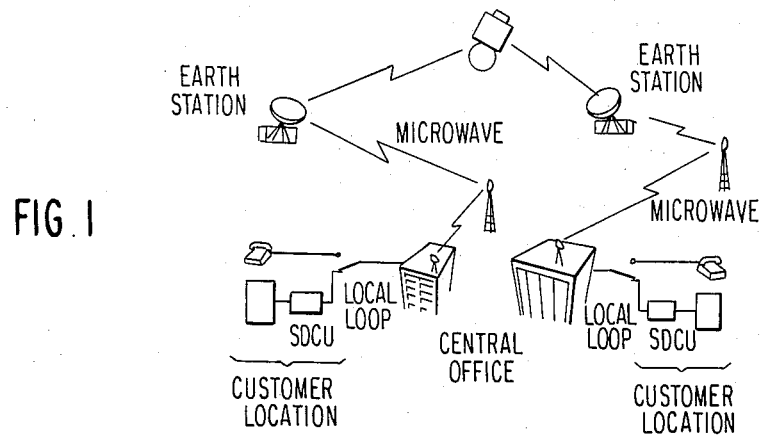
FIG. 1 is a simplified illustration of a prior art voice-grade satellite communications network.
Figure 2:
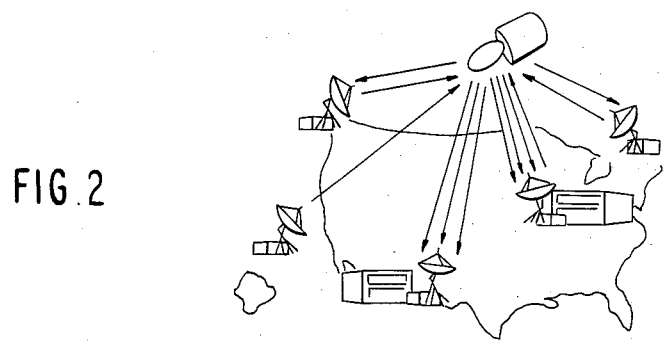
FIG. 2 is a simplified illustration of a prior art dedicated and customer tailored satellite communications network.
Figure 3:
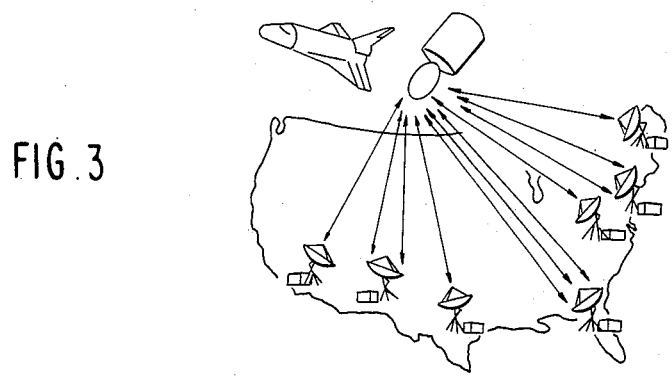
FIG. 3 is a simplified illustration of another prior art dedicated and customer tailored satellite communications network.
Figure 4:
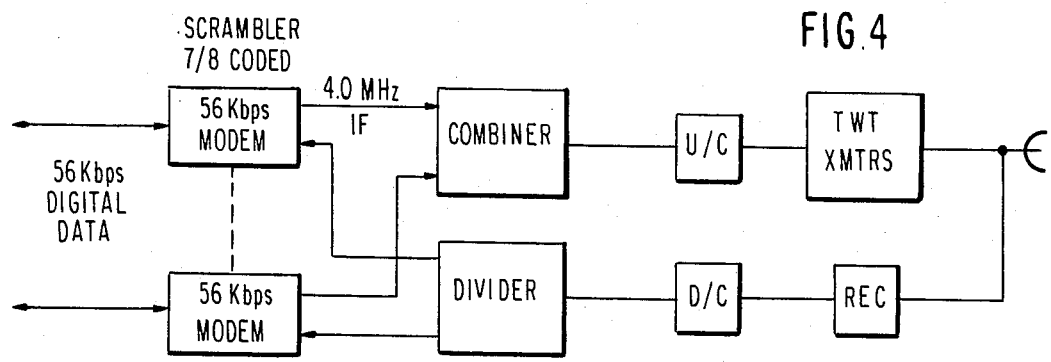
FIG. 4 is a simplified block diagram of a prior art dedicated satellite communications network.
Figure 5:
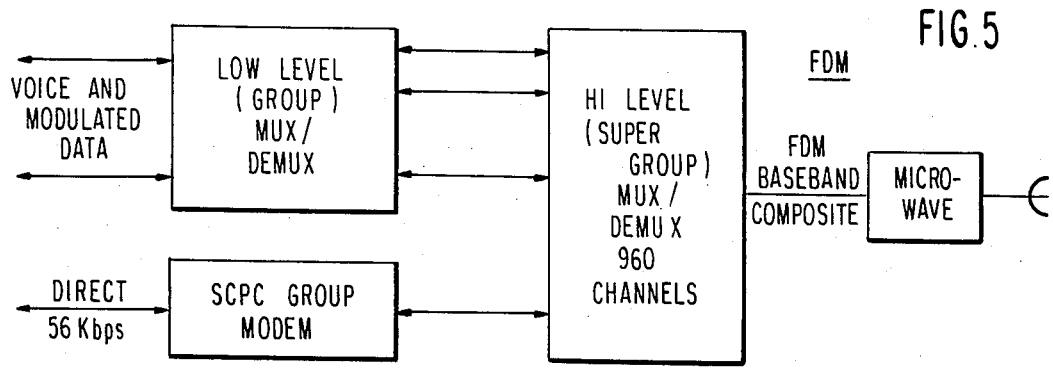
FIG. 5 is a simplified block diagram of a prior art central office system of a frequency division multiplex satellite communications system.
Figure 6:
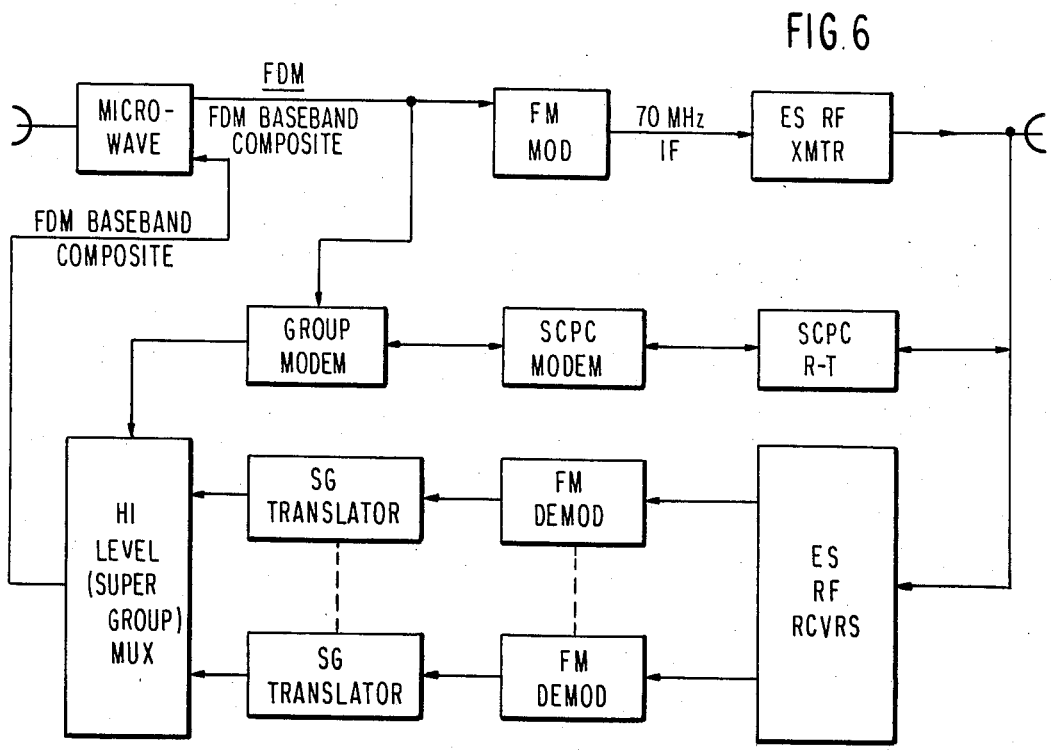
FIG. 6 is a simplified block diagram of a prior art earth station of a frequency division multiplex satellite communications system.
Figure 7:
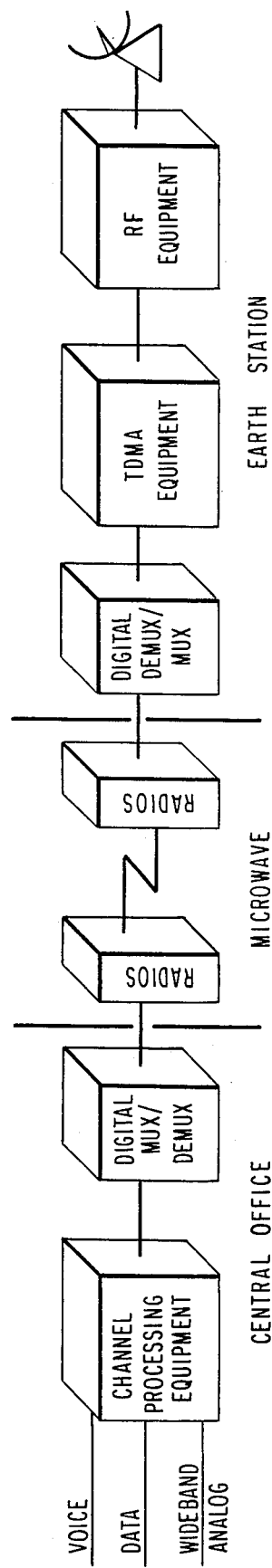
FIG. 7 is a simplified system block diagram of a prior art TDM/TDMA communications system.
Figure 9:
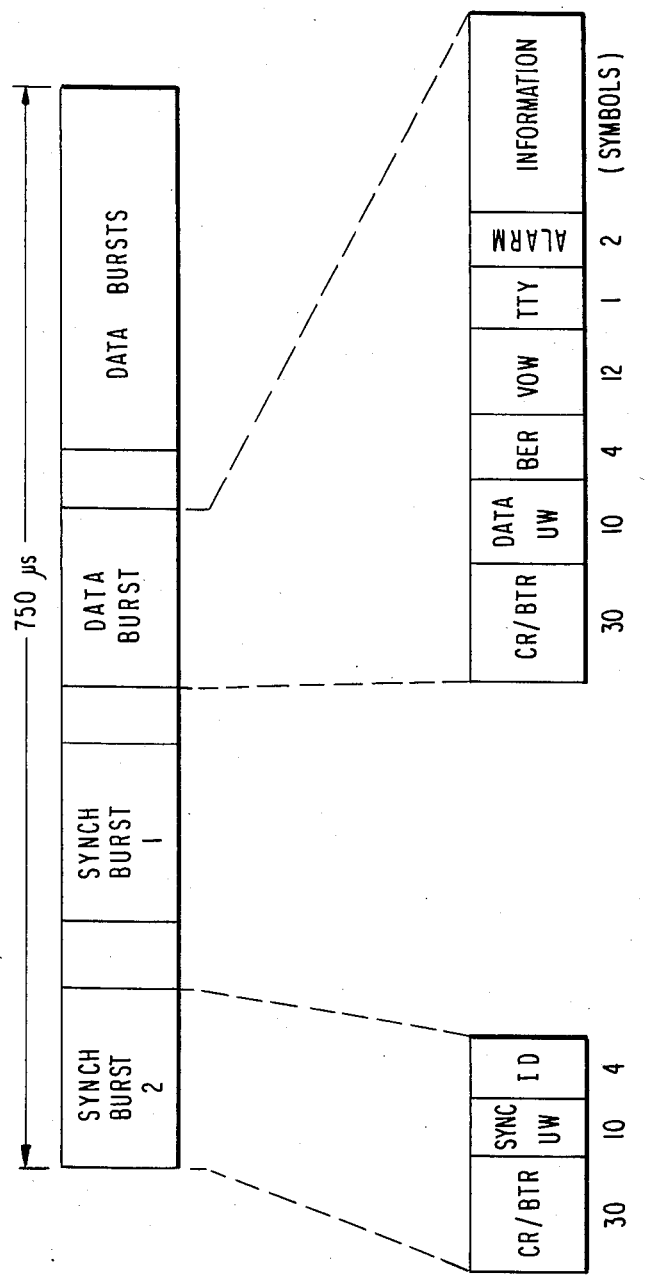
FIG. 9 is a diagram of the frame format of the TDMA system of FIG. 8.
Figure 10:
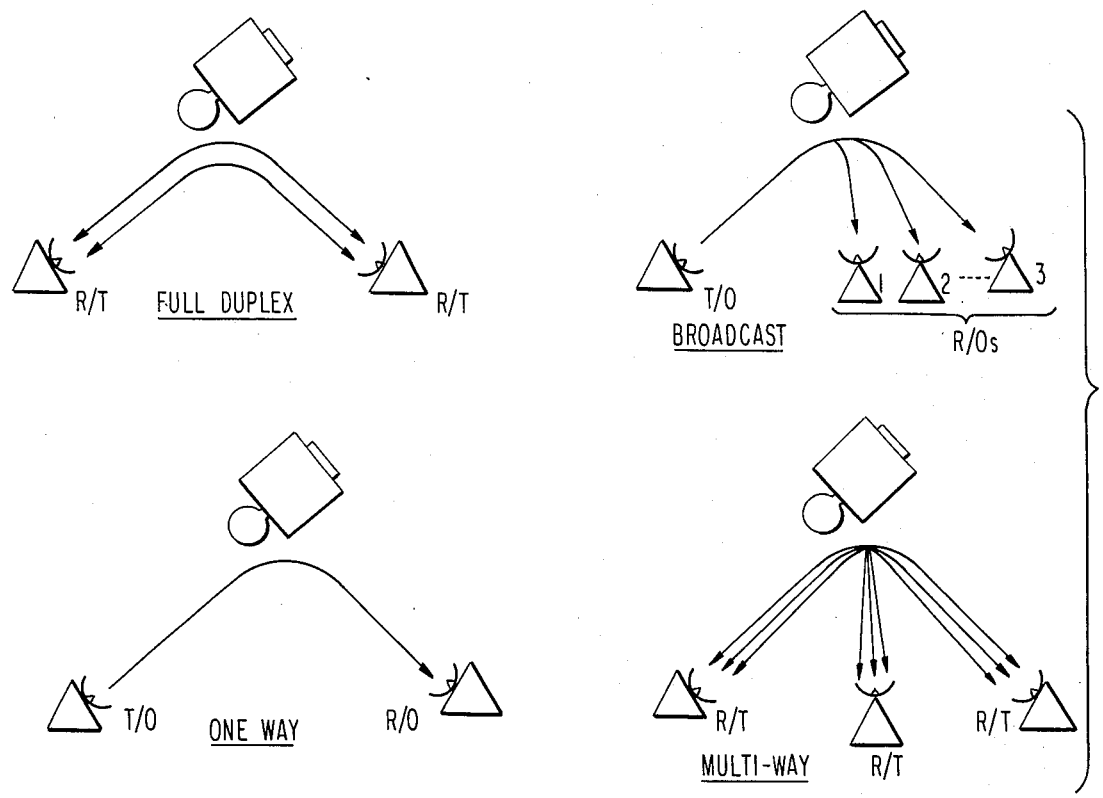
FIG. 10 shows diagrammatically several forms in which information can be transferred in satellite communications systems.
Figure 12:
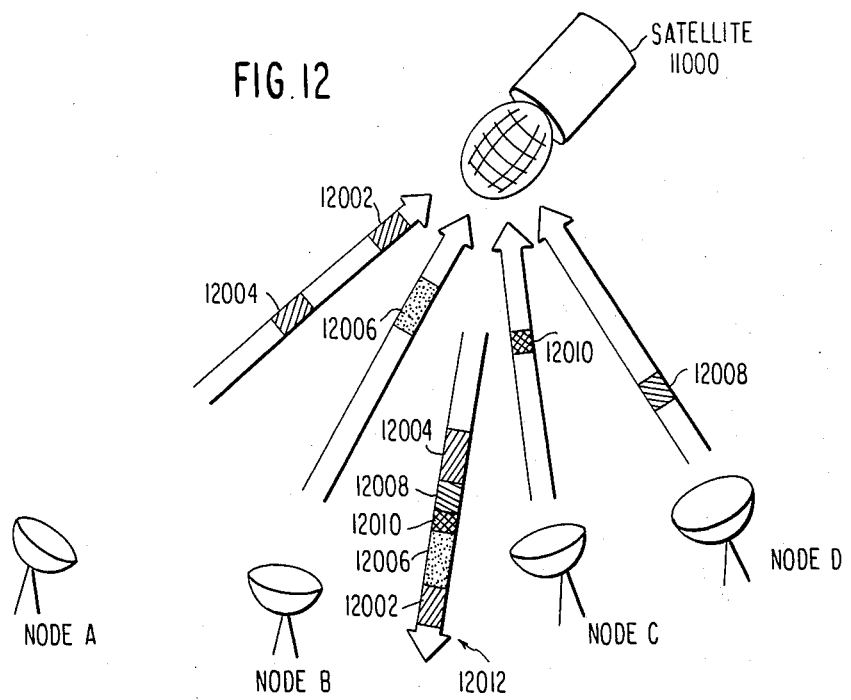
FIG. 12 is an illustration of the burst TDMA communication scheme employed by the present invention.

The burst TDMA communications scheme employed by the present invention is shown diagrammatically in FIG. 12. Node A first transmits a burst 12002 to satellite 11000 (note that the long axis of each of the five transmission burst arrows represents time). Node B then transmits a burst 12006. Node C then transmits a burst 12010. Finally, node D transmits a burst 12008. Satellite 11000 receives all of the bursts 12002, 12006, 12010, and 12008, amplifies and frequency translates them, and then transmits them in real-time in a broadcast mode back to all of the nodes A, B, C and D, as represented in the down arrow designated generally by reference numeral 12012.

Figure 13:
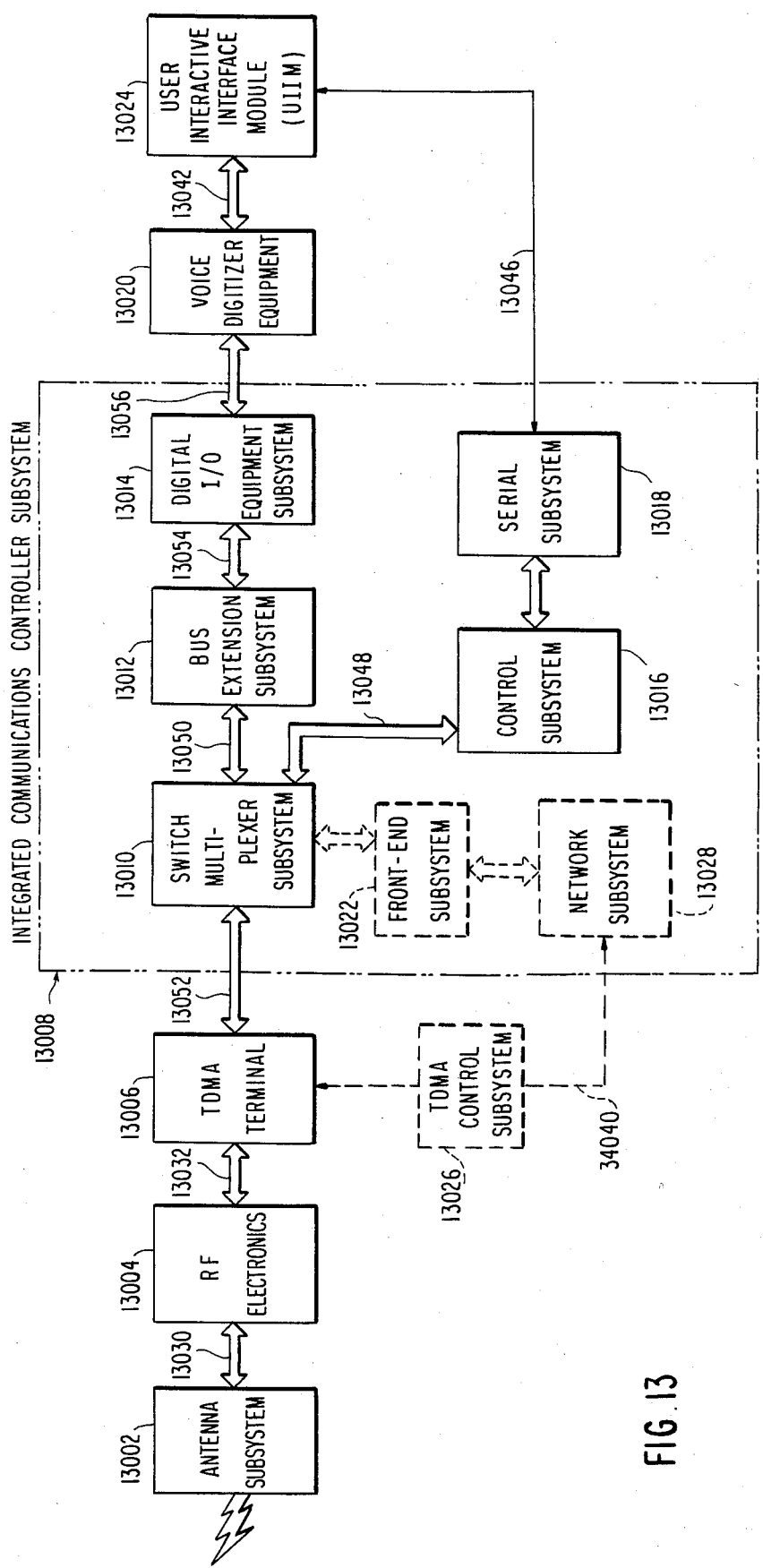
FIG. 13 is a general block diagram of the subsystems which are typically present at a node.
Figure 14B:
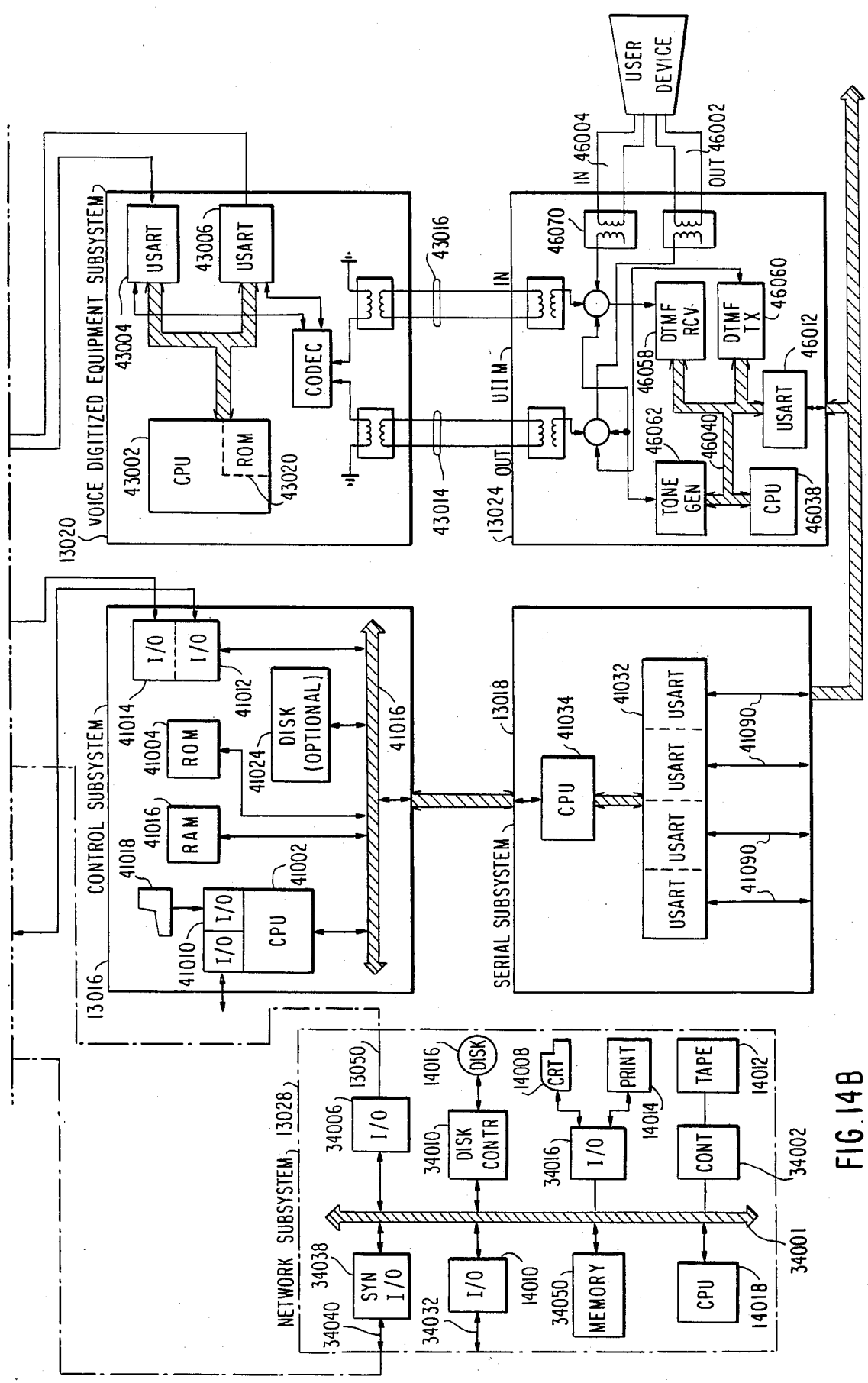
Figure 16:
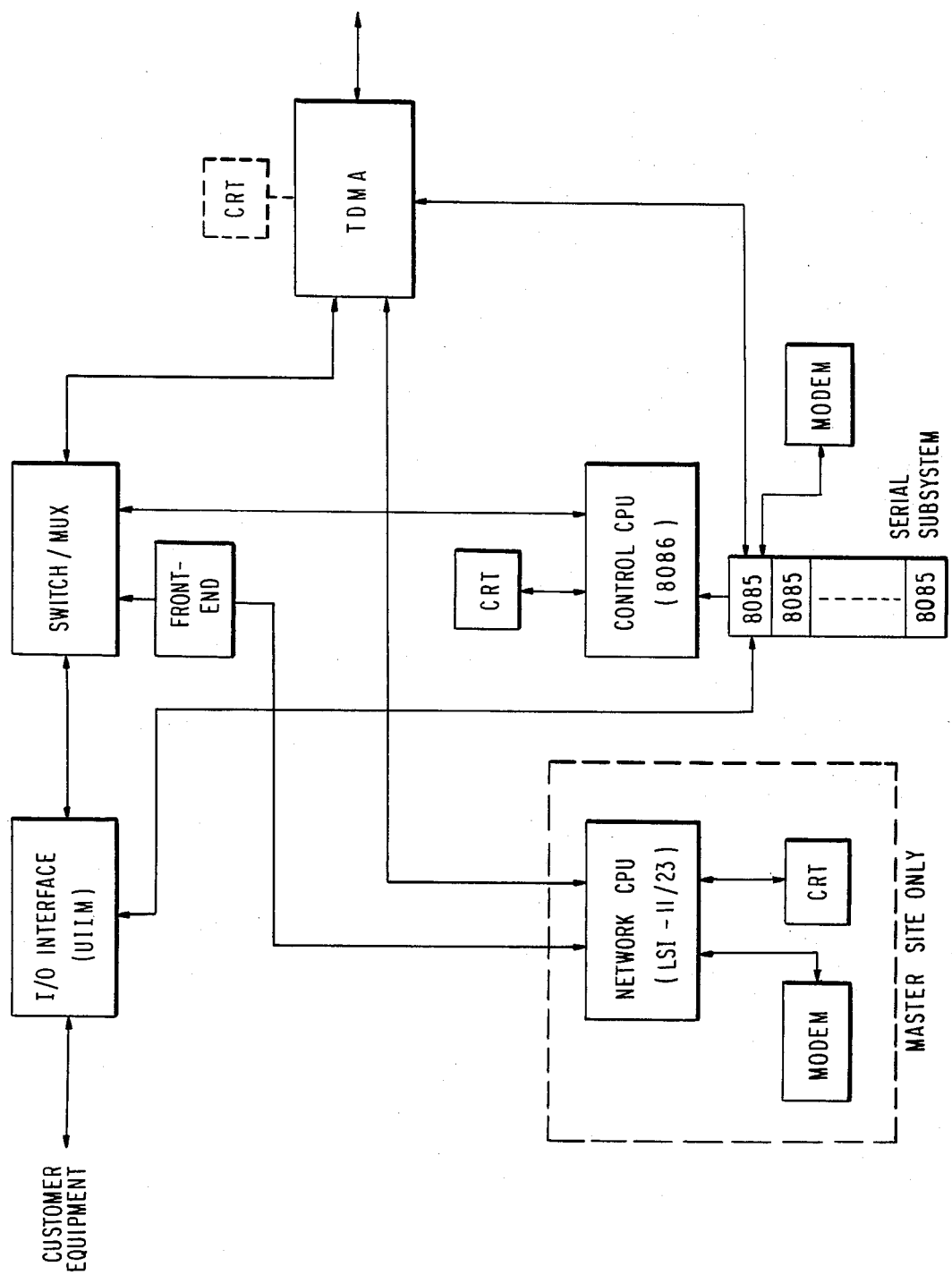
FIG. 16 is a block diagram showing system connection.

Referring now to FIGS. 13 and 14, which are general block diagrams of subsystems present at a node.

Each node of the present invention comprises the following: an antenna subsystem 13002; a radio frequency (R.F.) electronics subsystem 13004; a TDMA terminal subsystem 13006; and an integrated communications controller (ICC) subsystem 13008 comprising: a switch/ multiplexer subsystem 13010; a bus extension subsystem 13012; a digital input/output (I/O) equipment subsystem 13014; a control subsystem 13016; a serial subsystem 13018; a voice digitizer equipment subsystem 13020; and, a user interactive interface module (UIIM) subsystem 13024. The ICC subsystem 13008 comprises the main subsystem of the present invention.

Two of the nodes in the system, as discussed above, are designated master sites. One of these nodes is designated as the on-line master node, and the other as the back-up master node. Each of these master nodes further includes a network subsystem 13028, a TDMA control subsystem 13026, and a front end subsystem 13022. The other nodes in the system are designated as slave nodes.

The various subsystems at a node are now described in greater detail.

The antenna subsystem 13002 provides the physical and electrical interface to the space segment. Antenna subsystem 13002 focuses microwave energy from the transmit (up converter) portion of the RF electronics subsystem 13004 into a narrow beam directed at satellite 11000, and collects microwave energy transmitted from satellite 11000 for subsequent recovery and demodulation. Antenna subsystem 13002 is sized and configured to meet individual system, node, and geographical requirements.

RF electronics subsystem 13004 provides the necessary frequency translations (modulation/demodulation) from the nominal intermediate frequency (IF) band (for example, 70 MHz) to and from the transmit band (for example, 6 GHz) and receive band (for example, 4 GHz). Specifically, RF electronics subsystem 13004 on the transmit side includes an up converter and a high power amplifier, and on the receive side, includes a low noise amplifier and a down converter.

TDMA terminal subsystem 13006 provides control of the TDMA frame format and positioning of each node's burst within the frame. Clock and gating signals are provided to the ICC subsystem 13008 to allow assembly and disassembly of the transmission stream. TDMA terminal subsystem 13006 includes a burst modem, which converts the digital baseband signal to/from an appropriate modulated carrier in the 52–88 MHz intermediate frequency (IF) band. TDMA terminal 13006 interfaces on the receive side to the ICC subsystem 13008. This interface is in the digital baseband, and is at the burst rate of the transmission system (up to 16 Mbps).

The ICC subsystem 13008 operates in conjunction with the other subsystems of the present invention to provide dynamic, demand-assigned switching and bandwidth allocation on a realtime channel-to-channel basis. ICC subsystem 13008 also provides network intelligence for functions such as least cost routing, network control, and extensive management information collection/reporting. In addition, the ICC performs other functions to maintain the integrity of the network. These functions include:

1. employing an operator command interface (terminal 14008) at the network subsystem 13028 and an operator command interface (terminal 14006) at the control subsystem 13016 to allow user modification and display of system parameters, access to system status information, and manual override of system functions;

2. providing a modem interface 14010 at the network subsystem 13028 and a modem interface at the serial subsystem 13018 to allow operator interaction from a remote terminal(s);

3. utilizing redundant processing for both the network subsystem 13028 and control subsystem 13016 to allow switchover in case of system failure;

4. using bandwidth optimization functions including a background bandwidth shuffler which periodically reallocates bandwidth for maximum efficiency, and employing automatic dynamic rate adjustment (ADRA) for adjustment of bandwidth allocation in response to network usage; and 5. utilizing comprehensive billing and statistics files which record all significant network events including all call-processing parameters, operator log-on and log-off times, parameters associated with network subsystem 13028 or control subsystem 13016 switchovers, and down-line load times.

The ICC subsystem 13008 is comprised of the following subsystems:

The Switch/multiplexer 13010 is the central component of the ICC subsystem 13008. Switch/multiplexer 13010 provides all switching, routing, and multiplexing functions as regards the actual data paths through the system. Switch/multiplexer 13010 provides an all-hardware path for transmitted and received data at the TDMA terminal subsystem 13006 burst rate, which, for example, may be up to 12 Mbps. No storage or buffering is performed at the switch/multiplexer level, so that no delays in data propagation are created. Switch/multiplexer 13010 is fully programmable, and provides communication paths to and from lower level equipment by means of a high speed bus 13050. Both transmission and channel rates are variable; granularity on the TDMA transmission (bus 13052) is in multiples of 8000 bps, and on the channel (bus 13050) in multiples of 800 bps. Switch/multiplexer 13010 interfaces to TDMA terminal subsystem on the transmission side via bus 13052 in a single-stream burst format. Clocks, gates, and appropriate burst, frame, and superframe timing signals are provided by TDMA terminal subsystem 13006. On the receive side, the switch/multiplexer subsystem 13010 interfaces via bus 13050 to the bus extension subsystem 13012 (for example, 16 bits wide) by means of which data is distributed to the various user devices (channels).

The bus extension subsystem 13012 provides the necessary buffering and intercommunication for hierarchical distribution of data to the various input/output boards in the digital I/O equipment subsystem 13014. The bus extension subsystem 13012 also provides protection to prevent low level failures from impacting total node communications.

The digital I/O equipment subsystem 13014 provides the final interface (channels) to the user digital terminals and voice terminals. The transmission side (bus 13054) is at the internal bus rate (758K Words/s) and is in burst format. Expansion/contraction buffers are provided so that the interfaces on the terminal side are in standard synchronous serial format.

The network subsystem 13028 has the primary responsibility for control of the maintenance and topology of the entire network. All requests for system resources are handled by the network subsystem 13028 which maintains the preponderance of management information, including utilization statistics. The network subsystem 13028 uses numerous algorithms invented by the applicants in computing the network connectivity map. The appropriate elements of this connectivity map are communicated to the various nodes for processing by their control subsystems 13018. As discussed, a network subsystem 13028 is located at only the two master nodes in the network. The back-up master node ensures against catastrophic network failure in the event of a network malfunction at the on-line master node. Suitable programming is provided so that in the event of an on-line master node failure, the back-up master node automatically assumes control over the network by becoming the on-line master node.

Figure 18:
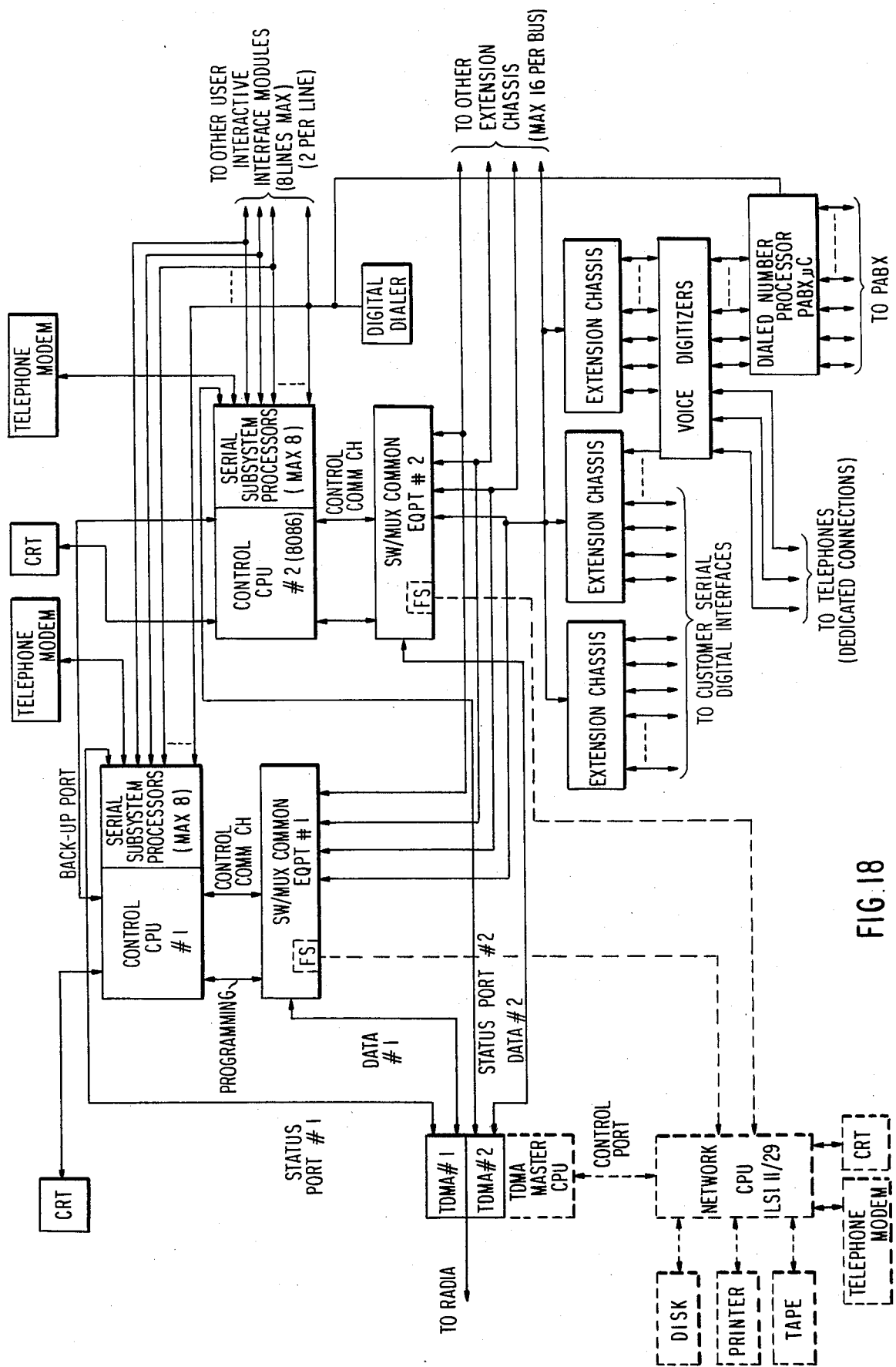
FIG. 18 is a block diagram of the present invention in a redundant configuration.

Referring now to FIG. 18, additional redundancy can be provided by stand-by subsystems at each of the nodes of the network. This additional redundancy further reduces the likelihood of a failure at a node from impacting on the operation of the network.

The primary function of the front end subsystem 13022 is to handle the protocol between the network subsystem 13028 and control subsystems 13016. The front end subsystem 13022 receives messages from the network subsystem 13028 via DMA interface 13050, formats the messages into blocks, adds a cyclic redundancy check (CRC) and block sequence number to the blocks, and transmits the blocks in broadcast mode to each control subsystem 13016.

In the reverse direction, the front end subsystem 13022 receives blocks from the control subsystems 13016, performs error checking on the blocks, builds messages from the data portion of the blocks, transmits the messages to the network subsystem 13028 via DMA interface 13050, and acknowledges receipt of the blocks.

The main function of control subsystem 13016 is that of programming, controlling, and reconfiguring the switch/multiplexer subsystem 13010 in response to commands from the on-line network subsystem 13028, which commands the control subsystem 13016 to perform the task of interpretation and translation of the connectivity map into the appropriate micro-code for use by the switch/multiplexer subsystem 13010. Switch-/multiplexer subsystem 13010 reprogramming, which results in network connectivity changes, takes place as frequently as every 3 seconds. The control subsystem 13016 also interfaces to the serial subsystem 13018. The control subsystem 13016 provides data collection and preprocessing functions for user device information flow, including requests for service.

The primary task of the serial subsystem 13018 is communication with the user interactive interface modules 13024 via a serial bus 13046 operating at, for example, 9600 bps. The information flow consists principally of dialing, status, control, and other supervisory information required to route and otherwise handle calls both on and off the network of the present invention.

Now that the ICC subsystem 13008 has been described, the other subsystems which make up the equipment of the nodes are discussed.

The voice digitizer equipment subsystem 13020 provides the necessary conversions between analog and digital domains so that high-quality speech information can be efficiently transmitted over the all-digital network of the present invention. The disclosed nearly instantaneously companding PCM (NIC/PCM) subsystem 13060 is a preferred version of the digitizer equipment subsystem 13020. The NIC/PCM subsystem 13060 provides high quality speech and supports 4800 bps modulated data at a 32 Kbps digitizing rate.

The user interactive interface module (UIIM) subsystem 13024 provides system access for virtually all types of data and voice service. UIIMs 13024 not only provide compatible electrical interfaces, but also the intelligence and routing control capability required to respond to terminal/user demands for service and other interactive functions.

Figure 17:
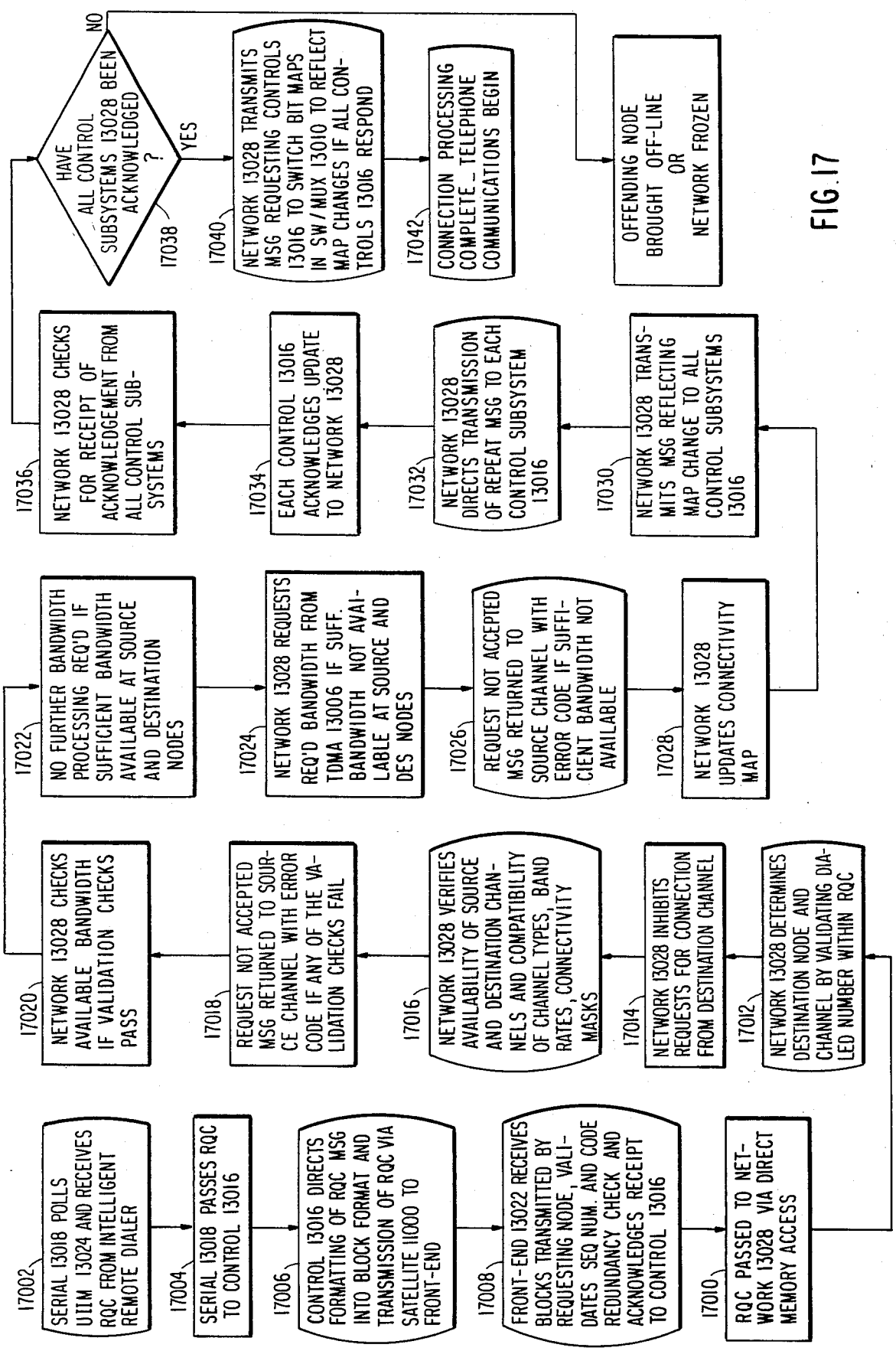
FIG. 17 is a flow chart representing a scenario of system operation.

To facilitate an understanding of the basic operation of the system and method of the present invention, a scenario is presented. Referring now to FIG. 17, the scenario includes a sequence of events which are performed during processing of requests for connection from intelligent (that is, microprocessor-controlled) user devices. The intent of the scenario is not to present a detailed and complete description of the present invention; rather it is to prevent a concrete example of the operation of the present invention:

1. A serial subsystem 13018, polling the user interactive interface modules 13024 at a node, receives a request for connection (RQC) from an intelligent remote dialer, as indicated by block 17002.

2. The serial subsystem 13018 passes the RQC to its associated control subsystem 13016, as indicated by block 17004.

3. The control subsystem 13016 directs the formatting of the RQC message into block format and the transmission of the RQC via satellite 11000 to the front end subsystem 13022 at the master node, as indicated by block 17006.

4. The front end subsystem 13022 at the master node receives the blocks transmitted by the requesting node, validates the block sequence number and cyclic redundancy check (CRC), and acknowledges receipt to the control subsystem 13016 of the requesting node as indicated by block 17008. The RQC is then passed to the network subsystem 13028 via a direct memory access (DMA) interface 13050, as indicated by block 17010.

5. The network subsystem 13028 determines the destination node and channel by translating the dialed number within the RQC as indicated by block 17012. The network subsystem 13028 then inhibits requests for connection from that (destination) channel so as to avoid contention difficulties, as indicated by block 17014.

6. Network subsystem 13028 verifies that the source and destination channels are available for connection, are compatible channel types, have compatible baud rates, and have compatible connectivity masks, and perform other validation checks as indicated by block 17016.

7. If any of the above validation checks fail, a Request Not Accepted message is returned to the source channel with an error code identifying the validation check which failed, as indicated by block 17018. If all of the above validation checks pass, the network subsystem 13028 then checks available bandwidth within the network, as indicated by block 17020.

8. If sufficient bandwidth is available at the source and destination nodes to accomodate the requested connection, no further bandwidth processing is required, as indicated by block 17022. If sufficient bandwidth is not available at the source and destination nodes, but is available elsewhere within the network, the network subsystem 13028 requests the required bandwidth from the TDMA terminal 13006, as indicated by block 17024. If sufficient bandwidth is not available anywhere within the network, a Request Not Accepted message is returned to the source channel with an error code indicating that bandwidth is not available, as indicated by block 17026.

9. The network subsystem 13028 updates its connectivity map (a map of all connections currently existing within the network) as indicated by block 17028, and transmits a message reflecting the map change to all of the control subsystem 13016, as indicated by block 17030.

10. The network subsystem 13028 directs the transmission of a reprogram message to all control subsystems 13016. This message directs the control subsystems 13016 to program the switch/multiplexer inactive bit map from the connectivity map. Note that this Reprogram message is sent automatically once every three seconds by the network subsystems 13028 if any map changes have been made since the last reprogram cycle.
11. Each control subsystem 13016 acknowledges the reprogram message to the network subsystem 13028, as indicated by block 17034.
12. The network subsystem 13028 checks for receipt of acknowledgement from all of the control subsystems 13016, as indicated by block 17036. If any control subsystem 13016 fails to respond with a positive acknowledgement after a specified number of retries, the offending node is either brought off-line, or the network is frozen, as indicated by block 17038. If all control subsystems 13016 respond properly, the network subsystem 13028 transmits a message requesting that the control subsystems 13016 switch the active and inactive bit maps in their respective switch/multiplexers 13010 to reflect the map changes, as indicated by block 17040. At this point, connection processing is complete and telephone communications can begin, as indicated block 17042.

It should be noted that requests for disconnection work in the exact same way in the present invention, with the exception that bandwidth re-allocation is not required and compatability checks are not made; all of the other steps delineated above, are performed.

Referring now to FIG. 15, the communication scheme of the present invention is now described. The communication scheme of the present invention is based on the identification of each bit in the TDMA frame through "burst", "frame", and "superframe" boundary information, plus bit stream timing information accompanying each transmission. User device to user device connectivity is established by means of a connectivity map. The connectivity map is used to assign groups of 16-bit words within the burst of each frame to a source/destination pair. The switch/multiplexer subsystem 13010, in turn, uses a high-speed bus to distribute data to and from the designated user devices and the TDMA interface.

A diagram of the framing structure is shown in FIG. 15. As shown in FIG. 15B, each frame is 20 milliseconds (ms) in length. A frame is comprised of a series of bursts. Each node transmits a single data burst (1, 2, 3, . . . n) per frame. Hence, for a network comprised of 25 active nodes, there will be 25 data bursts in a frame. Additional overhead bursts for TDMA network management are included in the initial portion of each frame (e.g., see, in FIG. 15B, the TDMA master burst timing and control burst, the TDMA back-up master burst, and the TDMA control burst).

A superframe, shown in FIG. 15A, consists of twenty-five frames. Note that all network reconfigurations occur on superframe boundaries.

As illustrated in FIG. 15D, each data burst consists of a variable number of 160-bit data units. A preamble consisting of carrier detection, bit timing, unique word identification, and communication overhead is attached to the data unit in each burst by the TDMA terminal subsystem 13006.

Assignment of transmission capacity is made to bursts in units of 160 bits. This is equivalent to a data throughput rate of 8 Kbs. Assignment of transmission capacity to channels of a node is made in terms of 16-bit words which is equivalent to a data throughput rate of 800 bps. Hence, basic channel rates are available in multiples of 800 bps. Signalling overhead is added to the information content of each burst by the ICC subsystem 13008. This overhead information allows communication to occur between the slaves and on-line master node. As shown in FIG. 15E, the burst originating from the on-line master node has the first 160 bits (ten 16-bit words) designated for signalling information from the on-line master node to the slave nodes. The 48 bits (three 16-bit words) are reserved for the signalling return path from each of the control subsystem 13016.

2.0 ANTENNA SUBSYSTEM

Figure 19:
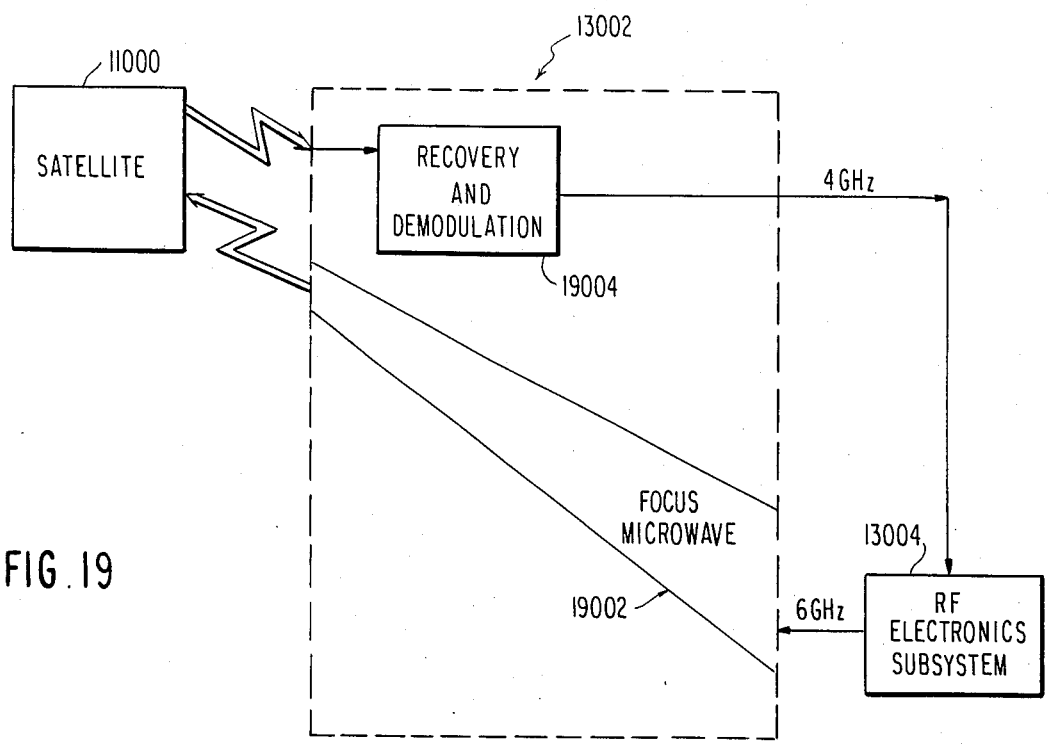
FIG. 19 is a block diagram of a typical antenna subsystem present at a node.

The antenna subsystem 13002 provides the electrical and physical interface to the space segment, as shown in FIGS. 11 and 19. The antenna subsystem 13002 focuses microwave energy (designated generally by reference numeral 19002) from the transmit portion of the RF electronics subsystem 13004 into a narrow beam directed at the satellite 11000, and collects microwave energy transmitted from the satellite for subsequent recovery and demodulation as indicated generally by reference numeral 19004. The antenna subsystem 13002 is sized and configured to meet individual system, node, and geographical requirements. The antenna subsystem is conventional, and any suitable antenna subsystem can be employed. A suitable form for the antenna subsystem is a 10-meter dish, for example, a model EFA-10-46B made by Andrews Manufacturing Company of Orland Park, Ill.

3.0 RF ELECTRONICS SUBSYSTEM

Figure 20:
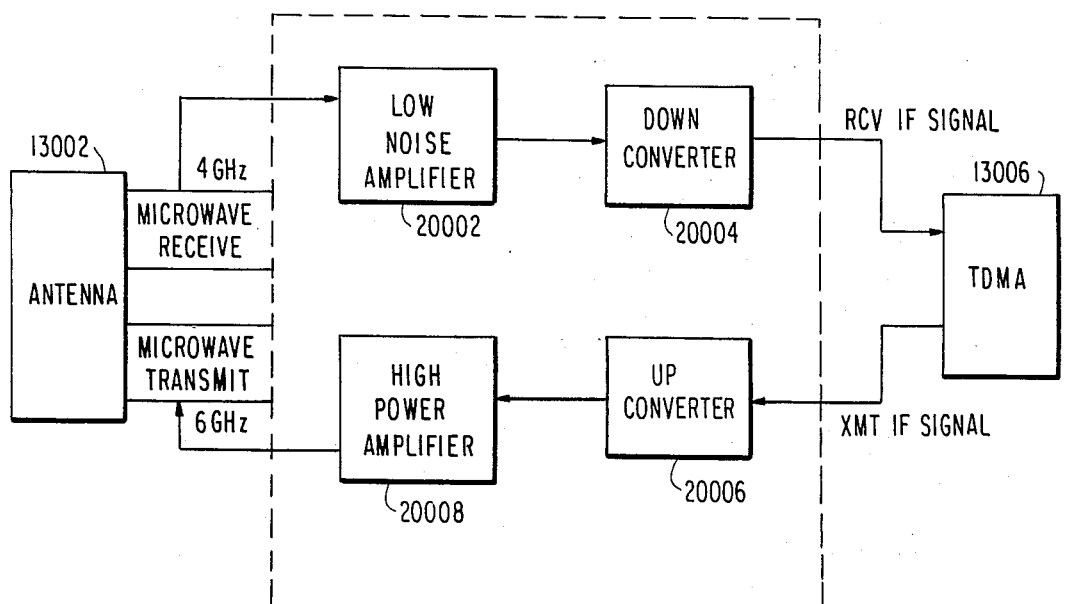
FIG. 20 is a block diagram of typical RF electronics circuitry present at a node.

The RF electronics subsystem 13004 is shown in general block diagram form in FIG. 20. The RF electronics subsystem 13004 provides the necessary frequency translations (modulation/demodulation) from the nominal intermediate frequency (IF) band (for example, 70 MHz) to and from the microwave transmit bands (for example, 6 GHz) and receive bands (for example, 4 GHz). Specifically, on the receive side, the RF electronics subsystem 13004 comprises a low noise amplifier (LNA) 20002 having an input connected to the antenna subsystem 13002 and an output connected to the input of a down converter 20004. The output of down converter 20004, which is a signal at IF, is provided to the TDMA terminal subsystem 13006. On the transmit side, the RF electronics subsystem 13004 comprises a up converter 20006 whose input is connected to the TDMA terminal subsystem 13006, and whose output is connected to the input of a high power amplifier (HPA) 20008. The output of high power amplifier 20008 is connected to the antenna subsystem 13002. These modules of the RF electronics subsystem 13004 are conventional, and any suitable equipment can be employed. A suitable form of the up converter 20006 is a model VD-6-D1, a suitable form of the down converter 20004 is a DC-4-D1, and a suitable form of the low noise amplifier 20002 is a model NC4-455C, all of which are manufactured by LNR of Haupauge, N.Y. A suitable form of the high power amplifier is a V2C16962D6 made by Varian Associates of Palo Alto, Calif.

4.0 TDMA TERMINAL SUBSYSTEM

4.1 TDMA Concepts

The TDMA scheme employed by the present invention allows the capacity (that is, bandwidth) of the satellite 11000 to be shared and re-allocated dynamically by allowing several transmission signals to share a common satellite path by using different time intervals for transmission. As shown in FIG. 15, during any given frame (20 milliseconds), each node is allotted a time segment or burst (which changes dynamically) in which to transmit control and data information to satellite 11000. These bursts are synchronized by TDMA subsystems 13006 so that satellite 11000 receives a virtually contiguous non-overlapping stream of data (see FIGS. 12 and 15).

A slave TDMA subsystem 13006 is situated at each node within the network. Each of the two primary nodes (i.e., the on-line node and the back-up node) includes a network subsystem 13028, a front end subsystem 13022, and a TDMA control subsystem 13026 comprising a TDMA CPU 21024 and associated control port 21022. The TDMA subsystem 13006 at the on-line node is responsible for bandwidth allocation and synchronization of burst transmission from each node, and maintains a satellite communications link with each slave TDMA subsystem 13006 and the back-up master TDMA subsystem 13006. The slave TDMA subsystems 13006 and the back-up master TDMA subsystem 13006 are responsible for the transmission and receipt of control information to/from the on-line TDMA control subsystem 13026 via satellite 11000. The slave TDMA subsystems 13006 at each node are responsible as well for the transmission and receipt of data to/from their ICC subsystems 13008 over the satellite link. All satellite transmission is accomplished according to the synchronized transmission schedule defined by the on-line TDMA control subsystem 13026 (under control of the network subsystem 13028). Note that control information between the on-line TDMA control subsystem 13026 and the slave TDMA subsystem 13006 at the master site is also communicated via satellite. Also note that data communication between any two user devices at the same node (e.g., telephones) must be accomplished via satellite 11000.

Control information is transmitted between nodes in an overhead field which is inserted at the beginning of each transmitted burst by the transmitting TDMA subsystem 13006, and then is removed by the destination TDMA subsystem 13006 before forwarding to the ICC subsystem 13008 for processing; all TDMA overhead is transparent to the ICC subsystem 13008. TDMA control information consists of map change commands (that is, bandwidth reallocation), status information, error information, and reset and initialization commands.

4.2 TDMA/ICC Subsystems Functions and Capabilities

The ICC subsystem 13008 at each node receives and processes requests for connection and disconnection from customer equipment (user devices) at that node and, via the on-line TDMA control subsystem 13026, allocates and de-allocates the bandwidth of satellite 11000. This section describes the means by which this allocation and de-allocation of the bandwidth of satellite 11000 is accomplished.

Upon network initialization, each node in the system of the present invention is allocated a pre-determined amount of bandwidth. This bandwidth is required for TDMA subsystem 13006 and ICC subsystem 13008 overhead; it is the means by which the slave nodes communicate control information to the on-line master node (the node which includes the on-line network subsystem 13028), and the means by which the on-line master node communicates to the slave nodes. When a request for connection is generated by a intelligent terminal device 11008, 11010, or 11012, a message is transmitted via satellite 11000 to the network subsystem 13028 at the on-line master node. The network subsystem 13028 at the on-line master node processes the connection by checking the status of the source and destination channels, the transmit and receive baud rates, and by making other validation checks. If all checks pass, the on-line network subsystem 13028 checks to see if sufficient bandwidth is available at the source and destination nodes to accommodate the channel connection. If so, the connection request is granted, and the on-line network subsystem 13028 re-maps the communications network to reflect the new connection and transmits the new map information to the network subsystem 13028 at the back-up master node and to all control subsystems 13016. Please note that if bandwidth is available, TDMA bandwidth reallocation is not required.

If sufficient bandwidth is not available, additional bandwidth is requested of the TDMA at the on-line master node. A request is generated first to de-allocate unused bandwidth from a specified node (that is, delete x amount of bandwidth from node y), which is then followed by a request to re-allocate the bandwidth at the specified node (that is, add x amount of bandwidth to node w). In the case that there is unused bandwidth which is not allocated to any node, only the request to add bandwidth may be required. The on-line TDMA control subsystem 13026, in response to bandwidth requests from the on-line network subsystem 13028, re-allocates bandwidth as required and returns a positive or negative response. It should be understood that the on-line network subsystem 13028 commands the bandwidth allocation of the on-line master TDMA subsystem 13006 via the on-line TDMA control subsystem 13026, and is aware of all bandwidth usage; a negative reply from TDMA subsystem 13006 at the on-line master node in response to a bandwidth request from on-line network subsystem 13028 is not expected, therefore, under normal circumstances. Requests for disconnection by intelligent terminal devices 11008, 11010, and 11012 are processed by the on-line network subsystem 13028 in a similar fashion (that is, re-mapping of the network may be required), but bandwidth allocation and re-allocation is not performed.

It can now be appreciated that only two conditions exist: either bandwidth is available, or bandwidth is not available. In the case that bandwidth is available, connections are established within a very short period of time after a request is detected (for example, three seconds). In the more demanding situation where bandwidth reallocation is required, the network is able to obtain the necessary bandwidth and reconfigure the network with an additional delay of a maximum of two seconds.

4.3 TDMA Terminal

Figure 21:
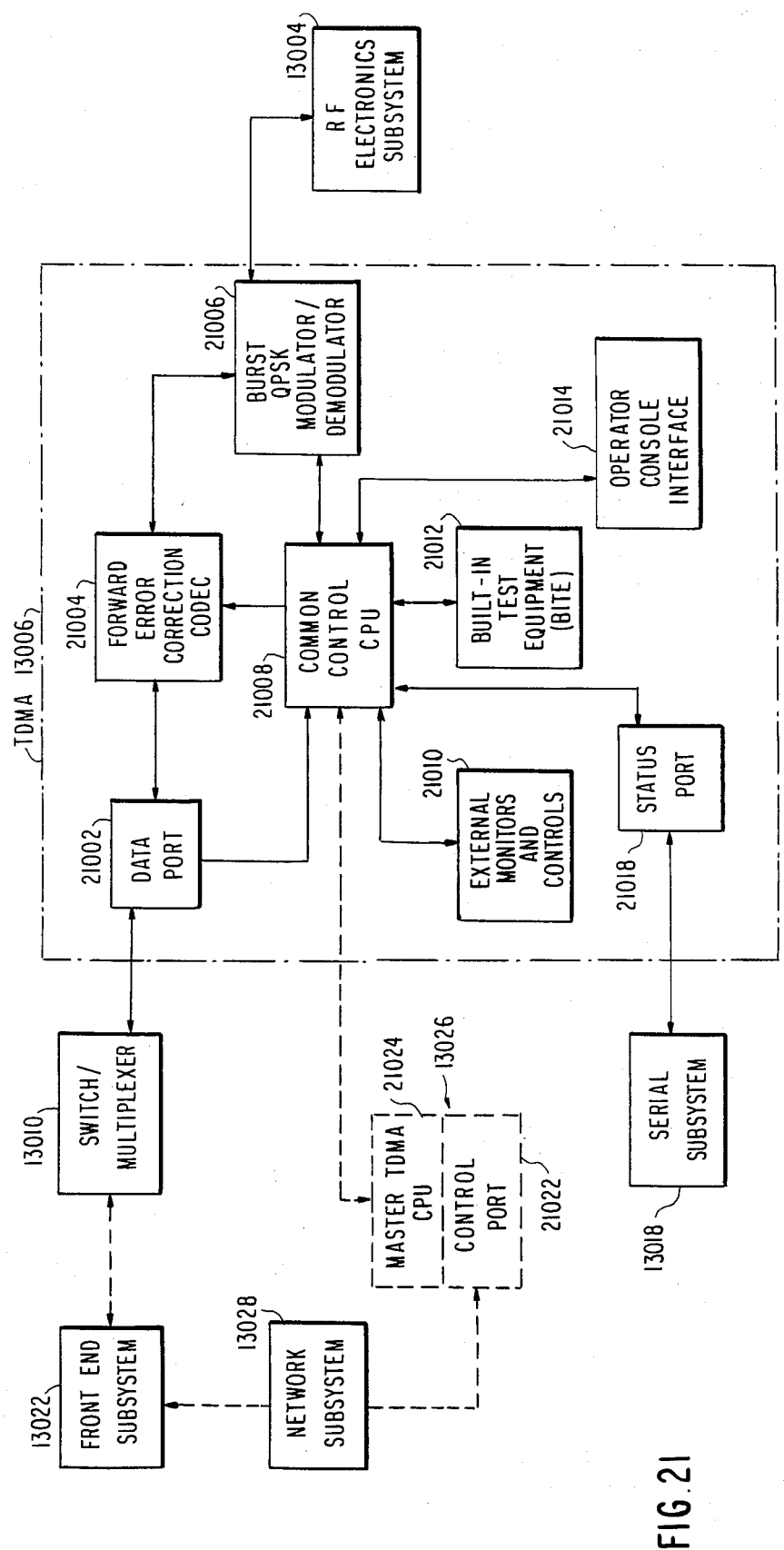
FIG. 21 is a simplified block diagram of the TDMA subsystem of the present invention.

Referring to the block diagram of FIG. 21, a TDMA subsystem 13006 comprises a data port 21002, a forward error correction codec 21004, a quadrature phase shift keying (QPSK) modulator/demodulator 21006, a common control 21008, external monitors and controls 21010, and an operator console interface 21014. TDMA subsystem 13006 is software controlled such that the TDMA terminal-to-TDMA terminal bandwidth may be modified on a demand basis. TDMA terminals 13006 have the capability of providing full interconnectivity in the network of the present invention. Two TDMA terminals 13006 act as masters (one on-line and the other back-up) for control of the network; all the other TDMA terminals act as slaves. Each of the two master TDMA subsystems comprises a slave TDMA subsystem 13006 and a TDMA control subsystem 13026. The master TDMA CPU 21024 in the TDMA control subsystem 13026 at the on-line node maintains the current TDMA network map (which is different from the connectivity map 23002) and issues commands to the slave TDMA subsystems 13006 for all changes. The network of the present invention is designed, for example, to accommodate from 2 to 25 TDMA terminals 13006.

Each TDMA terminal 13006 operates in broadcast mode (see FIG. 12). The total received data bit streams is passed by the TDMA terminal 13006 to its switch/multiplexer 13010, which forwards the data for that node from the received data bit stream and then sorts out the forwarded data in accordance with its destination terminal device. Note that each TDMA system 13006 is totally transparent to the structure and destination of the received data.

Data port 21002 provides a single transmit and receive interface between the switch multiplexer 13010 and the TDMA subsystem 13006. Data is passed across the interface of data port 21002 in burst format; data port 21002 also provides the necessary burst clocks and burst gating signals to the switch/multiplexer 13010. Data port 21001 is connected to the forward error correction codec 21004, which performs encoding and decoding along with forward error detection and correction.

QPSK modulator/demodulator 21006, under the control of common control 21008, receives and transmits the bit stream from and to forward error correction codec 21004 and the four-phase shift key (QPSK) modulator modulates/demodulates the bit stream on an IF carrier selectable, for example, in the band from 52 MHz to 88 MHz.

Common control 21008 oversees all of the functional elements of the TDMA terminal 13006. These includes time slot synchronization, addressing and timing of data port 21002, and inter-TDMA terminal 13006 control signaling and maintenance functions. Common control 21008 uses software control to permit near real-time TDMA terminal and network configuration control.

External monitor and control 21010 comprises all of the external controls, status monitors, and alarms required in all phases of the TDMA terminal 13006 operation, including startup, normal operation, routine maintenance, troubleshooting, fault isolation, and identification to the replaceable unit level. Included in this category are management port interfaces for entering control/status information.

TDMA subsystem 13006 has built-in test equipment (BITE) 21012 to provide an off-line self-testing capability and on-line continuous real-time performance monitoring of the TDMA terminal 13006.

TDMA terminals 13006 designated as master terminals have additional equipment (TDMA control subsystem 13026 and front end subsystem 13022) and software to format network maps, maintain network level node status, and to communicate with and receive command instructions from the on-line network subsystem 13028.

4.4 TDMA System Requirements

The burst transmission rate (same as terminal transmission rate or modem transmission rate) is defined as the actual burst clock rate including data, TDMA overhead, and forward error correction coding (FEC). The burst information transmission rate (as seen by the switch/multiplexer subsystem 13010) is the average data burst transmission rate exclusive of TDMA overhead and FEC. The burst transmission rate is selectable in increments of 800 Kbps from, for example, 800 Kbps to 16 Mbps.

Independent primary and secondary frame synchronization bursts are provided such that the system of the present invention switches automatically to the secondary sync burst, should the primary sync burst fail. This switchover is hitless, that is, does not cause any interruption in service.

Each of the TDMA control subsystems 13026 at the on-line and back-up master nodes monitors its sync burst on a continuous looped-back basis and determines that a failure has occurred if no sync burst is detected for a certain time period (for example, two seconds). In this case, the TDMA subsystem 13006 at the on-line master node automatically stops transmitting its sync burst.

In the event of power failure, a station operating as a master TDMA station enters initial acquisition and resumes operation.

Slave nodes are able to determine, by inspection of the primary and secondary overhead bursts, which network subsystem 13028 is in control of the network. In case of ambiguity, the slave nodes assume that the master node which was last confirmed to be in charge, is still in charge.

As previously discussed in connection with FIG. 15, the frame length is 20 milliseconds. Each frame comprises synchronization burst(s), data bursts and other bursts needed for network management and acquisition. Normally one data burst per frame is transmitted from each TDMA terminal 13006 in the network. For example, in a network comprising 25 TDMA terminals 13006, there are 25 data bursts in a frame. A superframe consists of 25 frames (500 msec in length). Note that all network reconfigurations take place on superframe boundaries.

Each TDMA terminal 13006 can be programmed to accept up to 25 data bursts per frame from the satellite 11000. Normally, a switch/multiplexer 13010 provides one burst per frame to its TDMA terminal 13006. The burst length granularity permits bandwidth assignments in multiples of 8 Kbps (160 bits per frame) information data rate. Note that the TDMA terminal 13006 does not introduce a propagation delay of more than 10 milliseconds. This frame format, as well as the format for the primary and secondary sync bursts needed for frame synchronization, is shown in FIG. 15.

As discussed in Section 1.0 above, each data burst comprises a preamble, information section, coding overhead, and postamble, as shown in FIG. 15. A burst may be assigned its position anywhere within one symbol time slot. It is possible to expand or contract each burst by an integral number of 160-bit units (equivalent to 8 Kbps or 10 sixteen-bit data words).

Each node is assigned a unique site identification number. The arrangement of information bursts within the frame is predefined by the on-line network subsystem 13028 using these identification numbers; this order is not changed.

The slave TDMA terminals 13006 are synchronized to the primary/secondary reference burst having a closed-loop through satellite 11000. Note that if the data burst position goes out of its assignable band (assigned position plus guard zone) during steady state operation, that station stops transmitting and then immediately reverts to the automatic acquisition process to re-enter the network.

The TDMA control channel through satellite 11000 is an overhead channel used for multiple purposes such as:

1. exchange of inter-TDMA control information;
2. network management information;
3. initial/re-entry of the acquisition slot; and
4. other overhead signaling, if required.

The method of entering the TDMA network initially, or re-entering it after a failure, is of the open-loop type aided by the TDMA control subsystem 13026 at the on-line mode. The process is automatic and does not cause interruption to the on-line TDMA data bursts.

The bit error rate (BER) performance of TDMA terminal 13006 when operated in an IF loopback mode is as follows (including forward error correction):

| BER | $E_b(t)^*/N_o$ (Normal) | $E_b(t)^*/N_o$ (Optimal) |
|---|---|---|
| $10^{-4}$ | 7.3 dB | 6.8 dB |
| $10^{-6}$ | 8.9 dB | 8.4 dB |
| $10^{-7}$ | 9.3 dB | 8.8 dB |
| $10^{-9}$ | 10.3 dB | 9.8 dB |

*$E_b(t)$ is the energy per transmission bit

The TDMA system clock (not shown) is generated by a high stability crystal oscillator within each TDMA terminal 13006. The clock stability is $10^{-8}$ per 6 months for master nodes and $10^{-7}$ per 6 months for slave nodes.

A pseudo-random sequence is added modulo 2 to the information portion of the data bursts in order to keep the power flux density radiated by each TDMA terminal 13006 constant and at acceptable levels. The modulated RF output spectrum is controlled such that carriers may be placed adjacent to one another at a spacing of 0.75 times the encoded carrier bit rate and meet the satellite 11000 loop BER performance specification.

The request for network topology changes occurs at the on-line master node generated by the on-line network subsystem 13028. Requests are of a high-level form such as "add 8 Kbps information capacity to node A" or "remove 24 Kbps information capacity from node M." The TDMA control subsystem 13026 responds to the on-line network subsystem 13028 via the control port 21022 after the change is implemented. The network is reconfigured in less than 2 seconds after the request is made from the on-line network subsystem 13028. The probability of errors causing the reconfiguration process to take longer than 2 seconds is less than $1 \times 10^{-3}$ for a data BER of $1 \times 10^{-3\,1\,5}$. Given a data BER of $1 \times 10^{-5}$, the probability that a new system map is implemented incorrectly is less than $1 \times 10^{-8}$.

As traffic requirements from one or more sites change, it may be necessary to reconfigure the burst length and position of several bursts in a TDMA frame. Signaling channel(s) between TDMA terminals 13006 in the network are established by the on-line network subsystem 13028. Communications channels of requested bandwidth are set up or removed under the control of the TDM control subsystem 13026 via the on-line network subsystem 13028. Slave node updates are hitless, i.e., take place without loss of system synchronization. Service is increased or decreased at any node by a program change at the master node. No hardware changes are required in the field to accomplish dynamic system reconfiguration. The on-line network subsystem 13028 via its TDMA control subsystem 13026 is able to poll the status of slave nodes so that the entire network can be monitored from the on-line master node.

The on-line TDMA subsystem 13006, upon request from the on-line network subsystem 13008, reassigns bandwidth to each TDMA transmit port as required. The increase or decrease in bandwidth is accomplished by changing burst lengths. The changes are hitless.

Each TDMA terminal 13006 in its basic configuration is non-redundant; however, any node may be equipped with redundant TDMA terminals 13006. Therefore, an option for redundancy of common TDMA equipment is provided. Equipment redundancy includes to the greatest degree possible the provision of two independent systems within each TDMA terminal 13006, with one system to be operated on-line and the other in stand-by mode. The stand-by system is immediately available for operation as an "on-line" system. Internal logic is provided to verify the availability of the stand-by system. Switching and control logic, which selects between redundant equipment, is designed such that it can be maintained, repaired, and replaced without a non-recoverable outage if the on-line system is operational.

Automatic switchover between TDMA terminals 13006 is performed with no loss of continuity of service when a failure is detected in the on-line system and when the stand-by system is available. The criteria for automatic switchover includes, but is not limited to, any failure which could result in system damage, immediate loss of continuity of service, or eventual loss of service.

4.5 TDMA Interfaces

4.5.1 ICC-TDMA Interface

There are two types of interfaces between ICC subsystem 13008 and its TDMA terminal 13006; one for the data transmission through data port 21002, and the other is the status port 21018 for the interchange of management (control and status) information (through the TDMA common control CPU 21008). Each slave TDMA terminal 13006 has one data port 21002 and one status port 21018. Each master TDMA terminal 13006 has one data port 21002 and one status port 21018 (like the slave TDMA terminal 13006) and one control port 21022. TDMA terminal 13006 interfaces to the switch/multiplexer 13010 through a single, bit serial, synchronous data port 21002. The data interchange is in burst format. The protocol for this data interchange is as follows:

The transmit side of the TDMA terminal 13006 provides continuous transmit clock, burst gating pulses, and frame synchronization pulses to the ICC subsystems 13008. The switch/multiplexer 13010 provides burst data during the burst gate intervals along with looped transmit clock. The data port 21002 aggregate transmit (receive) clock rate is equal to the burst modem 21006 information rate. The receive side of the TDMA terminal 13006 provides frame synchronization pulses, burst clock, burst gates, and all data bursts (stripped of TDMA overhead and FEC coding) to the ICC subsystems 13008.

The TDMA terminal 13006 supplies synchronization pulses indicating the time of reconfiguration for both the transmit and receive data streams. Time accuracy of all signals is sufficient to ensure that information can be transferred over the ICC/TDMA interface via a selected cable length (for example, 30 feet) without ambiguity or error. If a burst is missed by the TDMA terminal 13006 receiver, a dummy receive burst pulse is generated by the TDMA terminal 13006 so that the ICC subsystem 13008 does not lose burst count integrity. The probability of missing or falsely detecting a burst with an $E_b(t)/N_o$ of 7.3 dB is less than $1 \times 10^{-7}$. The information transferred between the ICC subsystem 13008 and TDMA terminal 13006 is a multiple of 160 bits.

All data interchanges between the ICC subsystems 13008 and TDMA terminal 13006 are in byte-oriented block format. Communications conform to the subset of the HASP multileaving BISYNC protocol. Information transfers between slave ICC subsystem 13008 and the slave TDMA common control 21008 are limited to system/equipment status.

The ICC subsystems 13008 are able to command the TDMA terminals 13006 to perform diagnostics by using the status ports 21018. The minimum included in these diagnostics are:

1. loopback at the ICC subsystem 13008 connector;
2. loopback at the RF equipment interface (IF loopback); and
3. internal self-test.

5.0 Integrated Communications Controller (ICC) Subsystem

The purpose of the integrated communications controller (ICC) subsystem 13008 is to provide a satellite communications switch between nodes for voice, data, and video connections. ICC subsystem 13008 provides full inter-connectivity between nodes and maintains high availability of equipment and satellite bandwidth.

This section describes generally the functions and capabilities of ICC subsystem 13008, the capacity of the ICC/TDMA network, the functional and logical description of the network, and finally, the expandability of the network.

The ICC subsystem 13008 provides dynamic processing of requests for and establishment of connection and disconnection requests between any two points in a system comprised, for example, of up to 64 nodes and up to 1000 channels (which may be telephones, PBXs, PABXs, video teleconferencing equipment, etc.) at each node. ICC subsystem 13008 allocates and de-allocates satellite bandwidth via TDMA 13006 at the on-line master node in response to requests, and maintains detailed billing and statistics files of these requests and other significant events within the system.

ICC connections exist in three basic forms: (1) dedicated/always connected; (2) dedicated/not always connected; and, (3) dynamic. For dedicated/always connected channels, bandwidth is allocated upon network initialization between the source and destination dedicated channels; bandwidth allocated for this type of connection is never de-allocated. For dedicated/not always connected channels, the source channel is dedicated permanently to the destination (that is, the source may not request connection to a different channel), but bandwidth is allocated/de-allocated only upon request. For dynamic channels, connections are established via input from the source channel of a dialed number which may specify either an on-net or an off-net call. Bandwidth is allocated and de-allocated only upon request. All connections at the present time are point-to-point but a broadcast capability is within the scope of the present invention.

The switch multiplexer 13010 is the central component of ICC subsystem 13008. All traffic carried by the satellite 11000 flows through it, and it provides the primary and essential function of routing all data to/from its position in each burst. Switch/multiplexer 13010 interfaces to TDMA terminal 13006 at up to 12 Mbps burst rate, and provides a standard synchronous interface to either terminal devices or to terminal interface input/output modules.

A primary function of the switch/multiplexer 13010 is to assemble bits from the various synchronous serial terminal channels into their proper positions in the TDMA burst structure (as defined by the network subsystem 13028 and control subsystems 13016), and to perform subsequent disassembly after transmission.

A key feature of switch/multiplexer 13010 is the ability to attain high data rate throughout (12 Mbps full duplex) while keeping the design conservative. Most of the digital components are low-speed Schottky TTL, all busses are buffered and terminated to maintain good transmission line characteristics, and chassis interconnects are made using differential line drivers and receivers.

Switch/multiplexer 13010 is easily expandable and maintains good system reliability. The architecture has inherent redundancy in many areas. On-line and off-line built-in test equipment (BITE) allows control subsystems 13016 to detect and locate failures. Finally, any slave site can be upgraded to a master.

The minimum number of nodes in the network is 3 and the maximum is 64, but the present invention contemplates even larger size networks. The maximum number of channels per node is 1000 (including voice links).

The maximum aggregate network data rate is 12.544 Mbps. 512 kbps is also a minimum bandwidth of the network. The network overhead consists of the communication channels between network subsystem 13028 and control subsystems 13016. The overhead bandwidth required by the network subsystems 13028 for transmission is less than 16 kbps. The overhead bandwidth required for each control subsystem 13016 is less than 4.8 kbps.

The node-to-node granularity is 8 kbps; i.e., the bandwidth allocated to each node can be increased/decreased in multiples of 8 kbps. Each channel has a minimum data rate of 800 bps and can be increased in integer multiples of 800 bps up to system maximum.

There are two (2) major resources controlled by the ICC subsystem 13008: bandwidth and channels. The following portion of this section describes the management requirements for these two sources.

Allocation of bandwidth is performed on two basic granules: bursts, and units within bursts. Allocation is performed at three points of system operation: system generation time, demand in real-time, and at scheduled intervals.

Fixed allocation—At system generation time or at operator console 14008 request from the system manager at the on-line master node, the initial configuration of bursts among nodes may be specified in terms of node-to-node bandwidth of 8 kbps increments. Dedicated allocation of bandwidth within bursts may be specified in terms of 800 bps increments. In addition, the minimum/maximum width of a burst may be specified on a node-by-node basis. At system generation or upon console request from the system manager at console 14008, dedicated inter-connection of channels may be defined or channel characteristics may be specified or modified.

Demand allocation—Allocation of bandwidth within a burst is performed on a prioritized first come-first served basis in real-time as required for the inter-connection of channels, and may result in de-allocation of lower priority active channels. Expansion and contraction of bursts is performed within the maximum/minimum limits when required to accommodate the allocation and re-allocation of block space within bursts. Management of channel inter-connection is performed in real-time on a demand basis. This management is initiated as a result of either standard dialing procedures or interface control signals. Verification of channel inter-connectability is performed. Allocation of bandwidth to channels is on a dedicated channel basis or dynamically within a node's permissible burst range. Priority override connections are provided.

Scheduled allocation—Expansion and contraction of bursts is performed on a scheduled time of day basis to allow mapping of a network into peak/idle periods among nodes, and to reduce demand allocation requests for bursts. Channel priorities can be adjusted on a scheduled time of day basis.

The ICC subsystem 13008 conforms to the following network timing constraints. A diagram of the framing structure is shown in FIG. 15. As shown in FIG. 15B, each frame is 20 ms in length. A frame is comprised of a series of bursts. Each node transmits a single data burst (1, 2, 3, ... n) per frame in consecutive order by node ED. Hence, for a network comprised of 25 active nodes, there will be 25 data bursts in a frame. Additional overhead bursts for TDM network management are included in the initial portion of each frame (for example, referring to FIG. 15B, the TDM master burst timing and control burst, the TDMA back-up master burst, and the TDMA control burst).

A superframe, shown in FIG. 15A, consists of twenty-five frames. All network reconfigurations occur on superframe boundaries.

The time required to complete a connection (assuming the connection can be completed) upon receipt of a request for connection, is 3 seconds 90% of the time, 4 seconds 95% of the time, and 6 seconds 99% of the time. This connection time includes bandwidth allocation within burst, and, if required, reconfiguration of the burst structure of the network. The connection time does not include delays due to further tandem dialing.

The system of the present invention is designed to support a communication and interaction average traffic load as follows:
   80% of channels for voice communication
   20% of channels for data communication
   3-minute average voice connection
   10-minute average data connection
   97% point-to-point connection
   3% multi-point connection
   24 kbps voice channel
   40% dedicated channel-to-channel assignment (affects routing but not bandwidth)
   20% user bandwidth permanently allocated
   4.8 kb average data channel
   8 nodes in system
   65% of available user bandwidth in use
   150 channels on-line (for example, 75 full-duplex links)
   200 channels in system
   2.5 Mbps system bandwidth
   3-secomd interconnect time
   $1 \times 10^{-7}$ BER The ICC software is designed so that 98% of the time, the following system requirements are fulfilled with the given range of profiles.

Requirements:
   5-second interconnect time
   2-second user response time to commands entered at a console (assuming the command uses minimal CPU resources)

Profiles:
   30% to 95% voice communication
   5% to 70% data communication
   0 to 100 requests for connection/disconnection per minute
   0 to 2000 requests for connection/disconnection per hour
   0 to 5 requests for connection/disconnection per second
   0 to 100 operator console requests per minute
   75% to 100% point-to-point connection
   0% to 25% multi-point connection
   16 kbps to 32 kbps voice channel rate
   20% to 40% dedicated channel-to-channel assignment
   5% to 50% user bandwidth permanently allocated
   60to 80% demand assigned channels
   2.4 kbps to 56 kbps data channel rate
   3 to 20 nodes in system
   Up to 80% of user bandwidth in use
   Up to 750 channels on-line in system
   Up to 2500 channels in system
   Up to 12 Mbps system bandwidth
   BER of $10^{-5}$
   Up to 512 channels at one node The ICC software is designed to handle the following worst case requirements without fatal hangups. Although this does not guarantee network operation, node integrity is maintained. In order to support the worst case, the LSI-11/23 (network subsystem CPU 14018) can be upgraded to a more sophisticated PDP-11.
   0% to 100% voice communication
   0% to 100% data communication
   300 simultaneous requests for connection/disconnection (but not necessarily implementation of all of them)
   0% to 100% point-to-point connection
   0% to 100% multi-point broadcast connection
   16 kbps to 32 kbps voice channel rate
   0% to 100% dedicated channel assignment
   0% to 100% user bandwidth permanently allocated
   0% to 100% demand channel assignment
   800 bps to 12 Mbps data channel rate
   3 to 64 nodes in system
   100% of bandwidth in use 64,000 channels allocated in system (not all on-line)
2,500 channels on-line in system at one time
12 Mbps system bandwidth
completely degraded satellite link The ICC hardware is designed so that any equipment, which through any single fault can cause complete loss of node or network function, can optionally be made fully redundant. This redundancy at the highest level includes the capability to switch from the on-line network subsystem 13028 to the back-up network subsystem 13028. The ICC software is designed to include the latter capability, and to facilitate extension to the support of other levels of redundancy with minimum impact.

The mean time between failures and mean time to restore are primarily hardware functions. Nonetheless, in the design of each module, consideration has been given to minimize the impact of hardware failures and maximize the isolation of failures to the least replaceable unit. Software is designed so that a hardware failure does not disable system software.

Both self-test and built-in test equipment functions are included in the ICC software design at all levels. Self-test functions are completely non-interfering, and operate in all common equipment modules in such a way that catastrophic faults can be identified with a 99% probability within 10.0 seconds after occurrence. Non-catastrophic faults can be identified with a 90% probability within 30.0 seconds after occurrence.

The ICC software system includes off-line built-in test equipment functions capable of isolating failure to the least replaceable unit level with a 90% probability in common equipment and an 85% probability in channel-specific equipment.

The ICC software is designed to interface with remote, diagnostic, and control equipment via a serial asynchronous modem data port 14010 at the network subsystem 13028 level and a modem data port at the control subsystem 13016 level. These interfaces provide access to all programs and permit full control of the ICC subsystem 13008 by a remote system. Security is provided (so that unauthorized personnel cannot access this capability) by a password function. Integrity of the communication line is enhanced by the inclusion of a 16-bit cyclic redundancy check (CRC) polynomial on each message.

The lost traffic threshold in a random bit error environment of $1.0 \times 10^{-6}$ is no greater than 3 disconnects per 100,000 connections.

Error-correcting memory is a hardware provision; however, if necessary, software is provided to support the hardware function.

The ICC software is designed so that the probability of a loss in system integrity (which includes corrupted map and undetected communication errors) in a bit error environment of $1 \times 10^{-5}$ does not occur more often than once a year. With this same bit error environment, the reconfiguration and inter-connection time does not exceed 3 seconds (due to degraded communication line) more often than twice per hour, and is predicted not to exceed 6 seconds more often than once a day.

The ICC hardware (both on-line and stand-by network subsystems 13028, control substems 13018, front end subsystems 13022, serial subsystems 13018, and switch/multiplexer subsystems 13010) is available 99.5% of the time.

The ICC network control software includes all necessary functions to record the pertinent details of all connections made, including, but not limited to, source and destination channels, addressing (dialed numbers), length of connection, system resources used, and unsuccessful connection attempts. Records are kept in such a way as to facilitate preparation of statistics and billing information. Data accumulated by ICC subsystem 13008 is recorded on a DEC-compatible file structure (e.g., floppy disc, magnetic tape, or fixed disc) and is able to be transmitted to a user device.

Although data transmission through satellite 11000 can be easily intercepted, it would require significant technical expertise to descramble the actual data burst and strip the burst of its signalling/protocol information, which information would be necessary to identify its source and destination. This fact provides an inherent layer of protection. For highly sensitive data, encryption is provided on a local level rather than node level. It should be noted that the present invention also contemplates encryption at the node level.

The network/node protocol is used to control communication between network subsystem 13028 and control subsystem 13016. This protocol is embedded within the burst structure of each node. The portion of the overhead dedicated to internode communication comprises 160 bits per burst for the maser node and 48 bits per burst for the slave nodes. This is an asynchronous positive acknowledgement protocol. This protocol supports, but is not limited to, the following functions:

Requests for connection/disconnection from the control subsystem 13016 to network subsystem 13028
Down-line loading of all lower-level control subsystems 13016
Connectivity map changes
Error condition reporting
Status data
Operator console requests The UIIM subsystem 13024 protocol is used by the serial subsystem 13018 to communicate with the user terminal dialing hardware. This protocol is an asynchronous polled protocol.

The ICC network subsystem 13028 software has a systematic way of logging, reporting, and acting on hardware failures as soon as they are discovered. The most important objective is keeping as much of the network operating as possible, even if some functions or channels are disabled. Decisions to switch from the on-line equipment to stand-by or redundant hardware are normally made at the lowest level possible, but the choice may be overridden by a higher-level subsystem. Lower-level subsystems have contingency plans if they do not receive a response from the next higher-level subsystem. For example, if the on-line and back-up network CPUs 14018 both fail, the control subsystems 13016 maintain the present network configuration and report the problem to the operator's console 14008.

Failure detection is performed at the lowest level possible. The subsystems automatically pass error information to the network subsystem 13028.

At all levels there are random events that cause corruption of data stored in RAM, on disk, or on tape. These errors are distinguished from hardware errors in that they are not generally reproducible or not consistently attributable to specific hardware components (that is, the hardware passes all the diagnostics). The ICC system 13008 uses single-bit error-correcting memories in the network and control subsystems 13028 and 13016. Software errors are logged at the network subsystem 13028, and reported in the same manner as hardware failures are reported.

As discussed, the network has an on-line network subsystem 13028 and a back-up network subsystem 13028, each of which is located at different geographical nodes. At initialization, the on-line master takes control and the back-up master 13028 assumes back-up status. The on-line master 13028 periodically updates the stand-by over the satellite control channel. If the control subsystems 13016 detect the loss of the on-line master 13028, they attempt to report it to the on-line master 13028. The back-up network subsystem 13028 continuously monitors the on-line network subsystem 13028. When the back-up network subsystem 13028 detects a failure of the on-line network subsystem 13028, the back-up network subsystem 13028 decides whether to take control of the network and become the on-line network subsystem 13028. This decision is based upon the detected failure and the status of the nodes in the network. If the original on-line network subsystem 13028 is repaired and is to regain network control, it must first send a request to the current on-line network subsystem 13028 to be updated with the most current network information. Once the original on-line network subsystem 13028 has been updated, the current on-line network subsystem 13028 relinquishes control and the original on-line network subsystem 13028 resumes control of the network.

Other backup components that can be present in the network are:
  a. Redundant switch/multiplexer 13010 common equipment;
  b. Redundant control subsystems 13016;
  c. Redundant TDMAs 13006;
  d. A second disk.

5.1 Switch/Multiplexer

The switch/multiplexer 13010 is the central component of the ICC subsystem 13008. All data traffic carried by the satellite 11000 flows through it, and it provides the primary and essential function of routing all data to/from its proper position in each burst. On one side, the switch/multiplexer 13010 interfaces to the TDMA terminal subsystem 13006 at up to 12 Mbps burst rate. On the other side, the switch/multiplexer 13010 provides a standard synchronous serial interface to the bus extension subsystem 13012.

The primary function of the switch/multiplexer subsystem 13010 for transmission to satellite 11000 is to assemble bits from the various synchronous serial terminal channels into their proper positions in the TDMA burst structure is defined by the network and control subsystems, 13028 and 13016, respectively, and to perform subsequent disassembly of the burst structure upon reception for satellite 11000.

In the receive direction, serial burst data from the TDMA subsystem 13006 is converted to 16-bit parallel words and smoothed in a small FIFO buffer to an internal bus rate of 783 KHz. This lower bus rate allows time for local channel address generation and permits the bus to be extended to equipment up to 50 feet away from the common equipment chassis. Smoothing buffers on a per channel basis are also provided to convert the 16-bit parallel data words to serial data for customer equipment.

The transmit direction operates similarly to the receive direction. Individual customer serial data is converted to 16-bit parallel data words and buffered on a per channel basis. A transmit channel address on the bus controls the order of transmissions from the channels. A common FIFO buffer synchronizes data from the internal bus to the TDMA transmit clock. Conversion of data words to serial burst data is performed when the TDMA opens its transmit gate.

A key feature of the switch/multiplexer 13010 is the ability to attain high data rate throughput (12 Mbps full duplex) while keeping the design conservative. Most of the digital components are low-speed Schottky TTL. All busses are buffered and terminated to maintain good transmission line characteristics. Chassis interconnects are made using differential line drivers and receivers.

The switch/multiplexer 13010 is easily expandable and maintains good system reliability. The architecture has inherent redundancy in many areas. The simplicity of the common hardware permits the actual cost per channel to be incremental with the number of channels, allowing smaller networks to still be cost-effective. On-line and off-line built-in test equipment (BITE) allows the control subsystems 13016 to detect and isolate failures.

5.1.1 Switch/Multiplexer Hardware

Figure 22:
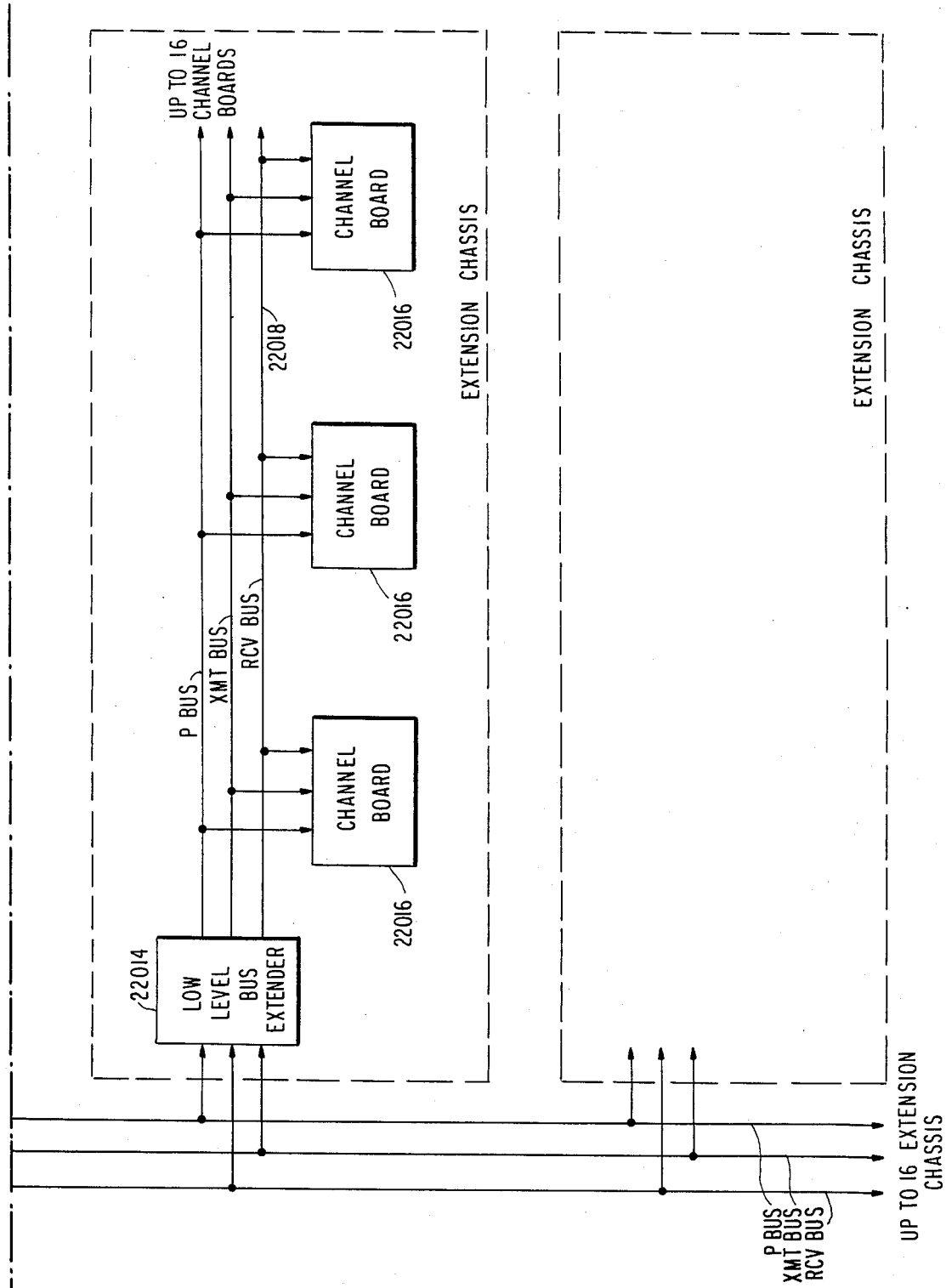
FIG. 22, comprising
Figure 23:
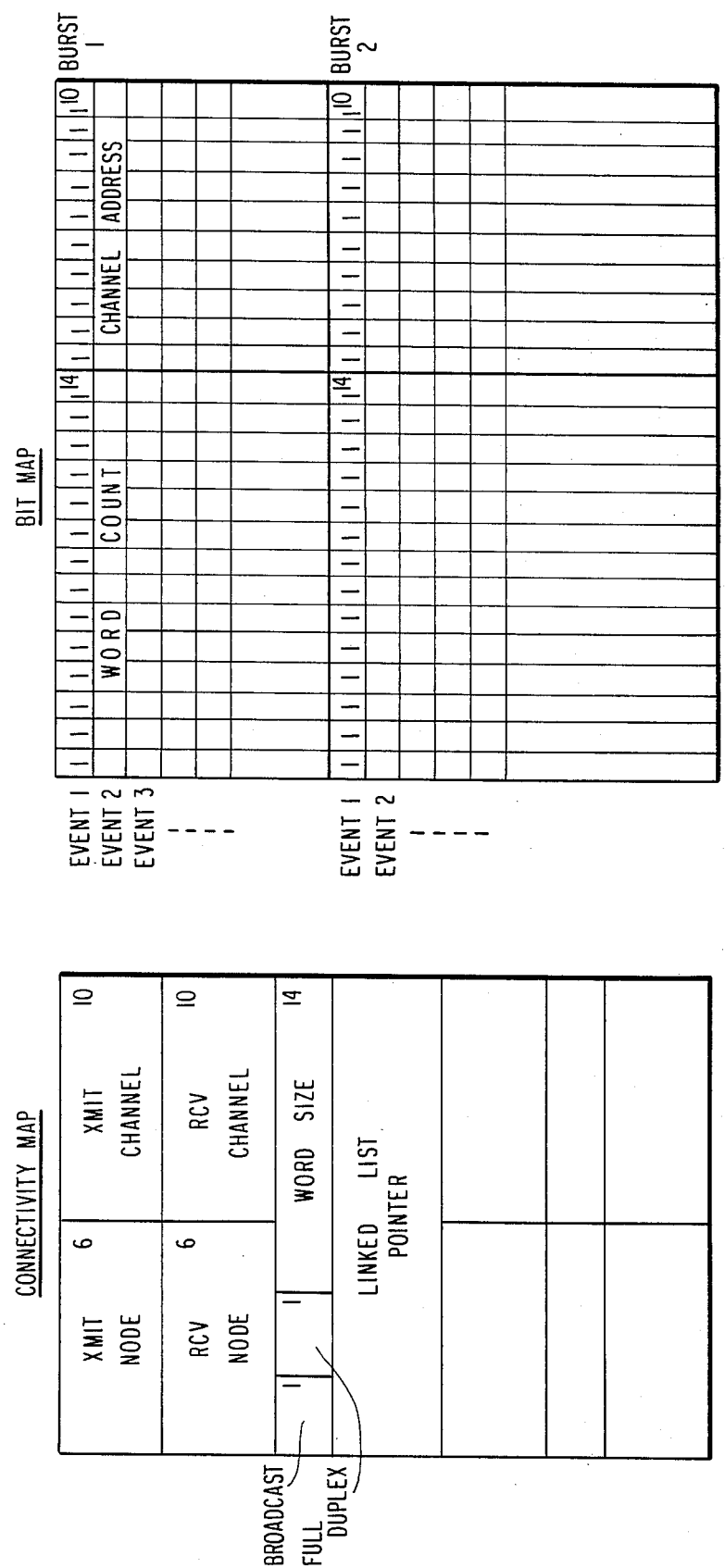
FIG. 23, comprising

Referring now to FIG. 22, which is a block diagram of the switch/multiplexer 13010 hardware, the hardware configuration of the switch/multiplexer 13010 consists of a receive (RCV) controller 22002, a transmit (XMT) controller 22004, a timing and sync generator 22006, a programming bus interface 22008, a control CPU communications interface 22010, several high-level bus extenders 22012, a front end subsystem 13022, and a number of low-level bus extenders 22014 (which interface to each high-level bus extender 22012). Note that up to sixteen channel boards 22016 can be connected to each low level bus extender 22014.

In a maximum hardware configuration, each of four high-level bus extenders 22012 feeds sixteen low-level bus extenders 22014, which in turn feeds sixteen boards 22016. This provides access to 1024 channels, but because some addresses are lost to control channels, the actual maximum is 1020 channels. This hierarchy prevents channel level failures from affecting other channels interfaced to other low-level bus extenders 22014, and low-level bus extender 22014 failures from affecting more than one of the four high-level bus extenders 22012.

5.1.1.1 Receive (RCV) Controller

Figure 24:
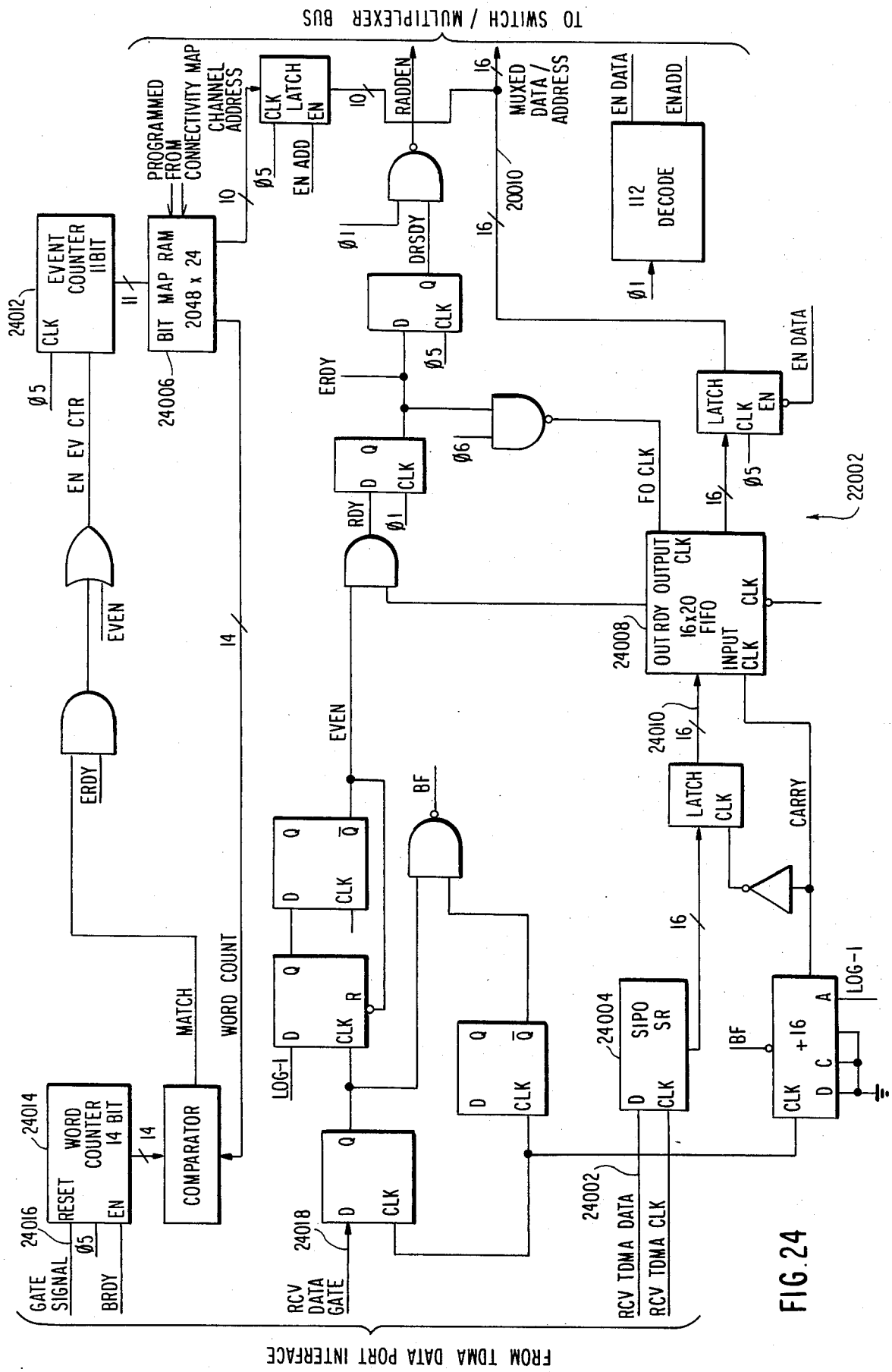
FIG. 24 is a block diagram of the receive controller in the switch/multiplexer.

The receive (RCV) controller 22002, shown in simplified schematic form in FIG. 24, receives RS-422 bit-serial data bursts over line 24002 from TDMA subsystem 13006, and converts them into 16-bit parallel data words through a serial in/parallel output (SIPO) shift register 24004. The RCV controller 22002 outputs a 10-bit channel address for each word of data based on the contents of a bit map 24006.

The words received from the TDMA subsystem 13006 are loaded into a 16-word deep FIFO buffer 24008 over a line 24010 to allow synchronization with the internal switch/multiplexer bus 28002. FIFO 24008 is emptied at a rate faster than TDMA subsystem 13006 can load data into FIFO 24008. Therefore, the RCV controller 22002 must occasionally inhibit bus cycles (and hence the emptying of the FIFO 24008) until data has been received and is ready to be removed from FIFO 24008.

A 10-bit address is output from the bit map 24006 for each word of data output onto the switch/multiplexer bus 28002. An 11-bit counter, the event counter 24012, addresses the bit map 24006 which is a 2048×24 bit RAM. For each active receive channel, there is one entry in bit map 24006. The lower 10 bits are the channel address, and the upper 14 bits are called the word number. This word number is compared with the count of a word counter 24014. When the word number matches the word count in word counter 24014, event counter 24012 is incremented. The next channel address and word number in the bit map 24006 are then available. Note that both event counter 24012 and word counter 24014 are reset at the beginning of each frame.

When a burst of data is received from TDMA subsystem 13006, TDMA subsystem 13006 raises a gate signal 24016. Gate signal 24016 causes word counter 24014 to be reset, FIFO 24008 to be cleared, and event counter 24012 to be incremented. For each word of 16 data bits output onto a receive bus 22018, word counter 24014 is incremented.

The bit map 24006 should be programmed with all 1's [0FFFFFFH] (address 1023 [3FFH], word number 16383 [3FFFH]) in location 0. Although event counter 24012 is reset to zero at the beginning of a frame, the start of the first burst causes it to increment to 1 for the first data word received. Location 1 of bit map 24006 contains the channel number of the first active channel. If the word number is N, then (N+1) words of data are addressed to this channel after which event counter 24012 is incremented to 2. The next channel addressed receives the number of words that is the difference between the present word number and the previous word number. Any data received that is destined for another node is programmed to go to channel 1023 [3FFH] (that is, the bit bucket). An all 1's entry [0FFFFFFH] (channel 1023 [3FFH], word number 16383 [3FFFH]) is inserted after the last bit of data used in a burst. When the RCV gate 24018 is opened for the next burst, event counter 24012 is incremented. The next entry in bit map 24006 contains the channel address for the first word of data in the next burst. Since word counter 24014 is reset on each burst, the word numbers start again from 0.

There are actually two 2048×24 bit maps in bit map 24006. One of these is always on-line, while the other off-line map is accessed for programming as described later in this section. Note that a map change is initiated by the control subsystem 13016. Specifically, the control subsystem 13016 initiates a map change (that is, switches the on-line map with the off-line map) at the start of the next superframe in response to receiving a "GO" signal from the network subsystem 13028. The off-line bit map 24006 has been previously programmed in accordance with the data in the connectivity map 23002.

5.1.1.2 Switch/Multiplexer Receive Bit Map

The switch/multiplexer receive bit map 24006 resides at programming locations 1000H to 1FFFH of a PBUS 22022. The map entries are each 24 bits wide; the even programming addresses are for the lower 16 bits and the odd programming addresses are for the upper 8 bits. The upper 8 bits of the odd address locations are unused.

The receive bit map 24006 is formulated from the connectivity map 23002 resident in all the nodes. The entries in the connectivity map 23002 are ordered in the sequence of burst transmission. Each burst may have words for one node that are intermixed with words destined for other nodes. The receive bit map 24006 has an entry for each active receive channel at its node, and also one entry for each space in the connectivity map 23002 where there are words for other nodes. The first entry is programmed into locations 1000H and 1001H. The entries are contiguous. All words not destined for the node are mapped to channel number 1023 [3FFH]. The receive word counter 24014 is reset to zero at the beginning of each frame. As mentioned previously, the lower 10 bits of an entry identify the channel to receive words. The upper 14 bits identify the number of the last word to be routed to that channel. All the words from every burst have a consecutive word number associated with them. After the last entry for each burst, an entry of all 1's is added. This entry instructs the hardware that there will be no more information until the next burst. The maximum number of entries is 2048, and the first entry is all 1's.

5.1.1.3 Transmit (XMT) Controller

Figure 25B:
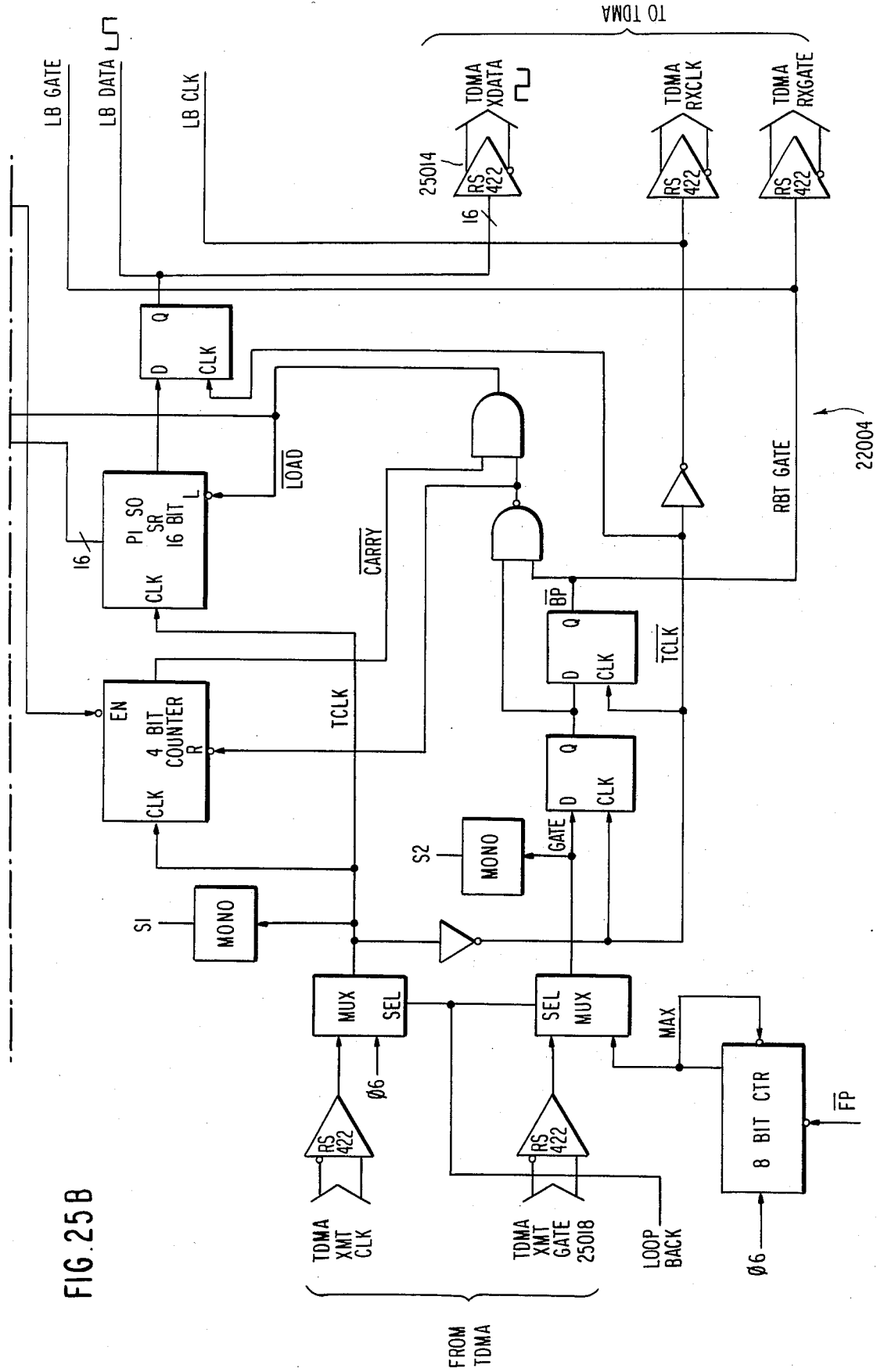

The transmit (XMT) controller 22004, shown in simplified schematic form in FIG. 25 (consisting of FIGS. 25A and 25B), creates a channel address for each 16-bit word of data transmitted. Referring to FIG. 25A, the sequence of addresses is determined by a transmit bit map 25002 and two counters (the word counter 25004 and the event counter 25006). Addresses are output onto 10 lines of a switch/multiplexer bus 25008, and data is sent back on 16 other lines 25010. The XMT controller 22004 loads the data words into a 16 word deep FIFO buffer 25012. When the TDMA subsystem 13006 raises its transmit gate, data words from FIFO buffer 25012 are converted to serial data and sent to TDMA subsystem 13006 over line 25014.

At the beginning of each frame, two counters, the event counter 25006 and word counter 25004, are reset. Event counter 25006 addresses the bit map 25002, a 2048×24 bit RAM. The lower 10 bits of the bit map 25002 are the address of the first channel to transmit. The upper 14 bits are called the word number. This word number is compared with the word count, and when they match, event counter 25006 is incremented. A new channel address and word number are then available out of bit map 25002. After 16 data words are input into FIFO buffer 25012, the ready line 25016 indicates that the buffer 25012 is full. Word counter 25004 and event counter 25006 are stopped from counting and the switch/multiplexer bus control signals on bus 28002 indicate that no data should be put onto the bus.

When the TDMA subsystem 13006 raises its transmit gate signal 25018, data begins flowing to the TDMA subsystem 13006 over a line 25014. As room becomes available in FIFO buffer 25012, more data words are loaded into it. Since the switch/multiplexer bus 28002 runs faster than the TDMA subsystem 13016 data rate, FIFO 25012 never runs empty.

Bit map 25002 causes N+1 words to be transmitted from the channel specified in its first location, where N is the word number. The next entry in the bit map 25002 specifies the second channel address and a new word number. The number of data blocks transmitted from this channel equals the difference between the present number and the previous one.

There is normally only one transmit burst per frame. After the last entry for data in bit map 25002, two additional entries are needed. First comes an entry of all 1's [0FFFFFFH] (word number 16383 [3FFFH], channel 1023 [3FFH]. This entry is defined as EOB (end of burst). The next entry is channel 1023 [3FFH], word number 16382 [3FFEH]. This is defined as an EOT (end of transmission). Since channel 1023 [3FFH] is defined as the bit bucket, no actual data words are driven onto the switch/multiplexer bus 28002.

When EOB is detected by hardware, a status bit on a line 25020 is set at FIFO buffer 25012 input, and event counter 25006 is enabled to increment when the next word is loaded into FIFO buffer 25012. This status bit is passed along through FIFO buffer 25012 in parallel with each word. When a set status bit reaches FIFO buffer 25012 output, it causes the output of data bits to the TDMA subsystem 13006 to be halted. The entry in bit map 25002 following EOB was EOT; therefore, FIFO 25012 is filled with data from the bit bucket, which is discarded when the frame pulse occurs.

If multiple bursts per frame are to be transmitted, then EOB is followed by data from the second burst. FIFO buffer 25012 is filled with data for the burst behind the set status bit and one word from the bit bucket. The word count for the second burst is not reset but continues, allowing one count for EOB. Upon reception of a new transmit gate signal 25018, the word from the bit bucket is overwritten with good data, and the output of data to the TDMA subsystem 13006 is enabled. After the last burst, an EOB and EOT must be in the bit map 25002, as in the single burst mode.

Note that bit map 25002 in the XMT controller 22004 actually is comprised of two 2048×24 bit maps. One of these bit maps is always on-line, while the other may be accessed by the control subsystem 13016 for programming.

5.1.1.4 Switch/Multiplexer Transmit Bit Map

The switch/multiplexer transmit bit map 25002 resides at programming locations 0000H to 0FFFH on the PBUS 22022. The map entries are each 24 bits wide, thus 2 programming locations are needed to read or write each entry. The even-numbered addresses are assigned to the lower 16 bits, and the odd-numbered addresses are assigned to the upper 8 bits of each entry. The upper 8 bits of the odd address locations are unused.

The transmit bit map 25002 is formulated from the connectivity map 23002 for a given node. Each entry in the connectivity map 23002 contains the node and channel number for the source and destination of each connection, and the number of transmission words to be sent. The order in which the entries appear is the order in which words are transmitted. The format of the transmit bit map 25002 is such that the first entry must always be programmed into programming locations 000H and 001H. At the beginning of transmission, the word counter 25004 is reset to zero. The lower 10 bits of the map 25002 identify the channel number that is transmitted first. The upper 14 bits identify the last word number to be transmitted from this channel. All the words transmitted in a burst have consecutive word numbers associated with them. The block counter 25004 is incremented after each word is transmitted. When the upper 14 bits of the first entry match the word count, the event counter 25006 increments and the second bit map entry is processed.

The transmit bit map 25002 may contain less than its maximum 2048 entries, but they always begin at 0000H and are contiguous. Also the location after the last entry is programmed to all 1's. This channel number, 1023 [3FFH], is unused, and the all 1's for the last word number tell the hardware that this is the end of the burst. The words counter 25004 is reset, and word for the next burst are loaded into the FIFO 25012. If a second burst is to be used, a second set of entries is made following the all 1's entry. The word counter 25004 has now been reset to zero, and word number 2 has the same format as the first word. These entries also end with an all 1's entry.

5.1.1.5 Timing and Sync Circuitry

Figure 26:
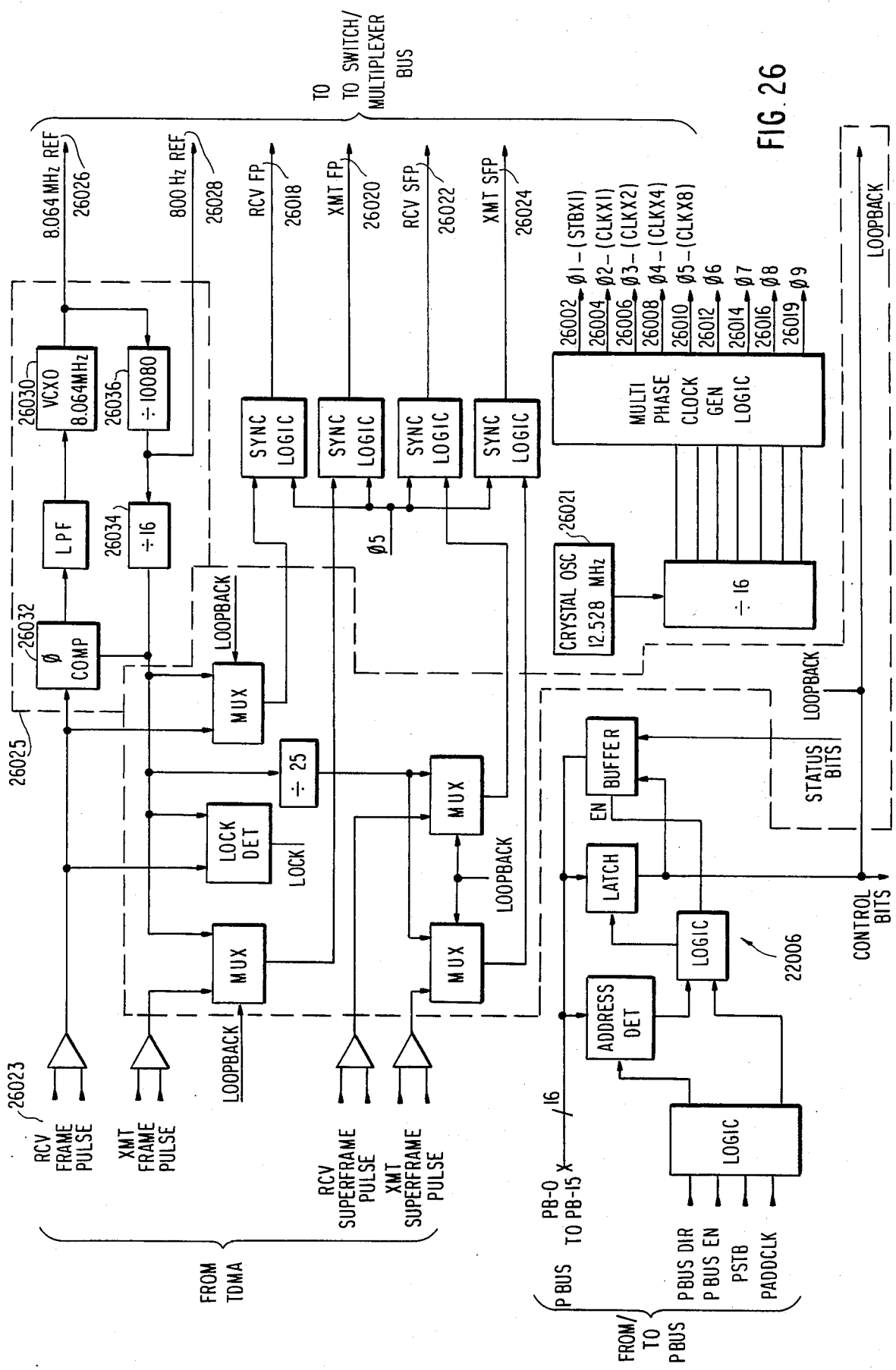
FIG. 26 is a block diagram of the timing and sync generator in the switch/multiplexer.

The timing and sync generator 22006, shown in schematic block diagram form in FIG. 26, provides the interface to the switch/multiplexer 13010 for both the transmit and receive frame and superframe pulses from the TDMA subsystem 13006. It reshapes and synchronizes these pulses with the internal switch/multiplexer bus clocks 26002 to 26018, which are derived in the timing and sync generator 22006 from a 12.526 MHz crystal oscillator 26020.

The receive frame pulse 26022 is used as a network timing reference. A second-order, type 2, phased-locked loop 26024 locks onto the receive-frame pulse and produces two reference frequencies 26026 and 26028. The frequency 26026 is a 8.064 MHz frequency chosen because it divides down to most common baud rates. The other frequency 26028, which is 800 Hz, is chosen because it is the basic unit of connectivity that can be added to or deleted from a connection.

The phase-locked loop 26024 has a frequency range of 100 ppm. Stability of the TDMA receive-frame pulse 26022 is assumed to be better than +/−10 ppm. The 3 dB bandwidth is 0.017 Hz, and the damping factor is 1.6. Since the loop is a type 2, the phase relationship of the reference and a voltage controlled oscillator (VCO) 26030 is known for the locked condition. In order to minimize lock time, a phase detector 26032 detects out-of-lock for phase errors greater than +/−18 degrees. When out-of-lock is detected, the loop counters 26034 and 26036 are reset to adjust the phase error to 0 degrees. If the loop is initialized with a phase error within +/−18 degrees, it normally pulls to within +/−1 degree in a minute. If the loop is within +/−6 degrees and the channel board buffers have 2% excess capacity, there is no possibility of an overfill or underfill of the buffers. After about 5 minutes, the loop phase error is less than 0.1 degree (5.5 microseconds). A loopback mode is provided within the phase detector 23032 to generate internal frame and superframe pulses for the bus for testing purposes.

5.1.1.6 Programming Bus (PBUS) Interface

Figure 27:
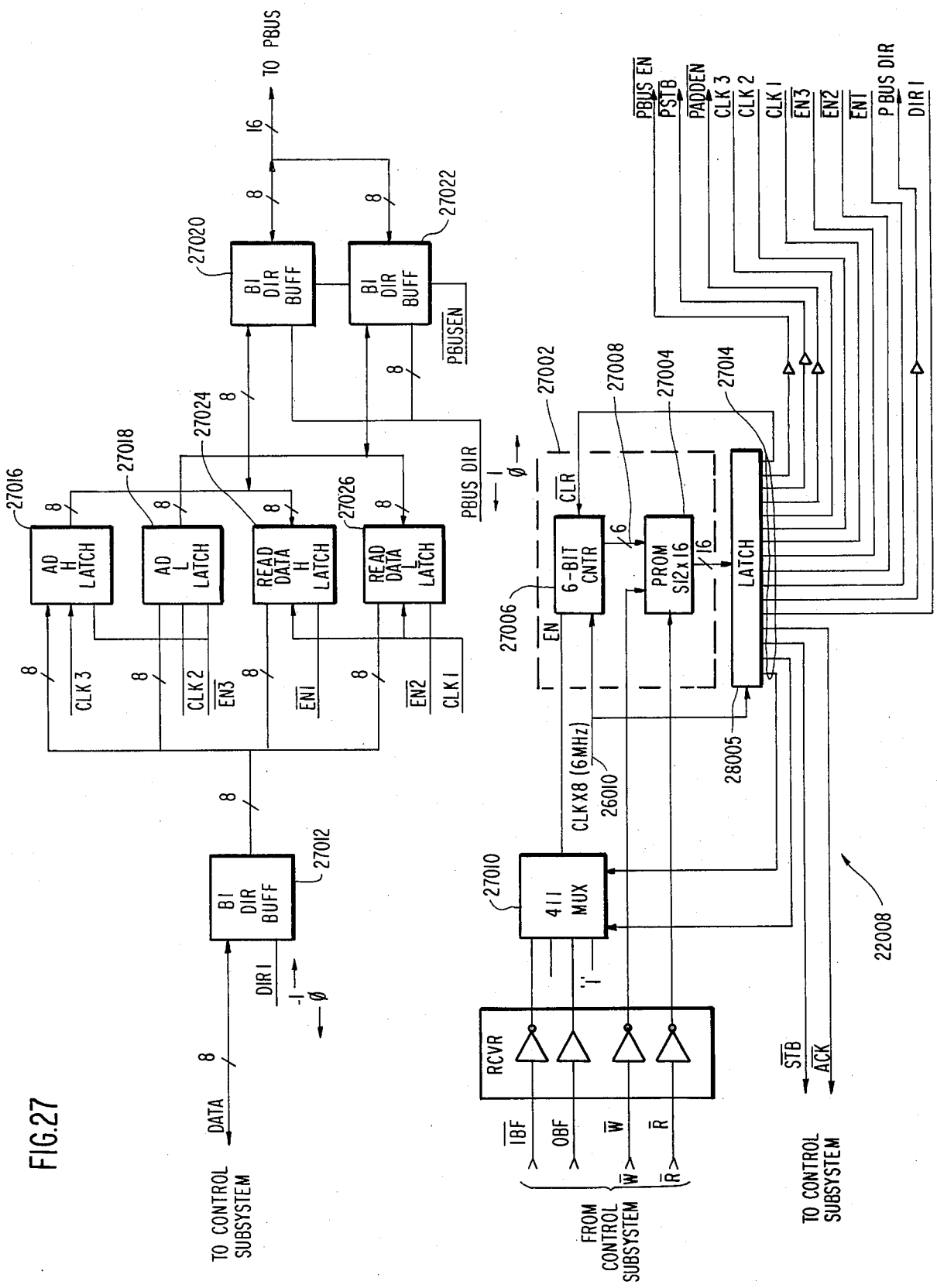
FIG. 27 is a block diagram of the programming bus interface to the switch/multiplexer.

The programming bus (PBUS) interface 22008 between the switch/multiplexer 13010 and the control subsystem 13016 is shown in schematic block diagram in FIG. 27. The heart of the design is a PROM-based sequencer designated generally by reference numeral 27002. There are two separate sequences contained in a PROM 27004 within sequencer 27002: one for a read (R/) cycle, and one for a write (W/) cycle. The R/ and W/ signals generated by the control CPU 14080 (which is an Intel 8086) determine which part of PROM 27004 is used to determine the appropriate sequence. All unused portions of PROM 27004 force a reset to a counter 27006, ensuring that the idle state after power-up and between sequences is at a count of zero. All inputs and outputs from PROM 27004 are latched and synchronized to CLK X8 26010, guaranteeing proper set-up times. A write operation occurs when the control CPU 14080 lowers W/, which forces the PROM sequence address lines 27008 to correspond to the write sequence. The sequencer 27002 then waits for OBF/ to go high from the control CPU 14080, signifying that data is available. A selector 27010 is used to stop counter 27006 until OBF/ goes high; OBF/ and IBF/ are latched to insure set-up time requirements to counter 27006. When OBF/ goes high, counter 27006 advances, and the sequencer 27002 goes through its program. A transceiver 27012 controls data direction from the control subsystem 13016. It is set up by the appropriate sequencer line of a bus 27014 to receive the high-byte address from the control subsystem 13016. As the sequencer 27002 advances, the data is latched into a latch 27016, and an ACK/ is sent back to the control subsystem 13016. The sequencer 27002 waits for OBF/ again, signifying that the low byte of address is available. The sequencer 27002 then causes the data to be latched into a latch 27018, enables latches 27016 and 27018 to drive towards the 16-bit PBUS 22022 via an EN 3 sequencer line, and gives an ACK/ back to the control subsystem 13016. Transceivers 27020 and 27022 are enabled to drive the latched address of latches 27016 and 27018 onto the PBUS 22020 and to control the PBUS control lines. This sequence continues with the high-order data going into a latch 27024 and the low-order data into a latch 27026, and then out to the PBUS 22022. At the end of this sequence, the counter 27006 is cleared.

A read operation is very similar as regards to the address latching of the first two bytes from the control subsystem 13016 into latches 27016 and 27018. Here, the 16-bit data from the PBUS 22022 is received via buffers 27020 and 27022, their direction being reversed by the sequencer 27002 via PBUS EN/ present on bus 27014. This data is latched into latches 27024 and 27026. Latch 27024 is then be enabled, and transceiver 27012 is reversed to put the high byte of data out to the control subsystem 13016. Thereafter, STB/ is pulsed to latch the output data into the control subsystem 13016. The sequencer 27002 then waits for IBF/ via selector 27010 to go back high and re-enable the counter 27006. The data in latch 27026 then is output through transceiver 27012 to the control subsystem 13016 for the low byte of data, and a similar sequence is performed waiting for IBF/. At the completion, counter 27006 is cleared.

5.1.1.7 Control CPU Communications Channel Interface

Figure 28:
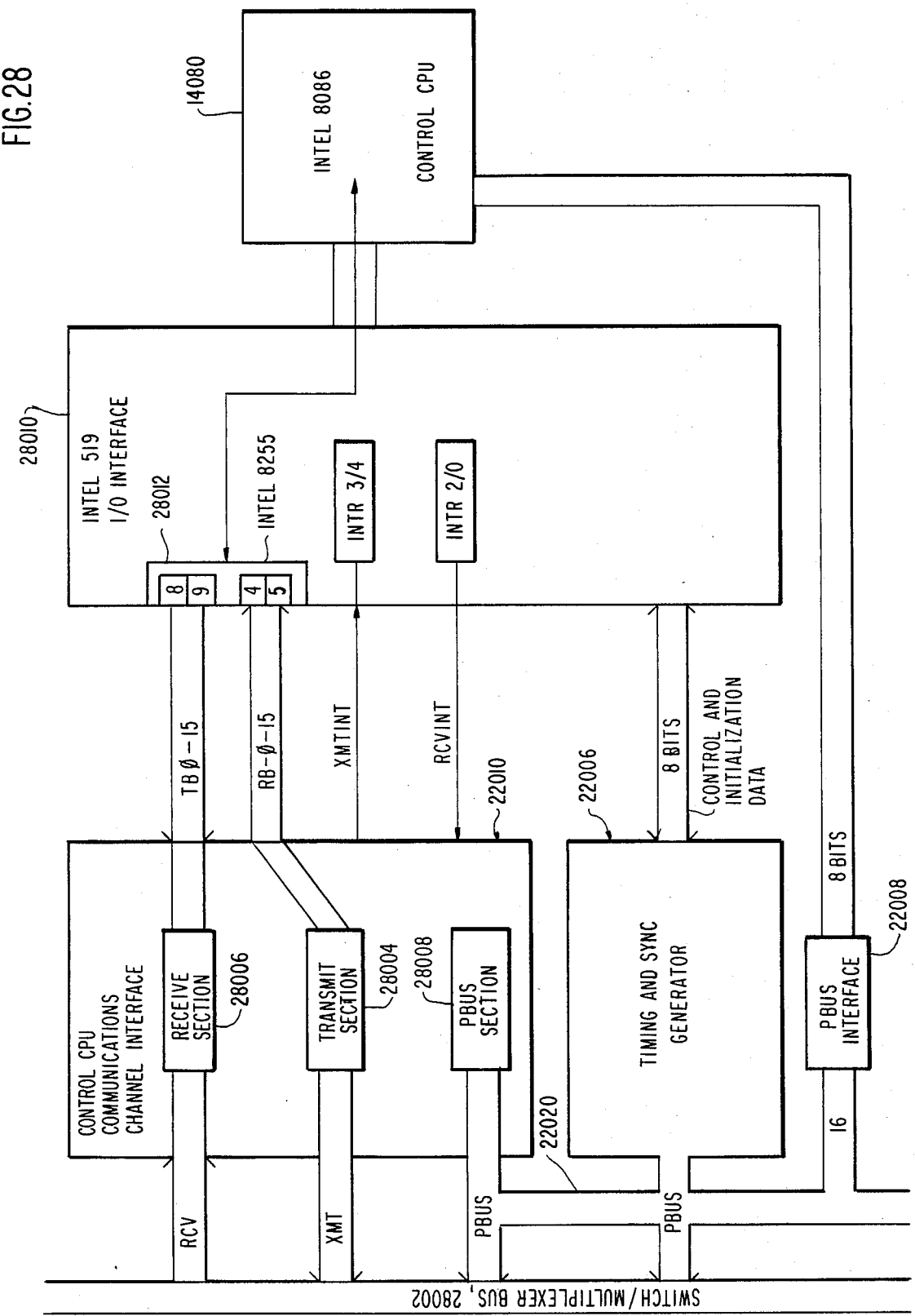
FIG. 28 is a block diagram of the switch/multiplexer to the control interface.

The control CPU communications channel interface 22010 provides, as shown in schematic block diagram form in FIG. 28, the communications interface between control subsystem 13016 and a switch/multiplexer bus 28002. The control CPU communications interface 22010 acts like a channel interface insofar as its interfacing into the switch/multiplexer bus 28002 is concerned. The data flow through interface 22010 is quite similar to that through a channel interface, with the only major difference being that its interface to the control CPU 14080 is parallel instead of serial. The interface 22010 has several functions which are controlled via the PBUS 22020. The interface 22010 is divided into three major sections: a switch/multiplexer transmit channel 28004, a switch/multiplexer receive channel 28006, and a PBUS section 28008.

5.1.1.7.1 PBUS Section Operation

The PBUS section 28008 of the communications channel interface board 22010 supplies, via the PBUS 22020, a 16-bit status word to the control subsystem 13016.

The PBUS address for this PBUS section 28008 is hard coded on the board and is compared against the 16-bit address on the PBUS 22020 applied to the PBUS 22020 by the PBUS interface 22008. When the address is detected and a read operation is identified by the proper PBUS control leads, a tri-state buffer enables this status word onto the PBUS 22020.

Bits 0-7 of the PBUS address on PBUS 22020 specify the dip switch setting, which identify the node number. Another bit, generated on the interface board 22010 by a latching circuit 28010, monitors the transmit/receive superframe pulses from the backplane, and identifies if a superframe has occurred since the last time status was read.

The PBUS section 28008 also contains buffers (not shown) which hold the initialization parameters programmed by the control subsystem 13016, discussed in the following section entitled "Programming Information."

5.1.1.7.2 Transmit Section Operation

Figure 29:
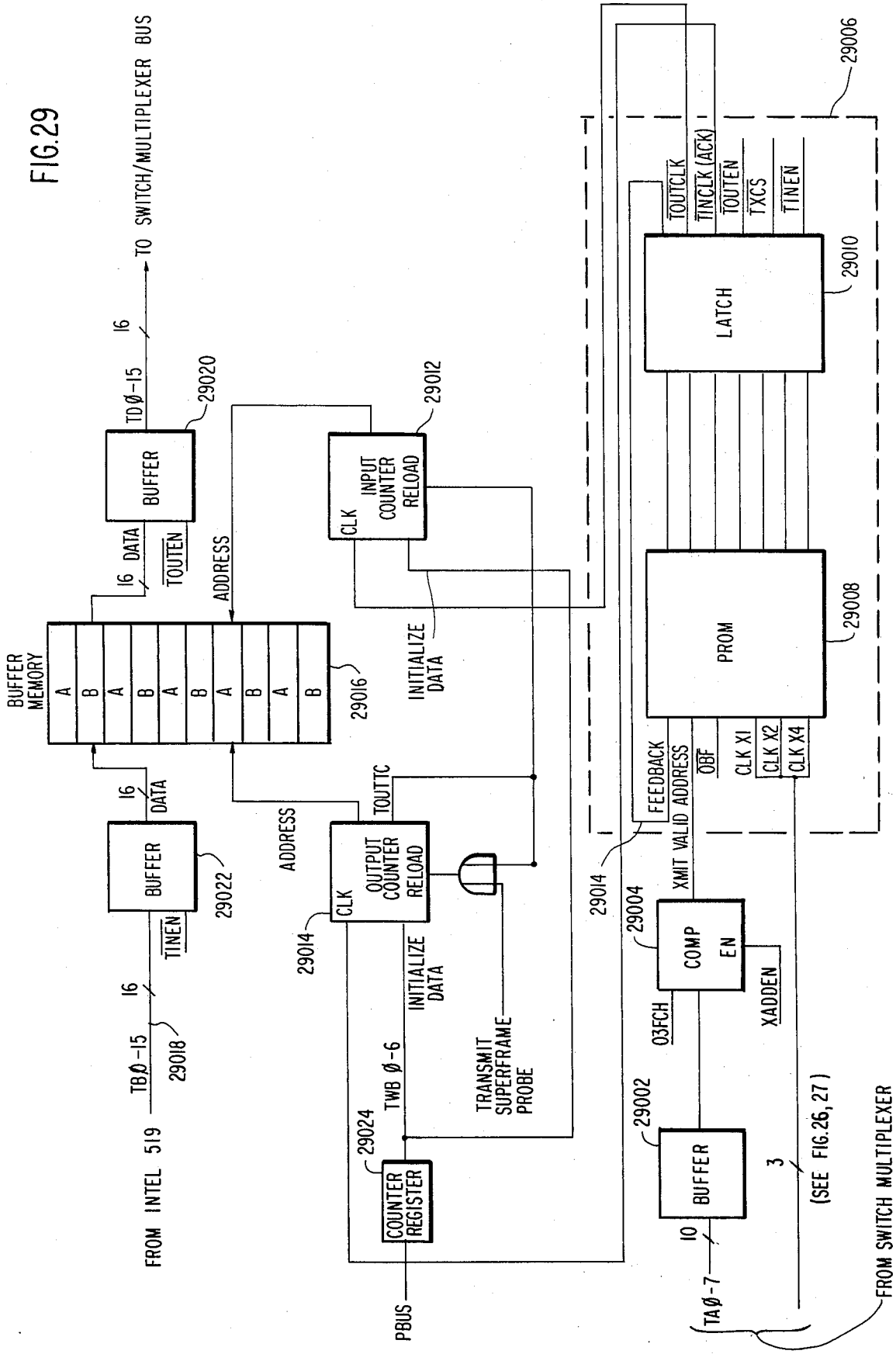
FIG. 29 is a block diagram of the transmit section in the control CPU communications channel interface.

The transmit section 28004 is shown in schematic block diagram form in FIG. 29. The transmit channel address bits TA0-9 are buffered in a buffer 29002, and then compared with 3FCH by a comparator 29004. The transmit address enable signal XADDEN is also an input to comparator 29004, so that the comparator 29004 output is the transmit address valid signal. Transmit address valid and three clocks CLK X1, CLK X2, and CLK X4 are inputs to a sequencer designated generally by reference numeral 29006. Sequencer 29006 is comprised of a PROM 29008 and a latch 29010.

Sequencer 29006 has one feedback bit 29012 and one input OBF/ from a parallel I/O interface 28010, which is an Intel model 519. The sequencer 29006 checks OBF/ and reads data from the interface 28010 during the first half of a switch/multiplexer bus cycle. During the second half of the cycle, the sequencer 29006 gates data onto the switch/multiplexer transmit bus 22020. Sequencer 29006 output TOUTCLK advances an input counter 29012 to provide the buffer address of the next word to be gated onto the switch/multiplexer bus 28002. Sequencer output TINCLK advances output counter 29014 to provide the buffer address for input data from the interface 28010 and provides the ACK signal to the interface 28010. The buffer memory 29016 is addressed by either an input counter 29012 or an output counter 29014 depending on which buffer 29016 (A or B) is enabled by the sequencer 29006.

A transmit buffer memory data bus 29018 (TBO-15) is gated onto the switch/multiplexer transmit data bus 22020 by a buffer 29020. Buffers 29020 and 29022 are enabled by sequencer outputs TOUTEN and TINEN, respectively.

The input counter 29012 and output counter 29014 are both reloaded when the output counter 29014 reaches terminal count (TOUTTC). The reload value (TWBO-6) represents the number of words per transmit block. Counter 29014 is also reloaded by the occurrence of a transmit superframe pulse (TSFP). In addition to reloading counters 29012 and 29014, an interrupt to interface 28010 is generated, and the A/B map is flipped by changing the state of TLSB. TLSB provides one of the input address bits for the data buffer memory 29016, and its inverse, TLSB/, is the same address bit for the output address, so that while the A portion of buffer 29016 is being written to, the B portion is being read from, and vice versa. The TLSB state changes on each block sent, so that while data is being read from sequential odd locations (A portion) of buffer 29016, data may be written to sequential even locations (B portion) of buffer 29016 for one block of data.

5.1.1.7.3 Receive Section Operation

The receive section 28006, which is shown in schematic block diagram form in FIG. 30, is now described. The operation of the receive section 28006 is very similar to that of the transmit section 28004. The description is therefore shorter, assuming an understanding of the transmit section 28004.

The multiplexed switch/multiplexer receive data and address bits (RBO–15) are buffered by a buffer 30002. The buffered data and address enable and RADDEN are compared with a programmable value CSADO–9 by a comparator 30008 to provide the RVALID signal. The receive sequencer 30010 causes a write to interface 28010 during the first half of the switch/multiplexer bus cycle, and a write of switch/multiplexer data into a receive buffer memory 30012 during the second half.

The receive buffer memory 30012 is addressed by either an input counter 30014 or an output counter 30016. The input and output counters 30014, 30016, respectively, reload after one full block has been received from switch/multiplexer 13010. The counters 30014, 30016 are reloaded to the value RWB0–7 as programmed via the PBUS 22022. At the end of each block received, an interrupt is sent to interface 28010 and the state of the RMSB (most significant bit) signal 30018 is changed. Note that the RMSB signal 30018 is the most significant address bit of the receive buffer memory 30012. RMSB signal 30018 is gated to address bit 8 during output to interface 28010. The inverse of the RMSB signal 30018 is used during input from switch/multiplexer 13010.

5.1.1.7.4 Programming Information

The control communications channel interface 22010 is initialized prior to sending or receiving data. The interface 22010 is set to the proper number of words per block for receive and transmit, the number of transmit blocks per superframe, and the switch/multiplexer receive address (CSADO–9). The receive address may be changed at any time, allowing either the on-line or back-up front end subsystem 13022 to be monitored. Changing the receive address, however, does not produce valid blocks until the beginning of a superframe. The transmit blocks per superframe count is for the programmer's convenience only, and may be set to the number of blocks minus one and complemented, to allow the last block flag to be sensed prior to the beginning of the next superframe. The count registers 29024 need only be loaded once, and they may be read back for verification. The control subsystem 13016 node ID (which is set via a dip switch) is available in the status word lowest 8 bits. Normal operation begins during the first superframe following PBUS initialization of the interface 22010.

5.1.1.7.5 Receive Operation

Referring again to FIG. 28, when a complete block of data has been collected in the receive buffer memory 30012 (A/B), interrupt INTR PORT 2/0 is activated. The correct number of words (one block) is read from control subsystem 13016 ports 04 and 05 of an I/O chip 28012 (an Intel8255) on interface board 28010. Port 04 is read first. The reading of port 05 causes the next word to be loaded into I/O chip 28012. The read may progress without status polls, since interface 28010 reloads the I/O port 28012 as fast as the control CPU 14080 can read it.

5.1.1.7.6 Transmit Operation

Referring again to FIG. 28, when a complete block of data has been sent to switch/multiplexer 13010 from the transmit buffer memory (A/B) 29016, interrupt INTR PORT 3/4 is activated. The correct number of words (one block) is written to ports 08 and 09 of I/O chip 28012. Port 08 is written first. Writing to port 09 causes the interface 28010 to write both ports (one word) into the transmit buffer 29016 (A/B). The write continues without polling STATUS since interface 28010 is capable of reading the output of I/O chip 28012 faster than the control subsystem CPU 14080 can load it.

5.1.1.8 Switch Multiplexer-PBUS Hardware Programming

Programming and status reading of the switch/multiplexer 13010 is performed by the control subsystem CPU 14080 through PBUS 22022. Note that both read and write data and addresses are 16 bits wide.

The timing and sync circuitry 22006 provides four handshaking lines (part of bus 27014) and functions as the interface from the PBUS 22022 to the control subsystem CPU 14080. The addresses are partially decoded in the high level bus extender 22012 and the low-level bus extender 22014. The inactive transmit and receive maps 25002 and 24006, respectively, are programmed and read back for confirmation of integrity. Built-in test equipment is invoked and loopbacks performed by setting various control bits. Status registers are read to determine the status of the switch/multiplexer 13010 and also of interfacing equipment such as control communications channel interface 22010. Internal registers can be programmed on each board to perform various functions.

5.2 Bus Extension Subsystem

The bus extension subsystem 13012, shown generally in FIG. 22, comprises the high level bus extenders 22012 and the low level bus extenders 22014. The bus extension subsystem 13012 has two purposes. The first is to provide expansion and drive capability so that data may be transferred between the switch/multiplexer 13010 and the channel boards 22016. The second is to provide isolation, so that any faults that may occur in customer devices 11008, 11010, 11012 and/or 11014 do not totally disable the proper functioning to the ICC subsystem 13008.

5.2.1 High Level Bus Extender

Figure 31B:
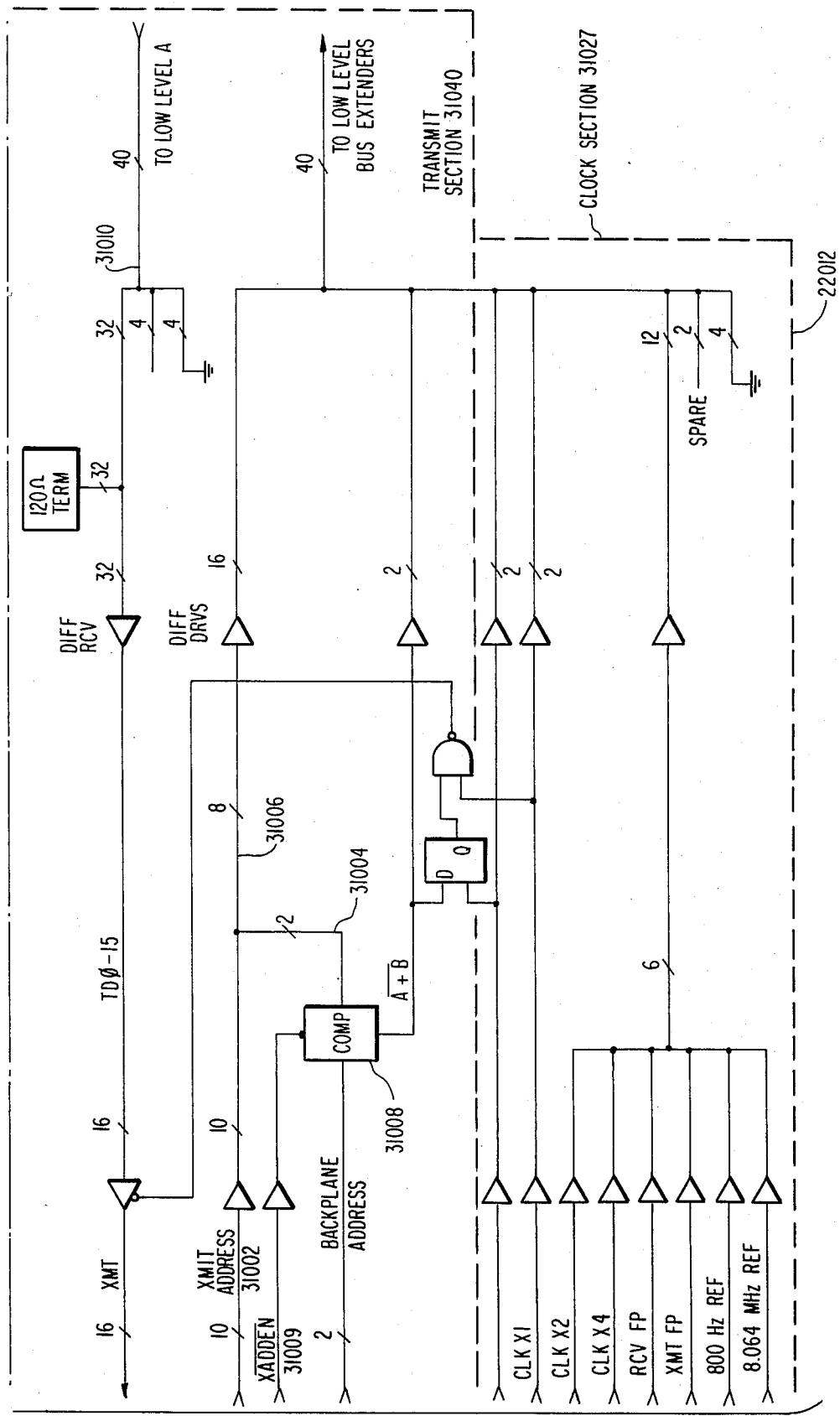
Figure 32C:
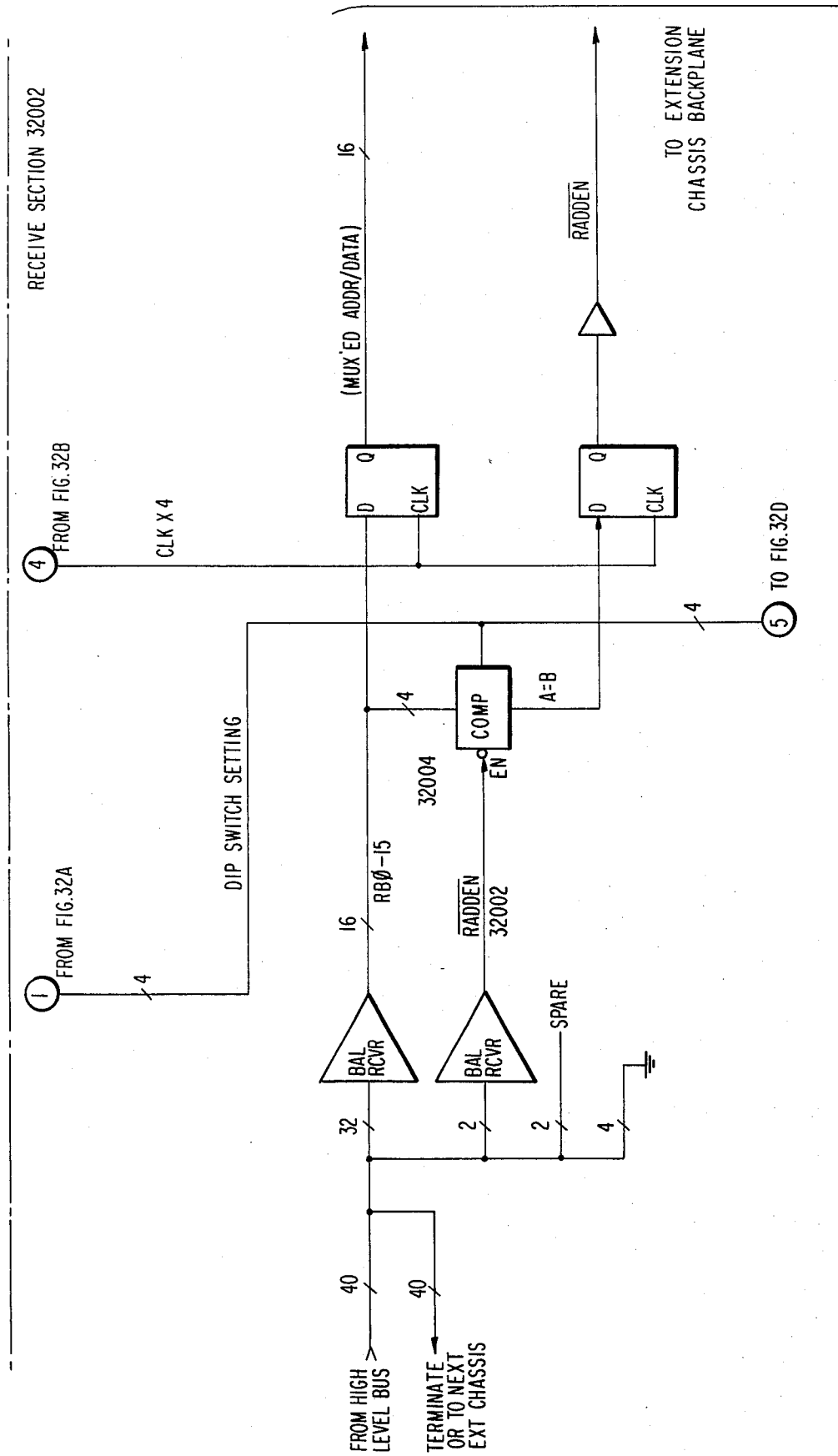
Figure 32D:
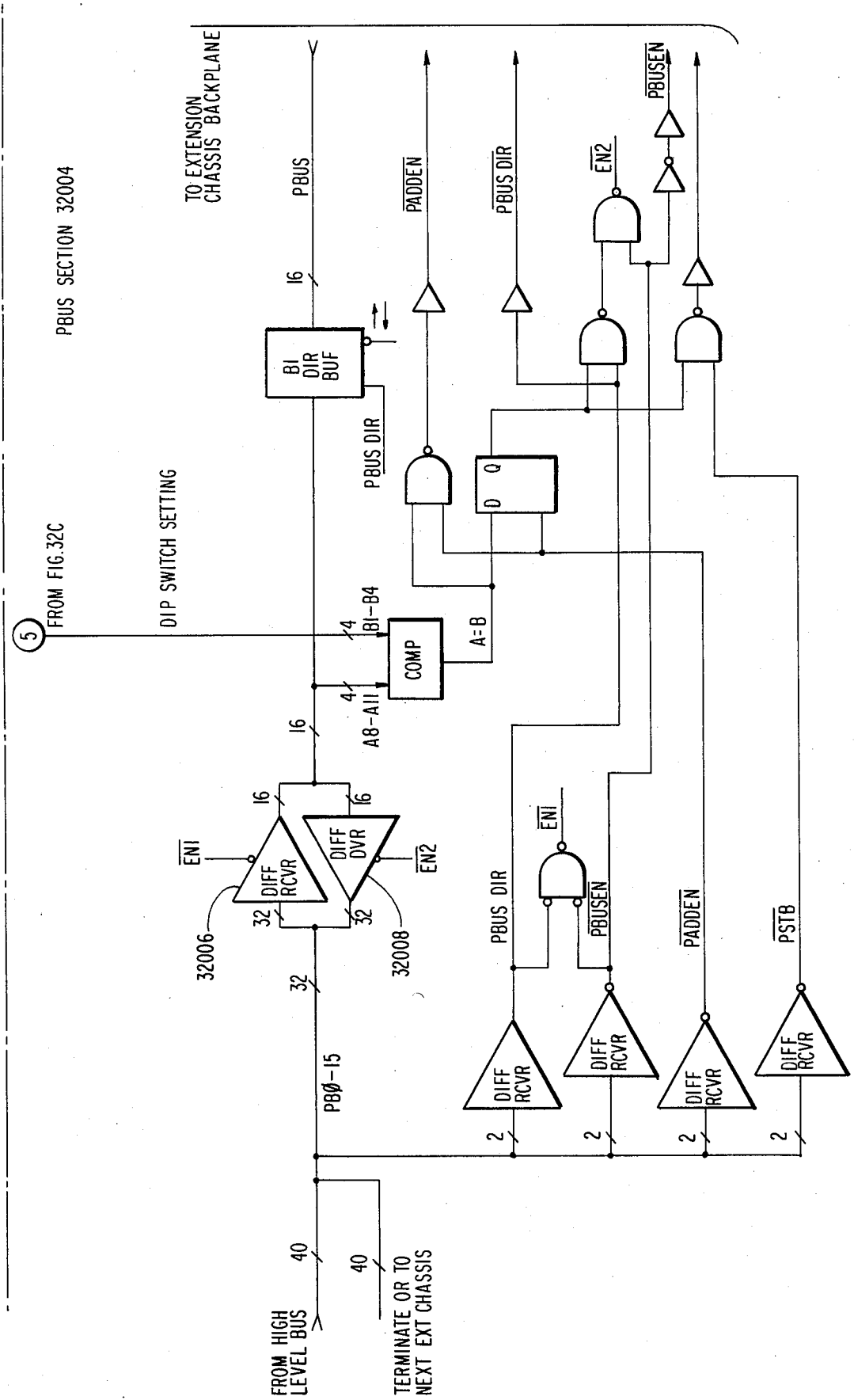

The high level bus extender 22012 is shown in schematic block diagram form in FIGS. 31A and 31B. There are four high-level bus extenders 22012 present in the bus extension subsystem 13012. Each high-level bus extender 22012 is divided into 4 main sections: (1) a transmit section 31040; (2) a receive section 31042; (3) a PBUS Section 31011; and, (4) clocks section 31027.

5.2.1.1 Transmit Section 31040

The transmit controller 22004 sends 10 address bits 31002 to the high-level bus extenders 22012 on lines 31002 of the XMT bus 22020. The upper 2 bits on lines 31004 are used by comparator 31008 to select 1 of 4 of the high-level bus extenders 22012 for transferring transmission data. The remaining 8 bits 31006 are transferred by the selected high-level bus extender 22012 to the low-level extender 22014. The control signal XADDEN 31009 then goes true low, indicating a valid address. If a board assigned to the group on the extension bus of this high level bus extender 22012 is not addressed, as indicated by comparator 31008, XADDEN 35009 is not transferred to the low-level so no data transfer takes place. If the board is addressed, XADDEN 31009 is allowed to propagate to the low-level bus extender 22014. When this happens, the low-level bus extender 22014 places data on transmit data lines 31010

(TD0-15). This data is transferred transparently back up through the high-level extender 22012 to the XMT controller 22004.

5.2.1.2 Receive Section 31042

The receive controller 22002 sends 10 address bits through the common backplane to the high-level bus extenders 22012, which arrive on lines 31026 of the RCV bus. The upper 2 bits on lines 31028 are used by a comparator 31010 to select 1 of 4 of the high-level bus extenders 22012 for transferring receive data. The remaining 8 bits of the address are decoded by the low level bus extenders 22014 and the channel boards 22016. When RADDEN (receive address enable) goes true low, and if the board is addressed as indicated by comparator 31010, the address and RADDEN signals are transferred to the low-level. The data, which is multiplexed with the address on a line 31026, then follows. If the board is not addressed, address and data are still transferred through the board, but RADDEN is blocked so that no data transfer takes place.

5.2.1.3 PBUS Section 31011

The timing and sync board 22006 in the common chassis sends 16 address bits through the common backplane to the high-level bus extenders 22012 on the PBUS (PB0-15) 22022. This address is carried on some of the 16 address/data lines PB0-PB15. PB15, the upper bit of the address, must indicate a transfer to/from the bus extension subsystem 13012 as opposed to the common equipment of the switch/multiplexer 13010. The next two upper bits of address (PB13 and PB14) select 1 of 4 of the high-level extender boards 22012. The remaining 13 bits are decoded by the low-level bus extenders 22014 and the channel boards 22016.

The PBUS portion 31011 of the high-level bus extender 22012 operates in two modes: write and read. In the write mode, the address bits PB14 and PB13 are first detected by comparator 31020 on one of four high-level bus extenders 22012. The selected high level bus extender 22012 then transfers the address and control signals to the low-level bus extender 22014; the PBUS control data to be written follows, and is also sent down to the low level extender 22014.

The read mode is quite similar to the write mode. First, the address bits PB14 and PB13 are detected by comparator 31020 on one of four high-level bus extenders 22012. The selected board 22012 then transfers the address and control signals (PSTB 35016 and PADDEN 35018) to the low-level extender boards 22014. (Note that PBUSEN 31072 and PBUS DIR 31014 always propogate to the low level extenders 22014 regardless of whether the high level extender 22012 is addressed). The control data to be read by the timing and sync board 22006 then returns from the low level to the high level. The transfer is done on each board in a buffered, but "transparent" manner; that is, only gate delays and cabling slow down the data paths.

Since the PBUS 22022 is bi-directional, certain onboard signals must control direction and tri-stating. EN1 31023 enables the differential drivers 31032 on the high-level bus for signals coming from the control subsystem 13016 to the low-level bus extenders 22014. EN2 31022 enables differential receivers 31021 on the high-level bus for data being transferred back from the low level to the control subsystem 13016. EN3 31024 enables the buffer 31015 to the common backplane for address and data going in either direction. Enable is used here in the sense of an integrated circuit not being in the tri-state mode; that is, it is either high or low on the bus. PBUS DIR 31014 controls the direction of transfer of the common backplane buffers on a board; that is, either "in" or "out".

5.2.1.4 Clock Section 31027

The clock section 31027 distributes needed clocks and several control signals continuously through all high-level bus extenders 22012 to all low-level bus extenders 22014. One group of signals are the clocks CLK X1, CLK X2, CLK X4, and STB X1, which are used for bus control. A second group, RCV FP 35028 and XMT FP 35032, are control signals used to initialize the channel card 22016 buffers. A third group, the 800 Hz and 8.064 MHz clocks, are used as timing references for the baud rate generators on the channel boards 22016.

5.2.2 Low-Level Bus Extender 22014

The low-level bus extender 22014 is shown in schematic block diagram form in FIGS. 32A, 32B, 32C, and 32D. This board 22014 interfaces the high-level bus extender 22012 to as many as 16 channel boards 22016. The interface to the high-level bus extenders 22012 is differential. The interface to the channel boards 22016 is single-ended TTL.

The board consists basically of three sections: (1) a receiver section 32002; (2) a transmit section 32102; (3) a programming bus section 32004; and, (4) a clock section 32104.

5.2.2.1 Receive Section 32002

The high-level bus extender 22012 sends 16 multiplexed address/data lines to the low-level extenders 22014. The full 16 bits are used for data, but only 10 of the 16 bits are used for address. Bit 3 through 0 of the address select 1 of 16 of the channel boards 22016. Bits 4 through 7 select 1 of 16 of the low level bus extenders 22014. Recall that the upper 2 bits of the address bits 8 and 9 were used to select 1 of 4 of the high-level bus extenders 22012.

To transfer data from the low-level bus extender 22014 to the channel boards 22016, the receive address is placed on the low-level RCV bus 22018 to the channel boards 22016. Comparator 32004 compares bits 4 through 7 of the address with the low level bus extender address, set on dip switch 32005. When RADDEN (Receive Address Enable) 32002 goes true low, and if the low level bus extender 22014 is addressed as indicated by comparator 32005, RADDEN is transferred to the channel boards 22016. The data, which is multiplexed with the address, then follows. If the low-level bus extender 22014 is not addressed, address and data are still transferred through the boards 22016, but RADDEN is blocked.

5.2.2.2. Programming Bus Section 32004

The low-level bus extender 22014 receives differential PBUS address and control signals from the high level bus extender 22016. Low-level bus extender 22014 compares 4 bits of the PBUS address against the switch setting set on the dip switch for the low-level bus extender 22014. If a match occurs, then PADDEN and PSTB are sent through to the channel card 22016 (PBUSEN and PBUS DIR are always sent through).

EN 1 enables differential receiver 32006 to send data through if the PBUS 22022 is enabled and direction is from high level to low level.

EN 2 only sends data back via differential driver 32008 if PBUS DIR points low to high and the low level bus extender 22014 is selected (that is, there is an address match).

5.2.2.3 Transmit Section 32102

To transfer data from the channel boards 22016 to the low-level bus extender 22014, the sequence is as follows. The XMT address TA0–7 is placed on the address bus 32012. This allows the comparator 32014 to compare bits 4 through 7 of the address to the settings on the dip switch for the low-level bus extender 22014. The control signal XADDEN 30006 goes true low, indicating the transmit controller has an open buffer, that is, indicating a valid address. If the board is not addressed, as indicated by the comparator 32014, XADDEN 32016 is not transferred to the low-level bus, so no data transfer takes place. If the board is addressed, XADDEN is allowed to propagate to the channel boards 22016. When this happens, the addressed channel board 22016 places data on the transmit data lines (TD0–15). This data is transferred transparently back up through the low-level bus extender 22014 to the high-level extender 22012.

5.2.2.4 Clock Section 32104

The clock signals CLK X1, CLK X2, CLK X4, and STB X1 propogate through the low-level bus extenders 22014. They are resynchronized by latch 32018 before leaving the low-level bus extenders 22014.

5.3 Digital Input/Output Equipment (Channel Boards)

Figure 33B:
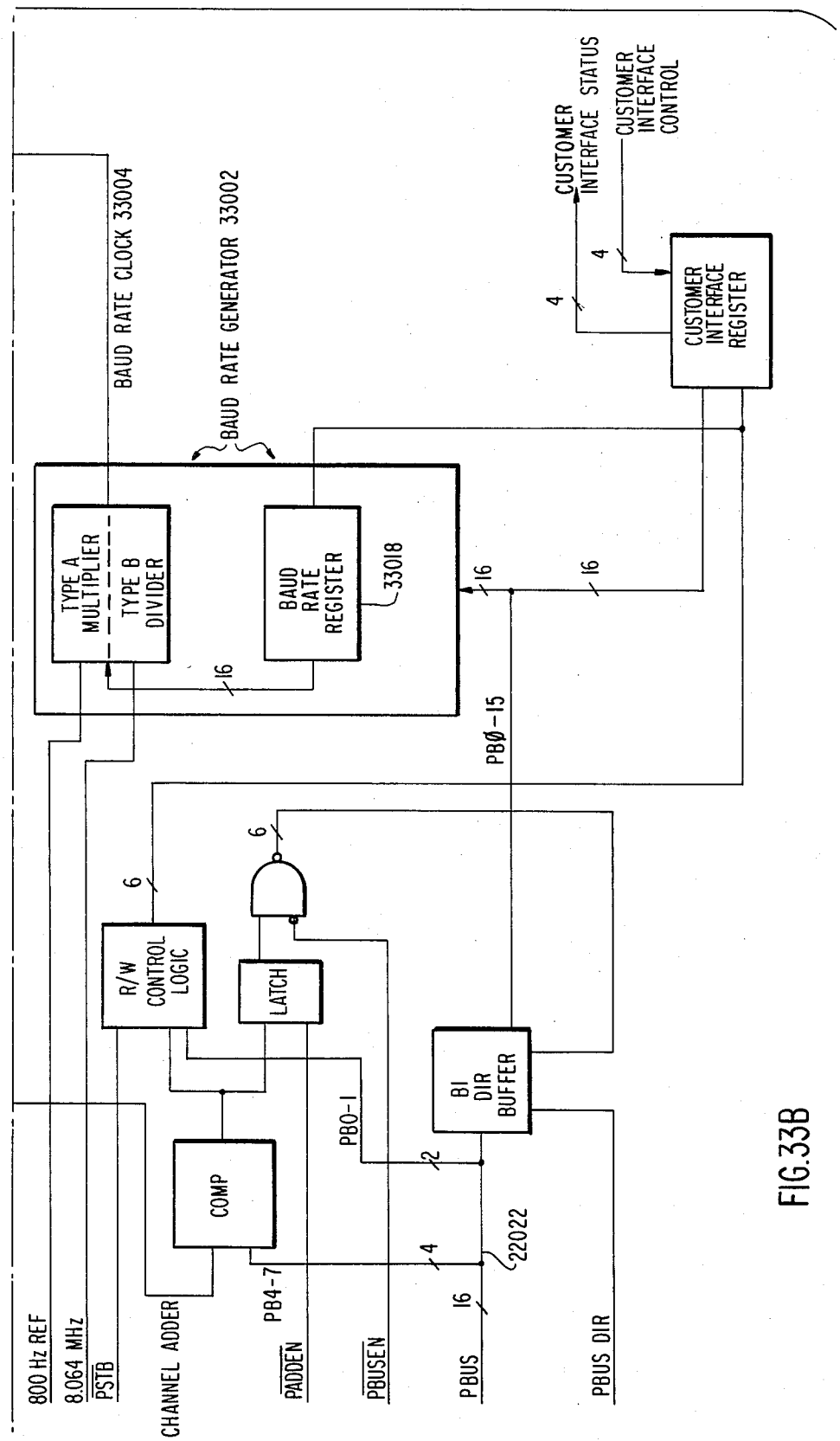

The digital input/output (I/O) equipment subsystem 13014 (channel boards 22016) is shown in schematic block diagram form in FIGS. 33A and 33B. The digital I/O equipment subsystem 13014 provides standard synchronous serial data to and from user devices 11008, 11010, 11012, and 11014. It also provides the buffering necessary to convert from burst to synchronous format, and from synchronous to burst format.

There are two types of digital I/O boards 22016 available in the system: a type A board and a type B board.

Referring now to the type A board, it allows a programmable baud rate of 800 bps up to 1.5440 Mbps in increments of 800 bps. A programmable baud rate generator 33002 employs a phase-lock-loop circuit which derives the selected baud rate from an 800 Hz reference which is derived from the receive frame pulse in the timing and sync circuitry 22006. The digital I/O circuitry uses a baud rate clock 33014 in both the receive and transmit directions.

A baud rate register 33018 of programmable baud rate generator 33002 is written to and read from via the PBUS 22022. Programming a desired baud rate is achieved by writing a multiplier value N to the baud rate register 33018 from the PBUS 22022. The new baud rate is N×800 bps where N can be any value from 1 to 1930 inclusive. The multiplier N is latched in the baud rate register 33018 and can be read by a PBUS 22022 read operation.

16-bit parallel receive data is latched from a receive bus 33008 and written to a 4K×16 receive FIFO buffer 33008. The 16-bit parallel receive data is read from the receive FIFO buffer 33009, and converted to serial data 33010 at the programmed baud rate. At the same time, new receive data is being written to the receive FIFO buffer 33009. The receive FIFO buffer 33009 holds a maximum of two 20 ms frames for a total of 40 ms of receive data. This allows for worst case movement of data bursts within the frame.

Meanwhile, serial transmit data at the programmed baud rate is converted to 32-bit words and written to a 4K×32 bit transmit FIFO buffer 33020. The data is read from the 4K×32 bit transmit FIFO buffer 33020 in 16-bit words on the next transmit frame pulse and output to the switch/multiplexer bus.

The transmit FIFO buffer 33020 holds a maximum of two 20 ms frames plus twice the worst case satellite doppler, that is, 2.8 ms, for a total of 42.8 ms of transmit serial data.

Note that the type B circuitry is similar to type A circuitry, except that the transmit buffer 33020 and the receive buffer 33009 are both 1K×16 bits in size, and the baud rate generator 33002 divides 8.064 MHz by the programmed number to produce 1 of 57 possible baud rates ranging from 800 bps to 672,000 bps.

5.4 Network Subsystem

The network subsystem 13028 is the master of the network of the present invention. The primary function of the network subsystem 13028 is to maintain the integrity of and perform the mapping functions for the network. It also maintains the intelligence for the network, including the status of each lower level CPU subsystem, each channel in the network, and the TDMA subsystems 13006. Primary tasks of the network subsystem 13028 are to maintain information concerning the current network configuration, to perform mapping functions in response to requests for connection and disconnection including reallocation of bandwidth, to initialize the network, to provide for communications between the network subsystem 13016 and any other CPU subsystems in the network, to provide an operator interface for the network, and to perform utility functions such as executing diagnostics, reporting network status information, logging network errors, and maintaining comprehensive billing and statistics files.

As discussed previously, the network subsystem 13028 operates in a redundant configuration with the primary network subsystem 13028 operating as an on-line unit and the secondary network subsystem 13028 operating as a back-up unit. The back-up network subsystem 13028 monitors the network and initiates takeover of the network upon detection of a failure of the on-line network subsystem 13028, as described in greater detail later in this section. If the back-up network subsystem 13028 should take over control of the network, the prior on-line network subsystem 13028 reacquires control as soon as it is able to do so.

The network subsystem 13016 is shown in block diagram form in FIG. 34. The network subsystem 13028 comprises conventional computer equipment, such as a Digital Equipment Corporation LSI-11/23 16-bit microprocessor 14018 with at least 128 kb of error-correcting memory 34050, and a disk 14016 for storage of system data structures. A CRT terminal 14008 is connected for operator entry, and a hard-copy device 14014 is connected for output of system status information.

The network subsystem 13028 performs the following basic functions:

1. Maintains the network connectivity map 23002 in memory.

2. Receives connectivity map change requests from all nodes.

3. Updates the connectivity map 23002 in response to requests from the control subsystems 13016 in accordance with network constraints.

4. Transmits connectivity map 23002 changes to all nodes.

5. Maintains a routing table 35038 identifying channel connections, dialed-number translations, and least-cost routes.

6. Initializes hardware and software on system start-up.

7. Provides the capability to down-line load any or all CPU subsystems on the network.

8. Maintains a channel characteristics file 35000 containing channel characteristics.

9. Provides a communications interface through the front end subsystem 13022 to the switch/multiplexer 13010 to the control CPU subsystems 13016 to provide interprocessor communication.

10. Manages the timing of network map changes to ensure that each node implements the new connectivity map 23002 synchronous with the superframe.

11. Processes status information transmitted by lower level subsystems, including error status information, bit error rate status, and network configuration changes (that is, normal operating status messages).

12. Provides a communications bus 34040 to the on-line TDMA control subsystem 13026 to handle changes in network topology.

13. Processes operator input in four modes, the first being diagnostic (the highest level of privilege), the second being privileged (allowing execution of secure system programs to perform such functions as manual override), the third being semi-privileged (allowing modification of system characteristics for only the node to which the operator is assigned), and the fourth being non-privileged (allowing read-only access to data structures and status information).

14. Provides a remote capability (via modem interface 14010) for an operator interface as defined in 13 above.

15. Provides the means for orderly transfer of command and control from the on-line to the back-up network subsystem 13028 (including reliability of the map and other data structures, and minimal loss of user requests).

16. Maintains records of network throughput, including network usage and billing information in a billing/statistics file 35044.

17. Provides the mechanism for running on-line and off-line diagnostics within the network, and for reporting error information and other system statistics to the operator.

18. Provides the mechanism to maintain a software error log 35046 on a storage device (such as disk 14016 or mag tape 14012) for all CPU subsystems on the network.

19. Provides the mechanism to maintain network integrity.

Turning now to the levels of security described in number 13 above, the on-line and back-up network subsystems 13028 each include a system console 14008 having the following four operating input/output levels of security:

1. The diagnostic mode—This mode allows high-level personnel to run diagnostic utilities and to examine and modify files and memory at the network subsystem 13028, the control subsystems 13016, the serial subsystems 13018, or any other CPU subsystems in the network.

2. The privileged mode—This mode allows middle-level personnel to change the network configuration and routing tables 35036 and 35038, respectively. It allows such personnel to manually override automatic channel assignments. User diagnostics can be run to verify connections and to isolate problems.

3. The semi-privileged mode—This mode allows middle-level to lower-level personnel to change the configuration or characteristics of the node to which the operator is assigned.

4. The nonprivileged mode—Low-level personnel use this mode. Such low-level personnel have read-only access to network status files 40020 and node configuration files 35036. These personnel are also permitted to request usage statistics from file 35044.

A dial-up line input/output 14010 provides an error-protected protocol for communicating with a remote terminal (not shown) via telephone lines 33033 and a modem 34034, as shown in FIG. 34. Input/output 14010 requires operators at remote terminals to enter a password for access to the network. Once the access has been gained at remote terminal the remote terminals functions in the same way as the network subsystem console 14008.

The TDMA control interface 34038 provides an error-protected protocol for communicating with the master TDMA control subsystem 13026 via bus 34040. Control information through interface 34038 is used to command the TDMA terminal 13006 at the on-line node to make changes to its TDMA connectivity map 23001, to receive confirmation that the changes have been implemented, to retrieve status information and, if required, to retrieve the TDMA connectivity map. The network subsystem 13028 may command, via interface 34038, the TDMA terminal 13006 at the on-line master node or any of the TDMA terminals 13006 at the slave nodes or at the back-up master node to go into diagnostic or loopback modes. This interface supports the TDMA terminal 13006 at the on-line master node such that the system console 14008 can function as a virtual TDMA console. Solicited or unsolicited fault information is passed to the network subsystem 13028 from the TDMA terminal 13006 at the on-line master node.

The communication link between the network system 13028 and the control subsystem 13016 via the front end subsystem 13022 and the switch/multiplexer 13010 provides an error-protected protocol for all overhead information. This overhead information includes the following:

1. requests for change in service from a control subsystem 13016 to the on-line network subsystem 13028;

2. passing of connection requests with associated dialed numbers from a control subsystem 13016 to the on-line network subsystem 13028;

3. down-line loading of control subsystems 13016 and serial subsystems 13018 and lower-level CPU subsystems;

4. new connectivity map 23002 information to control subsystems 13016;

5. status information and commands from a console (not shown) at a control CPU subsystem 13016 in response to operator requests;

6. solicited and unsolicited network status information;

7. error detection; and 8. diagnostic information in response to requests from the system console at the control CPU subsystem 13016 to a destination CPU subsystem.

The following portion of this section describes various data structures and protocols used by the network subsystem 13028. These data structures and protocols are described generally in terms of their purpose and contents.

Figure 35B:
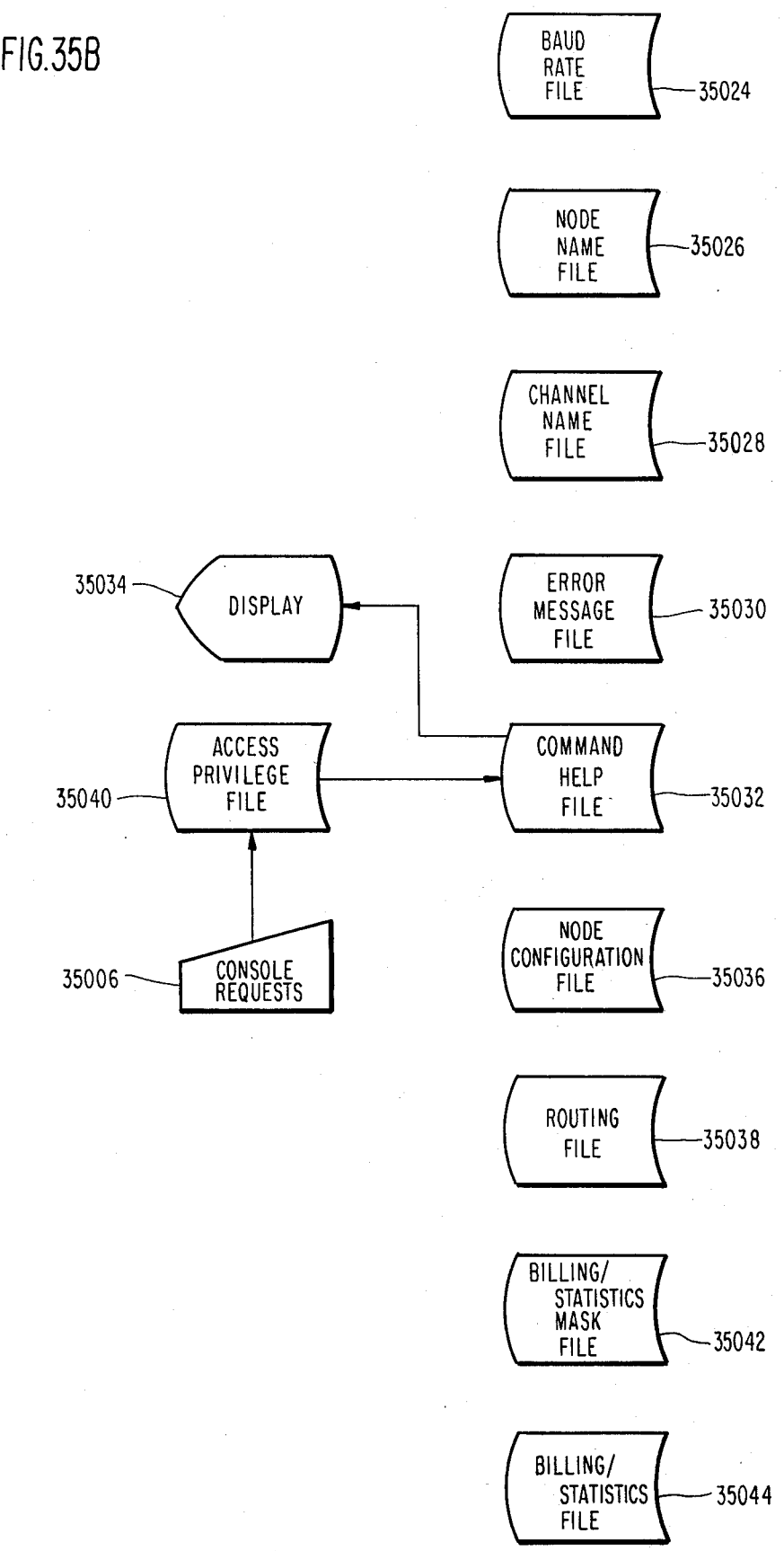

Referring now to FIGS. 35A and 35B, a system parameter file 35004 contains all basic system generation-level data required for the initial network configuration of the present invention exclusive of specific node and channel characteristics and operator access privileges. The control information included in the system parameter file 35004 is as follows:

1. number of nodes;
2. number of frames per superframe;
3. number of blocks per superframe;
4. maximum number of channels per node;
5. granularity data;
6. total bandwidth;
7. data file sizes;
8. map sizes;
9. system profile;
10. indication of which billing/statistics files 35044 to maintain; and
11. dead-man time out that is, length of time during which an operator may remain logged-on and inactive at a terminal.

A channel characteristics file 35000 is maintained in the network subsystem 13028. This file 35000 is constructed at system generation time 35002 from the solicited operator input via system console 14008. The channel characteristics like 35000 includes, but is not limited to, the following control information:

1. channel type;
2. channel identification;
3. node;
4. dedicated channel assignment;
5. connectivity masks (used to prevent connections between specified channels in the network);
6. channel driver type; and
7. channel connection characteristics (for example, baud rates)

A connectivity map 23002 is maintained at the network subsystem 13028 and is distributed in real-time to the control subsystems 13016 as indicated by output block 35010. Connectivity map 23002 is dynamically maintained and represents current inter-connection of all channels in the network. The connectivity map 23002 contains the following control information:

1. originating node and channel;
2. destination node and channel;
3. number of 800 bps blocks;
4. broadcast flag; and
5. full-duplex flag.

A connectivity map checksum table 35012 contains a checksum for every entry in connectivity map 23002. These checksums are used to confirm the integrity of connectivity map 23002.

The connectivity map 23002 has an associated connectivity map lockout mechanism 35014 which is used to prevent modifications to the connectivity map 23008 during map transmissions to control subsystems 13016, as indicated by block 35010, and, conversely, to lock out map transmissions when the connectivity map 23002 is being updated, as indicated by input block 35016. Lockout mechanism 35014 also prevents concurrent access by conflicting on-line network subsystem 13028 tasks to connectivity map 23002.

A channel status/priority file 35018 is a memory-resident file within the on-line network subsystem 13028 which includes both the priority of each channel within the network and the status of that channel (for example, active, out of service, being down-line loaded, etc.).

A network status file 35020 is a memory-resident file within the on-line network subsystem 13028 which contains the status of each subsystem within the network (that is, on-line TDMA control subsystem 13026, control subsystems 13016, front end subsystems 13022, serial subsystems 13018, and both the on-line and stand-by network subsystems 13028).

A channel type file 35022 is maintained at the network subsystem 13028 and contains all data specific to each channel type within the network. The channel type file 35022 includes the following control information relating to the status of the pins on the channel boards:

1. pin control on-line/off-line;
2. pin status on-line/off-line;
3. pin mask on-line/off-line.

Referring now to FIG. 35B, a baud rate file 35024 is maintained within the on-line network subsystem 13028 which contains all valid baud rates (or baud rates ranges) for each channel within the network.

A node name file 35026 is resident within the on-line network subsystem 13028 which contains ASCII names (for example, 6 characters or less) associated with each node identification (ID) number in the network.

A channel name file 35028 is resident within the on-line network subsystem 13028 which contains ASCII names (for example, 10 characters or less) associated with each channel identification number in the network.

A command help file 35032 is maintained within the on-line network subsystem 13028 which contains textual information to be output in response to operator request at the network subsystem console 14008, assuming access privilege is met pursuant to access privilege file 35040.

A node configuration file 35036 is maintained at the on-line network subsystem 13028 which includes information specific to each node in the network. The node configuration file 35036 includes the following control information:

1. node identification;
2. burst allocation (current);
3. minimum/maximum burst allocation;
4. node priority;
5. maximum number of dedicated channels;
6. maximum number of dynamic channels; and
7. time differential (from Greenwich Mean Time);
8. the current bandwidth usage for that node;
9. the number of active dedicated channels; and
10. the number of active dynamic channels.

A routing file 35038 is maintained by the on-line network subsystem 13028 which includes all data necessary to make connections within the network. The routing file 35038 contains the following control information:

1. access numbers (for example, dialed phone numbers);
2. dedicated interconnections.
3. least-cost routes;
4. area codes and exchanges;
5. translation masks for dialed number translations; and
6. validation masks for validation of station numbers.

Access privilege file 35040 is maintained at the on-line network subsystem 13028 which contains all data necessary to verify the access privilege of a console operator. The access privilege file 35040 contains the following control information:
 1. user identification;
 2. user password; and
 3. access privilege level.

A billing/statistics file 35044 is generated at the on-line network subsystem 13028. This file 35044 contains a log of statistical and billing information collected by the system. The information contained in file 35044 includes:
 1. automatic connection request time;
 2. automatic connection start/stop time;
 3. manual connection start/stop time;
 4. connection established time;
 5. time of network reconfigurations;
 6. network/node up/down times;
 7. operator log on/off times;
 8. intentional disconnects;
 9. connection refusals;
 10. node down-line load times; and
 11. remote diagnostic requests.

A billing/statistics mask file 35042 is maintained by the on-line network subsystem 13028 which contains a mask describing which billing/statistics files are currently being maintained by the system of the present invention.

A software error log 35046 is maintained by the on-line network subsystem 13028. The software error log 35046 contains a record of all errors and significant system events detected by the on-line network subsystem 13028 or reported lower-level subsystems. This software error log 35046 includes the following information:
 1. node or subsystem reporting the error;
 2. error number identifying the specific error detected;
 3. time of detection of the error; and
 4. parameters associated with the detected error.

A network/node protocol is used to control communication between the on-line network subsystem 13028 and each of the control CPU subsystems 13016 via the front end CPU subsystem 13028. This network/node protocol is embedded by the front end subsystem 13028 within the burst structure of each frame for each node (see FIG. 15). The network/node protocol is, for example, 160 bits per burst for the master node (10 16-bits words) and 48 (3 16-bit words) bits per burst for the slave nodes. Note that the network/node protocol is an asynchronous positive acknowledgement protocol. The network/node protocol supports, but is not limited to, the following functions:
 1. requests for connection/disconnection from a control subsystem 13016 to the on-line network subsystem 13028;
 2. down-line loading from the on-line network subsystem 13028 of the control subsystems 13028 or lower-level CPU subsystems;
 3. connectivity map 23002 changes;
 4. error condition reporting;
 5. status data;
 6. operator console requests 14008; and
 7. reset/initialization of lower-level CPU subsystems.

All TDMA communication in the network over the satellite 11000 link is structured as follows (reference is made to FIG. 15):

Superframe—The largest single element of data transfer within the network is a superframe. This is, for example, a data segment of 500 ms. All overall network timing is based on the superframe; that is, all network reconfiguration occurs on superframe boundaries.

Frame—The next lower-level of data transmitted over the network consists of a frame. A frame consists of 1 burst from each of the nodes in the network. The length of a frame, for example, is 20 ms. Thus, there are twenty five frames in a superframe.

Burst—The burst is the largest single element transmitted from each node as a contiguous data segment. Burst sizes are variable and dynamically allocated by the on-line network subsystem 13028. Each burst contains 1 data segment (unit) from each active channel at the node. The bursts are, for example, in increments of 8 kbps.

Unit—Each unit represents a continuous data segment from each active channel at a node. Units are comprised of a number of 16-bit words, and thus permit data rates in any multiple of 800 bps. As described above in this section, there is a dedicated overhead unit for each node within the network/node protocol to be transmitted. This dedicated overhead unit is, for example, a 160-bit unit for the master node and a 48-bit unit for the slave nodes.

The on-line and the back-up network subsystems 13028 can each employ any suitable operating system. Suitable operating systems are: RSX-11M$^R$ by Digital Equipment Corp. (DEC) of Maynard, Mass.; RT-11$^R$ by DEC; RSTS-E$^R$ by DEC; UNIX$^E$ by Bell Labs of Princeton, N.J.; or IAS$^R$ by DEC.

The on-line and the back-up network subsystems 13028 can employ any suitable programming languages. Suitable languages are: PASCAL; MARCO-11$^R$ by DEC; FORTRAN; BASIC; and "C".

The on-line and the back-up network subsystem 13028 can employ any suitable data base management system. Suitable data base systems are: FILES-11$^R$ by DEC; and RMS-11K$^R$ by DEC.

A remote terminal modem interface 14010 provides remote operators with an interface to the on-line network subsystem 13028 via a modem. The remote terminal modem interface 14010 is under the control of the operator command interface and allows the same commands as the local operator interface.

Figure 36:
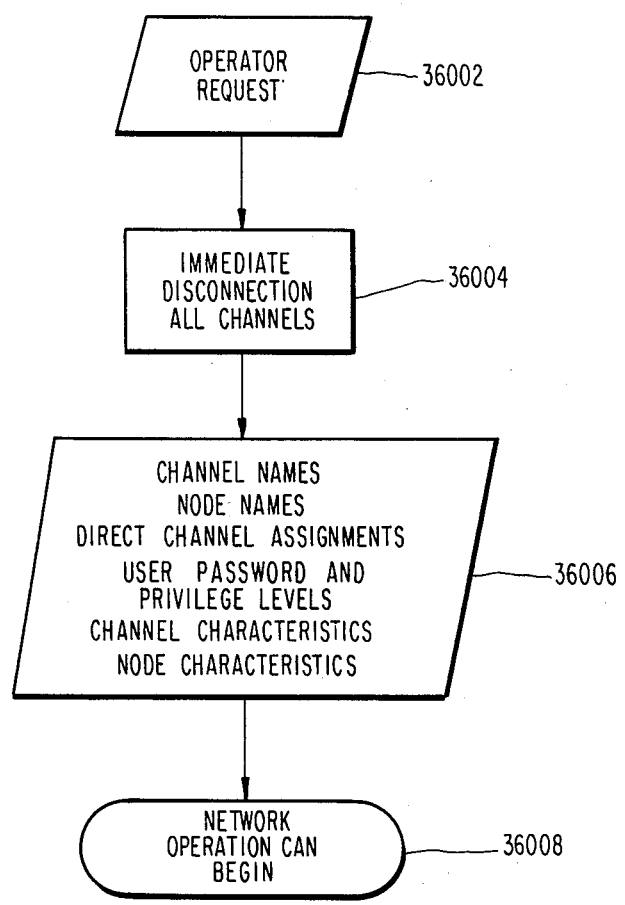
FIG. 36 is a flow chart of the processor involved in the configuration of the network.

Network initialization is a distinct phase in the operation of the network. Referring to FIG. 36, the first step in the network initialization procedure is for the operator to request to enter the initialization phase, as indicated by step 36002. This results in the immediate disconnection of all channels at all nodes (if any nodes are connected), as indicated as indicated by step 36004. The operator then can set up channel names, node names, direct channel assignments, user passwords and privilege levels, channel characteristics, and node characteristics, as indicated by step 36006. Note that set-up step 36008 must be completed before the network operation can begin, as indicated by step 36008. This routine can be re-entered at any time at the system manager's discretion (the system manager must be at privilege level 1 or 2) at step 36002.

Software redundancy is provided for the on-line and the back-up network subsystem 13028 (optionally, disc redundancy may be provided).

The network has an on-line network subsystem 13028 and a back-up network subsystem 13028. Since they are located at different geographical sites, each has its own front end subsystem 13022. Note that the primary network subsystem 13028 is a default-active (on-line) network which updates the secondary (back-up) network subsystem 13028 periodically. The only loss to the network which can occur during a switch is that of connection requests which have not been processed. Redialing may be necessary, but no loss is experienced of currently active channels.

There are three mechanisms for transferring control from the on-line network subsystem 13028 to the back-up network subsystem 13028:

1. An operator command to transfer control between network subsystems 13028;

2. If a threshold number of control subsystems 13016 fail to acknowledge the front end system 13022, the front end subsystem 13022 informs the network subsystem 13028 and may disable the offending control subsystem 13016. The network subsystem 13028 then decides whether to freeze the network, to turn off-line one or more control subsystems 13016 to perform their internal diagnostics (if the front end subsystem 13022 has not already done so), or to relinquish active control status to the back-up network subsystem 13028.

3. Should a back-up network subsystem 13028 timeout occur on lack of the periodic "network subsystem operating" messages from the on-line network subsystem 13028, or should the back-up network subsystem 13028 receive a threshold number of illogical messages from the on-line network subsystem 13028, the back-up network subsystem 13028 checks for a threshold level of control subsystem 13016 negative acknowledge signals, then initiates a switch-over to become the new on-line network subsystem 13028. The control systems 13016 have their own similar timeout, and eventually switch over to the back-up network subsystem 13028. Note that, the control subsystem 13016 timeout is longer, to allow the on-line network subsystem 13028 to recover and the back-up network subsystem 13028 to prepare itself.

Note that sequence 3 just described can occur in a number of circumstances: as the result of hardware or software faults at the on-line master nodes or as the result of hardware or software faults at the back-up master node, which do not actually cause the transfer of network subsystem control (that is, the on-line network subsystem 13028 will not relinquish control if the back-up network subsystem 13028 is at fault.

To prevent accidental switchover by a control subsystem 13016, there is an "ignore this message" flag sent under normal (on-line active) conditions by the back-up network subsystem 13028 in its minimal dummy message transmission block. If the control subsystems 13028 erroneously switch to the back-up network subsystem they will sense this and properly revert to listening to the on-line network subsystem 13028.

For the primary network subsystem 13028 to recover active network status, it first performs local self-test and diagnostic functions. When it is ready to resume, it performs exactly the same functions as the secondary network subsystems 13016 would to enter the network: it requests update on the network's current status. Upon completion, it issues a command to resume control.

Disc redundancy may be provided at both the primary network subsystem 13016 and the secondary network subsystem 13016. It should be understood that ghosting is performed when both disc subsystems are operating. Upon a failure recovery, the recovered disc is brought up-to-date by transferring all modified files to the recovered disc.

The on-line network subsystem 13028 initiates switchover by relinquishing control of the network as a result of any of the following conditions:

1. protocol failure (cyclic redundancy checks and threshold failures to acknowledge for: control system 13016 to on-line network subsystem 13028, on-line network subsystem 13028 to control subsystem 13016, back-up network subsystem 13028 to control subsystem 13016, and control subsystem 13016 to back-up network subsystem 13028);

2. operator typein (SWCH);

3. hardware failure;

4. software failure; and

5. TDMA terminal 13006 failure.

To initiate switchover, the on-line network subsystem 13028 issues a request back-up status (RQB) message to the back-up network subsystem 13028 requesting that the back-up unit 13028 take control. The back-up unit 13028 responds with a request master status (RQM) message. The on-line unit issues a change master (CMS) message to the back-up and to the control subsystems 13016. Both the back-up and the on-line network subsystems 13028 then transmit change status [(CHS)-TDMA(CSS)-ICC] messages to the local TDMA terminal 13006 and the local front end subsystem 13022.

The on-line unit 13028, during normal operations, transmits a network subsystem operating (NSO) message at specified intervals, notifying the control subsystems 13016 and the back-up front end subsystem 13022 that the on-line is functioning. If the control subsystems 13016 and/or the back-up front end subsystems 13022 fail to receive the network subsystem operating message within the specified time period, the control subsystems 13016 switch over and the back-up unit 13028 attempts to take control.

The back-up unit 13028 initiates switchover by requesting to become the on-line unit 13028 as a result of any of the following conditions:

1. a protocol failure (cyclic redundancy checks and acknowledge rates for: control subsystem 13016 to on-line unit 13028, on-line unit 13028 to control subsystem 13016, back-up unit 13028 to control subsystem 13016 and control subsystem 13016 to back-up unit 13028);

2. a loss of the network subsystem operating (NSO) message;

3. receipt of a threshold number of illogical messages; and 4. operator typein (SWCH).

To initiate switchover, the back-up unit 13028 issues a request master (ROM) message, which is a submissive request to take over the network. If the on-line unit 13028 relinquishes control, the back-up unit 13028 assumes on-line status and the network proceeds normally. Of, however, the on-line unit 13028 does not wish to relinquish control, the following procedures take place:

1. if the switchover was initiated as a result of operator typein and if the operator specified override (OV), immediate switchover take place. If override (OV) is not specified, the operator is informed that switchover did not take place; p0 2. if the switchover was initiated for any reason other than operator typein, the back-up unit 13028 monitors the "ignore-this-message" acknowledge (ACK) rate being reported by the local front end subsystem 13022 in order to determine the operational status of the on-line unit 13028: if the ACK rate is not exceeded, the back-up unit 13028 resets and informs the operator; if, however, the ACK rate is exceeded, indicating that control subsystems 13016 are attempting to listen to the back-up unit 13028, immediate switchover takes place.

To initiate immediate switchover, the back-up unit 13028 issues a kill network subsystem (KIL) message to the local front end subsystem 13022 and to the on-line unit 13028. The local front end subsystem 13022 issues a KIL block containing the KIL message for an entire superframe. The back-up unit 13028 begins network take over. Note that the on-line unit 13028 may not arbitrate on the KIL message and that the on-line unit 13028 must immediately relinquish control. The on-line front end subsystem 13022, upon reception of the KIL block, immediately changes its status to back-up and so informs its network subsystem 13028.

While operating as a back-up unit 13028, the network subsystem 13028 must issue an "ignore-this-message" at least once every other block starting at the first block.

The following is a description of the terminate/activate process for the network. The following conventions and assumptions have been made concerning the implementation of the activate and terminate capabilities:

1. The on-line network subsystem 13028 has the capability to "shut down" any node (i.e., any control subsystem 13016, serial subsystem 13018, or UIIM 13024) in the network in response to either (a) a catastrophic error in the network (for example, a node which repeatedly fails to respond to a reprogram message with a map program acknowledge), or (b) an operator typein (TERM). Conversely, the network subsystem 13028 can activate any of the above-mentioned CPU systems.

2. Any node that is currently being down-line loaded may not be terminated.

3. An operator requesting that a node be terminated is required to confirm the termination request.

4. When the on-line network subsystem 13028 de-activates a node, it marks that node in the network status file 35020 as "down, and then marks all channels at that node "down" in the channel status/priority file 35018. When the on-line network subsystem 13028 de-activates a serial subsystem 13018, it marks the serial CPU subsystem 13018 "down" in the network status film 35020, and then marks all channels polled by that serial subsystem 13018 "down" in the channel status/priority file 35018. When the on-line network subsystem 13028 de-activates a UIIM 13024, the channel associated with that UIIM 13024 is marked "down" in the channel status/priority file 35018. Further, each of these processes is reversed upon activation of a node, serial subsystem 13018, or UIIM subsystem 13024.

The following is a series of steps which are implemented in the node termination and activation processes:

1. The network subsystem 13028 issues a shut-down (SHD) message to the control subsystem 13016 to be terminated, and then disconnects all active channels at that node.
2. The control subsystem 13016 responds to the shut down message with an off the air (OFF) message, and then begins transmitting dummy blocks.
3. The network subsystem 13028 issues a change status (CST) message to the front end subsystem 13022 indicating that the specified node is no longer operational.
4. The front end subsystem 13022 responds to the change status CST message by marking the node "down."
5. The network subsystem 13028 modifies the network status file 35020 to indicate that the specified node is now "down", and then modifies the channel status/priority file 35018 to indicate that all channels at that node are now "down".
6. The network subsystem 13028 discards at this point any messages received from the de-activated node, but records the receipt of the message(s) in the error log file 35046.
7. The control subsystem 13016 generates and transmits a shut down message(s) for each serial subsystem 13018.
8. The control subsystem 13016, while in a de-activated state, discards any incoming messages except a reset message (which causes re-activation).
9. If a control subsystem 13016 is powered off while in a de-activated state and is subsequently powered back on, it re-initializes the normal protocol with the front end subsystem 13022, but is restricted from becoming re-activated (i.e., requesting down-line load) until such time as the network subsystem 13028 re-activates the node and informs the front-end subsystem 13022 (via a change status message) that the node is again functional. In other words, should the front end subsystem 13022 receive a reset block from a de-activated node, the front end subsystem 13022 notifies the network subsystem, but does not initialize protocol with the node until receiving a change status indicating that the node is again operational.
10. When a node is re-activated, it must request down-line load.

Figure 37:
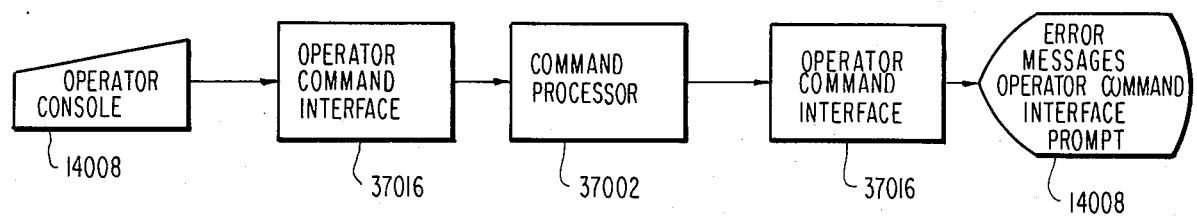
FIG. 37 is a flow chart of a command processor.

Referring again to FIG. 34, an operator command interface 34016 provides the basic interface between the system operator console 14008 or remote operator consoles (not shown) and the network CPU 14018. Operator command interface 34016 accepts commands from the operator console 14008, provides basic syntax checking, routes the command to a command processor 37002 (see FIG. 37), and returns error messages, system responses, and the prompt from the operator command interface 37016 to operator console 14008.

Figure 38:
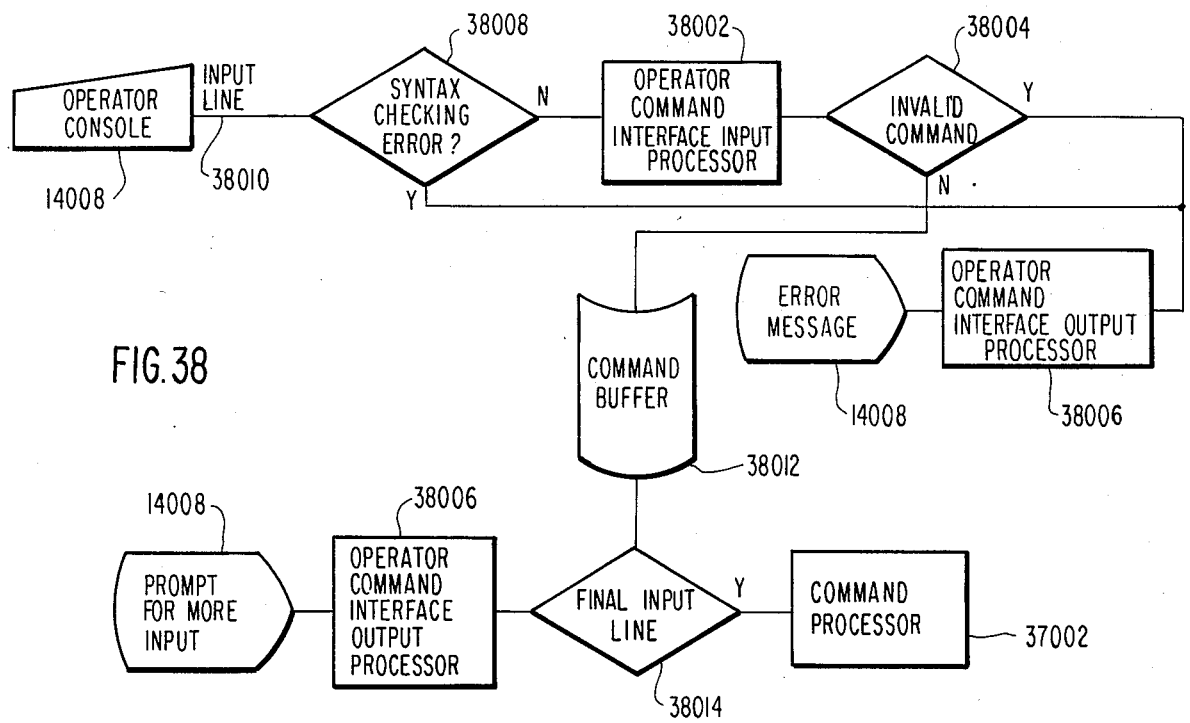
FIG. 38 is a flow chart of processors relating to operator commands.

Referring now to FIG. 38, an operator command interface input processor 38002 receives a command line on the input line 38010 from the operator console 14008. If the command line is the first line of a command, the command is validated. If an invalid command has been entered, it is detected by a decision block 38004, and an error message is sent to the operator console 14008 via an operator command interface output processor 38006. Basic (universal) syntax checking is performed on input line 38010, as indicated by a decision block 38008. If any syntax errors are detected, an error meassage is sent to the operator console 14008 via the operator command interface output processor 38006. The current input line from decision step 38004 is formatted into a command buffer 38012. If the current input line is the final input line, as indicated by a decision step 38014, the contents of command buffer 38012 are sent to command processor 37002. Otherwise, a status to prompt console 14008 for more input is sent to the operator command interface output processor 38006.

The operator command interface output processor 38006 receives input from either the operator command interface input processor 38002 (for example, invalid command message, syntax error messages, prompt for more input), or from the command processors 37002 (or example, command syntax error messages, display request and prompt for more command input, display command output text, completions (re-prompt) status). All display text is sent to console 14008. If more input is required, the prompt for more input is sent to console 14008. Otherwise, any error message is sent to the console 14008, and then the initial input prompt is sent to the console 14008.

The command processors 37002 provide the processing for operator commands received from either the system console 14008 or remote consoles (not shown). Command processors 37002 are activated via a variable "send data" from a command processor buffer 38012. If the originator of the command was either the system console 14008 or remote console (not shown) at the network subsystem 13028, output data is queued directly to the originating device. Upon completion of the command, a status return buffer is queued to the requesting task. If the originator of the command was another subsystem, output data is queued to the message output processor in the form of text message buffers. Upon completion of the command, a command completion status message buffer is queued to the message output processor.

Figure 39:
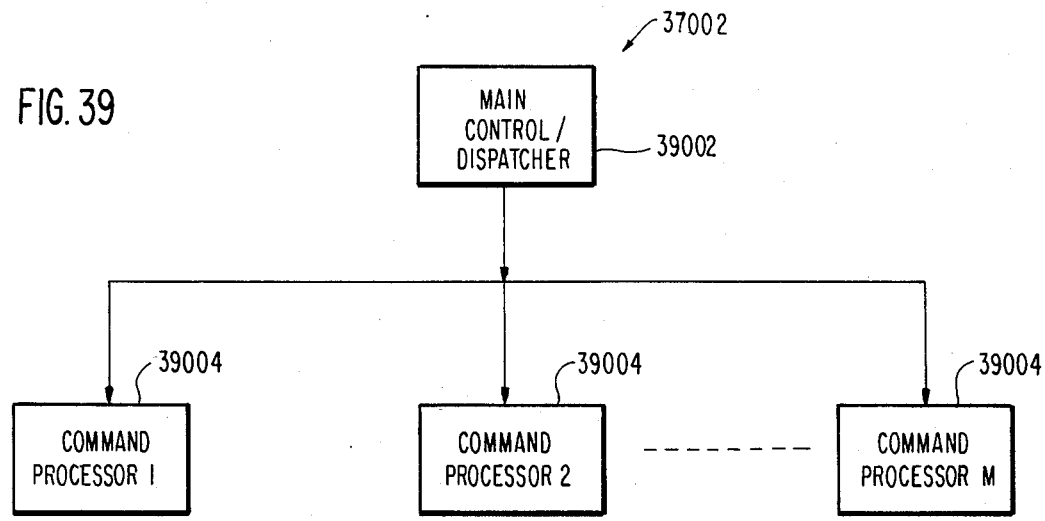
FIG. 39 is a flow chart of the main control dispatcher processor.

Each command processor, designated generally by reference numeral 37002, comprises a main control and dispatching unit 39002, and a set of command processor overlay units 39004, shown in processor block diagram form in FIG. 39.

As shown in Table 1 which follows, the network subsystem command processor provides the processing for but is not limited to the following commands:

TABLE 1

| OPERATOR COMMANDS | FUNCTIONS |
| --- | --- |
| ACTV | Active Node Function |
| AUTO | Begin Automatic Connection Algorithm |
| BAUD | Modify Baud Rates |
| CHAN | Modify Channel Name |
| CONN | Change Connectivity Map |
| DISP | Display Error Messages |
| DUMP | Dump Error Log |
| EXAM | Examine and Modify Memory |
| EXIT | Operator Log Off |
| HIST | Request Network History |
| IORW | I/O Port Read and Write |
| KILL | Terminate ICC System |
| LIST | List |
| LOAD | Down-Line Load |
| LOGB | Begin Error Log |
| LOGE | End Error Log |
| MANL | Stop Automatic Connection Algorithm |
| MAPS | Display Real-Time Connectivity Map Status |
| NODE | Modify Node Name |
| PARM | Modify System Parameter |
| PRIV | Modify Access Privilege |
| ROUT | Modify Routing File |
| SETC | Set Channel Characteristics |
| SETN | Set Node Characteristics |
| STAT | Request Status |
| SWCH | Switch (Swap) Redundant CPUs |
| TDMA | Enter TDMA Mode |
| TERM | Terminate Node Function |
| TIME | Time-Of-Day |
| TYPE | Modify Channel Type |

The command processor is activated by a variable "send data" from either an ICC message processor or an operator interface 14010, or from the console operator command interface 34016. A command processor buffer sends an operator command message to the command processor dispatcher. The appropriate overlay is executed, and ICC text messages are issued by the overlay. Upon completion of processing, command completion status is returned to the operator command interface 37016, or, if the command was issued by a remote operator command completion status ICC message, is delivered to the ICC output message processor 38006.

The ICC message processor 38006 receives ICC messages from the front-end interface 40004 and performs the processing required by the messages.

The front-end input processor receives the ICC message from the front-end interface 40004, and formats and routes the message to the appropriate ICC message process or routine. The front-end input processor receives ICC messages from front-end interface 40004 as inputs, and provides ICC messages to the ICC message process or routine as outputs.

The front-end output processor receives ICC messages from the ICC message process or routines, formats them, and then sends the formatted messages to the front-end interface 40004.

The ICC message processor routines receive the ICC message from the front-end input processor and process the message. If any response is required, an ICC message is generated and sent to the front-end output processor. The ICC message processor routines receive input in the form of ICC messages from front-end input processor, and provide as output ICC messages to the front-end output processor.

The back-up network subsystem 13028 processes add map entry messages and delete map entry messages to maintain the current status of the connectivity map 23002. These messages are generated by the on-line network subsystem 13028. The back-up network subsystem 13028 receives these add map and delete map entry messages and performs corresponding additions and deletions to its connectivity map 23002.

The new node map message 35016 is processed by the back-up network subsystem 13028. The back-up network subsystem 13028 deletes its current connectivity map 23002 for the specified node and processes the new node messages until the whole map for the specified node has been received. The connectivity map CRC is then checked for that node. If the CRC fails, a request node map message and an error message are generated and sent to the on-line network subsystem 13028. The network subsystem 13028 receives as input the request node map message, and provides as output the node map message(s) and data to the error log file 35046.

The request node map message is processed by the network subsystem 13028. One or more new node map messages 35016 are generated and sent to the requesting subsystem. Note that the new node map is sent in sections due to the 254-byte limitation on ICC messages. The network subsystem 13028 receives as inputs the request node map message and data from the connectivity map 23002, and provides as output the new node map message. If a threshold number of requests new node map messages are received from a control subsystem 13016, an error message is generated and sent to the error log file 35046, and the control subsystem 13018 is marked down.

The implement map change message is processed by the back-up network subsystem 13028 to maintain the status of the connectivity map 23002 currently in use by the network. The new connectivity map 23002 is marked as current, and the old map is discarded. The back-up network subsystem 13028 receives as input the implement map change message and data from the connectivity map 23002, and provides data to the connectivity map 23002 as output.

The request down-line load message is processed by the network subsystem 13028. The requested program is located on the disc 14016, and then one or more down-line load messages are generated and transmitted to the requesting subsystem. If the program cannot be located, an entry is made in the error log file 35046 and an error message is sent to the requesting subsystem. The network subsystem 13028 employs disc 14016 as an interface in connection with this message. The network subsystem 13028 receives as inputs the request down-line load message and data from the program file, and provides as output down line load messages or data to the error log file 35046.

The network subsystem connection processor receives and processes connection request messages from the message processor. The network subsystem 13028 receives the connection request message as input.

The network system disconnect processor receives and processes disconnection request messages from the message processor. The network subsystem 13028 receives the disconnection request message as an input.

Note also that the statistics collector receives billing and statistical information from various ICC network subsystem processors, and from lower level subsystems. The statistics collector formats and records the data in the billing/statistics file 35044. Billing and statistics entries which reflect modifications to the system configuration (for example, call processing records and data structure modifications) are then transmitted to the back-up network subsystem 13028.

The initialization processor is now described. The initialization processor initializes system parameters and allows input of new system parameters (for example, node and channel characteristics). While it should be noted that the network subsystem 13028 employs the Digital Equipment Corporation (DEC) Files-11 file management system and the RSX-11M TTY driver for this function, it should be understood that any appropriate file management system can be employed.

The HASP interface provides the communications protocol between the network subsystem 13028 and the TDMA control subsystem 13026. The HASP interface is implemented as an RSX-11M multi-unit device driver, and supports a subset of the Houston Automatic Spooling and Priority System Protocol (HASP), sometimes called multileaving bisync.

The TDMA initialization processor is responsible for the establishment of the communications link between the TDMA control subsystem 13026 and the on-line network subsystem 13028. The on-line network subsystem 13028 employs a synchronous line interface 34038 (See FIG. 34). Once the TDMA initialization processor has been completed, data transfer between the on-line network subsystem 13028 and the TDMA control subsystem 13026 is in the form of HASP messages.

The read message processor, which is responsible for receipt of data transmitted by the TDMA control subsystem 13026 to the on-line network subsystem 13028, returns the data portion of the next HASP message from the TDMA control subsystem 13026. When there are no outstanding read requests, message transfer to the on-line network subsystem 13028 is inhibited via the wait flag in the HASP protocol function control sequence 1 byte. The read message processor interfaces with the synchronous line interface 34038.

The write message processor, which is responsible for the transmission of data to the TDMA control subsystem 13026, accepts data for transmission to the TDMA control subsystem 13026, packages it in the HASP protocol, and transmits it to the TDMA control subsystem 13026. The interface to the write message processor is comprised of a synchronous line. The input to the write message processor is comprised of messages destined for the TDMA control subsystem 13026. Outputs comprise HASP format messages to the TDMA control subsystem 13026.

The front-end interface 40004 provides the communications protocol for the DMA interface 40004 between the on-line network subsystem 13028 and the front-end subsystem 13002. It comprises a privileged RSK-11M processor using the variable send/receive data facilities. This front-end interface 40004 is now described.

An initialization function issues an RSX directive to connect to the DRV-11B interrupt vector. Timeout and threshold counters are cleared, the idle state is set, and interrupts are enabled on the DRV-11B. This process is initiated when the front-end interface 40004 is executed, either as a result of an MCR run command, or the issuance of a variable send data to the function. Control is then passed to a main control loop.

A main control loop attempts to receive data from a variable send/receive buffer. If buffer data is received, the appropriate processing routine is called. Next, the main control loop determines if there is any input data available. If so, the process input routine is called. Next, the main control loop determines if an output can be initiated, and, if so, calls the output initiator. Finally, the main control loop waits for a group global event flag indicating that either an input or output has been completed or that the data of a variable send/receive buffer has been queued to the front-end interface 40004.

The processing of the variable send/receive buffer is as follows. If buffer indicates that initialization is to be performed, all current operations are aborted, the time-out and threshold counters are cleared, and the front-end interface 40004 is set to the idle state. If buffer indicates that status is to be reported, the status is queued to the requesting task. If buffer indicates that an exit is to be made, all current operations are aborted and the task is exited. If buffer indicates that a message is to be sent to the front-end subsystem 13002, the write-pending flag is set.

When input is available, the interface processor queues the variable send/receive buffers to the ICC input message processor for each message in the input buffer. The space is then released, and if there is input pending and sufficient space has been freed to accept the input, input is initiated.

During output initiation, interrupts are inhibited, and a request to transmit function and the message length are sent to the front-end subsystem 14004. A timer is started for detection of no response from front-end subsystem 13022.

When an interrupt occurs from the DRV-11B DMA interface 4004, processing is performed on the interface task. This processing is performed at "fork" level. Interrupts from the DRV-11B occur for DMA transfer complete or a front-end interface 40004 status of Idle, Wait, Proceed, or Request to Transmit. Table 2 shown below is a state table which describes the actions performed for the various conditions of the DMA interface 40004:

TABLE 2

| STATE | INTERRUPT | PROCESSING |
|---|---|---|
| IDLE | DMA INTERRUPT | This is an invalid interrupt and is counted in the interface status buffer. |
| | IDLE | Ignored. |
| | WAIT | Invalid, is counted, and an Idle function issued to front-end subsystem 13022. |
| | PROCEED | Invalid, is counted, and an Idle function issued to front-end subsystem 13022. |
| | TRANSMIT REQUEST | The message length is obtained and if there is sufficient space in the input buffer, a DMA transfer is initiated, a proceed function is sent, the state is set to input in progress, and in input time is started. If there is not sufficient buffer space, a wait function is sent to the front-end subsystem 13022, and the input pending flag is set. |
| INPUT IN PROGRESS | DMA INTERRUPT | The input time is reset, the input available flag is set, the group global event flag is set, and the state is set to Idle. |
| | IDLE | The input time is reset, the previously allocated buffer space is released, the state is set to idle, the group global event flag is set, and the DMA transfer is aborted. |
| | WAIT | Same as Idle. |
| | PROCEED | Same as Idle. |
| | TRANSMIT REQUEST | Same as Idle. |
| WRITE REQUESTED | DMA INTERRUPT | Invalid interrupt, counted, and an Idle function issued to front-end subsystem 13022. |
| | IDLE | The Request to Transmit is reissued. |
| | WAIT | The wait counter is incremented. |
| | PROCEED | The DMA transfer is initiated and the state set to Output In Progress. |
| | TRANSMIT REQUEST | The collision counter is incremented, the state is set to Idle and processing proceeds as above for Idle and Transmit Requested. |
| OUTPUT IN PROGRESS | DMA INTERRUPT | The output timer is reset, the write pending flag is reset, the state is set to Idle, and the group global event flag is set. |
| | IDLE | The output timer is reset, the Idle state is reset, and the group global even flag is set. |
| | WAIT | Same as Idle. |
| | PROCEED | Same as Idle. |
| | TRANSMIT REQUEST | Same as Idle and processing proceeds as above for Idle and Transmit Requested. |

Continuing with the DMA interface 40004 discussion, input timeout processing is as follows. When an input timeout occurs, it is counted. If the threshold level has been reached, the DMA transfer in aborted, the previously allocated buffer space is freed, the idle state is set, an idle processor is sent to front-end subsystem 13022, and the group global event flag is set.

An output timeout is counted after it occurs. If the threshold level has been reached, the DMA transfer is aborted, the idle state is set, an idle function is sent to front-end subsystem 13022, and the group global event flag is set.

The map connectivity processor, which maintains the connectivity map 23002 and the network configuration (topology), is now discussed in detail. The map control processor interconnection requests and maintains the network connectivity map 23002 (See FIG. 36). It sends map modification messages to the control subsystems 13016, performs bandwidth allocation, and sends bandwidth modification messages to the TDMA control subsystem 13026.

These processors are essentially performed by three distinct modules: a connection processor, a disconnection processor, and a reprogram processor. Each of these processors and their related subroutines work together to provide a modularized processor implementation approach.

Connection and disconnection requests are processed serially on a first come, first serve basis. In conjunction with these requests, the network is reprogrammed (the switch/multiplexer 13010 and TDMA connectivity maps 23002 are changed) when bandwidth reallocation is complete, and all control subsystems 13016 acknowledge updates of connectivity map 23002. The reception of a request initiates the map control processor, which in turn calls the connection processor or disconnection processor.

The request connection processor receives the request for connection messages from the ICC message processor with the origin identification (ID) and the destination code (phone number dialed). The origin ID is translated into a node ID and channel ID. The pointers in the channel characteristics file 35000 (CCF) directory entry is read and searched for the pointer into the channel characteristics file 35000 for the channel ID. Next, the channel characteristics file 35000 entry for the channel ID is read. If the channel status in the channel status/priority file 35018 is non-zero, then:

1. an request not accepted message is sent to the origin ID with an origin channel active status code;

2. a connection refusal record is written to the billing statistics file 35044; and,
3. if the channel is out of service, a system error message is sent to the error log file 35046.

Otherwise, if the channel does not have a dedicated channel, the routing file processor is called to process the destination code (dialed number).

A routing file processor is responsible for translating the dialed number into a node and channel ID. The routing file processor receives a destination code and origin node ID from the request connection processor and either locates a channel characteristics file 35000 (CCF) pointer for the destination, or returns a status code indicating why the channel was not found.

If the destination code does not have an area code, the default area code for the origin node ID is located and used. The area code and exchange is used as a pointer to the routing file 35038 partition, which contains the area code and exchange record. If the record is not found, a status of destination code not found in the routing file 35038 is returned to a calling routine. Otherwise, the routing file 35038 entry has been found.

If the special routing field is non-zero, the required special routine is called and a return status is received. If the first digit of the station number is one of the specified special digits, the required special processing is performed and the status is returned to the calling routine. If the verify station) field is non-zero, the station list is searched for a station number matching that of the destination code. If no match is found, a status of invalid station number is returned to the calling routine. If a dedicated channel exists for the station, it is returned to the calling routine. Otherwise, if no station verification is required, or if the station is valid with no dedicated channel, the multi-channel field is examined. If the field is zero, the channel characteristics file 35000 pointer is returned to the calling routine. Otherwise, the multi-channel expansion pointer is used to access the list of channel pointers for this record. These pointers are used sequentially to read the corresponding channel characteristics file (CCF) 35000 record and examine the status. If a status of 0 (inactive, available) is found, that channel characteristics file 35000 pointer is returned to the calling routine. Otherwise, the CCF pointer for the first of the multi-channels is returned to the calling routine.

If the destination code is not found in the routing file 35038 (for example, as a result of a mis-dialed or invalid number), a request not accepted message (REN) is sent to the origin with the status code returned by the routing file processor, and a connection refusal record is written to the billing/statistics file 35044. If the origin is a dedicated channel, or if a channel ID is returned by the routing file processor, the network status file 35020 is searched to find the status of the destination node. If the destination node is "down", an request not accepted message is sent to the origin ID with a "destination node down" status code and a connection refusal record is written to the billing/statistics file 35044. Otherwise, the channel characteristics file 35000 search is repeated for the destination channel. If the channel status is non-zero, then:
1. a request not accepted message is sent to the origin ID with an appropriate status code (e.g., channel active or out of service); and,
2. a connection refusal record is written to the billing/statistics file 35044.

If the channel status is zero, then both the origin and destination channels are considered available and records in the channel characteristics file 35000 for each channel are compared for compatibility. If the connectivity masks (system and user) do not match, then:
1. a request not accepted message is sent to the origin ID with a connectivity mask mismatch status code; and,
2. a connection refusal record is written to the billing/statistics file 35044.

If the connectivity masks do match, the baud rate processor is called with the origin ID and channel type, and the destination ID and channel type. If the network is nearing full network bandwidth capacity, and if the channels to be connected can be connected at a lower baud rate, the channel type file 35022 entry for each channel is examined to see if the reduced matching baud rates can be found. If compatible baud rates are found, those baud rates are returned to the calling processor. Otherwise, the unreduced matching baud rate value is returned to the calling processor. The algorithm, for this process, which is called the automatic digitizing rate adjustment (ADRA) processor, is described later in this section.

If the baud rate processor returns a status indicating that no match is possible, then:
1. an request not accepted message is sent to the origin with a baud rate mismatch status code; and,
2. a connection refusal record is written to the billing/statistics file 35044.

If the baud rates are compatible, the bandwidth allocation processor is called to allocate the bandwidth, reconfigure the network, and, if necessary, reprogram the TDMA control subsystem 13026. The bandwidth allocation processor receives a request for bandwidth allocation or deallocation. The node configuration file 35036 is processed to determine if there is sufficient unallocated bandwidth within each node's current burst segment. If insufficient bandwidth is available, a bandwidth unavailable status is returned.

If one or more nodes are found with sufficient unused bandwidth to satisfy the allocation request, their current burst segments are reduced by the necessary bandwidth (but not less than the minimum burst sizes). Delete bandwidth message(s) are sent to the TDMA control subsystem 13026 to effect the reallocation. If a request not accepted message is returned, the node's current bandwidth is not modified and processing proceeds with the next entry in priority order. Once sufficient request accepted messages have been returned to make the required bandwidth available, add bandwidth messages are sent to the TDMA control subsystem 13026. If a request not accepted message is returned, a bandwidth unavailable status is returned to the calling routine.

If channels of lower priority are found which are identified as disconnectable channels and which have sufficient bandwidth allocated to satisfy the requirement, the request disconnection processor is called to disconnect the channels and to return their bandwidth. Intentional disconnect messages are sent to the billing/statistics file 35044. Bandwidth allocation processing proceeds then resumes. If sufficient bandwidth cannot be made available via lower priority disconnections, an insufficient bandwidth status is returned to the calling routine. If sufficient bandwidth has been allocated for the request, the node and bandwidth data is returned to the calling routine.

If the bandwidth allocation processor returns a status code of insufficient bandwidth available, then:

1. a request not accepted message is sent to the origin with an insufficient bandwidth status code; and,
2. a connection refusal record is written to the billing/statistics file 35044.

Once all validation has been completed and the source and destination channels have been determined to be available and compatible, and sufficient bandwidth is available for the connection, add map entry (ADM) messages are sent to the back-up network subsystem 13028 and control subsystems 13016, the reprogram message is inhibited, and the acknowledges are awaited. At this time:
1. the reprogram message is enabled;
2. the reprogram timer is set;
3. an request accepted message is sent to the origin ID;
4. the channel status/priority file 35018 entries for the channels are marked as active; and,
5. a call processing record is written into the billing/statistics file 35044.

A reprogram processor is responsible for insuring that all map changes have been implemented by the control subsystem 13016. The reprogram processor is initiated by the reprogram timer. The map modification commands (for example, Add Map, Delete Map) are disabled while the reprogram command is being transmitted to all of the nodes and all of the acknowledgements are being received. If one or more nodes do not acknowledge the reprogram command (either by an ACK or a request for a new node map) within a specified timeout period, either the network is frozen in its current state or the offending modes are shut down. After all of the nodes have acknowledged or have shut down, the add map command is enabled and the implement map change (GO) command is transmitted to all of the nodes.

The baud rate processor returns either the baud rate for the connection, or a status indicating that the baud rates for the channels cannot be matched. In addition, the baud rate processor verifies that baud rates passed to it (via manual connect) are valid baud rates for the corresponding source and destination channels. The channel characteristics file 35000 entry for each channel is read and the pointer is used to read the baud rate file 35024 entry for each channel to obtain the maximum baud rate allowable for each channel.

The request disconnect processor receives the request for disconnection messages from the ICC request for disconnect message processor with the node/channel ID of the channel to be disconnected. The linked map header pointer for the node is located in the connectivity map 23002 and the list is searched for both the transmit and receive entries for the channel. If only one entry or neither entry is found, a system error message is sent to the error log files 35046. Otherwise, if both entries are found, the connectivity map table 23008 is searched again for the transmit and receive entries for the other node/channel ID. The channel characteristics file (CCF) 35000 directory entries are read and searched for the pointers into the CCF for each channel ID.

The reprogram message is inhibited until after the delete map entry (DLM) messages for each connectivity map table 23002 entry have been sent to the back-up network subsystem 13028 and the control subsystems 13016, and have been acknowledged, at which time:
1. the reprogram message is enabled;
2. the reprogram timer is set;
3. the channel status/priority file 35018 entries for the channels are marked as inactive, available; and,
4. a call processing record is written to the billing/statistics file 35044.

The network subsystem 13028 incorporates a bandwidth shuffler, which is responsible for insuring that unused bandwidth is allocated such that the greatest efficiency is achieved. The bandwidth shuffler is scheduled on a periodic basis, and evaluates the bandwidth allocation and the bandwidth utilization for each node. Without having to reprogram the TDMA, the bandwidth shuffler redistributes the unused bandwidth from each node among all nodes so that each node has some unused bandwidth that can be allocated readily whenever there is a request for a new connection. To accomplish judicial distribution of the unused bandwidth available and minimize the TDMA reprograms, the bandwidth shuffler must necessarily predict the future demand for each node so that the distribution of excess bandwidth is tied to this predicted demand. Two factors that reflect future demands are:
1. Current usage of bandwidth by a node. The higher the current usage, the more demand for bandwidth, due to high traffic at that node; and
2. Past history of ratio of connections to disconnections. If this ratio is high, then the demand for bandwidth is high, as each connection requires the node's availability unused bandwidth.

The amount of unused bandwidth a node is allocated by the bandwidth shuffler as a weighted average of both the current usage and the ratio of connection to disconnection in the past "T" interval of time.

Equation 1

$$U_i = (X \text{ times tuning-factor 1}) \text{ plus } (Y \text{ times tuning-factor 2})$$

where:
$U_i$=node i's current usage;
X=number of 8000 bps blocks currently in use by node i; and,
Y=0 or (number of connections-number of disconnections) whichever is greater.

By changing the tuning-factor dramatically, the weightage given to each factor in equation 1 above is changed. The total usage Tu of each node is computed according to the following equation:

Equation 2

$$Tu = \sum_{o}^{x} U_i$$

where:
Tu=the total system usage;
X=number of nodes in the system; and,
$U_i$=node i's current usage.

The weighted average Wi of each node is computed as in accordance with the following equation:

Equation 3

$$Wi = Ui/Tu$$

The bandwidth shuffler finally computes the percentage of unused bandwidth Ai to be allocated to each node in accordance with the following equation:

Equation 4

$$Ai = Wi \text{ times } Ta$$

where Ta is the total available unused network bandwidth.

The following is the sequence of events that takes place when the bandwidth shuffler is scheduled to run.
1. The bandwidth shuffler is scheduled every X minutes and just before the start of reprogramming the TDMA (i.e., just before the process bandwidth request is sent to the TDMA).
2. A check is made to be sure the request connection and request disconnection processes are not scheduled until all the updates are completed (if they are scheduled, they must be locked out).
3. The number of virtual blocks in use is computed by going through node configuration file 35036.
4. An entry for each node is made in a temporary file containing the amount of unused bandwidth allocated to each node; the number of virtual blocks in use, and each node's priority.
5. If a node's current usage is near its maximum limit or its minimum limit, then an entry is not made in the temporary file for that node (i.e., this node is not included in the bandwidth shuffling process).
6. The weighted average for each node and the amount of bandwidth to be allocated is calculated.
7. The amount of adjustment of bandwidth to be made for each node is calculated by going through the temporary file.
8. The bandwidth processor is called to adjust the node configuration file 40036.
9. Commands are transmitted to the TDMA for bandwidth adjustment.

The automatic digitizing rate adjustment (ADRA) processor is invoked when network bandwidth is near full capacity. The ADRA processor attempts, wherever possible, to implement connections and disconnections at reduced baud rate levels, and thereby increase bandwidth utilization efficiency. The ADRA processor, if invoked, tries to find a baud rate compatible with the source and destination channels that is lower than the requested baud rate. The extent to which the requested baud rate is reduced depends on the network loading. Depending on the total bandwidth in the network, a global variable is updated periodically, reflecting the extent to which each request is to be reduced. The ADRA processor then reduces the requested baud rate by the global variable.

The ADRA processor is performed only for channels whose entry in the channel characteristics file 35000 entry has been set to indicate that bandwidth reduction can be performed for that channel. If the ADRA processor cannot find a baud rate lower than the requested rate that is compatible between source and destination, it returns the original (unchanged) requested rates.

The error processor logs all errors reported or detected in the network, and, when appropriate, initiates recovery action. The error initialization processor is invoked as a result of an RSX operating system send data directive. The error log file 35046 is opened for appending. Interfacing is accomplished through the Files-11 and the RSX-11M TTY driver. Inputs originate from the send data block, while output is sent to the error log file 35046 record.

Error record processing is invoked as a result of an RSX send data directive. The record is written to the error log file 35046 with a time stamp. If an end of file is detected, a message is sent to the operator's console 14008, and subsequent error log file 35046 records are written to a secondary file. If the error log device is a magnetic tape, upon end of file detection subsequent file will be written to the disk, and the operator is prompted to mount a new error log tape. Interfaces include the Files-11 and the RSX-11M TTY Driver. Input arrives from the send data block via RSX, while outputs are transmitted to the error log file 35046 record, and, in some cases the operator console 14008.

Termination of the error log file 35046 is invoked as a result of an RSX send data directive. The error log file 35046 is closed, and the error log processor is exited. Input is received from the send data block, while output is sent to the error log file 35046 record.

The initialization task performs the required processing to initialize user dependent ICC data structures and to place the system in condition for a cold start.

The file initialization processor processes the system configuration file and initializes user dependent data structures. The file initialization processor interfaces with the Files-11M. The system configuration file is the input to the file initialization processor. The file initialization processor provides output to the connectivity map 23002, the channel characteristics file 35000, the node configuration file 35036, the channel name file 35028, the node name file 35026, the routing file 35038, the access privilege file 35040, the billing/statistics file 35046, and the system commons file.

The start-up processor provides for the day-to-day start-up or recovery of the network. The start-up initialization processor opens the network data structures and initializes all memory resident tables, and allocates initial bandwidth. The start-up initialization processor provides outputs to the connectivity map 23002, the channel characteristics file 35000, and the billing/statistics file 35046.

The initialization processor is responsible for the TDMA start-up processor. The TDMA start-up processor establishes communication with the TDMA control subsystem 13026. The initial connectivity map 23002 is established and TDMA operation is initiated. The start-up processor also establishes communications links with all the lower level subsystems in the network. Subsystems are initialized in the following order: front end subsystem 13022; control subsystems 13016; serial subsystems 13018; UIIM subsystems 13024. Programs are down-line loaded as required, and the network status table 35020 is updated as subsystems successfully complete initialization.

The map initialization processor transmits the initial connectivity map 23002 to the control subsystems 13016.

The system generation processor performs the functions required to generate an ICC system tailored to a specific users configuration via a question/answer session. This processor queries the system operator console 14008 for system generation parameters specific to the customer's configuration, and then creates a system parameter file 35004. Inputs include operator responses to parameter queries as well as parameter queries from an ASCII text file. Outputs are sent to the system parameter file 35004; parameter queries are directed to the console 14008.

The file generation processor generates configuration-dependent disk files. This processor utilizes the system parameter file 35004 to determine the format and length of the files generated. Outputs are sent to the:
1. channel characteristics file 35000;
2. channel type file 35020;
3. node configuration file 35036;

4. channel name file 35028;
5. node name file 35026;
6. routing file 35038;
7. access privilege file 35040; and
8. billing/statistics file 35044.

The network subsystem 13026 incorporates a redundancy processor, which is responsible for maintaining the current state of the network at both the on-line and back-up network subsystems 43028.

Operator commands which result in the modification of system tables or files are spooled to the back-up network subsystem 13028. The redundancy processor transmits a network subsystem 13028 operating message on a timed basis, which allows the back-up network system 13028 to detect an inoperative on-line system. The redundancy processor may also be responsible for ghosting on systems with back-up disc systems, i.e., duplicate records are written on duplicate disks.

The present invention provides the capability for remote operators to interface with the network subsystem 13028 via modem 14010. The HASP protocol is used for this interface.

After a computer has transmitted a message sequence, it should receive a completed, valid response within a specified timeout. The timeout for the remote terminal is 2 seconds; for the network subsystem 13028, it is 3 seconds. If a correct sequence is not received, the last transmitted message is retransmitted. If any message is retransmitted ten times, an error message is generated. The block sequence number used in the block control byte (BCB) is a modulo 16 counter. Each time a new network-remote-message is sent, the count is incremented. The receiving CPU should keep track of the received count. If a block is received with the same sequence number as the previous message, a duplicate message has been received. The duplicate message is acknowledged, and then discarded. If a sequence number is received out of order, the error is recorded, and the line is reinitialized.

Each HASP message includes a block check character (BCC) to ensure line integrity. This BCC is a cyclic redundancy check which is generated over the message; the resulting remainder is the BCC. The receiver performs the same calculation on the received message including the BCC. If the remainder is zero, the message is determined to be error free. If the remainder is non-zero, error recovery is invoked. The cyclic redundancy check used is the CRC-16 polynomial, mathematically represented as $X^{16}+X^{15}=X^2+1$. Every character after the start-of-text (STX) is included in the calculation up to the end-of-transmission block. Data link escape characters (DLE) are not included in the calculation.

Both the modem and the network CPU subsystem 13028 share equally in the responsibility in error recovery; there is no primary or master site. Whenever a timeout occurs or a block is received with an incorrect block check character, a negative acknowledgement (NAK) is sent. After 10 NAK's have been transmitted in succession, the remote end is considered down and an error message is generated.

The operator at the remote terminal is responsible for establishing communications with the network subsystem 13028. The operator initiates the protocol by transmitting the enquiry message. After the network subsystem 13028 acknowledges the enquiry message, the operator is notified with a "ready" message. Next, the operator transmits a sign-on message. If the sign-on message passes the various validation tests at the network subsystem 13028, the network subsystem 13028 responds with an acknowledgement and the operator is notified.

5.5 Front End Subsystems

The front end subsystem 13022 is shown in schematic block diagram form in FIGS. 40A and 40B. The front end subsystem 13022 provides a communications interface between the on-line network subsystem 13028 and the control subsystems 13016. The function of the front end subsystem 13022 is to provide protocol checking and block transmission functions for the network subsystem 13028. Very broadly, the front end subsystem 13022 consists of a microprocessor 14004 such as an Intel 8086. Microprocessor 14004 has a DMA interface indicated generally by a reference numeral 40004 to the on-line network subsystem 13028 and an interface 40006 to the switch/multiplexer 13010.

The network subsystem 13028 transmits all messages destined to the front end subsystem 13022 or to lower-level subsystems to the front end subsystem 13022 via a DMA interface 40004. The front end subsystem 13022 determines from the message type whether the front end subsystem 13022 itself is the message destination. If the destination is the front end subsystem 13022, the front end subsystem 13022 processes the message (that is, performs the action indicated by the message data); if the destination is a lower-level subsystem, the front end subsystem 13022 formats the message into a block for broadcast transmission to all control subsystems 13016. It should be noted that blocks are fixed length (FIG. 15G) (messages, on the other hand, are variable length) and can be comprised of several messages, single messages, or message fragments. All blocks contain block sequence numbers and a CRC, which are inserted or calculated before transmission to the Control subsystems 13016.

All messages transmitted to the on-line network subsystem 13028 from the control subsystems 13016 (or from lower-level subsystems via the control subsystems 13016) are packaged into blocks and transmitted over the satellite 11000 link. The front end subsystem 13022 intercepts each of these blocks, validates the CRC, acknowledges (or negative acknowledges) the appropriate control subsystem 13016, validates the block sequence number, and assembles messages from the block which are then transferred to the network subsystem via DMA interface 40004.

The front end subsystem 13022 performs the following functions:

1. handles the protocol between the on-line network subsystem 14018 and the control subsystems 13016 (i.e., acknowledges, negative acknowledges, etc.);
2. separates messages from incoming blocks arriving from all control subsystems 13016 and both (on-line and stand-by) network subsystems, and transfers the messages to the network subsystem 13028 separated by a source node ID;
3. transmits messages from the network subsystem 13028 by formatting the message into blocks for transmission to control subsystems 13016.

The front end subsystem 13022 performs the following basic tasks:

A. "Bootstrap" System Start-up
   (1) initializes hardware and software on system start-up;
   (2) provides a minimal "bootstrap" for down-line loading the executable program and system generation parameters from the network subsystem 13028.

B. Down Line Load System Start-up
  (1) initializes hardware and software on system start-up;
  (2) establishes protocol with the control subsystems 13016 and the other front end subsystem 13022;
  (3) maintains ICC protocol.
  (4) provides system status to the network subsystem 13028.

C. Receive
  (1) de-blocks and reconstructs messages for the network subsystem 13028;
  (2) performs block sequence number and CRC checking;
  (3) performs retransission of blocks;
  (4) maintains ACK/NAK statistics for the network subsystem 13028.

D. Transmit
  (1) maintains block sequence numbers, ACK/NAKs, and performs CRC generation;
  (2) performs message blocking; and,
  (3) performs transmission self-checking.

E. Internal
  (1) provides fault-recovery procedures; and
  (2) performs processing as required by messages received from the network subsystem 13028.

5.5.0 Front End Subsystem Hardware

The front end subsystem 13022 is comprised of two major sections: (1) a front end processor depicted in FIGS. 40A and 40B and, (2) a front-end switch/multiplexer interface depicted in FIGS. 40C and 40D.

5.5.1 Front End Processor

The front end processor uses an Intel 8086 CPU microprocessor 14004 configured in minimum (MIN) mode. A address/data bus 40012 of the 8086 microprocessor 14004 is demultiplexed to provide a buffered address bus 40014 and a buffered data bus 40016.

The front end processor uses pairs of eight-bit wide memory devices 40018 to give 16-bit wide memory in any configuration of RAM, EPROM or ROM. The six pairs of memory devices are enabled by six of the eight outputs of a memory mapping PROM 40020. One of the two remaining PROM outputs is used to select the memory mapped portions of the switch/multiplexer interface and the other is unused.

Control signals for memory and I/O read and write (MWR, MRD, IOW, and IOR) are generated by a decoder attached to the 8086, CPU 14004 or by the DMA controller 40022, when it is enabled.

5.5.2 DMA Controller

The DMA controller 40022 provides a high speed transfer between the network subsystems 13028 and the front end subsystem 13022, and between the front end subsystem memory and the CRC hardware 40024.

The DMA controller device 40022, an Intel 8237, is programmed by the Intel 8086 CPU 14004, via the low side of the data bus (see page A42, the 8086 Family User's Manual, Intel, October 1979). During a DMA operation, the 8237 DMA controller 40022 generates the memory write (MWR) and memory read (MDR) signals, as well as the memory address. The 8086 HLDA signal is used to disable the 8086 address drivers and enable the DMA address drivers.

A mapping RAM 40023 is used to map sequential DMA address groups to any one of 256 segments of memory within a 8 K memory area defined by A14–A19. Each segment is 32 words in length. The DMA mapping RAM 40023 is loaded, cell by cell, using 16 I/O ports. Each cell contains an 8-bit value. In the case of transfers of more than 32 words, the DMA mapping RAM 40023 allows the 32-word blocks to be in non-contiguous physical memory locations. This scheme allows DMA transfers to be somewhat transparent to link-list memory management.

Upon completion of a DMA transfer, the DMA controller 40022 generates an end-of-process (EOP) interrupt via the interrupt controller 40026.

5.5.3 Processor Peripherals

In addition to the DMA controller 40022, there are three 8-bit peripheral devices and three 16-bit peripheral devices available to the processor.

The 8-bit peripherals are: a 8253-5 timer 40044; a 8259A interrupt controller 40026; and an 8251A USART 40042. These devices are I/O mapped by a decoder, and are on the low side of the data bus. One channel of the timer 40044 provides a "dead man timer", which generates a non-maskable interrupt (NMI) to the processor and causes and EOP for DMA transfers. A second timer channel provides a baud rate clock to the USART 40042. A third timer channel is available as a general purpose timer/interrupt via the interrupt controller 40026. The USART 40042 produces two interrupts (TXRDY and RXRDY) via the interrupt controller 40026.

The 16-bit peripherals are: a CRC generator-checker 40024; a DMA interface 40004 to the network subsystem 13028; and the front end subsystem to switch/multiplexer interface 40006 (including the transmit and receive buffers).

CRC Generator-Checker

The CRC generator/checker 40024 is used to confirm the validity of information within data blocks. The cyclic redundancy checker (CRC) generator/checker 40024 produces a CRC polynomial result on a list of data words. The polynomial used is CCITT-16. The CRC polynomial is automatically initialized at the beginning of a transfer on DMA channel 2. In the transmit mode, the outgoing data is presented to the CRC checker 40024 and the generated result is stored in the last word of each block. In the receive mode, the incoming data is presented to the CRC checker 40024; the CRC word accompanying the data is compared to the value computed by the CRC checker 40024. If equal, the block is ACK'ed. If not equal, the block is NAK'ed. Bits are clocked through the CRC generator-checker 40024 at a rate of 15 MHz.

The generated 16-bit check character is placed in a 16-bit output register (not shown), which may be read under program I/O by the 8086 CPU 14004 prior to initiating another DMA transfer to the CRC logic.

DMA Interface to the Network Subsystem

The DMA interface 40004 provides a high speed data transfer between the front end subsystem 13022 and the network subsystem 13028.

Control of four DMA channels is provided by an 8237-2 device 40022 and an associated address mapping RAM 40024. Two of the four 8237 channels are used; one for data transfer between the front-end subsystem 13022 and the LSI-11 14018, the other for data transfer to the CRC generator/checker 40024. The 8237-2 device 40022 is programmed as described in the Intel 8237-2 data sheet with the exception of the use of the address registers.

Messages passed between the front end subsystem 13022, as well as handshaking control signals, pass through this interface. The message data is retrieved directly from a selected address in the memory of one subsystem, and placed in a selected address in the other subsystem's memory.

The interface 40004 between front end subsystem processor and the network subsystem 13028 consists of a control interface 40026 (for control and handshaking signal transfer) and a data interface 40028 (for message transfer).

5.5.4 Front End Subsystem to Switch/Multiplexer Interface

Figure 40C:
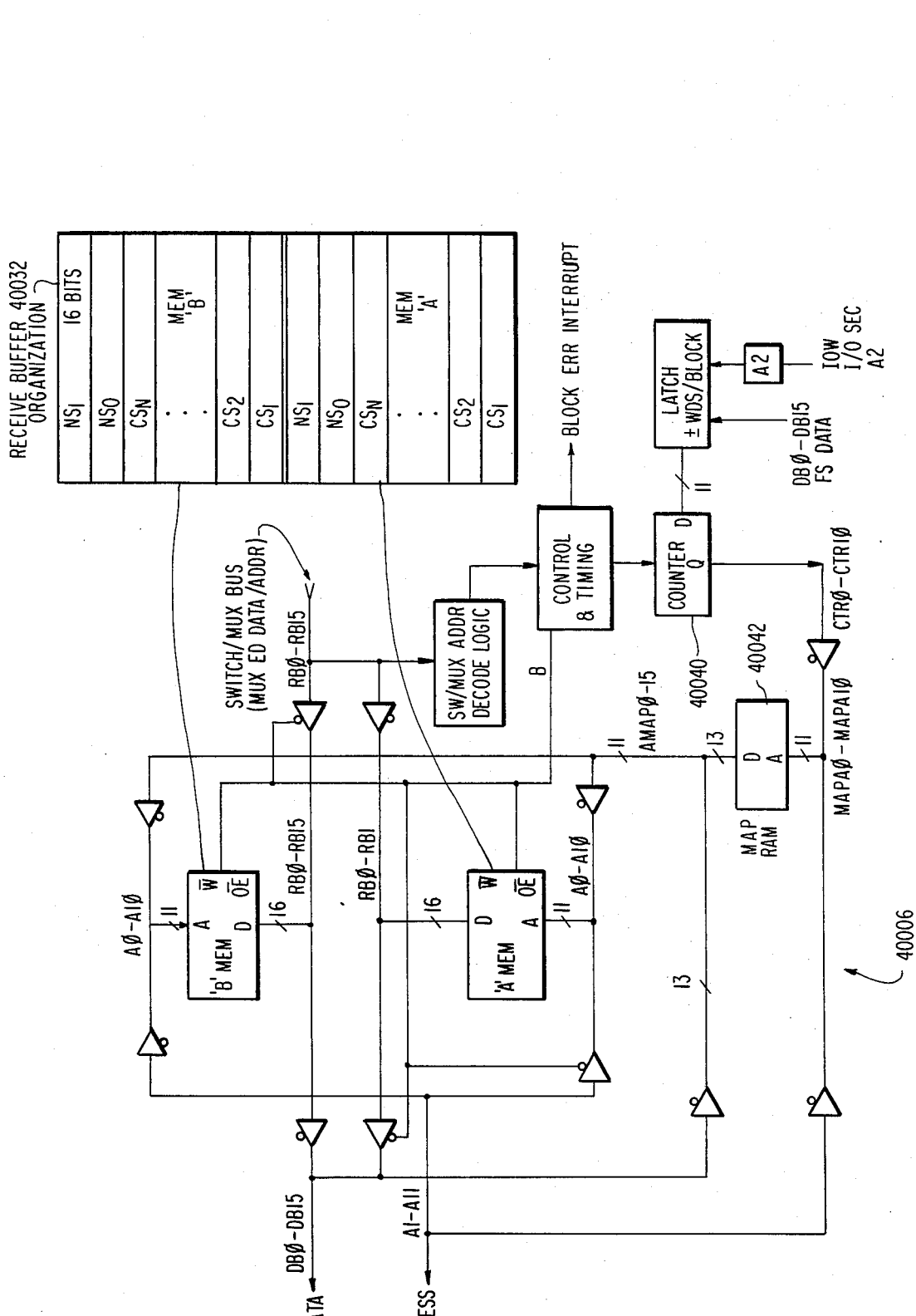
Figure 40D:
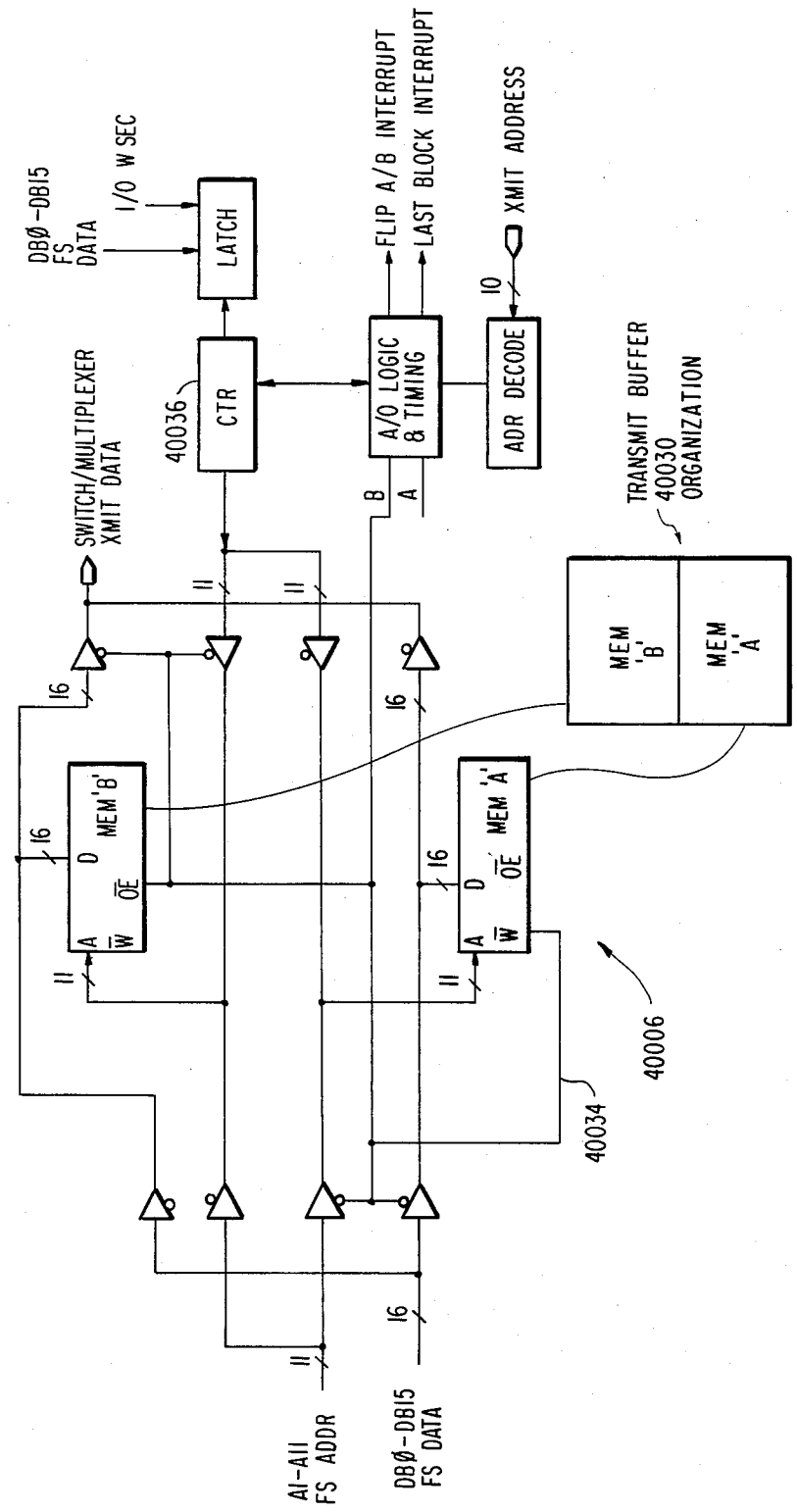

Referring now to FIGS. 40C and 40D, the front end to switch/multiplexer interface 40006 provides two independent data channels from front end subsystem 13022 to the switch/multiplexer common equipment bus 28002. One channel (shown in FIG. 40C) is for data received by the front-end subsystem 13022 from the switch/multiplexer bus 28002. The other channel (shown in FIG. 40D) is for data transmitted by the front-end subsystem 13022 to the switch/multiplexer bus 28002. The transmit channel provides a buffer 40030 of 16-bit data words to be transmitted to all control subsystems 13016 and both front end subsystems 13022. The receive channel provides a buffer 40032 consisting of a block of 16-bit data words from all control subsystems 13016 and both front end subsystems 13022. The buffers 40030 and 40032 are memory mapped in the 8086 memory space. Each buffer is double-buffered (A and B) allowing their use by front end processor 14004 to be transparent to the switch/multiplexer bus timing at the 16-bit level. In other words, one of the two buffers in the double-buffer is always releasing data while the other buffer is being loaded with data.

5.5.4.1 Transmit Channel

The block diagram of the transmit channel interface in FIG. 40D shows the data paths from the front end CPU 40002 data and address bus 40012 to the switch/multiplexer. The front end CPU 40002 writes 16-bit words to a particular address in either of the two memories (A or B). The block diagram shows the enable line 40034 for writing the "A" memory. The "B" memory is enabled to be read by the switch/multiplexer bus. Each read by switch/multiplexer 13010 increments an address counter 40036 until maximum count is reached, at which time the role of the "A" and "B" memories are reversed. The front end CPU 40002 may also read back the contents of the transmit buffer which is not enabled to switch/multiplexer 13010 to verify the contents of the data being written.

The transmit superframe pulse initializes an address generator which sequentially reads out data from the "A" or "B" memory addressed by the switch/multiplexer. Address generator is also initialized at terminal count, that is, when an entire block has been completely transmitted. On reaching terminal count, the A/B memory is flipped, and a block sent interrupt is generated (TXBUFEMPTY).

5.5.4.2 Receive Channel

The block diagram of the receive channel interface in FIG. 40C shows the data paths from the switch multiplexer 13010 to the front end subsystem 13022.

A receive address counter 40040 is incremented each time the switch/multiplexer 13010 addresses the front end subsystem 13022. Upon reaching terminal count, the address counter is reinitialized and the receive A/B buffer is flipped.

The outputs of the receive address counter 40040 address a mapping RAM (receive block map 40042). The output of the mapping RAM 40042 determines the buffer memory location for each received word, such that the buffer memory contains a block of words from each node, arranged in contiguous physical addresses. The mapping RAM 40042 is loaded by the front end CPU 14004 and may be read back by the front end CPU 14004. The address of the block mapping 40042 is determined by a memory mapping PROM 40018 in the front-end subsystem processor. The front end CPU address and data bus 40014 and 40016, respectively, drives the mapping RAM's address and data lines when a memory write to the receive map is executed.

A memory read from the receive buffer allows the front end CPU 40002 to access the received data. The address is the same for both the A and B memories, and selection is based on the A/B state.

5.5.4.3 Switch/Multiplexer Interface Programming Information

Switch/Multiplexer Transmit (Tx) Interface

The transmit hardware interface is initialized by writing a word count and blocks/superframe count to an I/O port. The word count is the 2's complement of the number of words per transmit block. The block/superframe count is the 2's complement of the number of clocks per superframe. The port may be read back for verification.

A transmit block is written to the memory addresses specified by memory map 40042. The last word to be transmitted is written to the last word location minus the word count. The next block to be transmitted can be written after the transmit hardware causes a transmit buffer available interrupt. The entire block is written before the next occurrence of a transmit buffer available interrupt. A last transmit block interrupt is activated during the last block of a superframe. This interrupt indicates that the block to be loaded after the next buffer available interrupt will be the first block of a superframe.

Switch/Multiplexer Receive Interface

The receive channel of the switch/multiplexer interface 40006 is initialized by writing a word count to an I/O port. The word count is the 2's complement of the total number of words expected by the front end 13022, comprising one block of data from each control subsystem 13016, and the two front end subsystems 13022 (primary and secondary). In addition, the receive block map 40042 is initialized by writing a list of 14-bit values to memory locations. Each successive value represents the 12-bit offset from the beginning of the receive buffer 40032 where each successive word from the switch/multiplexer 13010 is stored. The offset value for the first word received is written at the beginning of memory sector 6+FFFH−word count. This mapping function causes the words arriving from the switch/multiplexer 13010 to be stored such that blocks of data from each control subsystem 13016 and the front-end subsystems 13022 are arranged contiguously, although they are not received in that order. In certain system configurations there may be a time during a burst when sequentially received words belong to different blocks. During this period, words alternate between the current block and the succeeding block.

The word counter is automatically reset by the receive superframe pulse should it go out of sequence.

The block map is addressed by the word counter during normal operation.

Front End/Control Subsystem Block Protocol

When the front end subsystem 13022 needs to restart the protocol (typically after a power failure or redundancy switchover), it sends out blocks containing no data with a reset block sequence number. The control subsystems 13016 receive the reset sequence number and respond by sending reset ACKs and blocks with their own reset sequence numbers containing no data. This continues until a reset ACK is received from all control subsystems 13016 (and the redundant network subsystem front end 13022). Any subsystem CPU that does not respond within a given time is designated as off-line.

The front end subsystem 13022 responds to each control subsystem 13016 reset sequence with reset ACKs. Once the front end subsystem 13022 receives reset sequence numbers from all sites, or a timeout occurs, it sends out dummy sequence numbers. Each control subsystem 13016 receives the rest ACK, and sends dummy block sequence numbers. Once it receives dummy sequence numbers, it sends out dummy ACKs. The front end subsystem 13022 receives the dummy sequence numbers and sends dummy ACKs. Once a node is sending dummy sequence numbers and receiving dummy blocks, the reset is over, and data blocks are sent with sequence numbers starting at zero. The front end subsystem 13022 at this point, transmits a status message to the network subsystem 13028, specifying which control subsystems 13016 have successfully reset, and which have not.

Data from the control subsssystems 13016 (via the switch/multiplexer 13010) to the front end subsystem 13022 is read into a data buffer. This buffer contains a block of data from each control subsystem 13016 and from both front end subsystems 13022. The front end subsystem 13022 then performs CRC checking on each block.

If the CRC check fails, a NAK is placed in the outgoing block. If the CRC check succeeds, an ACK is placed in the outgoing block.

If the block sequence number is the expected block sequence number, messages are de-blocked and put out on a queue for transmission to the network subsystem 13028. The ACK bytes from the received block are then processed. If an ACK byte indicates an acknowledgement for a dummy block, it is ignored. If the ACK byte is for a particular block sequence number, it is marked off in the outgoing block queue entry for the block sequence number. If the queue entry indicates that all required nodes have ACKed the block, the block is removed from the queue.

If a NAK is encountered, the outgoing block queue is scanned to locate the last block not ACKed by all nodes, and retransmission begins at that point.

After a specified number of NAKs are received (as determined by SYSGEN parameter) from any given node, an error message is sent from the front end subsystem 13022 to the network subsystem 13028, informing the network of the failure (NAK alert).

Network Subsystem/Front End Subsystem Protocol

The network subsystem/front end subsystem protocol is an interface between the network subsystem 13028 and the front end subsystem 13022, and is provided by the following hardware interfaces: the DRV11-B in connection with the LSI-11 CPU 14018, the DR11-W in connection with the PDP-11 CPU, and the front end subsystem DMA interface in connection with the front end subsystem CPU 40002.

The DRV11-B and DR11-W interfaces each provide a DMA interface to the network subsystem 13028. For the purposes of this interface, the network subsystem 13028 acts as the master device, and the front-end subsystem 13022 acts as the local slave device (i.e., data transfers from the network subsystem 13028 to the front end subsystem 13022 have priority). Details concerning the DRV11-B interface are found in DEC's Microcomputer Interfaces Handbook; and details concerning the DR11-W interface are in the most recent version of the PDP-11 Peripherals Handbook. Note that the idle state of the DRV11-B or DR11-W is the interrupt enable state.

The interface between the front end subsystem 13022 and the DRV11-B or DR11-W consists of the following hardware signals: ATTN, CYCLE REQUEST, BA INC ENB, WC INC ENB, SINGLE CYCLE, C0, C1, READY, BUSY, AOO, INIT V2, INIT, FUNCTION 1, FUNCTION 2, FUNCTION 3, STATUS A, STATUS B, STATUS C. The network subsystem 13028 can manipulate and examine via software only the three FUNCTIONs, ATTN, the three STATUS bits, and the 16 input and 16 output lines. The front end subsystem 13022 can manipulate via software the three FUNCTION bits, C0, C1, ATTN, and the 16 input and 16 output lines. Note that all other interface lines are controlled by hardware. The front end subsystem 13022 uses the C0 and C1 lines to control direction flow of the DMA (C0-0, C1=0, DMA occurs towards the front-end, and C0=0, C1=1 DMA occurs towards the network subsystem 13028).

Handshaking commands are sent to the front end subsystem 13022 by the network subsystem 13028 via function bits 1 and 3. Whenever a new command is sent by the network subsystem 13028, it acts to interrupt the front end subsystem 13022 by raising function bit 2 high and then low again. Handshaking commands are sent to the network subsystem 13028 by the front end subsystem 13022 via status bits A and C. Whenever a new command is sent by the front end subsystem 13022, it interrupts the network subsystem 13028 by use of the ATTN bit.

The network subsystem 13028 (in order to initiate a message transfer) loads a network to front end transfer request function code into the function bits of the control/status register (CSR) of the network to front end DRV11-B (DR11-W), which interrupts the front end subsystem 13022 by setting function bit 2, and waits for it to proceed or provide status from the front end. The front end subsystem 13022 accepts the request for message transfer by reading the function bits and responding with a proceed status using status bits A and C and causing an interrupt via the ATTN. The front end subsystem 13022 rejects the message by setting either a wait status or a front end to network transfer request status and causing an interrupt. Otherwise, the front end subsystem 13022 sets a proceed status, and then sets up its DMA channel for 129 words (max count+1) and begins to transfer.

If the network subsystem 13028 receives a proceed status, the network subsystem 13028 sets the GO bit. The message is transferred and the network subsystem 13028 sends a transfer complete function, which interrupts the front end subsystem 13022 via function bit 2 upon the end of transfer. The front end subsystem 13022 then examines the message to determine how many bytes were transferred. If the network subsystem 13028 receives a wait status, it waits for a proceed or front end to network request.

If the network subsystem 13028 receives a front end to network transfer status, the network subsystem 13028 requeues the output request. If the network subsystem 13028 accepts the message, a DMA transfer is set up with a proceed function to the front-end with the WCR register being set up for 129 words in the DRV11-B (DR11-W) and the GO bit set (status bit 2, which is not pulsed to interrupt the front-end). If the message cannot be accepted, a wait function (GO bit not set) is sent to the front end subsystem 13022. The status bit 2 is pulsed to interrupt the front end subsystem 13022, and the proceed function is sent when possible.

The front end subsystem 13022 may originate a message by selecting a front end to network transfer status and by interrupting the network subsystem CPU 14018 via the ATTN line. The network subsystem 13028 responds with either a proceed and GO or wait function with status bit 2 pulsed. If a proceed and GO is given, and the DMA occurs, then the front-end 14004 selects a transfer complete status, and pulses ATTN. If, however, the network had responded with a wait function, the front end subsystem 13022 tries again by resending the front end to network request status at the end of a specified timeout. Once the transfer is complete, the network subsystem 13028 examines the message length to determine how many bytes were transferred.

The following table sets forth the function/status bit definition (handshaking commands):

TABLE

|  | Function Bits | |
| --- | --- | --- |
|  | 3 | 1 |
| Network to Front-End Transfer Request | 1 | 1 |
| Proceed/Idle/Transfer Complete Function | 0 | 1 |
| Wait Function | 1 | 0 |
| Off-line/Power Down | 0 | 0 |
|  | Status Bits | |
|  | C | A |
| Front-End to Network Transfer Request | 1 | 1 |
| Proceed/Idle/Transfer Complete Function | 0 | 1 |
| Wait Function | 1 | 0 |
| Off-line/Power Down | 0 | 0 |

A time-out facility is implemented for error recovery and initialization of the interface. If a response is not received within a specified time determined at SYSGEN, reset requests are issued periodically until a proceed response is received.

Software Processing

Task Dispatcher

The front end subsystem executive/task dispatcher controls all subsystem functions. The first function of the executive/task dispatcher is to initialize the control variables, the hardware, and the interrupt vector table.

Following initialization, the executive/task dispatcher cycles until a task is scheduled to be executed. If more than one task is ready for execution, the executive/task dispatcher gives control to the task with the highest priority. Once a task completes its function, control is returned to the executive/task dispatcher. If no tasks are ready to run, the executive task dispatcher returns to a system idle state.

The executive task dispatcher is non-preemptive, i.e., all tasks run to completion before another task can be given control. Only hardware interrupts can temporarily suspend task processing.

Tasks are scheduled via the event timer (i.e., at some multiple of the real time clock) or are scheduled immediately by setting a task dispatcher flag.

Task Processing

When a transmit block interrupt occurs, the interrupt service routine schedules the front end/control CPU block task. This task is responsible for generating the next block and moving it to the switch/multiplexer interface buffer for transmission to all control subsystems 13016 and the other front end subsystem 13022.

If the GO flag is set, then a GO block is built which contains no data and this block is sent to all control subsystems 13016 for each block in a superframe. This block directs the control subsystems 13016 to switch the active and inactive bit maps in the switch/multiplexer 13010. Control is then returned to the task dispatcher.

If the GO flag is not set, then a retransmit flag, which is set in the receive block task is examined. If the flag is set, then retransmission is required. The last block not ACK'ed by all active control subsystems 13016 and the other front end subsystem 13022 (if active), then the block is retrieved from a retransmit queue. This block is then moved to the switch/multiplexer interface transmit buffer 40030 for transmission.

If neither the GO flag nor the retransmit flag is set, then message data is moved sequentially to a free transmit buffer 40030 until the transmit buffer 40030 is full. If the message queue is empty before the transmit buffer 40030 is full, then the remainder of the transmit buffer 40030 is padded with a special character. The block sequence number and the ACK/NAK fields are then inserted into the transmit buffer 40030. A CRC is computed on the transmit buffer data and this buffer data is moved to the switch/multiplexer interface 40006. In addition, if the block contains message data, the block is saved on a retransmit queue.

If the message queue is empty, then a dummy block sequence number and the ACK/NAK fields are inserted into the transmit buffer. A CRC is computed on the dummy block and this block is moved to the switch/multiplexer interface 40006. Control is then returned to the task dispatcher.

Receive Task Processing

When a receive block interrupt occurs, the interrupt service routine schedules the front-end subsystem/control subsystem receive block task via the task dispatcher. This task processes blocks from all control subsystems 13016 and both front end subsystems 13022. Note that a front end subsystem 13022 performs a CRC check on its own data and maintains ACK/NAK statistics.

Sequentially, a block of data (from a control subsystem 13016 or a front end subsystem 13022) is passed to the CRC generator/checker logic, and the computed CRC value is compared with the input CRC block value. If not equal, then a NAK is placed in the next transmit ACK/NAK field and NAK statistics are updated. If equal, then an ACK is placed in the next transmit ACK/NAK field.

To coordinate data to and from control subsystems 13016 and the other front end subsystem 13022, a node table is maintained; the table tracks the next expected block sequence number (bsn) from each control subsystem, the last bsn ACK'ed by each control subsystem, ACK/NAK statistics, etc.

Sequentially, the ACK numbers in each block are examined. If the number is one greater (modulo 128) than the entry in the node table, the entry is incremented. When all entries in the list show that a certain block has been received correctly by all control subsystems 13016 and the other front end subsystem 13022, the corresponding block is removed from a retransmit queue and placed on a free transmit queue. If a dummy block sequence number or a block sequence number out of order is received, it is ignored. If a NAK is received, then a retransmission of all un-ACKd blocks is initiated. This task sets a retransmission flag and indicates the starting block sequence number; the transmit block task clears it and performs retransmission.

If the receive block task is temporarily receiving faster than the transmitter is sending, all ACK/NAK fields are inserted with NAKs and no further processing is performed. If the CRC is in error, then the ACK-/NAK field is set to a NAK, and the NAK rate count is incremented. Whenever a NAK is received, the NAK rate count is incremented. These two counts are used to determine error rates. If a threshold rate of NAK transmission is reached, the network sybsystem 13028 is notified.

Assuming the CRC is valid and the input bsn equals the next expected data, messages are unpacked from the blocks and placed on a queue for transmission to the network subsystem 13028. If the queue fills up, NAK's are sent back to the control subsystems 13016 to ensure that there is no data overrun.

Messages between the network subsystem 13028 and the front end subsystem 13022 are transmitted using the same data format. Transmission is accomplished by using DMA transfer between the two subsystems.

Interrupt Handlers

The interrupt service routines are invoked via a hardware interrupt which automatically vectors the software to the appropriate interrupt handler. The interrupt handlers ensure that no volatile information is lost from the currently running task. Typically, the interrupt handlers are able to preempt any running task at any time.

These interrupt routines always take precedence over currently running tasks. Interrupt services routines perform necessary input/output to keep the hardware devices operating as fast as possible.

The watchdog timer interrupt is a catastrophic interrupt and never occurs in a normally operating system. The hardware has a retriggerable monostable flip flop with a time out period of 1.6 seconds. The software ensures that the monostable is retriggered more often than every 1.6 seconds. If the time out elapses, the hardware causes a non-maskable interrupt (NMI) to occur invoking a watchdog timer interrupt handler.

Every 10 milliseconds, the real-time clock interrupt occurs invoking the real time clock interrupt handler. This interrupt handler keeps track of several software timers (counters), and decrements the active timers. If any of the counters become zero, then the appropriate task dispatcher flag is set. If no counters become zero, control is returned to the interrupted task.

The switch/multiplexer transmit block interrupt occurs at the end of every block transmitted by the switch/multiplexer 13010 (and TDMA 13006). This interrupt handler reschedules, via the task dispatcher, the transmit block task to begin building the next transmit block.

The switch/multiplexer last block of superframe interrupt indicates that the next block will be the start of a new superframe. This interrupt is used to synchronize two events which must occur at the start of a superframe.

The end-of-processor interrupt indicates that a DMA transfer is complete. The appropriate control variables are reset to enable the next DMA transfer.

The switch/multiplexer receive block interrupt occurs when data has been received from all control subsystems 13016 and both front end subsystems 13022. This interrupt handler schedules, via the task dispatcher, a receive block task to begin processing the receive block data.

The network interrupt handler is invoked when the network subsystem 13028 has a message to be transmitted or when the network subsystem 13028 responds to a front end subsystem DMA request. Various function bits designate the status of the DMA request. The status information is provided in the network/front end protocol section.

When the network subsystem 13028 requests to transfer a message to the front end subsystem 13022, the front end subsystem 13022 performs the necessary functions to set up the DMA hardware for the transfer. Once the message transfer is complete, the front end subsystem message processor examines the message to determine if processing is required.

If processing is required, message parsing is performed. Examples of messages processed in the front end subsystem 13022 are input/output diagnostics, memory read/write diagnostics, messages which change the processing requirements (i.e., remove a node), etc.

If the message is not destined for the front end subsystem 13022, the message is placed on a transmit message queue. Messages are removed from this queue by the transmit block task for transmission to the control subsystems 13016 and the other front end subsystem 13022.

The USART receive interrupt handler is invoked when an operator depresses any key on the CRT. The character is read in from the 8251 data port and the appropriate action is taken. Normally, the input character is stored in a data buffer. However, if a special control character is recognized, special processing is performed.

The USART transmit interrupt handler is invoked when the 8251 is ready to accept the next character for output. Characters will continuously be output to the CRT until a special character (0FF hex) is recognized. Note that times 3 of the 8253-5 device generates the baud rate for the CRT; the current rate is 2400 baud.

5.6 Control Subsystem

Figure 41:
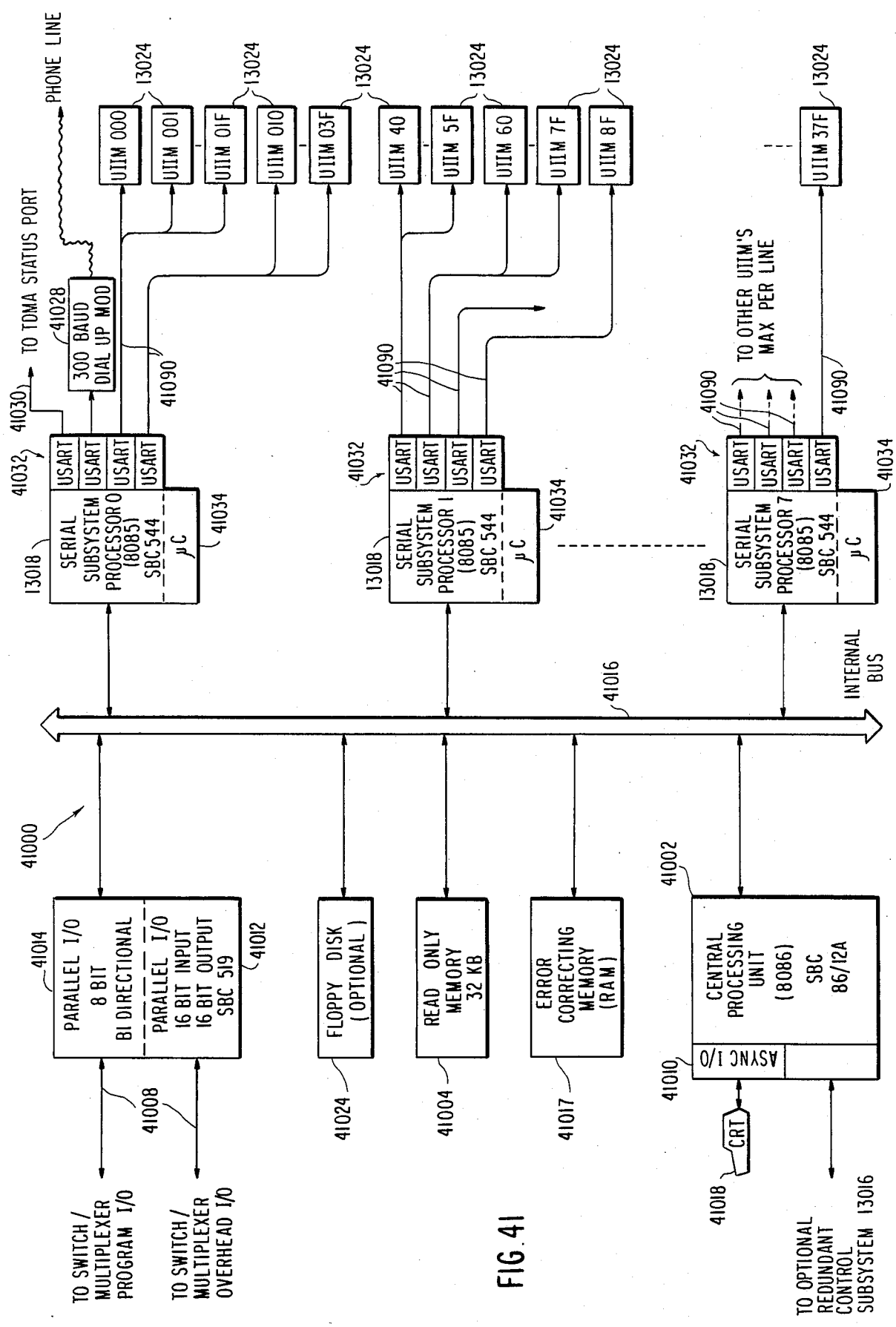
FIG. 41 is a hardware block diagram of some of the components in the control and serial subsystems.
Figure 42:
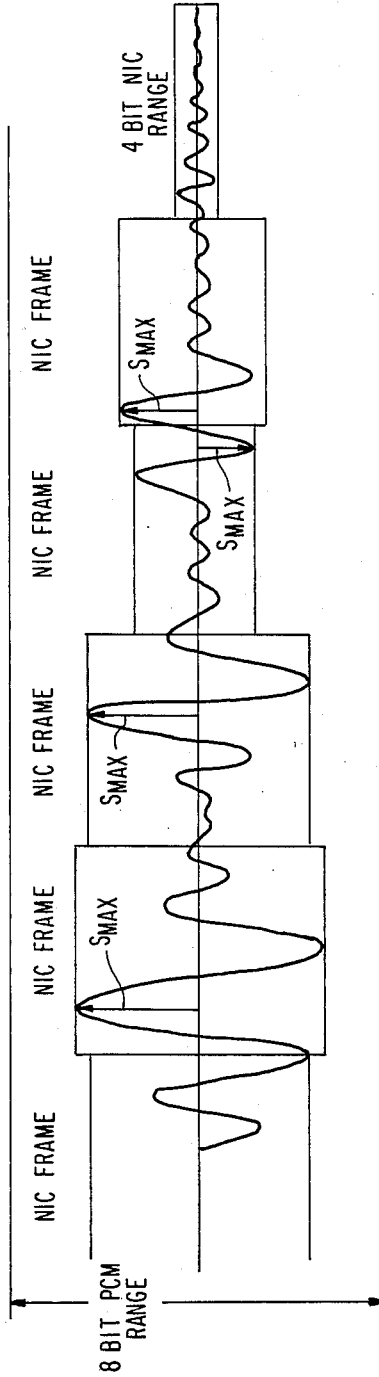
FIG. 42 is a representation of the NIC compressing procedure.

The control subsystem 13016 is shown in hardware block diagram form in FIG. 41. The control subsystem 13016 is a controlling processor whose principal function is the programming and reconfiguration of the attached switch/multiplexer 13010. In addition, the control subsystem 13016 maintains a map (23002) of the current network, topology, provides a communications interface between the on-line network subsystem 14018 and the serial subsystem 13018 (and associated intelligent devices 11008, 11000, and 11012), communicates with the local TDMA terminal 13006, polls non-intelligent devices 11012 for connection/disconnection requests, and provides an operator interface 41010.

In a normal non-redundant configuration, there is one control subsystem 13016 per node. In a redundant configuration, all equipment at the node is redundant. The standby control subsystem 13016 initiates switchover to the redundant equipment upon failure of a watchdog timer being set by the on-line control subsystem 13016.

Generally, the control subsystem 13016 includes a microprocessor 41002 (such as a 16-bit Intel 8086 with at least 32 Kb of error-correction read/write memory 41006 and 32 Kb of read-only memory 41004).

The control subsystem 13016 performs the following basic functions:

1. Initializes hardware and software on system start-up.
2. Provides minimal bootstrap capabilities to down-line load the complete control subsystem 13016 from the on-line network subsystem 13028.
3. Maintains a network connectivity map 23002.
4. Calculates from connectivity map 23002 a switch-/multiplexer bit map 24016 and programs the switch-/multiplexer inactive bit map 24016.
5. Implements, synchronous with the superframe, the map change in response to command from the on-line network subsystem 13028.
6. Provides a communications path between the network subsystem 13028 and any user interactive interface modules (UIIMs) 13024 (connected to intelligent devices, such as digital dialers 11012).
7. Processes connectivity requests from non-intelligent channels and transmits these requests to the on-line network subsystem 13028.
8. Commands the local TDMA subsystem 13006 to perform diagnostics and/or to receive status information from the TDMA via the serial subsystem 13018.
9. Monitors (polls), for diagnostic purposes, the status of the switch/multiplexer 13010 and the serial subsystems 13018.
10. Provides an operator interface 41010 at the same four levels of security described in connection with the network subsystem 13028 by relaying of operator inputs to the on-line network subsystem 13028 and displaying responses from the on-line network subsystem 13028. In addition, local operator inputs are processed to perform diagnostics, loopbacks, interface checks, and other tests.
11. Provides remote access via a modem interface 41028 through the serial subsystem 13018.
12. Provides an interface to the serial subsystem 13018.
13. Provides the diagnostic mechanism to maintain node integrity.
14. Provides the mechanism to transmit error logging information to the on-line network subsystem 13028.

The control subsystem 13016 is in constant communication via the front end subsystem 13022 with the on-line network subsystem 13028. The control subsystem 13016 executes commands from, and dispatches requests to, the network subsystem 13028. A local operator may query the local node or ask for information about any other node via a CRT terminal 41018 connected to an input/output port 41010 at the control CPU 41002. The operator's request is transmitted to the on-line network subsystem 13028 to determine the information needed to respond to the operator's query. Note that the communication link between the on-line network subsystem 13028 and the control subsystem 13016 takes place over the TDMA satellite path. There is a parallel input/output path 41012, 41014 within the control subsystem 13016 to implement this communication link.

As stated previously, the main task of the control subsystem 13016 is the programming and reconfiguration of the switch/multiplexer 13010. As new customer terminals are brought on-line and off-line, new network connectivity maps 23002 are implemented, baud rates are changed, and the control subsystem 13016 reconfigures the switch/multiplexer 13010. Parallel input/output 41014 within the control subsystem 13016 is provided to accomplish this function.

Due to the complexity of the control subsystem 13016, remote hardware and software diagnostic capabilities are incorporated. Hardware diagnostics are further subdivided into: (1) on-line automatic monitoring and verification, and (2) user interactive preventive maintenance and diagnostics.

The control subsystem 13016 must occasionally obtain information from its associated TDMA terminal 13006. This information includes status/verification and diagnostics. A serial synchronous interface port in the serial subsystem 13018 is dedicated for this purpose and is connected to a bus 41030.

In order for the control subsystem 13016 to determine routing of calls (both voice and data), it communicates with remote intelligent devices generating dialed numbers. Such intelligent devices include auto dialers, digital dialers, voice digitizers with telephone dialing 13020, etc. An interactive serial subsystem 13018 performs the polling for this task and interrupts the control subsystem 13016 with this control information. Note that up to 8 serial subsystems 13018 may be employed with one control subsystem 13016 for this control (polling and select) function.

In one configuration, the main processor board in the control subsystem 13016 is an Intel SBC86/05A single board computer. This board provides: a 16-bit 8 MHz model 8086 microprocessor 41002, space for 32 kb read-only memory 41004, 16 kb of dual-port read/write memory (not used), 24 parallel I/O lines 41008, a USART 41010 for connection to the CRT terminal 41018, two timers used as a real-time clock and as a watchdog timer, and eight levels of interrupt. A single-bit error-correcting read/write memory 41006 is incorporated for increased reliability. Note that the memory size is in increments of 64 kg up to a maximum of 512 kb on a single board with a system maximum of 1 Mb. The amount of memory in the control subsystem 13016 depends on the complexity of the node; 64 kb is the nominal amount. Initial program bootstrap loaders are programmed in the read-only memory 41004; executable code is stored in read/write memory 41016. Note that the executable code is stored in read/write memory 41016 and not in ROM 41004 so program changes can be implemented quickly. Normally, the control subsystem CPU 41002 is down-line loaded from the network subsystem 13028, but battery backup is available.

The control subsystem 13016 utilizes the Intel RMX/88 operating system. The control subsystem 13016 software employs PL/M-86 (high level language) and ASM-86 (assembly language).

The termination and activation of a control subsystem 13016 is described in the next portion of this section.

The on-line network subsystem 13028 issues a shut down (SHD) message to the control subsystem 13016 to be terminated which results in disconnections of all channels active at that node. The control subsystem 13016 responds to the shut down message with an off the air (OFF) message and then begins transmitting dummy blocks. The on-line network subsystem 14018 then issues a change status (CST) message to the front end subsystem 13022, indicating that the specified node is no longer operational. The front end subsystem 13022 responds to the CST message by marking the node down. The on-line network subsystem 13028 modifies the network status file 35020 to indicate that the specified node is now down, and modifies the channel status/priority file 35018 to indicate that all channels at that node are now down. The on-line network subsystem 13028 at this point discards any messages received from the de-activated node, but records the receipt of the message in the error log file 35046. The control subsystem 13016 generates and transmits a shut down message for each of its serial subsystem 13018. The control subsystem 13016, while in a de-activated state, discards any incoming messages from the front end subsystem 13022 except a reset message (which reset message causes re-activation).

If a control subsystem 13016 is powered OFF while in a de-activated state and is subsequently powered back ON, it re-initializes protocol with the front end subsystem 13022, but is restricted from becoming re-activated (i.e., requesting down-line load) until such time as the on-line network subsystem 13028 re-activates the node and informs the front end subsystem 13022 (via a change status message) that the node is again functional. In other words, should the front end subsystem 13022 receive a reset block from a de-activated node, the front end subsystem 13022 notifies the on-line network subsystem 13028, but does not initialize protocol with the node until receiving a change status from the network subsystem 13028, indicating that the node is again operational. When a node is re-activated, it must request a down-line load.

The control subsystems 13016 switches over to the back-up network subsystem 13028 as a result of the following conditions:
protocol failure,
loss of network subsystem operating (NSO) message from the on-line network subsystem 13028, or
receipt of an illogical message from the on-line Network Subsystem.

The control subsystem input/output interfaces 41012 and 41014 provide an error-protected protocol for all overhead information passed between the network subsystem 13028 and the control subsystems 13016. This information includes the following:

1. new connectivity map 23002 information to all control subsystems 13016;
2. requests for change in service from a control subsystem 13016 to the on-line network subsystem 13028;
3. passing of dialed numbers from a control subsystem 13016 to the on-line network subsystem 13028;
4. down-line loading of control subsystems 13016 and serial subsystems 13018;
5. status information requested/commands by an operator at a control subsystem 13016;
6. information to be displayed at a control subsystem 13016 in response to operator requests;
7. solicited and unsolicited ICC status information;
8. error detection; and
9. transparent throughput of diagnostic information in response to requests from any system console to a destination network or console subsystem 13028, 13016, respectively.

The software at the control subsystem 13016 supports the following functions:

1. Polling for connection/disconnection requests from its associated switch/multiplexer 13010.
2. Performing the control subsystem 13016 mapping functions.
3. Providing a communications interface between the network subsystem 13028 and its associated serial subsystems 13018.
4. Performing utility functions through an operator interface (41010) such as local diagnostics and transmission requests to the network subsystem 13028.

The RMX-88 executive provides task dispatching and interrupt processing functions for the control subystem 13016. RMX-88 is fully described in *Introduction to the RMX-80/88 Real-Time Multitasking Executive* (142238-002).

Interrupts are processed on a prioritized basis. Interrupts are received as a result of input from the following seven external sources: Watch-dog timer, RAM errors realtime clock, switch/multiplexer 13010, serial subsystems 13018, and the CRT input and output (13010). The interrupt processor schedules the appropriate task via the executive dispatcher.

The operator command interface 41010 provides the basic interface between the control subsystem console 41018 and the control subsystem 13016. It accepts commands from the console 41018, and routes the command to the network subsystem 13028 for processing or, if appropriate, to the appropriate command processor within the control subsystem 13016.

All message processing is controlled by the block I/O interrupt service routine which determines if the service to be performed comprises block input or block output and which initiates the appropriate action to be taken.

Block input processing

The block input task receives blocks transmitted from the front end subsystem 13022. The primary functions of this task are to validate the cyclic redundancy check (CRC), to acknowledge (or negative acknowledge) the block based on the result of the CRC check, to validate the block sequence number and to assemble complete messages from the blocks.

The message dispatcher task receives messages from the block input task and determines, by examining the message type, whether the intended message destination is the control subsystem itself or a lower-level subsystem (in the case of ambiguity, the message destination field is further verified to determine the destination subsystem).

If the message dispatcher task determines that the intended message destination is a lower-level subsystem, the serial subsystem-control subsystem interface task is initiated which decodes the destination field and initiates message transmission to the appropriate serial subsystem. If the task determines that the destination is the control subsystem itself, the message processing task is initiated which evaluates the message data and takes the appropriate action.

Block output processing

The block creation task receives messages which are stored on a FIFO queue for output to the front end subsystem 13022. This task assembles blocks from the messages, inserts the appopriate block sequence number at the beginning of each block, and calculates a cyclic redundancy check which is then inserted at the end of the block. The task then initiates output of the completed block to the front end subsystem 13022.

The control subsystem 13016 and the serial subsystem 13018 transfer messages via 8K of dual port RAM. This interface is fully described in the Serial Subsystem section of this document.

The error message processor provides the capability of transmitting error messages to the network subsystem 13028. Any error detected by a control subsystem 13016 formats the error message and queues the message to the appropriate task.

The initialization processor performs basic initialization functions, including down-line loading from the network subsystem 13028, and establishment of the control subsystem 13016 communications link. The initialization processor includes the bootstrap program, and the start-up function.

The bootstrap program's function is to provide all functions necessary for the network subsystem 13028 to down-line load the control subsystem 13016 software. Note that the switch/multiplexer initialization must program the switch/multiplexer 13010 to establish communication. The bootstrap program interfaces with the switch/multiplexer communications link.

The system start-up function provides for the warm/cold start of the control subsystem 13016. The network subsystem 13028 sends a message to the control subsystem 13016 indicating that a warm or cold start-up is requested. For a warm start, connections remain as defined at shut-down. In contrast, for a cold start, the control is brought up in its initial state. The system start-up interfaces with the switch/multiplexer communications interface.

The map control processor processes map change requests from the network subsystem 13028 and performs the necessary programming of the switch/multiplexer 13010. The functions include modifying the connectivity map 23002, calculating the map-checksum, verifying the checksum, and reprogramming the inactive switch/multiplexer bit map.

The map switch processor processes the "GO" command from the network subsystem 13028 and exchanges the active and inactive switch/multiplexer bit maps 24016 synchronous with the superframe. Interfacing is accomplished through the switch/multiplexer programming interface.

The switch/multiplexer interface provides the basic I/O interface between the switch/multiplexer 13010 and the control subsystem 13016. It is comprised of the switch/multiplexer input processor and the switch/multiplexer output processor.

The switch/multiplexer polling processor polls the switch/multiplexer 13010 for connection requests from non-intelligent (i.e., non micro-processor controlled user devices) and routes the requests to the network subsystem 13028. It is comprised of an initialization function, a switch/multiplexer polling controller, a connection processor, and a disconnection processor.

The initialization function, activated as a part of each initialization or "cold start", creates a file, resident within the control subsystem 13016 RAM 41006 which lists each user device which is not under UIIM 13024 control (i.e., in which the control must poll for connection). When this has been completed, the polling function is set for activation every 2 seconds.

The switch/multiplexer polling controller polls the switch/multiplexer 13010 to determine if any user devices have requested connection or disconnection. The controller polls those channels not under UIIM 13024 control and compares the interface pin status against the current pin status table. If the pin status has changed, a comparison is made to determine if a connection or disconnection is being requested. If a request is detected, the appropriate message is generated and transmitted to the Network Subsystem for processing.

The control subsystem 13016 maintains a message processor for each message type received. The message processors perform whatever action is requested by the message and routes required responses to the appropriate destination.

The redundancy processor provides the capability to operate a redundant control subsystem 13016, and includes updating the back-up control subsystem 13016 to keep its mapping current and, when necessary, switches control to the back-up control unit. The redundancy processor includes a watch-dog processing timer, a switchover processor, a switchover command processor, an update processor-on-line (primary), and an update processor-back-up (secondary).

The watch-dog processing timer receives control once per second. If the back-up control times-out (i.e., the timer has not been set by the primary within the last second), the back-up control subsystem 13016 demands control. If the timer is not reset within the prescribed time period, control is switched by the hardware to the alternate unit.

The switchover processor receives control to switch control subsystems 13016 upon receipt of a command from the on-line network subsystem 13028. The processor resets the bit, which indicates that a switchover is desired, and then assumes a back-up status. The processor also sets the malfunction bit in the hardware redundancy processing equipment. The hardware then switches control to the alternate unit. The switchover processor interfaces with the hardware redundancy processor. Messages to switch control (from the network subsystem 13028) are provided as inputs, and outputs are provided in the form of messages to the back-up unit for relinquishing control.

The switchover command processor receives control as a result of an operator command to switch control subsystems 13016. The command processor validates the operator command and, if all checks pass, transfers control to the switchover processor. Operator commands to switch control subsystem 13016 are its inputs, and it provides outputs in response to operator commands.

The update processor-on-line (primary) is responsible for udating the back-up control subsystem 13016 each time a new connectivity map 23002 is calculated and each time a modification is made to its channel type file 35002. The inputs consist of control received from the meassage processor, and the outputs comprise messages to the back-up unit.

The update processor-back-up (secondary) functions to receive and acknowledge update information from the on-line control subsystem 13016. Its inputs are update messages. Its outputs are acknowlegement and negative acknowledgement commands.

When the buffer becomes full, the control subsystem 13016 performs CRC checking. If the CRC checks fails, a NAK is added to the control subsystem 13016 ACK list for transmission to the front end subsystem 13022. If the CRC is valid, the block sequence number in the block is checked against the expected block sequence number. If they are equal, the block is queued to the message processor. If the block sequence number indicates a dummy block, no further processing is performed.

5.7 Serial Subsystem

The serial subsystem 13018 is responsible for the polling and transmission of information to intelligent customer devices (such as PABX 11008, telephone 11010, and modem 11012). The serial subsystem 13018 also provides a communications interface between the control subsystem 13016 and the TDMA 13006 or modem 41028.

The serial subsystem 13018 is comprised of an Intel 8085 8-bit microprocessor designated generally by reference numeral 41034. Microprocessor 41034 has four USART (universal synchronous/asynchronous receive/transmit) designated generally by reference numeral 41032. The microprocessor 41034 communicates with the microprocessor 41002 over a common bus 41016. The microprocessor 41034 communicates with the remote dialers or UIIM's (32 typically) by way of a balanced line, multidrop, polled asynchronous line 41090 via the USARTs. Each serial subsystem 13018 is capable of supporting 128 remote dialers (32 per USART 41032); several serial subsystems 13018 are required if more remote dialers are configured. A maximum of 8 serial subsystems 13018 can be accommodated by a control subsystem 13016. One USART 41032 on the first serial subsystem 13018 is reserved for a control interface (HASP protocol) on bus 41030 to the TDMA terminal 13006; a second USART 41032 on this serial subsystem 13018 is reserved as a interface with a modem 41028 to allow remote operator command entry.

The serial subsystem 13018 performs the following basic functions:

1. Initializes hardware and software on system start-up.
2. Provides a status port interface between the local TDMA 13006 and the control subsystem 13016 in accordance with defined protocol.
3. Provides a front end interface between the modem 41028 and the control subsystem 13016.
4. Polls the user interactive interface modules (UIIM) 13024 and transmits to the interface module information passed through the serial subsystem 13018, in accordance with defined protocol, from the control subsystem 13016.
5. Provides the mechanism to transmit error logging information to the control subsystem 13016.

Termination/Activation of a serial subsystem 13018 occurs as follows:
1. The network subsystem 13028 issues a shut down (SHD) message to the serial subsystem 13018 to be terminated.
2. The network subsystem 13028 modifies the network status file 35020 to indicate that the specified serial subsystem 13018 is now "down," and modifies the channel status/priority file 35018 to indicate that all channels at that serial subsystem 13018 are now down.
3. The network subsystem 13028 discards at this point any messages received from the de-activated serial subsystem 13018 but records the receipt of the message in the error log file 35044.
4. The serial subsystem 13018, in response to the shut down message, disables all UIIM's 13024 at that serial subsystem 13018. Note that a UIIM 13024 which has been "removed from" the serial subsystem's 13018 poll list times out and generates a busy signal if attempting to transmit a request for connection.
5. The serial subsystem 13018, while in a de-activated state, will discard any incoming messages except a reset message (which causes re-activation).

The serial subsystem 13018 interface provides a mechanism for building messages in the serial subsystem's 13018 memory and for processing I/O interrupts to control the message flow between CPUs. The information flow includes both commands and control data. The serial subsystem 13018 passes information from other interfaces that must be processed by the control subsystem 13016. This processing supports the following functions:

1. Modem 41028 line interface—This input/output allows a remote terminal (not shown) to function as the control system console 41018 by transparently passing received information from the serial subsystem 13018 to the system console 41018 routines. This input/output restricts system access by way of detecting a password.
2. TDMA control interface—This input/output via bus 41030 provides solicited and unsolicited status and diagnostic information from the TDMA 13006. It also allows the control system console 41018 to function as a virtual slave TDMA operator console. This input/output provides the front end processing for the error protected protocol.
3. UIIM 13024 interface—This interface passes information bound for the network and control subsystems 13028, 13016, respectively, in a transparent mode. It receives solicited and unsolicited status and diagnostic information. It passes information from the network subsystem 13028 to the user interactive interface modules 13022. It also sends control information to the user interactive interface modules 13022.

The software at the serial subsystem 13018 supports the following functions:

1. Provides a communications interface with the TDMA 13006.
2. Provides a communications interface with the modem 41028.
3. Polls and transmitting information to the user interactive interface modules (UIIMs) 13024.

The interrupt processors are comprised of: a real-time clock interrupt processor, a control subsystem input interrupt processor, a control subsystem output interrupt processor, a modem input interrupt processor, a modem output interrupt processor, a TDMA input interrupt processor, a TDMA output interrupt processor, a UIIM input interrupt processor, a UIIM output interrupt processor, and a modem ring interrupt processor.

The interrupt processors service interrupts, perform all necessary interrupt processing, and schedule the appropriate dispatcher processors via dispatcher tables. Interrupt processing is performed on a prioritized basis. Interrupt processors are described later. Interfaces include the following: (1) a control subsystem interface—4K RAM memory via Intel's MULTIBUS, (2) a Modem interface—UART, (3) a UIIM interface—UART, (4) a TDMA interface—UART, (5) a real-time clock interface, (6) a watch-dog timer, and, (7) a modem interface—control leads. Inputs include: (1) Messages from the control subsystem; (2) Characters from a remote terminal via modem; (3) Characters from a user interactive interface module; (4) Characters from the TDMA; (5) Interrupts at a specified time slice (realtime clock); (6) Interrupts at a specified time slice (watch-dog timer); and (7) Interrupts from a modem (ring). Outputs include: (1) Messages to the Control Subsystem; (2) Characters to a remote terminal via modem; (3) Characters to a UIIM, (4) Characters to the TDMA, and (5) a Modem control to answer the telephone.

This real-time clock interrupt processor services the real-time clock interrupt. It searches the enable/disable entry in the dispatcher table, and for any message processor which is enabled, it decrements the correponding time entry in the dispatcher time table. Interfacing is accomplished through the real-time clock. Inputs are received from the dispatcher table. Outputs flow to dispatcher table.

The control input interrupt processor services the interrupt when the control subsystem 13016 writes a data word into the first word of the serial subsystem RAM. If the CS-TO-SS-COMMAND is "1", it typically enables the control subsystem input processor; if "0", then the control subsystem output processor is enabled. Interfacing is through a 4K RAM memory via the bus 41016 interrupt lines. Inputs arrive in the form of a message from the control subsystem 13016. Outputs are sent to the dispatcher table.

The modem input interrupt processor services the interrupt when the serial subsystem 13018 receives an 8-bit character from a remote terminal. If the character is not the last character of the input message, it is stored in a message buffer. When the last character is encountered, the modem 41028 input message processor is scheduled and the modem timeout processor disabled, via the enable/disable entry in the dispatcher table. Interfacing is accomplished through a UART 41032. Inputs include an 8-bit character from the remote terminal and arrive through an input message buffer/pointer and counter. Outputs are directed to the input message buffer/pointer and counter and the dispatcher table.

The modem 41028 output interrupt processor services the interrupt when the serial subsystem 13018 transmits an 8-bit character to a remote terminal. If the character is not the last output character of the output message, the next character is transmitted to the remote terminal. When the last character is transmitted to the remote terminal, the output interrupt is disabled, the input interrupt enabled, and the serial modem timeout processor is scheduled via the enable/disable entry in the dispatcher table. Interfacing is accomplished through a UART 41032. Inputs arrive from the output message buffer/pointer and counter. Outputs are directed to the output message buffer/pointer and counter and the dispatcher table, and include an 8-bit character sent to the remote terminal.

The TDMA input interrupt processor services the interrupt when the serial subsystem 13018 receives an 8-bit character from the TDMA 13006. If the character is not the last character of the input message, it is stored in a message buffer. When the last character is encountered, the TDMA input message processor is enabled via the enable/disable entry in the dispatcher table. Interfacing occurs through a UART 41032. Inputs consist of 8-bits of data from the TDMA 13006 and arrive through the input message buffer/pointer and counter. Outputs are sent to the input message buffer/pointer and counter and to the dispatcher table.

The TDMA output interrupt processor services the interrupt when the serial subsystem 13018 transmits an 8-bit character to the TDMA 13006. If the character is not the last output character of the output message, the next character is transmitted to the TDMA 13006. When the last character is transmitted to the TDMA 13006, the interrupt are disabled, the TDMA timeout processor is enabled via the enable/disable entry in the dispatcher table, and the input interrupt enabled. Interfacing occurs through a UART 41032. Inputs arrive from the output message buffer/pointer and counter. Outputs include 8-bits of data to the TDMA 13006, the output message buffer/pointer and counter, the dispatcher enable/disable processor table, and the dispatcher time table.

The UIIM input interrupt processor services the interrupt when the serial subsystem 13018 receives an 8-bit character from a UIIM 13024. Every character input is stored in a message buffer. If it is the first input character, then the UIIM poll/select timeout processor is disabled and the UIIM transmission timeout processor enabled. When the last input character is encountered, the UIIM input message processor is scheduled and the UIIM transmission timeout processor is disabled. The UART 13024 input interrupt is turned off. Interfacing occurs through a UART 13024. Inputs arrive from the input message buffer/pointer and counter and include control data from the UIIM 13024. Outputs are sent to the dispatcher table and the input message buffer/pointer and counter.

The UIIM output interrupt processor services the interrupt when the serial subsystem 13018 transmits an 8-bit character to a UIIM 13024. If the character is not the last output character of the output message, the next character is transmitted to the UIIM 13024. When the last character is transmitted to the UIIM 13024, output is disabled, the UIIM poll/select timeout processor is scheduled via the enable/disable entry in the dispatcher table, and input enabled. Interfacing occurs through a UART 41032. Input arrives from the output message buffer/pointer and counter. Outputs include 8-bits of data to the UART 41032, as well as data to the dispatcher table and the output message buffer/pointer and counter.

The watch dog timer interrupt processor services the interrupt caused by a timeout of a programmable counter. When the serial subsystem 13018 is operating properly, the programmable counter is constantly reprogrammed via software. When a fatal error occurs, this function is invoked, causing a subsystem reset and a message to be queued to the control subsystem. Interfacing is accomplished through a timer. Outputs include an error message and a subsystem reset jump.

The modem ring interrupt processor services the interrupt caused by a ring indicator interrupt on the RS232 interface. It turns on data terminal ready and request to send leads, and enables the receiver logic (hardware/software) for this serial interface. The modem time-out processor is scheduled to start in 3 seconds if no data is received. Interfacing is through a modem UART 41032 and modem RS232 leads. Outputs are sent to the dispatcher table.

The dispatcher processor provides the mechanism to invoke a message and a timeout processor at a specific time. The dispatcher maintains a table; entries in the table identify if a processor is enabled or disabled, the time at which processor is to be activated, the starting address of the processor, and an address (index register) to point to the scratch pad area for each input/output processor (one for each UART). The dispatcher searches the enable/disable entry in the dispatcher table and if any processor is enabled and its corresponding timer entry is zero, then the appropriate message processor is invoked. There are no interfaces. Inputs arrive from the dispatcher table. Outputs are sent to the dispatcher table and control is passed to a message processor.

With regard to buffer management, there are a number of designated buffers of 270 bytes each to be used as randomly allocated input buffers. There is a FREE-LIST table which will list pointers pointing to the designated buffers. As a buffer is allocated, a pointer is pulled off the bottom and the entry is zeroed. Reallocated buffers are added to the bottom. Each output processor (one for each UART and one for serial subsystem/control subsystem interface) manages an input and an output message queue. These are circular queues (FIFO) where each each entry is a 16-bit buffer address and a 16-bit length. The message processor pushes entries on the stack when it performs routing, and the output processors pull off entries as they are sent. Each output queue is large enough to hold all possible buffer pointers.

As stated above, the dispatcher processor comprises message processors and time-out processors.

The message processor comprises the following: The control subsystem input processor; the control subsystem output processor; the UIIM poll input processor; the UIIM poll output processor; the UIIM select input processor; the UIIM select output processor; the network message processor; the modem input processor; the modem output processor; the TDMA input processor; the TDMA output processor.

The time-out processors comprise the UIIM poll/select timeout processor; the UIIM transmission timeout processor; the TDMA timeout processor; the modem timeout processor; the watchdog timeout processor.

The control subsystem input message processor processes the message in the serial subsystem/control subsystem communications buffer. This processing is accomplished by analyzing the CS-TO-SS-COMMANDS. If a "1" is present then the message is moved into an allocated buffer area, the command zeroed, and a multibus interrupt is generated. The message processor is then enabled with this allocated buffer in its queue. The control subsystem input message processor is usually scheduled by the control subsystem input interrupt processor. The SS/CS input message processor interfaces with the 4 K RAM memory. It receives inputs from the serial subsystem/control subsystem communications buffer, and provides outputs to the dispatcher table.

The control subsystem output message processor builds the communications buffer when data is to be transferred to the control subsystem 13016. If the SS-TO-CS-COMMAND is a "0," the old output buffer is reclaimed, if appropriate, a new buffer obtained from its queue, the SS-TO-CS COMMAND is set up, an error timeout is started, and a multibus 65010 interrupt is then initiated. If the SS-TO-CS-COMMAND is "1" a multibus interrupt is repeated. Usually the control subsystem output message processor is scheduled by the control subsystem output interrupt processor. The control subsystem output message processor interfaces with the 4 K RAM memory via the Intel MULTIBUS. SS-TO-CS-COMMAND are the inputs, and the outputs are messages to the control CPU subsystem.

The interface for modem 41028 provides the communications interface between the serial subsystem 13018 and a remote terminal. It includes a modem input message processor, a modem output message processor, and a modem timeout processor.

The modem input message processor processes the message from a remote terminal. The modem input message processor parses the input message and performs validation. If no errors are encountered, complete processing of the message is performed and the protocol processing is initiated. If an ACK is received, an output buffer area is reclaimed; if a NAK or error is received, flags are set for the modem output message processor. The modem output message processor is then scheduled, and the network message processor is also scheduled if there is data to be processed. There are no interfaces. Inputs arrive from a message buffer which contains a string of characters to be processed. Outputs are sent to the dispatcher table.

The modem output message processor builds a message which is transmitted to the remote terminal. An input flag designates the appropriate error processing. A new input buffer is allocated from the FREE-LIST; if less than 20% of the pointers are available, then a wait-a-bit message is sent. If no FREE-LIST pointer is available, then a wait-a-bit message is sent. If no FREE-LIST pointer is available, then a NAK is sent, and the input buffer is re-used. If no error processing is needed, then a message is pulled off the output queue and the protocol characters added to the message. After the message is built, the modem output message processor initiates the output of the first character of the message and enables output interrupts. Interfacing occurs through a UART. A flag (which designates the error of input messages) is input to the modem output message processor, and 8-bits of data are sent to the output message buffer/pointer as output.

The modem timeout processor is invoked when a valid sequence has not been received from the remote terminal within 3 seconds. This processor sets the appropriate bits in the status byte to invoke error recovery and then schedules the modem output message processor via the dispatcher table, and disables inputs. Interfacing is accomplished through the UART 41032. A status byte is output to the dispatcher table.

The TDMA interface via a bus 41030 provides the communications interface between the serial subsystem 13018 and the TDMA 13006. It is comprised of a TDMA input message processor, a TDMA output message processor, and a TDMA timeout processor.

The TDMA input message processor, which is scheduled by the TDMA input interrupt processor and activated by the dispatcher, processes the message from the TDMA. The TDMA input message processor determines the message type (ENQUIRY, ACK, NAK, CONTROL-MESSAGE, TDMA-ICC-MESSAGE), performs applicable validation checking (block sequence number checking, block check character checking, detection of pads), completes message processing and schedules the TDMA output message processor via the dispatcher table. If an ACK is received, output buffer area is reclaimed; if a NAK or error is received, flags are set for the TDMA output message processor. The network message processor is scheduled if there is data to process. Inputs arrive from a message buffer. Outputs are sent to the dispatcher table and include a flag which designates the error output response.

The TDMA output message processor builds a message which is to be transmitted to the TDMA 13006. An input flag designates the appropriate error processing. A new input buffer is allocated from the FREE-LIST; if less than 20% of the FREE-LIST pointers are available, then a wait-a-bit message is sent. If no FREE-LIST pointer is available, then a NAK is sent and the input buffer is re-used. If no error processing is needed, then a message is pulled off the output queue and the protocol characters are added to the message. After the message is built, the TDMA output message processor initiates the output of the first character of the message and enables output. Interfacing is accomplished through the UART. A flag (which designates the type of output message) is input. An 8-bit character is output to the dispatcher table and the output message buffer/pointer.

The TDMA timeout processor is invoked when a valid sequence has not been received from the TDMA 13006 within 3 seconds. This processor sets the appropriate bits in the status byte to invoke error recovery and then schedules the TDMA output message processor via the dispatcher table, and disables input. Interfacing is accomplished through the UART. A status byte is output to the dispatcher table.

The UIIM interface provides the basic communications interface between the serial subsystem 13018 and the UIIMs 13024. It is comprised of the UIIM poll input processor, the UIIM select input processor, the UIIM polling output processor, the UIIM select output processor, the UIIM poll/select timeout processor, and the UIIM transmission timeout processor.

The UIIM poll input processor analyzes transmissions from the UIIMs. It performs block control character (BCC) error checking and block sequence number checks. The status byte is updated to flag the UIIM poll output processor on what needs to be sent next. If a message is received which needs to be routed, the network message processor is scheduled and the buffer pointer pushed on its queue. The UIIM output processor is also scheduled. A message from a UIIM is input. Outputs are provided to the dispatcher enable/disable table and the status bytes are sent to the network message processor queue.

The UIIM select input processor validates responses received from the UIIMs during transmission sequences to the UIIMs. If a NAK is received, the old buffer is requeued. If an ACK is received, the old output buffer is reclaimed. The status byte is updated to flag the UIIM output processor and the UIIM output processor is scheduled. Messages from the UIIM 13024 are input. Status bytes are output to the dispatcher enable/disable table.

The UIIM polling output processor coordinates the receiving of messages from the UIIM. It first ensures that the UIIM input processor starts address entry in the dispatcher table points to the UIIM poll input processor; then it allocates an input buffer from the FREE-LIST. If none are available, no further processing occurs and the UIIM poll output processor is rescheduled via the dispatcher table. It then checks the status byte to determine what error processing needs to be performed. If none need to be performed and there is no polled transmission sequence occurring, the output queue is checked for any messages to be sent; if any messages are to be sent, the UIIM output processor start address entry in the dispatcher table is set to point to the UIIM select output processor, it is scheduled, and this processor terminated.

If the status byte indicates that a polled sequence is not occurring and the output queue is empty, then initial polling occurs. A UIIM active/inactive list is maintained and initiates the transmission of the polling sequence to each UIIM that is active, to determine if it has information to read. If, after two successive passes through the UIIM active/inactive list, a response has not been received, the UIIM address is removed the active list, this processor uses one entry out of the inactive list and poll it to see if the UIIM 13024 is now active. Interfacing is accomplished through the UART 41032. Inputs arrive in the form of Status bytes from the FREE-LIST and the UIIM Active/Inactive list. Outputs in the form of status bytes are sent to the UIIM active/inactive list, the output buffer pointer, and the dispatcher table.

The UIIM select output processor coordinates the transmission of messages to the UIIM. It first ensures that the UIIM select input processor start address is set on the dispatcher table. It then allocates an input buffer from the FREE-LIST; if none are available, no further processing occurs. The UIIM output processor start address entry in the dispatcher table is set to point to the UIIM poll output processor and is rescheduled via the dispatcher table. If the FREE-LIST is not empty, then the status byte is checked to determine what error processing is to be performed. If this indicates that no transmission is active, the output queue is checked. If empty, the UIIM poll output processor entry in the dispatcher table is set to point to the UIIM poll output processor, and scheduled. If not empty, a select message is created to be sent to the appropriate UIIM and the status byte is updated and the message sent. Interfacing is accomplished using the UART. Inputs include a status byte and a connection to the FREE-LIST. Outputs consist of an output buffer pointer, a status byte, and information to the dispatcher table.

The UIIM poll/select timeout processor is invoked when no response is received within 25-milliseconds of the polled/select transmission. This processor sets the appropriate bits in the status byte to invoke error recovery. It then schedules the UIIM output processor via the enable/disable entry in the dispatcher table. Interfacing is through the UART. A status byte is output to the dispatcher table.

The UIIM transmission timeout processor is invoked when a valid complete sequence is not received within 300-milliseconds of the last serial subsystem to UIIM transmission. This processor sets the appropriate bits in the status byte to invoke error recovery. This processor then schedules the UIIM output processor via the dispatcher table and disables input. Interfacing occurs through the UART. A status byte is output to the dispatcher table.

The initialization task provides basic initialization functions including downline loading from the network subsystem and establishment of serial subsystem communication links. It is comprised of a bootstrap program and a system start-up function.

The serial subsystem 13018 maintains a bootstrap program whose function is to provide the capability for the network subsystem 13028 to down-line load (via the control subsystem 13016) the serial subsystem software. 4 K RAM provides the serial subsystem/control subsystem interface. Serial subsystem software provides the input.

The subsystem start-up function provides a cold-start capability for the serial subsystem 13018. Subsystem start-up will include provisions for the following:

1. Initializing tables, buffers, and pointers;
2. Setting-up of the real-time clock interrupt;
3. Scheduling the processor to initialize communications protocol with the TDMA 13006; and
4. Scheduling the processor to initiate communications protocol with the UIIMs 13024.

A real-time clock provide interfacing. Outputs are sent to the dispatcher table, the UIIM active/inactive table, the TDMA input message buffer and pointer, the TDMA output message buffer and pointer, the UIIM input message buffer and pointer, the UIIM output message buffer and pointer, the modem input message buffer and pointer, and the modem output message buffer and pointer.

The network message processor processes messages from a UIIM 13024, the control subsystem 13018, and from a remote terminal. The message type (RDL, XEQ, etc.) and destination are unpacked and analyzed. If the destination code designates a subsystem other than the serial subsystem 13018, the message pointer and length are pushed onto the appropriate output message queue. If the destination code specifies the serial subsystem 13018, the control is passed to the specific subroutine. A directory is kept which lists the range of addresses which are valid for each interface (and the serial subsystem 13018 itself) and this forms the basis of the routing. If an address is not found in the directory, it is assumed that the message needs to be routed to the control subsystem 13016.

The network message processor is always scheduled and runs when no other processors need service. It manages a FIFO type circular message queue into which other input processors push on buffer address and lengths. If the queue is empty, this processor returns. Inputs arrive from the message queue. Outputs are sent to the output queues and the dispatcher table.

Protocols

Control/serial subsystem protocol: The interface between the control subsystem 13016 and the serial subsystem 13018 is provided via the Intel MULTIBUS structure 41016.

The dual port RAM feature of the systems is used to provide the control subsystem 13016 with an access path to a portion of each serial subsystem's 13018 RAM. The flag interrupt feature of the serial subsystems 13018 is used to signal the serial subsystem 13018 that data is available in its RAM. The serial subsystems 13018 use one of the MULTIBUS interrupt lines to signal the control subsystem 13016 that data is available in its RAM. All serial subsystems 13018 at a node share one of the available (INT 0–INT 7) lines. When the serial subsystem 13018 raises the interrupt, the control subsystem 13016 determines what type of service is requested. Two types are possible:

(1) An acknowledgement to a previous control subsystem 13016 to serial subsystem message transfer.

(2) A request to transfer a message from the serial subsystem 13018 to the control subsystem 13016.

The following table illustrates a possible memory map of the configuration as seen from the various CPUs:

| CONTROL SUBSYSTEM ADDRESS | LOCATION |
|---|---|
| 00000–0FFFF | 86/12A RAM (control subsystem) |
| 10000–1FFFF | 464 RAM (extended memory) |
| 20000–DFFF | Unassigned |
| A0000–A1FFF | 544-0 8000–9FFF (serial subsystem 0) |
| A2000–A3FFF | 544-1 8000–9FFF (serial subsystem 1) |
| A4000–A5FFF | 544-2 8000–9FFF (serial subsystem 2) |
| ⋮ | ⋮ |
| AE000–AFFFF | 544-7 8000–9FFF (serial subsystem 7) |
| E8000–FBFFFH | Unassigned |
| F0000–FFFFFH | 86/12 ROM |

The 8 K RAM out of the 16 K total serial subsystem 13018 RAM is accessible by the control subsystem 13016 via the dual port RAM controller, of which approximately 260 bytes will be used as a buffer.

When the control subsystem 13016 desires to transfer data to the serial subsystem 13018, it moves the data to the first message buffer. Once the message has been moved, the control subsystem 13016 notifies the serial subsystem 13018 of the presence of the message by writing a "1" into the CS-SS-COMMAND, and subsystem 13016 and initiates processing of the message by the serial subsystem. The control subsystem 13018 only writes into the buffer or CS-SS-COMMAND when the CS-SS-COMMAND is zero. The serial subsystem 13018 processes the flag interrupt and interprets the message in the SS-MESSAGE. Once processed, the SS zero CS-SS-COMMAND and interrupts the CS using multibus 41016 interrupts. The serial subsystem 13018 only writes the CS-SS-COMMAND when it has been interrupted and it is nonzero.

When the serial subsystem 13018 desires to transfer data to the control subsystem 13016 it moves the data into an appropriate message buffer within the 4 K RAM, stores a pointer to the buffer into the CS-POINTER, and writes a "1" into the SS-CS-COMMAND when the SS-CS-COMMAND is zero. The control subsystem 13016 processes the message; once completed, it zeroes the SS-CS-COMMAND and writes a "1" into SS-INTERRUPT cell, signalling that the transfer is complete while processing, the CS puts a −1 into the SS-CS-COMMAND.

Should a timeout occur on lack of message completion, the sequence is repeated until an acknowledging interrupt is received.

The following table, Table 4, is a very general illustration of the flow of control between the two systems:

TABLE 4

| FUNCTION | CONTROL SUBSYSTEM | SERIAL SUBSYSTEM |
|---|---|---|
| CONTROL TO SS MESSAGE | MAKE SURE CS-TO-SS-COMMAND IS O MOVE MESSAGE TO MESSAGE BUFFER MOVE "1" INTO CS-TO-SS COMMAND | |

TABLE 4-continued

| FUNCTION | CONTROL SUBSYSTEM | SERIAL SUBSYSTEM |
|---|---|---|
| | INITIATE FLAG INTERRUPT | |
| | | PROCESS FLAG INTERRUPT IF CS-SS-COMMAND = 1 THEN PROCESS MESSAGE ELSE DONE SET CS-SS-COMMAND TO 0 INITIATE MULTIBUS INTERRUPT |
| | PROCESS MULTIBUS INTERRUPT MAKE SURE THAT SS-CS COMMAND = 0 | |
| SS TO CONTROL MESSAGE | | MOVE MESSAGE TO A BUFFER MOVE POINTER TO CS-POINTER MOVE "1" INTO SS-CS-COMMAND INITIATE MULTIBUS INTERRUPT |
| | PROCESS MULTIBUS INTERRUPT IF SS-CS-COMMAND = 1, THEN PROCESS MESSAGE ELSE DONE WHILE PROCESSING MESSAGE, SET SS-CS-COMMAND = −1 ZERO SS-CS-COMMAND, WHEN COMPLETE INITIATE FLAG INTERRUPT | |
| | | PROCESS FLAG INTERRUPT MAKE SURE CS-SS-COMMAND = 0 |

The serial subsystem/UIIM data communication format/protocol is now described.

The serial subsystem/UIIM data communication protocol uses an eight-bit EBCDIC code, no parity, one start bit, and one stop bit. It uses the standard EBCDIC representation for control characters, as shown in Table 5 below.

TABLE 5

| NAME | HEX | OCTAL | DESCRIPTION |
|---|---|---|---|
| STX | 02 | 002 | START OF TEXT MESSAGE |
| ETX | 03 | 003 | END OF TEXT MESSAGE |
| EOT | 37 | 067 | END OF TRANSMISSION |
| ENQ | 2D | 055 | ENQUIRY |
| ACK0 | 1070 | 020 161 | ACKNOWLEDGEMENT |
| ACK1 | 1061 | 020 141 | ACKNOWLEDGEMENT |
| NAK | 3D | 075 | NEGATIVE ACKNOWLEDGEMENT |
| DLE | 10 | 020 | DATA LINK ESCAPE |
| WAK | 106B | 020 153 | ACKNOWLEDGE AND WAIT |

The physical Level 1 interface consists of bus 41090 of two balanced pair lines for transmit and receive data, and a signal ground line. No control leads are used or supported.

In general, the Level 2 protocol is loosely based on an IBM 2780 type polled BISYNC protocol. The serial subsystem 13018 is the primary station and performs the polling. The user interactive interface modules (UIIM) 13024 will be the back-up stations. Since this is an asynchronous protocol, no synch characters are used. This protocol is given the name BIAS (binary asynchronous).

With regard to addressing, each BIAS link can have up to 32 UIIMs 13024 multidropped on the line 41090. Each UIIM 13024 is given a unique address in the range of 0 to 1F (hex) or 37 (octal). To have this address conform to EBCDIC representation, either a hex 40 (octal 100) or a hex 60 (octal 140) is added to the address to form an address character in the range of 40 hex (100 octal) to 7F hex (177 octal). Each UIIM 13024 only recognizes their unique address characters. A 40 hex is added for a poll, and a 60 hex for a selection.

Normally, the serial subsystem 13018 will poll each UIIM 13024 in sequence to determine if it has any data to send. This is done by sending a poll sequence with a poll address for the appropriate UIIM 13024. This address is in the range of 40 hex (100 octal) to 5F hex (137 octal).

When the serial subsystem has information to transmit to the UIIM, it sends a select sequence with a select address for the appropriate UIIM. This address is in the range of 60 hex (140 octal) to 1F hex (177 octal), and is formed by adding 60 hex (140 octal) to the UIIM unique address. Therefore a UIIM 13024 determines if it is being selected to receive data, or polled to send data by the state of bit 5 of the address character.

The serial subsystem 13018 sends out a poll sequence to each UIIM 13024 to determine if it has information to read.

The DLE, EOT forces all UIIMs into a receive mode and stops their transmissions if any were occurring. All UIIMs 13024 examine the poll addresses to determine it it is theirs; both addresses must compare or the UIIM's take no action.

(1) Polling/selecting timeout:

When the serial subsystem 13018 polls (or selects) each UIIM 13024 address that is in its active list, if start of transmission has not been received within 25 milliseconds, the serial subsystem 13018 continues polling with the next address in its file. If, on two successive passes through the active list, no response is received, the UIIM 13024 address is removed from the active list and placed on the inactive list. For every pass through the active list, the serial subsystem 13024 uses one entry out of the inactive list and polls it to see if it has come back on-line.

(2) The transmission timeout:

Once a UIIM 13024 has been polled or selected and transmission has begun, a valid sequence has to be received by each end from the other end within 300 milliseconds after the last transmission. If a correct sequence is not received, error recovery is invoked.

Serial subsystem recovery occurs as follows:

Most error recovery lies with the serial subsystem 13018; it is the serial subsystem's 13018 responsibility to keep the link running.

(1) Polled recovery:

During a polled transmission sequence (i.e., when the UIIM is transmitting data), if the serial subsystem 13018 times out, it sends a NAK. If after 2 NAKs, a valid message is not received, a DLE, EOT is sent and the serial subsystem 13018 continues polling from its active list. The UIIM 13024, when receiving a NAK, should go back and retransmit its last message. If the serial subsystem 13018 receives a sequence number out of order, it acknowledges the block to correspond with the received sequence number but ignores the message.

(2) Selection recovery:

During a selection transmission sequence (i.e., when the serial subsystem is transmitting data), if the serial subsystem 13018 times out, it sends an ENQ. If after 2 ENQ's, a valid message is not received, a DLE,EOT is sent and the serial subsystem 13018 continues polling from its active list it is assumed that the last message sent by the serial subsystem 13018 has not been received by the UIIM. When the UIIM receives an ENQ, it retransmits its previous transmission (ACK 0, ACK 1, NAK). If the serial subsystem 13018 receives a NAK or an out of sequence ACK (ACK 0 when it expected ACK 1), it resends the previous message.

If the correct ACK is received, the next message is sent.

UIIM RECOVERY (1) Polled Recovery:

During a polled transmission sequence (i.e., when the UIIM 13024 is transmitting data), if the UIIM 13024 times out, it ignores all unrecognized character sequences that it has previously received and wait for an error recovery transmission from the serial subsystem 13018. If a DLE,EOT is received, it goes back into a wait state for its proper address. If a NAK is received, it retransmits its last message. If nothing valid is received within the timeout period, the sequence is repeated.

(2) Selection Recovery:

During a selection transmission sequence (i.e., when the serial subsystem 13018 is transmitting data), if the UIIM 13024 times out, it ignores all uncompleted message data previously received, and waits for an error recovery transmission from the serial subsystem 13018.

If a DLE,EOT is received, it goes back into a wait state for its proper address. If an ENQ is received, it retransmits its last response. If nothing valid is received within the timeout period, the sequence is repeated.

(2) Selection Recovery:

During a selection transmission sequence (i.e., when the serial subsystem 13018 is transmitting data), if the UIIM 13024 times out, it ignores all uncompleted message data previously received, and waits for an error recovery transmission from the serial subsystem.

If a DLE,EOT is received, it goes back into a wait state for its proper address. If an ENQ is received, it retransmits its last response. If nothing valid is received within the timeout period, the sequence is repeated.

The data communication format and protocol between the serial subsystem 13018 and a modem 41028 is defined by the data communication format and protocol between the network subsystem 13028 and modem.

6.0 Digital Speech Interpolation (DSI) System

The function of the voice digitizer equipment subsystem 13020 is to convert analog information to and/or from a user device into a corresponding digital signal. The analog to digital conversion allows analog information to be carried by the all digital network of the present invention. Any type of analog to digital converter can be employed for the voice digitizer equipment. For example, a converter employing a logarithmic or linear digitization scheme can be used. Specific converters which produce a digital bit scheme having a reduced number of bits for a given analog signal are particularly suited for the present invention. Of this type is the nearly instantaneous companding (NIC) subsystem and method discussed in Section 6.1 below.

6.1 Nearly Instantaneous Companding (NIC)

The NIC speech coder functions as the primary voice digitizer in the ICC/TMDA satellite communications system. The digital output of the NIC voice digitizer is a 32 Kbs serial data stream containing specially encoded voice data in a structured format. Employing this voice digitizer offers a two-to-one channel capacity advantage over conventional $\mu$-Law PCM digitization (64 Kbs per channel) while offering comparable performance.

The NIC companding scheme is based upon the inherent quasi-stationary characteristics of speech: over short periods of time (typically 5–25 ms), the (second-order) statistical characteristics of voice signals remain relatively constant. Partitioning the signal into fixed-duration time frames, the signal samples of a given frame are quantized based upon the dynamic range of that frame.

Described below is the implementation of the present invention. Among the differences between previous implementations and the present invention are: Analog-to-PCM and PCM-to-analog conversions, block-length of NIC frames, and NIC-to-PCM and PCM-to-NIC conversions.

Initially, the analog speech signal is band limited within, for example, 200–3200 Hz. Note that a combination of switched capacitor and analog filtering in the present invention enables the use of a 7.5 KHz sampling frequency without aliasing distortions. Analog-to-digital conversion is performed by employing a standard $\mu$-law 8 bit PCM coder/decoder (CODEC) 43010. The digitized speech signal is then segmented into 60 samples per 8-ms frame: $S(n), n=1,2 \ldots 60$. All samples within a given frame are then normalized by a maximum amplitude $S_{max}$, which becomes the scaling factor for this particular frame. The normalized samples $S'(n)$ are bounded by unity:

$$-1 \leq S'(n) \leq 1$$

The scaling factor $S_{max}$, which carries the essential information about the dynamic range within a particular frame is provided with the encoder data. The normalized samples $S'(n)$ are encoded with fewer bits than the original signal from the CODEC 43010. Specifically, as shown in FIG. 63, the present invention provides NIC encoded analog signals to the digital I/O equipment 13014, and receives NIC encoded analog signals from the digital I/O equipment 13014. The frame format is as follows: 4 bits (3 magnitude, 1 sign) are used for each NIC sample and 5 bits are used to encode $S_{max}$ for the entire frame (denominated the SMAX0 bits of the control word). Since the $S_{max}$ scaling information is most essential for error free transmission (observe that an error in $S_{max}$ propagates through the whole frame of sixty sample frame), parity bits (denominated by P in the control word) are added for simple error detection and correction for this word. A sync word (8 bits) precedes the above data in each NIC frame.

The NIC encoding/decoding scheme of the present invention can be expressed as follows for a block of PCM samples $\{L_{ij}, V_{ij}\}$:

NIC encoding: 7-bit $\mu$-Law to 3-bit linear

Input: $\{L_{ij}, V_{ij}\}$,
$0 \leq L_{ij} \leq 7, 0 \leq V_{ij} \leq 15, 1 \leq j \leq n$,
$n$ is the number of samples per block.

$$P_{imax} = \max_{j} \{2^{L_{ij}}(V_{ij} + 16.5) - 16.5)\}, 1 \leq j \leq n.$$

$$N_{ij} = \begin{cases} INT\left[8 \frac{2^{L_{ij}}(V_{ij} + 16.5) - 16.5}{P_{imax}}\right] & \text{for} \\ 2^{L_{ij}}(V_{ij} + 16.5) - 16.5 \neq P_{imax}, \\ 7 \text{ for } 2^{L_{ij}}(V_{ij} + 16.5) - 16.5 = P_{imax}. \end{cases}$$

Output: $P_{imax}, 0 \leq P_{imax} \leq 4079.5$,
$\{N_{ij}\}, 0 \leq N_i \leq 7, 1 \leq j \leq n$.

NIC decoding: 3-bit linear to 7-bit $\mu$-Law

Input: $P_{imax}, 0 \leq P_{imax} \leq 4079.5$
$\{N_{ij}\}, 0 \leq N_{ij} \leq 7, 1 \leq j \leq n$,
$n$ is the number of samples per block.

$$L_{oj} = INT\left[\log_2 \frac{P_{imax} \frac{2N_{ij} + 1}{16} + 16.5}{16}\right]$$

$$V_{oj} = INT\left[\frac{P_{imax} \frac{2N_{ij} + 1}{16} - 16}{2^{L_{oj}}}\right]$$

Output: $\{L_{oj}, V_{oj}\}, 0 \leq L_{oj} \leq 7, 0 \leq V_{oj} \leq 15, 1 \leq j \leq n$.

The voice digitizer of the present invention basically consists of the following two steps in the direction from the analog device to the digital I/O equipment 13014: analog to digital conversion to $\mu$-law logarithmic and then conversion of the $\mu$-law logarithmic to the NIC format defined by the equation above. In the direction from the digital I/O equipment 13014 to the analog device, the present invention basically consists of the following two steps: conversion of the NIC format to the $\mu$law logarithmic in accordance with the equation above, followed by $\mu$law digital to analog conversion.

In the preferred embodiment of the present invention, the PCM-to-NIC conversion is performed in a ROM look-up table 43020 in order to speed up the operations of normalization and generation of NIC samples. The data stored in the ROM lookup table 43020 is determined in accordance with the above equation. In one embodiment of ROM lookup table 43020, a 12 bit address consisting of the 7-bit PCM magnitude and the 5-bit $S_{max}$ is formed. An economic method of addressing either nibble in look-up tables enables the reduction of memory from 4K to 2K. On the receive side, $S_{max}$ is used in conjunction with each received NIC nibble to form an address to a NIC-to-PCM look-up table in ROM 43020. For example, the NIC-to-PCM conversion table 43020 has 256 memory locations. Its 8 bit address is a combination of the $S_{max}$ and NIC information bits. In addition, in this embodiment of the present invention, the sign bit is bypassed in both PCM-to-NIC and NIC-to-PCM conversions in order to reduce the memory size of ROM 43020.

It should be noted that the use of a conversion table 43020 is not necessary for implementing the NIC scheme or algorithm of the present invention. Additionally, the particular characteristics of the conversion table 43020 mentioned above (e.g., a 12 bit address, 256 memory locations) are merely design choices, and presented for exemplary purposes only.

The entire process of NIC data compression described above is performed by software and implemented on a fast single chip microcomputer.

Figure 43:
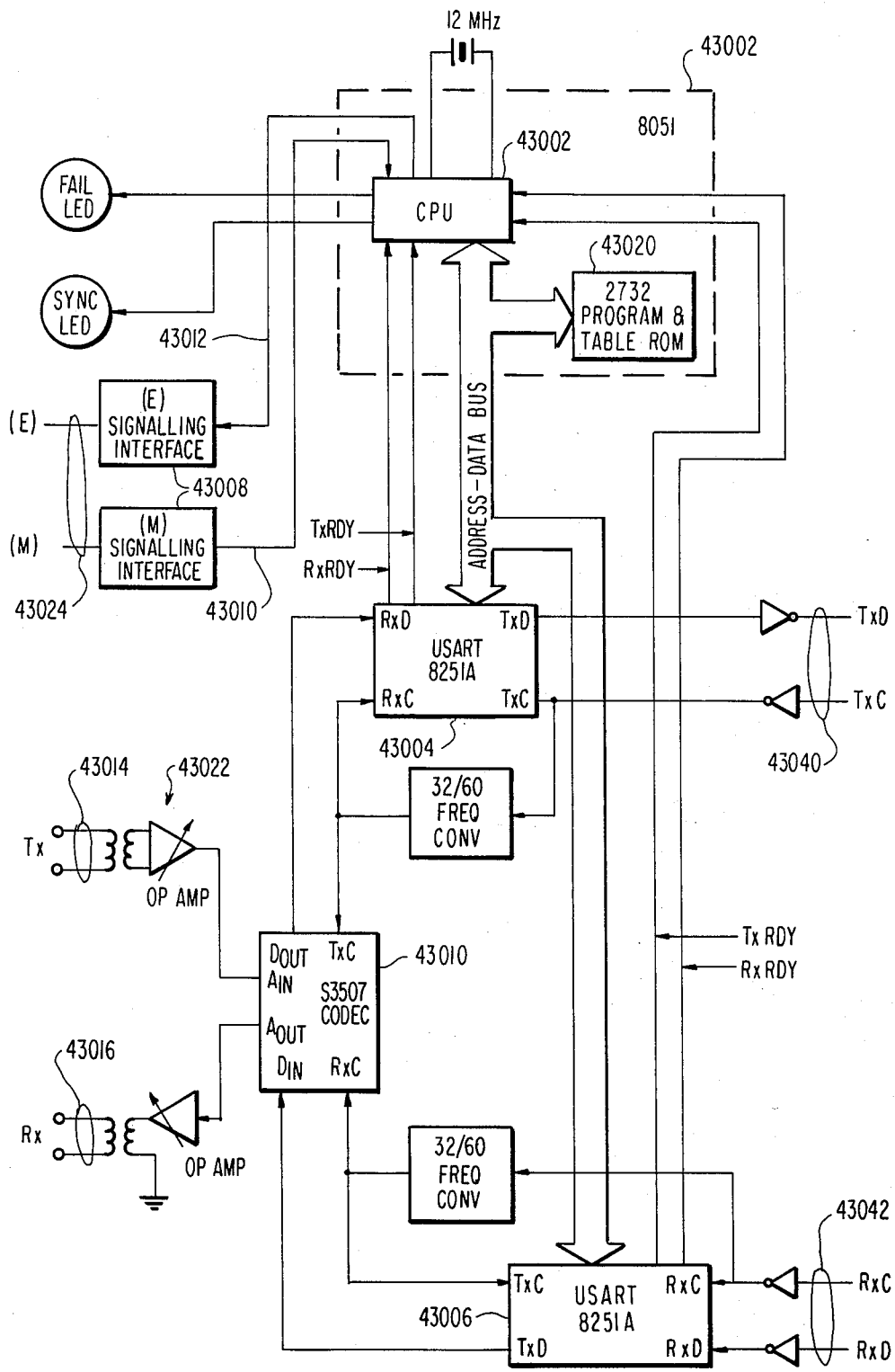
FIG. 43 is a hardware block diagram of the NIC digitizer.

An embodiment of the hardware of this subsystem is shown in block diagram form in FIG. 43. An 8-bit Intel 8051 single IC microcomputer 43002 is the main functional unit. Microcomputer 43002 includes a CPU, 4K bytes of ROM 43020, 128 bytes of RAM (not shown), 4×8 I/O lines, two 16-bit timers and performs most of its instructions in 1 or 2 sec. (12 MHz version). The 8051 controls the functions of both the transmitter and the receiver. The entire PCM-to-NIC and NIC-to-PCM conversion process in accordance with the present invention is performed in software. The program, the PCM-to-NIC and NIC-to-PCM look-up tables reside in less than 4K bytes of ROM 43020, resulting in enough unused memory to allow for special user requirements and features. The overall processing time for one frame of speech for both transmit and receive mode is less than 7.3 ms (91% of maximum real-time load).

A. Transmitter

The preamplified audio input signal passes through an input stage 43002 having a switched capacitor filter with a 3 dB cutoff frequency at 3250 Hz and roll-off characteristic steep enough to avoid aliasing from frequencies above 3750 Hz (the Nyquist frequency). The prefiltered signal at the output of input stage 43002 is then applied to the $\mu$-law companding 8-bit A/D converter 43010. A suitable form for CODEC 62010 is an AMI S3507 CODEC chip, which performs prefiltering, A/D conversion, D/A conversion, and post filtering. The sampling frequency is, for example, 7.5 KHz. The serial PCM clocks of 60 KHz and 7.5 KHz are synthesized from a phase-lock loop (PLL) circuit driven by the external 32 KHz transmit clock. The 60 kb/s serial PCM transmit data is converted to parallel data by the USART (universal synchronous/asynchronous receiver/transmitter) 43006.

The 8051 controls data flow from the USART 43004 into a RAM, segments it into frames of 60 samples long, searches for maximum amplitude $S_{max}$, creates addresses of the PCM-to-NIC look-up table and generates NIC samples. The NIC data is loaded into another parallel-to-serial converter (USART) 43006 and to the line driver at rate of 32 kb/s. The formatted output bit stream (i.e., transmission frame) is synthesized by the software of the 8051.

In order to provide compatibility with standard telephone equipment, E&M signalling capability 43008 is supplied. The 8051 monitors the status of the M lead 43010, and sends it as one data bit per frame. The device can send not only "ON/OFF" hook information but the dialing pulses including DTMF signalling as well.

The structure of the 256-bit frame is as follows:

8-bit sync pattern, 5 bit $S_{max}$, 1 signalling bit, 1 parity bit, 1 spare bit and 60 NIC nibbles (4 bits each).

Figure 44:
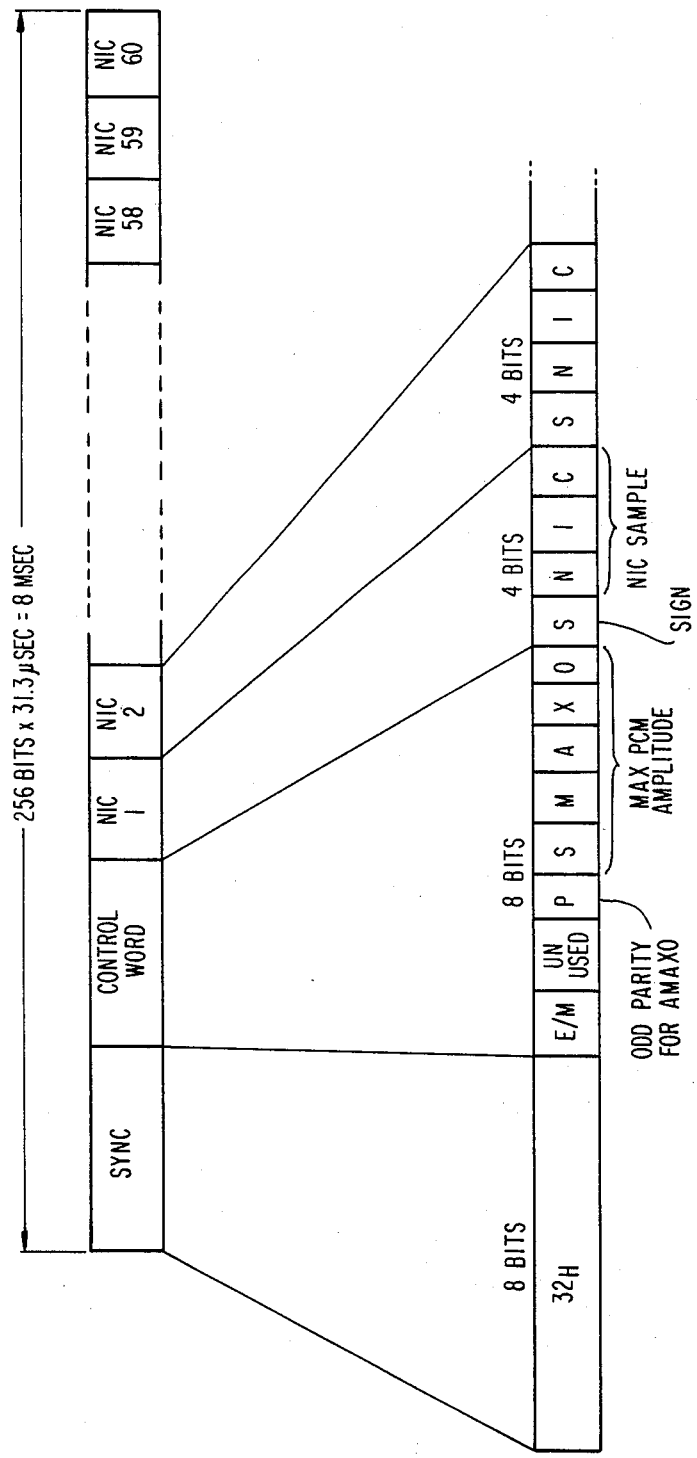
FIG. 44 is a representation of the NIC frame organization.

The frame organization is shown in FIG. 44.

B. Receiver

The serial 32 kb/s bit stream from a line passes through the line receiver and is applied to the USART 43004 to be buffered and converted into parallel 8-bit form. The frame alignment is set up during a synchronization process which will be described in the next section. The scaling parameter $S_{max}$ is decoded and combined with the 4-bit NIC code to create the address for the NIC-to-PCM conversion look-up table. A synthesizer generates receive PCM frequencies 7.5 KHz and 60 KHz, utilizing a phase locked loop (PLL) configuration with a receive clock of 32 KHz input signal.

Decoded PCM samples are sent back to parallel-to-serial converter (USART) 43004 and then serially to the μ-law PCM D/A decoder at a rate of 60 kb/s. The quantized output signal is smoothed by the switched capacitor filter whose cut-off frequency is 3200 Hz and is passed through an operational amplifier gain stage to the 600-ohm matched line transformer.

The 8051 43006 monitors the signalling bit in the frame and sends it to the signalling interface block. The circuit generates the E status that is sent to the trunk over line 43012.

7.0 User Interactive Interface Module (UIIM)

The user interactive interface module is a general class of devices in the ICC subsystem 13008 whose function is to input routing information into the system. For example, one type of user interactive interface modules interfaces to standard telephone PABXs. Another type, referred to as a digital dialer, allows users to input routing information for devices connected to the ICC subsystem 13016, but which are located remotely from the control subsystem 13016 (for example a FAX machine). The following discussion relates to the first type of UIIM, but it is to be understood that the present invention encompasses any type of device which inputs routing information through the serial subsystem.

In the preferred embodiment of the invention, the user interactive interface modules 14020 performs the following general functions:

(1) inputs dialed numbers (DIALPULSE or DTMF) from a user device (e.g., a telephone or PABX) and transfers these numbers upon polling to the serial subsystem for processing.

(2) provides an analog communications interface between the user devices and the voice digitizer.

More specifically, UIIM 14020 performs the following tasks and functions:

1. Interfaces 1 channel telephone trunk to and from a PABX 11008 or user device 11010.

2. Provides a trunk 46000 with the PABX 11008 or user device 11010, which trunk 46000 comprises a first balanced pair lines 46002 (600 ohms) a second balanced pair lines 46004 (a pair of E leads 66006, and a pair of M leads 46008).

3. Detects DTMF dual tone multi-frequency (dialed digit) from the balanced pair 46004 for input audio data.

4. Generates and transmits DTMF tone digits via the pair 46002 along with the audio output to the PABX 11008 or user device 11010.

5. Provides trunk signalling via the E pair 46006 and the M pair 46008.

6. Detects Dial pulse (dialed digit) from the trunk E pair 46006.

7. Generates and transmits dialed pulse digits via the M pair 46008 to the PABX 11008 or the user device 11010.

8. On-hook/off-hook detection and generation for supervision of the trunk.

9. Generates and transmits audible tone information, such as a dial tone (350@440 Hertz), ringback tone (440@480 Hertz), busy tone (480@620 Hertz), and a beep tone (1400 Hertz).

10. Stores in memory (RAM) 46010 the detected dialed telephone number.

11. Sends number dialed to the serial subsystem 13018 via an interface (USART 46012) employing a polling protocol as discussed below.

12. Sends status information (line identification number) off-hook, etc., to the serial subsystem 13018; provides the analog voice signals via a pair of balanced analog audio lines 46014 and 46016 to the voice digitizer 13020.

13. Provides digital data to and receives digital data from the voice digitizer 13020 via an interface (USART 46018) and associated data bus 46020, the control bus 46022, and a signalling bus 46024.

14. Sends a number dialed to a remote UIIM 14020 via the voice digitizer 13020.

15. Receives a look-up routing table from the serial subsystem 13018 by the down line loading of the eprom 46026.

16. Provides an indication, such as a front panel LEDs indicators 46028 and 46030 of the status of the UIIM 14020.

17. Provides self-test diagnostics on power-up or by in front panel switch.

Figure 45:
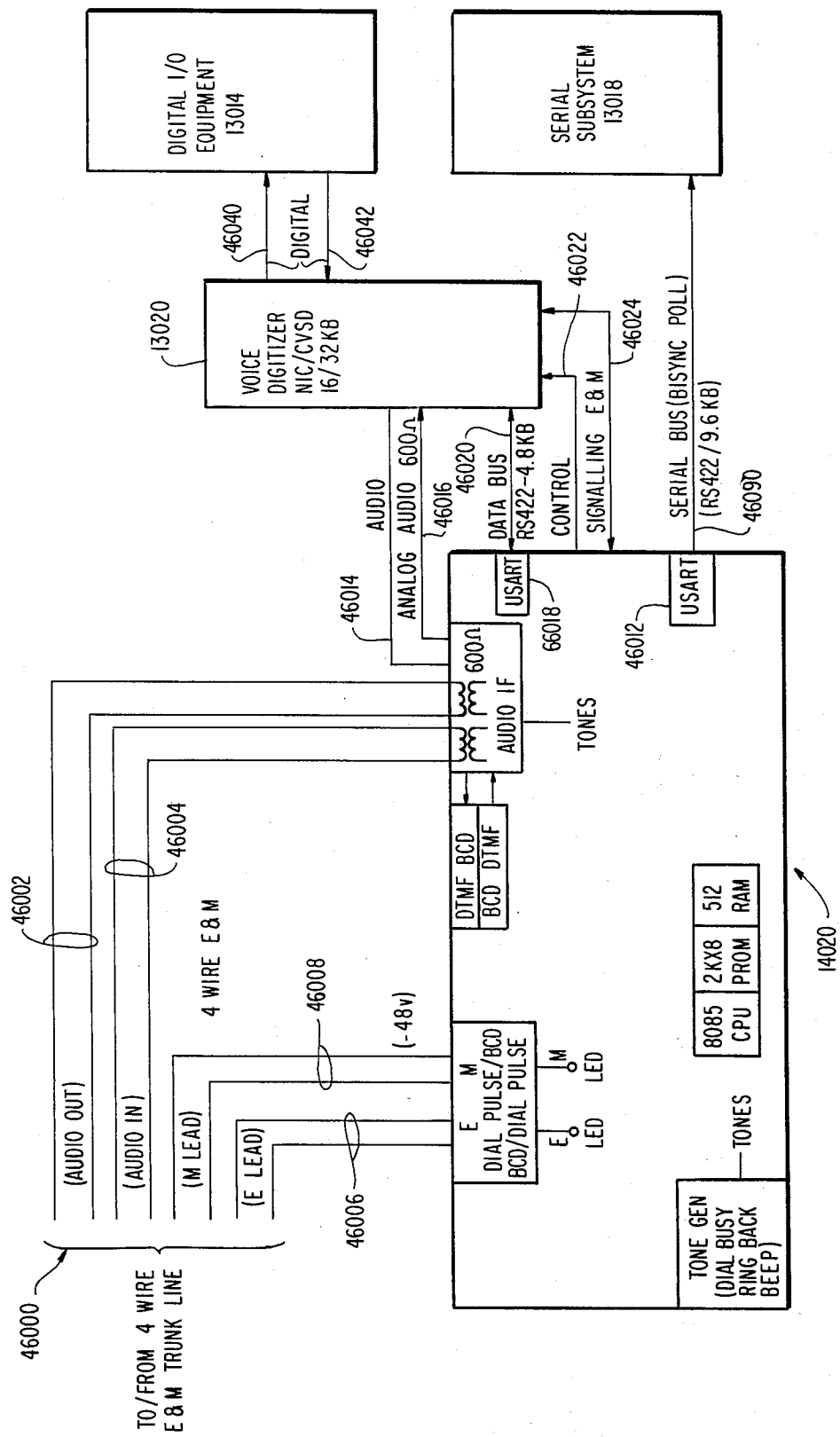
FIGS. 45 and 46 are block diagrams of the UIIM subsystem.

Referring now to FIG. 45, the UIIM 14020 is shown in abbreviated block diagram form emphasizing its connection to its associated PABX 11008 or user device 11010, its voice digitizer 13020, and its serial subsystem 13010. Note that the numbering between this diagram and FIG. 46 indicates common components. Referring now to 46, which is a more detailed block diagram of a preferred embodiment of the UIIM 14020, it is seen that the heart of the UIIM is a CPU 46032, which controls the operation of UIIM 14020 in accordance with control information received from its serial subsystem 13018, its associated PABX 11008 or user device 11010, and its program stored in memory 46020. A preferred form of CPU 46030 is a model 8085 microprocessor made by Intel. It should be noted that CPU 46030 is not limited to an eight-bit machine, and that 16 or 32 bit or other bit size machines can be employed. A suitable for for memory 46026 is a EPROM, such as a model 2716 by Intel, which has a storage capacity of 2K 8-bit bytes of information. Obviously, other suitable forms for memory 46020 can be employed.

Referring again to CPU 46032, a reset switch 46034 is connected to the reset input. CPU 46032 has a crystal 46036 to provide the reference frequency for it and other devices in UIIM 14020. It is thus seen that this CPU does not have to be clock synchronized with the other CPUs in the system. CPU 46032 provides various clock signals, such as the 2.456 MHz clock signal on lead 46038.

A data/address bus 46040 is connected to CPU 46032 via a buffer 46042 and an address bus 46044. Buffer 46042 is controlled by CPU 46032 via a line 46046. A control bus 46048 is connected to CPU 46032 via a buffer 46050 and a bus 46052.

Also connected to data/address bus 46040 is a memory 46010, which can be a random access memory (RAM), such as a model 8155 by Intel having a storage capacity of 512 eight-bit words. A trimer PIT 46054 is connected to bus 46040, and a suitable device for for it is a model 8253 by Intel. The data/address information on bus 46040 is provided on command to the serial subsystem 13018 via an interface 46012, such as a USART (Universal Synchronous Asynchronous Receive Transmit) a suitable form for interface 46012 is a model 8251 made by Intel.

Also connected to data/address bus 46040 is an interface 46056 for interfacing with the voice digitizer 13020. A suitable form for interface 46056 is a model 8251 made by Intel. Also connected to the data/address bus is a DTMS/BCD receiver logic module 46058. Module 46058 is of conventional design, and a suitable form for it is a model SSI201. Also connected to the data/address bus 46040 is a BCD/DTMF dialer logic module 46060 of conventional design. A suitable for module 46060 is a MK5087. Also connected to the data/address bus 46040 is an input/output port of conventional design, such as a port found on a 8155 chip made by Intel.

Also connected to the data/address bus 46040 is a tone generator logic module 46062, which generates desired analog tones in accordance with control signals received from bus 46040 tones generated by module 46062 are, for example, a dial tone, a busy tone, a ring back tone and a beep tone. A suitable form for module 46062 is a model PIT-8253.

Also connected to the data/address bus 46040 is a module 46064 having a memory (for example, 256 eight-bit words of RAM), a counter (for example, a 14-bit counter) and input/output ports (for example, three input/output ports each of which is eight bits wide. A suitable formor module 46064 is a model 8155 made by Intel. Finally, a BCD/DP diapulse dialer module 46066 is connected to the data/address bus 46040.

Briefly, the operation of the embodiment shown in FIG. 46 of UIIM 14020 is as follows. Audio signals on air 46004 are received from the PABX 11008 or the user device 11010. These audio signals are provided to the voice digitizer 13020 via bus 46016 via a transformer 46070, buffer 46072, buffer 46074, buffer 46076 and transformer 46078. In addition, module 46062 can provide tone outputs to the voice digitizer 13020 under control of CPU 8085 via data bus 46040. Analog signals on bus 46014 from the voice digitizer 13020 are provided to the PABX 11008 or the user device 11010 via the UIIM 14020 via a transformer 46080, a buffer 46082, a buffer 46084, a buffer 46086, and a transformer 46088. Module 46062 can provide desired tones to the bus 46002 under control of the CPU 46032 via bus 46040. Note that the UIIM 14020 provides the analog data and from its PABX 11008 or user device 11010 to its voice digitizer 13020.

Referring now to control information, control information between the serial subsystem 13018 and the UIIM 14020 is provided via the serial bus 46090. Note that a polling protocol is employed, as is described in greater detail below. The control information perceived by interface 46012 is provided to CPU 46032 via bus 46040. Terminally, CPU 46032 can provide control information to the serial subsystem 13018 via port 46012.

Control information between the PABX 11018 or the user device 11010, and its UIIM 14020 is either in the form of DTMF tones provided with the audio signals or signalling via the PBUS 46006 or the MBUS 46068. With reference to DTMF signalling, module 46058 receives DTMF tones from either the PABX 11008 or the user device 11010, decodes them, and provides a digital representation of same via bus 46040 to CPU 46032. In response to the control signals, or based on control information received from the serial subsystem 13018, CPU 46032 via bus 46040 causes module 46060 to provide DTMF control tones to the PABX 11008 or the user device 11010. Thus, it is seen that when DTMF signalling is employed, no additional signalling lines or buses need be employed.

Figure 46:
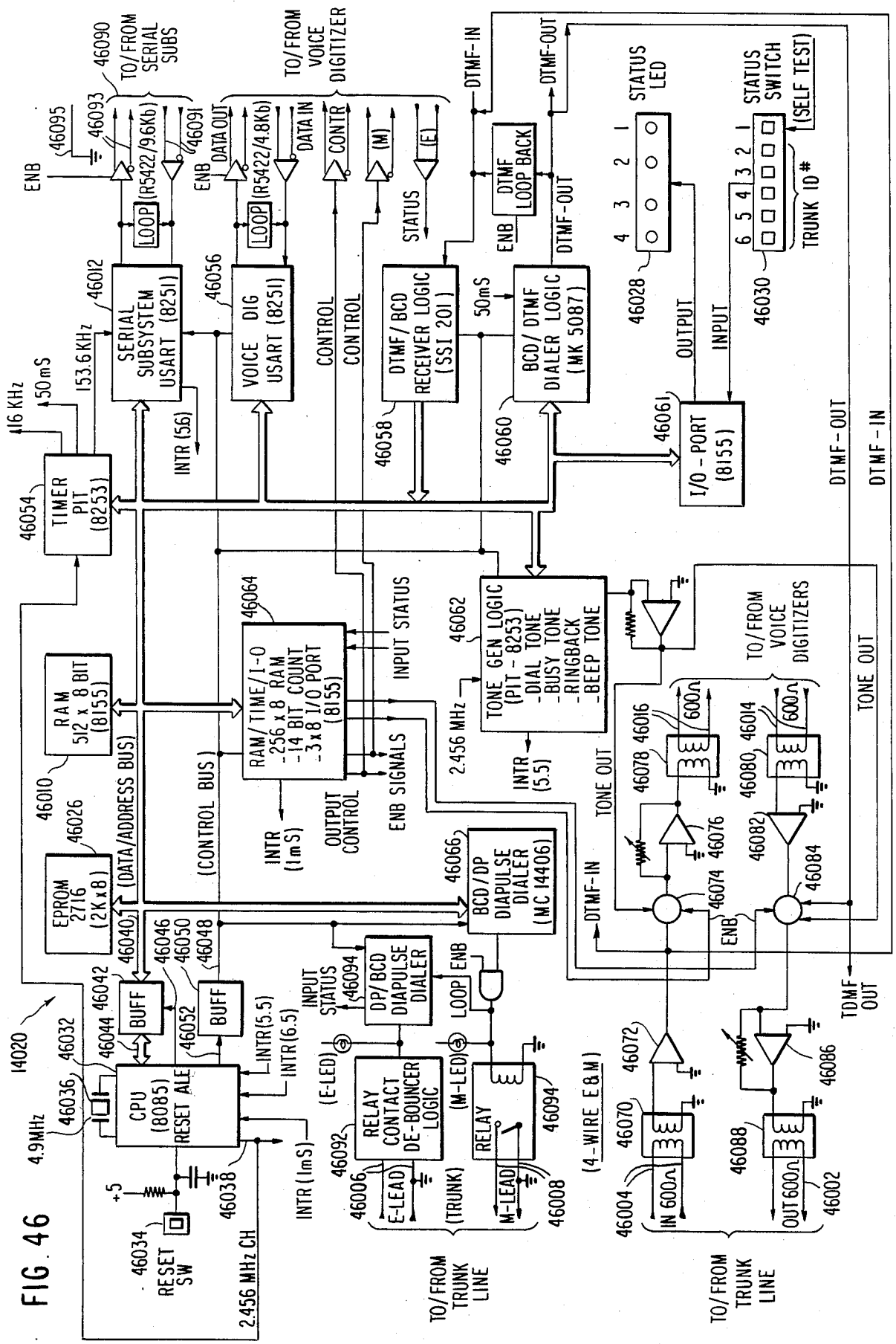

The UIIM 14020 tone in FIG. 46 also provides the capability of E and M control signalling (dial pulse). In this connection, note that a relay contact de-bouncer logic module 46092 is connected to the E bus 46006. The output of module 46092 is provided to a DP/BCD dial pulse detect module 46094, which provides a BCD signal representation of the received dial pulse signal to the input status port of module 46064. In this way, CPU 46032 can determine which dial pulse number has been provided by the PABX 11008 or the user device 11010.

Similarly, CPU 46032 can control a dial pulse PABX 11008 or a user device 11010 by providing a signal via bus 46040 to module 46066. Module 46066 generates a dial pulse signal in accordance with the signal present on the 46040, and this dial pulse signal toggles a relay module 46094, which provides the dial pulse to the MBUS 66008 in conventional fashion.

Also note that the tones conventionally employed in the United States to indicate to a user certain signal conditions, such as dial tone, busy tone, ring back, and beep tone, are provided by the UIIM 14020 to the PABX 11008 or the user device 11010 by module 46062. Thus, it is seen that the UIIM 14020 is the stage in the system of the present invention which generates these tones.

Finally, please note that the port 46061 provides indication of the system operation by controlling the status LED module 46028. In addition, a status switch 46030 can be used to input data to the UIIM 14020 via port 46061. Note that a switch 46030, for example, provides the user with the self-test capability, and also can be employed to change the trunk ID number, if desired.

The following user interactive interface module (UIIM) 14020 protocol is used by the serial subsystem 13018 to communicate with each user interactive interface module 14020. As shown in FIG. 41, more than one UIIM 140920 is typically connected to bus 46090. Note that this protocol is an asynchronous polled protocol. A preferred form for this protocol uses an eight-bit EBCDIC code, having no parity bit, one start bit, and one stop bit. The protocol uses the standard EBCDIC representation for control information.

Referring to FIGS. 60A and 60B, the physical interface consists of two balanced pair lines 46093 and 46091 for transmit and receive data and a signal ground line 46095, all of which make up bus 46090. Note that no control leads are used or supported in this embodiment of UIIM 14020.

The protocol is a polling protocol, loosely based on an IBM 2780 type polled BISYNC protocol. The serial subsystem 13018 acts as the primary station and performs the asynchronous polling. For purposes of this discussion, the user interactive interface modules 14020 act as the back-up stations. Since this is an asynchronous protocol, no sync characters are needed. For purposes of this discussion, the protocol is called the binary asynchronous (BIAS) protocol.

Each binary asynchronous link, for example, has up to 32 UIIMs 14020 multidropped on bus 46090. Each UIIM 14020 is given a unique address in the range of, for example, 0 to 1F (hex) or 0 to 37 (octal). To have this address conform to EBCDIC representation, either a hex 40 (octal 100) or a hex 60 (octal 140) is added to each address to form an address character having a value in the range of 40 hex (100 octal) to 7F hex (177 octal). Each UIIM 14020 is programmed to recognize only its unique address. Note that 40 hex is added by the serial subsystem 13018 in order to poll the addressed UIIM 14020 in order to allow the polled UIIM 14020 to transmit control information to the serial subsystem 13018. The serial subsystem 13018 adds 60 hex to the address in order to indicate to the addressed UIIM 14020 selected by the serial subsystem that the subsequent control information transmitted by the serial subsystem 13018 is intended for the addressed UIIM 14020.

Normally, the serial subsystem 13018 polls each UIIM 14020 multidropped on bus 46090 in sequence to determine if it has any control information to send. The polling of each UIIM 14020 was described above in connection with the 40 hex number added to the address.

When the serial subsystem 13018 has control information to transmit to a UIIM 14020, it sends a select sequence (namely, a 60 hex is added to the address of the selected UIIM 14020) with a select address for the appropriate UIIM 14020. Thus, each UIIM 14020 can determine if it is being selected to receive control information from or is being polled to send control information to its serial subsystem 13018.

A control message called a DLE, EOT is sent by the serial subsystem 13018 to all UIIMs 14020 at any time, and it causes each UIIM 14020 to stop transmission if any is occurring. All UIIMs 14020 examine the poll addresses to determine if it is theirs: both addresses must be equal in order for an addressed UIIM 14020 to take any action.

When the UIIM 14020 has been selected by the serial subsystem 13018 to receive control information, the selected UIIM 14020 responds with an acknowledgement 0 message (ACK 0). The selected UIIM 14020 is then sent a data block by the serial subsystem 13018. If the serial subsystem 13018 needs to send an additional data block, it does so when the UIIM 14020 arises next in its polling sequence. This time, no select address is needed. Instead, only a data block is sent, and the selected UIIM 14020 responds with an ACK 1 message. This can be repeated over and over as many times as needed by the serial subsystem 13018 to transmit data blocks to the selected UIIM 14020. Note that the serial subsystem 13018 may also send a temporary text delay sequence to a selected UIIM 14020 if it desires to keep the communication link via bus 46090 active without sending data blocks.

If the serial subsystem 13018 polls (or selects) a UIIM 14020 present on the active list of the serial subsystem 13018, and receives no response for a given time period (for example, 25 milliseconds), the serial subsystem 13018 continues to the next UIIM 14020 on its active list. If no response is received from a given UIIM 14020 on its active list in two successive passes, the UIIM address is removed from the active list and placed on the inactive list. Note that on every pass through the active list, the serial subsystem 13018 polls one entry out of the inactive list (corresponding to an inactive UIIM 14020) in order to possibly bring that inactive UIIM 14020 back into the active category.

Once a UIIM 14020 has been polled or selected by its serial subsystem 13018 and transmission has begun, a valid sequence over bus 46090 has to occur within a given time interval (for example, 300 milliseconds). An error recovery is invoked if a valid sequence is not received within this time period. The serial subsystem 13018 invokes most error recovery and it has the system responsibility of keeping the link (66090) operational.

During a polled transmission sequence (that is, when a polled UIIM 14020 is transmitting data), the serial subsystem 13018 sends a NAK to the polled UIIM 14020 if it does receive valid data. Note that a UIIM 14020 receiving a NAK retransmits its last message to the serial subsystem 13018. If the serial subsystem 13018 has sent 2 NAKS and has still not received valid data, it sends a DLE, EOT control message to all UIIMs 14020 and then polls the next UIIM 14020 on its active list.

During a selection transmission sequence (that is, when the serial subsystem 13018 is transmitting control information to an addressed UIIM), if the UIIM 14020 does not receive valid data, it sends an ENQ message to the serial subsystem 13018. If after 2 ENQ's are sent by the UIIM 14020, and a valid message is not received, the serial subsystem 13018 sends a DLE, EOT message to all UIIMs 14020 and then polls the UIIM 14020 from its active list.

Obviously, numerous modifications and variations of the present invention are possible in light of the above teachings. It is therefore to be understood that, within the scope of the appended claims, the invention may be practiced otherwise then as specifically described herein.

We claim:

1. A communication system, comprising:
   (a) transmission means for transmitting a radio frequency signal in accordance with a first IF signal, and for providing a second IF signal in accordance with a received radio frequency signal;
   (b) time division multiple access means for generating said first IF signal by assembling frames of first serial data, and for providing second serial data by disassembling said second IF signal;
   (c) switch multiplexer means for supplying said first serial data from stored first parallel data under control of first control signals, and for providing second parallel data from said second serial data under control of second control signals;
   (d) bus extension means for providing said stored first parallel data by storing first parallel data, and for providing stored second parallel data by storing said second parallel data;
   (e) digital input/output means for supplying said first parallel data in accordance with first digital data, and for supplying second digital data in accordance with said stored second parallel data;
   (f) conversion means for providing said first digital data in accordance with first analog signals, and for providing second analog signals in accordance with said second digital data; and (g) control means for providing said first and second control signals in accordance with input signals and a stored program.

2. A communications system, for use with a satellite, comprising a plurality of nodes, each of said nodes comprising:
(a) transmission means for transmitting a first radio frequency signal to the satellite in accordance wih a first IF signal, and for providing a second IF signal in accordance with a second radio frequency signal received from the satellite;
(b) TDMA means, coupled to said transmission means, for generating said first IF signal by providing bursts of first serial data, and for providing second serial data by disassembling said second IF signal;
(c) first bit map means for storing first routing data;
(d) second bit map means for storing second routing data;
(e) routing means, coupled to said TDMA means and to said first bit map means, for supplying said first serial data from first parallel data in accordance with said first routing data, and, coupled to said TDMA means and to said second bit map means, for providing second parallel data from said second serial data in accordance with said second routing data;
(f) a plurality of first interfaces and a plurality of second interfaces; and
(g) first bus means, coupled to said routing means and to said plurality of first interfaces, for providing said first parallel data from said plurality of first interfaces, and, coupled to said routing means and to said plurality of second interfaces, for providing said second parallel data to said plurality of second interfaces.

3. The communications system as recited in claim 2, further comprising:
control means, coupled to said first bit map means, for modifying said first routing data in accordance with first control data, and, coupled to said second bit map means, for modifying said second routing data in accordance with second control data.

4. The communications system as recited in claim 3, wherein said control means further comprises:
first connectivity map means for storing first connectivity map data;
first means, coupled to said first connectivity map means, for supplying said first control data in accordance with said first connectivity map data;
second connectivity map means for storing second connectivity map data; and
second means, coupled to said second connectivity map means, for supplying said second control data in accordance with said second connectivity map data.

5. The communications system as recited in claim 4, wherein said first means comprises:
storage means for storing a program; and
processor means, coupled to said storage means and to said first connectivity map means, for producing said first control data in accordance with said stored program and said first connectivity map data.

6. The communications system as recited in claim 4, wherein said second means comprises:
storage means for storing a program; and
processor means, coupled to said storage means and to said second connectivity map means, for producing said second control data in accordance with said stored program and said connectivity map data.

7. The communications system as recited in claim 4, wherein said control means further comprises:
third means, coupled to said routing means, for providing said first connectivity map data in accordance with some of said second serial data.

8. The communications system, as recited in claim 4, wherein said control means further comprises:
third means, coupled to said routing means, for providing said second connectivity map data in accordance with some of said second serial data.

9. The communications system, as recited in claim 2, wherein said first bit map means comprises:
active means for storing said first routing data; and
inactive means for storing updated first routing data.

10. The communications system as recited in claim 9, further comprising:
control means, coupled to said first bit map means, for supplying said updated first routing data in accordance with control data.

11. The communications system as recited in claim 10, wherein said control means comprises:
connectivity map means for storing connectivity map data; and
first means, coupled to said connectivity map means, for supplying said control data in accordance with said connectivity map data.

12. The communications system as recited in claim 11, wherein said control means further comprises:
second means, coupled to said routing means, for providing said connectivity map data in accordance with some of said second serial data.

13. The communications system as recited in claim 12, wherein said routing means further comprises:
switch means, coupled to said control means, for replacing said first routing data with said updated first routing data in accordance with some of said second serial data.

14. The communications system as recited in claim 2, wherein said second bit map means comprises:
active means for storing said second routing data; and
inactive means for storing updated second routing data.

15. The communications system as recited in claim 14, further comprising:
control means, coupled to said second bit map means, for supplying said updated second routing data in accordance with control data.

16. The communications system as recited in claim 15, wherein said control means comprises:
connectivity map means for storing connectivity map data; and
first means, coupled to said connectivity map means, for supplying said control data in accordance with said connectivity map data.

17. The communications system as recited in claim 16, wherein said control means further comprises:
second means, coupled to said routing means, for providing said connectivity map data in accordance with some of said second serial data.

18. The communications system as recited in claim 17, wherein said routing means further comprises:

switch means, coupled to said control means, for replacing said second routing data with said updated second routing data in accordance with some of said second serial data.

19. The communications system as recited in claim 2, wherein said first bit map means comprises:
a plurality of entry means for storing associated channel addresses and word numbers, each of said channel addresses indicative of one of said plurality of first interfaces, and each of said word numbers indicative of the number of data words of said first parallel data from said one of said plurality of first interfaces.

20. The communications system as recited in claim 2, wherein said second bit map means comprises:
a plurality of entry means for storing associated channel addresses and word numbers, each of said channel addresses indicative of one of said plurality of second interfaces, and each of said word numbers indicative of the number of data words of said second parallel data provided to said one of said plurality of second interfaces.

21. The communications system as recited in claim 19, wherein said routing means comprises:
word counter means for counting the number of data words of said first parallel data; and
event counter means for selecting one of said plurality of entry means in accordance with said number of data words counted by said word counter means.

22. The communications system as recited in claim 21, wherein said routing means further comprises:
comparator means, coupled to said word counter means and to said first bit map means, for incrementing said event counter means when the number of data words counted by said word counter means corresponds to said word number contained in said entry means selected by said event counter means.

23. The communications system as recited in claim 20, wherein said routing means comprises:
word counter means for counting the number of data words of said second serial data; and
event counter means for selecting one of said plurality of entry means in accordance with said number of data words counted by said word counter means.

24. The communications system as recited in claim 23, wherein said routing means further comprises,
comparator means, coupled to said word counter means and to said second bit map means, for incrementing said event counter means when the number of data words counted by said word counter corresponds to said word number contained in said entry means selected by said event counter means.

25. The communications system as recited in claim 21, wherein said TDMA means comprises:
means for sensing said bursts of first serial data to detect the beginning of a frame.

26. The communications system as recited in claim 25, wherein said routing means further comprises:
resetting means, coupled to said means for sensing said bursts of first serial data, for resetting said word counter means and said event counter means when the beginning of a frame is detected.

27. The communications system as recited in claim 23, wherein said TDMA means comprises:
means for sensing said bursts of second serial data to detect the beginning of a frame.

28. The communications system as recited in claim 27, wherein said routing means further comprises:
resetting means, coupled to said means for sensing said bursts of second serial data, for resetting said word counter means and said event counter means when the beginning of a frame is detected.

29. The communications system as recited in claim 2, wherein said routing means comprises:
transmit controller means for providing said first serial data from said first parallel data.

30. The communications system as recited in claim 29, wherein said transmit controller means comprises,
register means for converting said first parallel data to said first serial data.

31. The communications system as recited in claim 2, wherein said routing means comprises:
receive controller means for providing said second parallel data from said second serial data.

32. The communications system as recited in claim 31, wherein said receive controller means comprises:
register means for converting said second serial data to said second parallel data.

33. The communications system as recited in claim 2, wherein said TDMA means comprises:
first means for sensing said bursts of first serial data to detect the beginning of a transmit frame; and
second means for sensing said second serial data to detect the beginning of a receive frame.

34. The communications system as recited in claim 33, wherein said routing means comprises:
third means, coupled to said first means, for generating first timing data in response to the detection of the beginning of said transmit frame; and
fourth means, coupled to said second means, for generating second timing data in response to the detection of the beginning of said receive frame.

35. The communications system as recited in claim 3, further comprising:
interface means, coupled to said routing means and to said first bit map means, for supplying said first control data in accordance with some of said second serial data.

36. The communications system as recited in claim 35, wherein said interface means comprises:
buffer means, coupled to said routing means and to said first bit map means, for buffering some of said second serial data to produce said first control data; and
sequencer means, coupled to said routing means and to said buffer means, for controlling said buffering by said buffer means in accordance with some of said second serial data.

37. The communications system as recited in claim 2, further comprising:
second bus means coupled to said first bit map means and to said plurality of first interfaces; and
control means, coupled to said first bus means and to said second bus means, for supplying first control data via said second bus means to said first bit map means to modify said first routing data in accordance with some of said second serial data received via said first bus means from said routing means.

38. The communications system as recited in claim 37, further comprising:
means, coupled to said first bus means and to said second bus means, for controlling the providing of said first parallel data from said plurality of first interfaces via said first bus means to said routing means in accordance with said first routing data provided via said second bus means.

39. The communications system as recited in claim 37, wherein said control means further comprises:
buffer means, coupled to said first bus means and to said second bus means, for providing to said second bus means said first control data by buffering some of said second serial data; and
sequencer means for controlling said buffering by said buffer means.

40. The communications system as recited in claim 39, wherein said control means further comprises:
storage means for storing a program; and
processor means, coupled to said storage means, to said first bus means, and to said sequencer means, for controlling said sequencer means in accordance with said program and some of said second serial data.

41. The communications system as recited in claim 3, further comprising:
interface means, coupled to routing means and to said second bit map means, for supplying said second control data in accordance with some of said second serial data.

42. The communications system as recited in claim 41, wherein said interface means comprises:
buffer means, coupled to said routing means and to said second bit map means, for buffering some of said second serial data to produce said second control data; and
sequencer means, coupled to said routing means and to said buffer means, for controlling said buffering by said buffer means in accordance with some of said second serial data.

43. The communications system as recited in claim 2, further comprising:
second bus means coupled to said second bit map means and to said plurality of second interfaces; and
control means, coupled to said first bus means and to said second bus means, for supplying first control data via said second bus means to said second bit map means to modify said second routing data in accordance with some of said second serial data received via said first bus means from said routing means.

44. The communications system as recited in claim 43, further comprising:
means, coupled to said first bus means and to said second bus means, for controlling the providing of said second parallel data to said plurality of second interfaces via said first bus means from said routing means in accordance with said first routing data provided via said second bus means.

45. The communications system as recited in claim 43, wherein said control means further comprises:
buffer means, coupled to said first bus means and to said second bus means, for providing said second control data by buffering some of said second serial data; and
sequencer means for controlling said buffering by said buffer means.

46. The communications system as recited in claim 45, wherein said control means further comprises:
storage means for storing a program; and
processor means, coupled to said storage means, to said first bus means, and to said sequencer means, for controlling said sequencer means in accordance with said program and some of said second serial data.

47. The communications system as recited in claim 37, wherein said control means further comprises:
control interface means, coupled to said first bus means, for providing some of said first parallel data in accordance with said first routing data.

48. The communications system as recited in claim 47, wherein said control interface means comprises:
buffer means, coupled to said first bus means, for providing some of said first parallel data; and
sequencer means, coupled to said second bus means and to said buffer means, for controlling the providing of some of said first parallel data in accordance with said first routing data.

49. The communications system as recited in claim 48, wherein said sequencer means comprises:
memory means for storing sequencing data; and
counter means, coupled to said memory means, for addressing said buffer means in accordance with said sequencing data.

50. The communications system as recited in claim 49, wherein said control interface means further comprises:
comparator means, coupled to said second bus, for accessing said memory means to provide said sequencing data to said counter means in accordance with said first routing data.

51. The communications system as recited in claim 43, wherein said control means further comprises:
control interface means, coupled to said first bus means, for receiving some of said second parallel data in accordance with second routing data.

52. The communications system as recited in claim 51, wherein said control interface means comprises,
buffer means, coupled to said first bus means, for receiving some of said second parallel data; and
sequencer means, coupled to said second bus means and to said buffer means, for controlling the receiving of some of said second parallel data in accordance with said second routing data.

53. The communications system as recited in claim 52, wherein said sequencer means comprises:
memory means for storing sequencing data; and
counter means, coupled to said memory means, for addressing said buffer means in accordance with said sequencing data.

54. The communications system as recited in claim 53, wherein said control interface means further comprises:
comparator means, coupled to said second bus, for accessing said memory means to provide said sequencing data to said counter means in accordance with said second routing data.

55. The communications system as recited in claim 2, wherein at least one of said plurality of first interfaces and at least one of said plurality of second interfaces comprise:
high level bus extension means, coupled to said first bus means, for providing some of said first parallel data to said first bus means and for receiving said second parallel data from said first bus means.

56. The communications system as recited in claim 55, wherein said high level bus extension means comprises:

comparator means for providing said first parallel data to said first bus means when said first routing data equals a preselected address.

57. The communications system as recited in claim 55, wherein said high level bus extension means comprises:
comparator means for providing enable data when said second routing data equals a preselected address.

58. The communications system as recited in claim 55, wherein said first bus means comprises:
transmit bus means, coupled to said routing means and to said plurality of first interfaces, for providing said first parallel data to said plurality of first interfaces; and
receive bus means, coupled to said routing means and to said plurality of second interfaces, for providing said second parallel data to said plurality of second interfaces.

59. The communications system as recited in claim 55, further comprising:
low level bus extension means, coupled to said high level bus extension means, for providing some of said first parallel data to said high level bus extension means, and for receiving said second parallel data from said high level bus extension means.

60. The communications system as recited in claim 59, wherein said low level bus extension means comprises:
comparator means for providing said first parallel data to said first high level bus extension means when said first routing data equals a preselected address.

61. The communications system as recited in claim 59, wherein said low level bus extension means comprises:
comparator means for providing said first parallel data to said first high level bus extension means when said first routing data equals a preselected address.

62. The communications system as recited in claim 59, wherein said low level bus extension means comprises:
comparator means for providing enable data when said second routing data equals a preselected address.

63. The communications system as recited in claim 3, further comprising:
programming bus means coupled to said control means; and
high level bus extension means, coupled to said first bus means, for providing some of said first parallel data to said first bus means and for receiving said second parallel data from said first bus means.

64. The communications system as recited in claim 63, wherein said high level bus extension means further comprises:
comparator means for providing enable data when data received from said control means via said programming bus means corresponds to a preselected address; and
buffer means, coupled to said programming bus means, for controlling the direction of transmission of data on said programming bus means.

65. The communications system as recited in claim 64, further comprising:
low level bus extension means, coupled to said high level bus extension means, for providing some of said first parallel data to said high level bus extension means, and for receiving said second parallel data from said high level bus extension means.

66. The communications system as recited in claim 65, wherein said low level bus extension means further comprises:
second bus means coupled to said programming bus means;
comparator means for providing enable data when data received from said control means via said programming bus means corresponds to a preselected address; and
buffer means, coupled to said programming bus means, for controlling the direction of transmission of data on said programming bus means.

* * * * *